(12) United States Patent
Houthoff et al.

(10) Patent No.: US 12,552,866 B2
(45) Date of Patent: Feb. 17, 2026

(54) INTERNALIZING BINDING MOLECULES TARGETING RECEPTORS INVOLVED IN CELL PROLIFERATION OR IN CELL DIFFERENTIATION

(71) Applicant: LinXis B.V., Amsterdam (NL)

(72) Inventors: Hendrik Jan Houthoff, Amsterdam (NL); Paulus Martinus Petrus van Bergen en Henegouwen, Utrecht (NL); Niels Jurriaan Sijbrandi, Utrecht (NL); Joey Armand Muns, Hoofddorp (NL); Jan Hendrik Schooten, Utrecht (NL); Sebas Daniël Pronk, Utrecht (NL)

(73) Assignee: LinXis B.V., Amsterdam (NL)

( * ) Notice: Subject to any disclaimer, the term of this patent is extended or adjusted under 35 U.S.C. 154(b) by 1074 days.

(21) Appl. No.: 17/436,629

(22) PCT Filed: Mar. 6, 2020

(86) PCT No.: PCT/NL2020/050148
§ 371 (c)(1),
(2) Date: Sep. 6, 2021

(87) PCT Pub. No.: WO2020/185069
PCT Pub. Date: Sep. 17, 2020

(65) Prior Publication Data
US 2022/0143204 A1 May 12, 2022

(30) Foreign Application Priority Data
Mar. 8, 2019 (NL) ..................... 2022702

(51) Int. Cl.
*C07K 16/28* (2006.01)
*A61K 47/68* (2017.01)
*A61K 39/00* (2006.01)

(52) U.S. Cl.
CPC ...... *C07K 16/2863* (2013.01); *A61K 47/6849* (2017.08); *A61K 47/6879* (2017.08); *A61K 2039/505* (2013.01); *C07K 2317/31* (2013.01); *C07K 2317/35* (2013.01); *C07K 2317/569* (2013.01); *C07K 2317/77* (2013.01); *C07K 2317/92* (2013.01); *C07K 2317/94* (2013.01)

(58) Field of Classification Search
None
See application file for complete search history.

(56) References Cited

U.S. PATENT DOCUMENTS 9,650,444 B2   5/2017   Wiegand et al.
10,106,614 B2  10/2018  Stanimirovic et al.
2011/0282033 A1 11/2011  Gonzalez Pajuelo et al.

FOREIGN PATENT DOCUMENTS

JP    2017514456 A    6/2017
WO    2016/124781 A1  8/2016

OTHER PUBLICATIONS

Proc. Natl. Acad. Sci. USA, 79(6):1979-1983, Mar. 1982 (Year: 1982).*
Molecular Immunology, 2007, vol. 44, pp. 1075-1084 (Year: 2007).*
Biochemical and Biophysical Research Communications, 2003, vol. 307, pp. 198-205 (Year: 2003).*
Colman P. M. (Research in Immunology, 145:33-36, 1994) (Year: 1998).*
Klaas Poelstra et al: "Drug targeting to the diseased liver", Journal of Controlled Release, Elsevier, Amsterdam, NL, vol. 161, No. 2, Feb. 11, 2012 (Feb. 11, 2012), pp. 188-197.
Yazdani Saleh et al.: "Drug targeting to myofibroblasts: Implications for fibrosis and cancer", Advanced Drug Delivery Reviews, vol. 121, Jul. 16, 2017 (Jul. 16, 2017), pp. 101-116.
Thomas Longerich et al: "Tumor induced local fibrogenic effect by hepatic metastasis of insulinoma", Virchows Archiv, Springer, Berlin, DE, vol. 446, No. 6, Jun. 1, 2005 (Jun. 1, 2005), pp. 680-681.
Crespo Yanguas Sara et al: "Experimental models of liver fibrosis", Archives of Toxicology, Springer. DE, vol. 90, No. 5, Jun. 6, 2015 (Jun. 6, 2015), pp. 1025-1048.
Peter Bannas et al: Nanobodies and Nanobody-Based Human Heavy Chain Antibodies As Antitumor Therapeutics, Frontiers in Immunology, vol. 8. Nov. 22, 2017 (Nov. 22, 2017).
Dong Rui et al: Endosome-ER Contacts Control Actin Nucleation and Retromer Function through VAP-Dependent Regulation of PI4P, Cell, Elsevier, Amsterdam, NL, vol. 166, No. 2, Jul. 14, 2016 (Jul. 14, 2016), pp. 408-423.
Heukers, Raimond, et al. "Endocytosis of EGFR requires its kinase activity and N-terminal transmembrane dimerization motif." Journal of cell science 126.21 (2013): 4900-4912.
Van Dijk, F., et al. "The antifibrotic potential of a sustained release formulation of a PDGFβ-receptor targeted rho kinase inhibitor." Journal of Controlled Release 296 (2019): 250-257.
Bart Nijmeijer—Slide deck Development of first-in-class nanobody-drug conjugates for the targeted therapy of Liver Fibrosis and Cirrhosis—presented by applicant on Nov. 7, 2019 on the ATDC in Belfast.
"Final Oral & Poster Programme" ATDC 2019 Belfast—published by third party on the internet on Jul. 6, 2022.

(Continued)

*Primary Examiner* — Rachel B Gill
*Assistant Examiner* — Imma Barrera
(74) *Attorney, Agent, or Firm* — Ipsilon USA—NLO

(57) ABSTRACT

The invention relates to the field of binding molecules comprising at least one single variable antibody domain, targeted at receptors present on myofibroblasts and/or hepatic stellate cells (HSCs). The invention also relates to a binding molecule comprising at least two single variable antibody domains, each targeting a receptor on HSCs and/or on myofibroblasts. The invention further relates to nucleic acids encoding such binding molecules, a host cell for expression of such binding molecules and to methods for preparing such binding molecules. The invention further relates to pharmaceutical compositions that comprise such binding molecule and to uses of such binding molecules and/or compositions, in particular for prophylactic, therapeutic or diagnostic purposes.

17 Claims, 24 Drawing Sheets

Specification includes a Sequence Listing.

(56) References Cited

OTHER PUBLICATIONS

B. Nijmeijer, E. Schooten, S. Pronk, P.J.G.M Steverink, P. Van Bergen en Henegouwen, H.J. Houthoff, Development of first-in-class nanobody-drug conjugates for the targeted therapy of Liver Fibrosis and Cirrhosis—Published by third party online on Apr. 7, 2021.

Strop, Pavel, et al. "Location matters: site of conjugation modulates stability and pharmacokinetics of antibody drug conjugates." Chemistry & biology 20.2 (2013): 161-167.

Nejadmoghaddam, Mohammad-Reza, et al. "Antibody-drug conjugates: possibilities and challenges." Avicenna journal of medical biotechnology 11.1 (2019): 3.

\* cited by examiner

INTERNALIZING BINDING MOLECULES TARGETING RECEPTORS INVOLVED IN CELL PROLIFERATION OR IN CELL DIFFERENTIATION

The invention relates to the field of binding molecules comprising at least one single variable antibody domain, targeted at receptors present on myofibroblasts and/or hepatic stellate cells (HSCs). The invention also relates to a binding molecule comprising at least two single variable antibody domains, each targeting a receptor on HSCs and/or on myofibroblasts. The invention further relates to nucleic acids encoding such binding molecules; a host cell for expression of such binding molecules and to methods for preparing such binding molecules. The invention further relates to pharmaceutical compositions that comprise such binding molecules and to uses of such binding molecules and/or compositions, in particular for prophylactic, therapeutic or diagnostic purposes.

SEQUENCE LISTING

The instant application contains a Sequence Listing which has been submitted electronically in ASCII text format encoded as XML and is hereby incorporated by reference in its entirety. The txt, file was created Aug. 16, 2021 and is named "P6070234PCT-US_Sequence Listing.txt" and is 120.554 bytes in size. The sequence listing contained in this.txt file is part of the specification and is hereby incorporated by reference herein it its entirety.

BACKGROUND OF THE INVENTION

Chronic Liver Disease

Chronic liver disease (CLD) in the clinical context is a disease process of the liver that involves a process of progressive destruction and regeneration of the liver parenchyma leading to liver fibrosis (LF) and liver cirrhosis (LC), a condition characterized by fibrotic scarring, nodular regeneration of liver parenchyma and an elevated portal blood pressure. CLD may be caused by viral infections (e.g. HCV), a metabolic syndrome (e.g. NASH), or the alcohol abuse. LF is characterized by the accumulation of Extracellular Matrix (ECM) proteins, tissue contraction, and as a consequence alteration in blood flow. These symptoms are caused by the activation of HSCs, which are pericytes found in the space of Disse (a small area between the sinusoids and hepatocytes). Generally speaking, pericytes are contractile cells that wrap around the endothelial cells that line the capillaries and venules throughout the body. Upon activation, HSCs transdifferentiate into myofibroblasts and start secreting large amounts of ECM proteins and profibrogenic cytokines. If left untreated, the accumulation of ECM proteins will cause LF to progress to LC, which is ranked as the 12th leading cause of death worldwide.

Therapies in CLD

Cures aiming at the primary causes of liver disease currently form the most effective strategy, but only exist for a minority of aetiologies. In general, liver transplantation is the only treatment available for patients with end stage chronic liver disease. Given the high level of morbidity and mortality, there is a clear need for the development of (additional) therapeutic approaches to supplement, or potentially replace, the current methods of treatment. The research conducted into CLD over the past decades has improved the understanding of the pathophysiology of the disease allowing for the development of novel agents targeting the underlying disease processes. So far, there are no approved specific medicinal therapies for CLD, and although there are newer therapies currently undergoing evaluation, the studies of these treatments are at a relatively early stage.

An alternative to current therapies would be a reduction and eventual disappearance of the portal hypertension and/or the fibrotic scar tissue in the liver. Theoretically, antifibrotic therapies can target different aspects of fibrogenesis, including the inhibition of matrix deposition or collagen synthesis and the break-down of newly formed fibrotic tissue. Newly synthesized collagen is thought to be more susceptible to degradation than old collagen; however, studies in animals have shown that even advanced cirrhosis is reversible and human data suggests the same. Recent advances in the understanding of the pathogenesis of liver fibrosis are now leading to novel therapeutic approaches of liver fibrosis. Drugs with 'antifibrotic activity' have been studied in clinical trials but proved to be ineffective especially due to their systemic toxicity. The therapeutic application of these (often small) molecules such as Rho-kinase inhibitors and JAK-2 kinase inhibitors has been hampered by their cumbersome pharmacodynamic and kinetic profile. Thus, there is a need for an improved therapy and diagnosis for CLD, in particular for liver fibrosis.

SUMMARY OF THE INVENTION

The present invention provides such alternative and improved therapy or diagnosis in the form of a binding molecule comprising at least one single variable antibody domain and at least one diagnostic and/or therapeutic molecule, wherein the at least one single variable antibody domain is able to specifically bind to a transmembrane receptor expressed on a hepatic stellate cell (HSC) and/or on a myofibroblast.

Such binding molecule enables targeting of an activated hepatic stellate cell or myofibroblast, preferably through binding to a platelet derived growth factor receptor-beta (PDGFRB) or an insulin-like growth factor 2 receptor (IGF2R), which are both highly expressed on such cells.

The binding molecules are preferably bound to a toxin or a drug via, e.g., a linker comprising a Pt(II) transition metal complex. In particular when the drug is a kinase inhibitor, such as a RHO-kinase, a JAK-2 inhibitor, or a neprilysin inhibitor, a binding molecule according to the invention preferably provides a relaxation of activated HSC or myofibroblasts, which, e.g., attenuates liver fibrosis. The use of the linker reduces the (off-target) toxicity generally seen with these kinase inhibitors.

In liver disease, the selective delivery of a drug to (activated) cells that play a crucial role in the onset, maintenance and exacerbation of fibrosis, e.g. hepatic stellate cells (HSC), is an interesting venue to pursue. The targeting of receptors such as the PDGFRB and IGF2R that are upregulated on activated HSC, can be used to arrive at an effective medicinal treatment of liver disease. In the present invention, the targeting of PDGFRB or IGF2R is considered an important means as, through said targeting, the internalisation of a proteinaceous molecule comprising e.g. a rho-kinase inhibitor, a JAK-2 kinase inhibitor, or a neprilysin inhibitor is induced.

The invention further provides a nucleic acid encoding at least part of a binding molecule according to the invention and a host cell for expression of at least part of a binding molecule according to the invention, comprising a nucleic acid according to the invention.

Also provided is a method for producing a binding molecule according to the invention, comprising culturing a host cell according to the invention, allowing for expression of at least part of said binding molecule, harvesting the binding molecule, and coupling the therapeutic or diagnostic molecule to said part of said binding molecule, optionally through a linker as defined above.

As the binding molecule according to the invention comprising a therapeutic molecule is particularly suited for therapy of, e.g., fibrosis or cancer, the invention further provides a pharmaceutical composition comprising at least one binding molecule according to the invention and at least one pharmaceutically acceptable excipient. Such pharmaceutical composition may further comprise at least one other compound useful in the treatment of chronic liver disease. A pharmaceutical composition according to the invention is particularly useful as an adjuvant treatment of variceal bleeding in the presence of portal hypertension or for use in the treatment of liver disease.

As the binding molecule according to the invention comprising a diagnostic molecule is particularly suited for diagnosis of, e.g., liver fibrosis, the invention provides a diagnostic composition comprising at least one binding molecule according to the invention comprising a diagnostic molecule, preferably an imaging agent, and a diluent and/or excipient.

BRIEF DESCRIPTION OF THE FIGURES

FIG. 5. Amino acid sequence of human PDGFRB VHHs (CDRs underlined). Affinities are measured on human PDG-FRB ectodomain (ECD), SCC VII cells transfected with human PDGFRB receptor (SCC-hPDGFRB) and the human hepatic stellate cell line (LX-2). Data of the competition assays is included to categorize the VHHs in different epitope groups.

FIG. 6. Amino acid sequence of rat PDGFRB VHHs (CDRs underlined). Affinities are measured on rat PDGFRB ectodomain (ECD) and squamous cell carcinoma cells transfected with rat PDGFRB receptor (SCC-rPDGFRB). Data of the competition assays is included to categorize the VHHs in different epitope groups.

DETAILED DESCRIPTION OF THE INVENTION

Figure 1:
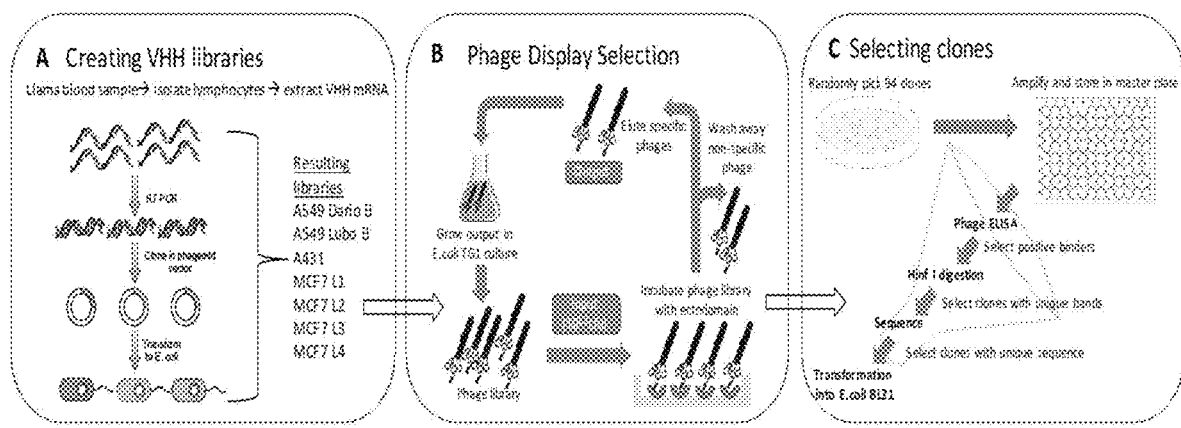
FIG. 1. Overview of the research process from (A) creating the VHH libraries from blood samples of immunized llamas, to (B) performing phage display selection and (C) selecting clones for screening (figure adapted from Schoonooghe S. et al, Immunobiology 2012, 217:1266-1272).

First, it should be noted that all steps, methods, and techniques that are not specifically described in detail can be performed in a manner known per se, as will be clear to the skilled person, unless indicated otherwise. Reference is made to standard handbooks and the common general knowledge mentioned herein describing techniques for protein engineering, such as affinity maturation and other techniques for improving the specificity and other desired properties of binding moieties, present in a binding molecule according to the invention, such as immunoglobulin single variable domain antibody (ISVD), a variable domain of a heavy chain (VH), a variable domain of a heavy chain only antibody (VHH), a domain antibody (dAb), or a single domain antibody (sdAb). It must be noted that as used herein, the singular forms "a", "an", and "the" include plural references unless the context clearly indicates otherwise. Those skilled in the art will recognize or be able to ascertain using no more than routine experimentation, many equivalents to the specific embodiments of the invention described herein. Such equivalents are intended to be encompassed by the present invention. The term "and/or" wherever used herein includes the meaning of "and", "or" and "all or any other combination of the elements connected by said term". The term "about" or "approximately" as used herein means within 25%, preferably within 20%, more preferably within 15%, and most preferably within 10% of a given value or range. Throughout this specification and the claims which follow, unless the context requires otherwise, the word "comprise" and variations such as "comprises" and "comprising" will be understood to imply the inclusion of the stated feature, but not the exclusion of any other feature. When used herein the term "comprising" can be substituted with the term "containing" or "including" or "having". In contrast, the word "consisting of", in combination with (a) feature(s) means the inclusion of the feature(s) mentioned but the exclusion of any other feature(s).

In a first embodiment, the invention provides a binding molecule comprising at least one single variable antibody domain and at least one diagnostic or therapeutic molecule, wherein the at least one single variable antibody domain is able to specifically bind to a transmembrane receptor expressed on activated HSCs and/or myofibroblasts, which are preferably characterized by increased proliferation, contractility, chemotaxis, and enhanced extracellular matrix (ECM) protein production (e.g. collagen). See for a complete description of how to preferably determine whether HSCs are activated or not: Tsuchida et al (Mechanisms of hepatic stellate cell activation, Nature Reviews Gastroenterology & Hepatology, 2017).

A therapeutic molecule comprised within a binding molecule according to the invention preferably induces HSC relaxation, which is a sign of diminished HSC activation, thereby decreasing the fibrogenesis process initiated by primary liver disease. One example of such therapeutic molecule is Y27632, a small molecule kinase inhibitor which has been shown to induce HSC relaxation in a working example of the current invention. In particular, it was demonstrated that a binding molecule of the invention in particular interacts with the receptors on activated HSC. The studies demonstrate a proof of concept that a binding molecule of the invention can be used to treat liver fibrosis patients. It also proves that a binding molecule of the invention does not interfere with platelet activity.

A binding molecule of the current invention must be able to specifically bind to a transmembrane receptor expressed on hepatic stellate cells, in particular activated hepatic stellate cells, and/or myofibroblasts. Examples of receptors that are expressed in sufficient amount on activated HSC and/or myofibroblasts are, e.g., PDGFRB and IGF2R. Hence, in a preferred embodiment, a binding molecule according to the invention is provided, wherein the transmembrane receptor is a PDGFRB or an IGF2R.

PDGF is one of numerous growth factors that regulate cell growth and division. In particular, PDGF plays a significant role in blood vessel formation, the growth of blood vessels from already existing blood vessel tissue, mitogenesis, i.e. proliferation, of mesenchymal cells such as fibroblasts, osteoblasts, tenocytes, vascular smooth muscle cells and mesenchymal stem cells as well as chemotaxis, the directed migration, of mesenchymal cells. PDGF is a dimeric glycoprotein that can be composed of two A subunits (PDGF-AA), two B subunits (PDGF-BB), or one of each (PDGF-AB). PDGF is a potent mitogen (a protein that encourages a cell to commence cell division, triggering mitosis) for cells of mesenchymal origin, including fibroblasts, smooth muscle cells and glial cells. In both mouse and human, the PDGF signalling network consists of five ligands, PDGF-AA, -BB, -AB, -CC, and DD, and two receptors, PDGFR-alpha (PDGFRA) and PDGFR-beta (PDGFRB).

All PDGFs function as secreted, disulphide-linked homodimers, but only PDGFA and PDGFB can form functional heterodimers. PDGF is overly synthesized upon activation of HSC as may occur in conditions of alcoholism or hepatitis. As such, the activation and cellular division of fibroblasts occurs, leading to connective tissue that is especially prevalent in wound healing. PDGF is a required element in this process. In essence, the PDGFs allow a cell to skip the G1 checkpoints in order to divide. It has been shown that in monocytes-macrophages and fibroblasts, exogenously administered PDGF stimulates chemotaxis, proliferation, and gene expression and significantly augments the influx of inflammatory cells and fibroblasts, accelerating extracellular matrix and collagen formation and thus reducing the time for the healing process to occur. Quiescent HSCs express PDGFRA, while HSCs switch to PDGFRB expression upon activation. HSCs become activated by liver cell injury and liver cell death, which results in fibrogenesis. The mannose 6-phosphate/insulin-like growth factor-2 receptor (M6P/IGF2R) plays an important role in early fibrogenesis by participating in the activation of latent transforming PDGFB, a potent inducer of the matrix proteins in activated HSC that produce the hepatic scarring. IGF2R is a transmembrane glycoprotein which is involved in the clearance of extracellular ligands (IGF-II), activation of extracellular ligands (TGFβ) and in the sorting of newly synthesized, M6P-tagged, lysosomal enzymes from the trans-Golgi network (TGN) to lysosomes. Because of this function, IGF2R cycles between sorting endosomes, the endocytic recycling compartment, TGN, late endosomes and the plasma membrane (Maxfield & McGraw, Nat Rev Mol Cell Biol. 2004 February;5 (2): 121-32).

A binding molecule according to the invention can be used for a variety of fibrotic diseases, wherein myofibroblasts expressing one of the transmembrane receptors described above play a role, such as, for instance, liver fibrosis, lung fibrosis, or renal fibrosis. In a working example, the invention provides proof of principle in (activated) HSC. However, in liver fibrogenesis, activated hepatic stellate cells (HSCs) are thought to transdifferentiate into myofibroblasts (Yuchang Li, et al. Mesothelial-mesenchymal transition in the liver. PNAS (2013), 110:2324-2329), which abundantly express PDGFRB and IGF2R. Another major source of hepatic myofibroblasts in fibrotic liver in both experimental models of liver fibrosis and in patients with liver disease are portal fibroblasts (Jun Xu, et al. The types of hepatic myofibroblasts contributing to liver fibrosis of different etiologies. Frontiers in pharmacology (2014), 5:167). In a preferred embodiment, therefore, a binding molecule according to the invention is provided, wherein the myofibroblast is a hepatic myofibroblast. Preferably the myofibroblast is derived from an HSC or a portal fibroblast, more preferably from an HSC. "Derived from" in this context refers to the differentiation of the originator cell (the HSC or portal fibroblast) into the myofibroblast. The term "myofibroblast" preferably includes the myofibroblast-like cells that are in transition from HSC or portal fibroblast into the myofibroblast and which may have an intermediate phenotype between the originator cell and the myofibroblast. Quiescent HSCs generally express desmin, neural markers, such as glial fibrillar associated protein (GFAP), synaptophisin, synemin, and nerve growth factor receptor p75 (Geerts A. (2001). History, heterogeneity, developmental biology, and functions of quiescent hepatic stellate cells. Semin. Liver Dis. 21 311-335 10.1055/s-2001-17550; Bataller R., Brenner D. A. (2005). Liver fibrosis. J. Clin. Invest. 115, 209-218). In addition, Nr1d2, Adipor1, Adpf, Dbp, Prei4, and Foxj1 were identified as unique markers associated with HSC quiescent phenotype (Liu X., Xu J., Brenner D. A., Kisseleva T. (2013). Reversibility of Liver Fibrosis and Inactivation of Fibrogenic Myofibroblasts. Curr. Pathobiol. Rep. 1, 209-214). In response to fibrogenic liver injury and release of TGFß1, quiescent HSCs rapidly undergo activation. They downregulate vitamin A-containing lipid droplets and neural markers, and differentiate into collagen Type I and aSMA-expressing activated HSCs/myofibroblasts (Bataller and Brenner, 2005; Forbes S. J., Parola M. (2011). Liver fibrogenic cells. Best Pract. Res. Clin. Gastroenterol. 25, 207-217). They also upregulate production of matrix metalloproteinases MMPs, especially MMP13, and their inhibitors TIMPs (Uchinami H., Seki E., Brenner D. A., D'Armiento J. (2006). Loss of MMP 13 attenuates murine hepatic injury and fibrosis during cholestasis. Hepatology 44, 420-429). In addition, activated HSCs upregulate Crlf1, Spp1, Lox, LoxL2, IL-17Ra, Fosl1, and Folr1, genes that are uniquely associated with the activated HSC/myofibroblast phenotype (Liu et al., Reversibility of Liver Fibrosis and Inactivation of Fibrogenic Myofibroblasts. Curr. Pathobiol. Rep. 2013, 1:209-214).

In particular when the binding molecule comprises a therapeutic molecule that acts inside the cell, it is preferred that the binding molecule is taken up by the cell, e.g. through ligand or antibody internalization. Ligand internalization is defined as a receptor-mediated endocytic process in which the cell will only take in an extracellular molecule (e.g., a (natural) ligand or an antibody) if it binds to its specific receptor protein on the cell's surface. Endocytosis is a process by which cells internalize non-particulate materials such as proteins or polysaccharides by engulfing them. Thus, in a preferred embodiment, a binding molecule according to the invention is provided, wherein binding of the binding molecule to the receptor enables induction of ligand or antibody internalization.

In a preferred embodiment, a binding molecule according to the invention is provided, wherein the binding molecule comprises an additional single variable antibody domain that is able to specifically bind to a transmembrane receptor expressed on an HSC and/or a myofibroblast. Such binding molecule may comprise two single variable antibody domains that are able to bind two different antigens, e.g. epitopes on the same antigen, i.e., two different epitopes on one receptor. The latter is also called a biparatopic binding molecule. A binding molecule of the invention may also comprise two single variable antibody domains that are both specific for the same epitope.

Such binding molecule, which is also known as bivalent binding molecule cannot bind to two epitopes on a single receptor (as generally, there are no two of those epitope sequence present in the sequence of one receptor (unless it is a dimer), but is able to bind the same epitope sequence on two receptors of the same type, e.g., two PDGF receptors that are in the vicinity of each other. The effect thereof is that the bivalent binding molecule cross-links the two receptors, thereby inducing internalization of the receptors and the binding molecule bound thereto. In case of a biparatopic binding molecule, binding results in receptor oligomerisation, which further enhances receptor internalization. In a preferred embodiment, therefore, a binding molecule according to the invention is provided, wherein the binding molecule is a multiparatopic, preferably a biparatopic binding molecule. Alternatively or combined with a multiparatopic specificity, it is preferred that the binding molecule is a multivalent, preferably a bivalent binding molecule. Alternatively, or combined with a multiparatopic specificity, a bivalent specificity, or both, it is preferred that the binding molecule is a multispecific, preferably a bispecific binding molecule. A binding molecule of the present invention can thus combine multiple single variable antibody domains, wherein, e.g., two are bivalent towards each other and, in addition, biparatopic and/or bispecific with respect to a third, fourth, fifth or even sixth single variable antibody domain. Although a binding molecule according to the invention can comprise more than six single variable antibody domains, it is preferred that a binding molecule according to the invention comprises 2-6, preferably 2-4, more preferably 2 single variable antibody domains, for ease of production and which have shown excellent results in animal models, as defined previously and below.

A single variable antibody domain present in a binding molecule according to the invention can be any kind of single variable antibody domain. Classical single variable antibody domains are variable domains of (parts of) antibodies, such as a (single) domain antibody or an immunoglobulin single variable domain antibody. Preferably, the at least one single variable antibody domain and/or the additional single variable antibody domain are, independently from one another, selected from the group consisting of an immunoglobulin single variable domain antibody (ISVD), a variable domain of a heavy chain (VH), a variable domain of a heavy chain only antibody (VHH), a domain antibody (dAb), and a single domain antibody (sdAb). More preferably, both the at least one single variable antibody domain and the additional single variable antibody domain are single variable domain antibodies, preferably variable domains of heavy chain only antibodies. These smaller (parts of) antibodies are preferred, because, in particular in a tandem format (e.g. bivalent or biparatopic), they show high internalisation capacity and optimal tissue penetration because of their smaller size.

The term "immunoglobulin single variable domain" ("ISVD"), interchangeably used with "single variable domain", defines molecules wherein the antigen binding site is present on, and formed by, a single immunoglobulin domain. This sets immunoglobulin single variable domains apart from "conventional" immunoglobulins or their fragments, wherein two immunoglobulin domains, in particular two variable domains, interact to form an antigen binding site. Typically, in conventional immunoglobulins a heavy chain variable domain (VH) and a light chain variable domain (VL) interact to form an antigen binding site. In this case, the complementarity determining regions (CDRs) of both VH and VL will contribute to the antigen binding site, i.e. a total of six CDRs will be involved in antigen binding site formation. In contrast, the binding site of an immunoglobulin single variable domain is formed by a single VH or VL domain. Hence, the antigen binding site of an immunoglobulin single variable domain is formed by no more than three CDRs. The term "immunoglobulin single variable domain" hence does not comprise conventional immunoglobulins or their fragments which require interaction of at least two variable domains for the formation of an antigen binding site. This is also the case for embodiments of the invention which "comprise" or "contain" an immunoglobulin single variable domain. Thus, a binding molecule or a composition that "comprises" or "contains" an immunoglobulin single variable domain may relate to e.g. constructs comprising more than one immunoglobulin single variable domain. Alternatively, there may be further constituents other than the immunoglobulin single variable domains, e.g. auxiliary agents of different kinds, protein tags, colorants, dyes, etc. However, these terms do comprise fragments of conventional immunoglobulins wherein the antigen binding site is formed by a single variable domain. Generally, single variable domains will be amino acid sequences that essentially consist of four framework regions (FR1 to FR4, respectively) and three complementarity determining regions (CDR1 to CDR3, respectively). Such single variable domains and fragments most preferably comprise an immunoglobulin fold or are capable for forming, under suitable conditions, an immunoglobulin fold. As such, the single variable domain may e.g. comprise a light chain variable domain sequence (e.g. a VL-sequence) or a suitable fragment thereof; or a heavy chain variable domain sequence (e.g. a VH-sequence or a VHH sequence) or a suitable fragment thereof; as long as it is capable of forming a single antigen binding unit (i.e. a functional antigen binding unit that essentially consists of the single variable domain, such that the single antigen binding domain does not need to interact with another variable domain to form a functional antigen binding unit, as it is e.g. the case for the variable domains that are present in e.g. conventional antibodies and scFv fragments that need to interact with another variable domain—e.g. through a VH/VL interaction—to form a functional antigen binding domain). In one embodiment of the invention, the immunoglobulin single variable domains are light chain variable domain sequences (e.g. a VL-sequence) or heavy chain variable domain sequences (e.g. a VH-sequence); more specifically, the immunoglobulin single variable domains can be heavy chain variable domain sequences that are derived from a conventional four-chain antibody or heavy chain variable domain sequences that are derived from a heavy chain antibody (e.g. a VHH). For a general description of heavy chain antibodies and the variable domains thereof, reference is inter alia made to the prior art cited herein, as well as to the prior art mentioned on page 59 of WO 08/020079 and to the list of references mentioned on pages 41-43 of the International application WO 06/040153, which prior art and references are incorporated herein by reference. As described in these references, VHH sequences and partially humanized VHH sequences can in particular be characterized by the presence of one or more "Hallmark residues" in one or more of the framework sequences. A further description of the VHHs, including humanization of VHHs, as well as other modifications, parts or fragments, derivatives or "VHH fusions", multivalent constructs (including some non-limiting examples of linker sequences) and different modifications to increase the serum half-life of the VHHs and their preparations can be found e.g. in WO 08/101985 and WO 08/142164. One example is, e.g., the presence of a binding domain with affinity for human serum albumin.

Hence, in order to increase the half-life of the binding molecules according to the present invention, said binding molecules preferably comprise one or more other groups, residues, moieties or binding units that increase said half-life compared to a binding molecule without such groups, residues, moieties or binding units. These groups, residues, moieties or binding units are also referred to as half-life extenders.

The half-life extenders to be used in the binding molecules according to the present invention preferably increases the serum half-life of the binding molecules in humans with at least 1 hour, preferably at least 2 hours or longer. They may increase the half-life for more than 6 hours, such as more than 12 hours or even more than 24, 48 or 72 hours.

A particularly preferred binding unit to be used in the binding molecules according to the present invention is an albumin binding domain, an albumin binding VHH or an antibody Fc tail or fragment thereof.

For the term "dAb" or "sdAb", reference is e.g. made to Ward et al. 1989 (Nature 341 (6242): 544-6), to Holt et al. 2003 (Trends Biotechnol. 21 (11): 484-490) as well as to e.g. WO 04/068820, WO 06/030220, WO 06/003388.

It should also be noted that, although less preferred in the context of the present invention because they are not of mammalian origin, single variable domains can also be derived from certain species of shark (e.g., the so-called "IgNAR domains", see e.g. WO 05/18629) as well as from mice (e.g. the so-called humabodies of Crescendo Biologics). The amino acid sequence and structure of an immunoglobulin sequence, in particular an immunoglobulin single variable domain, can be considered-without, however, being limited thereto—to be comprised of four framework regions or "FRs", which are referred to in the art and herein as "Framework region 1" or "FR1", as "Framework region 2" or "FR2", as "Framework region 3" or "FR3", and as "Framework region 4" or "FR4", respectively. These framework regions are interrupted by three complementary determining regions or "CDRs", which are referred to in the art as "Complementarity Determining Region 1" or "CDR1", as "Complementarity Determining Region 2" or "CDR2", and as "Complementarity Determining Region 3" or "CDR3", respectively. The total number of amino acid residues in an immunoglobulin single variable domain can be in the region of 110-120, is preferably 112-115, and is most preferably 113. It should, however, be noted that parts, fragments, analogues or derivatives of an immunoglobulin single variable domain are not particularly limited as to their length and/or size, as long as such parts, fragments, analogues or derivatives meet the further requirements outlined herein and are also preferably suitable for the purposes described herein. Thus, in the meaning of the present invention, the term "immunoglobulin single variable domain" or "single variable antibody domain" comprises peptides which are derived from a non-human source, preferably from a camelid, preferably as a camel heavy chain antibody. They may be humanized, as previously described, e.g. in WO 08/101985 and WO 08/142164. Moreover, the term comprises binding molecules derived from non-camelid sources, e.g. mouse or human, which have been "camelized", as previously described, e.g. in WO 08/101985 and WO 08/142164. The term "immunoglobulin single variable domain" encompasses immunoglobulin sequences of different origin, comprising mouse, rat, rabbit, donkey, human, and camelid immunoglobulin sequences. It also includes fully human, humanized or chimeric immunoglobulin sequences. E.g., it comprises camelid immunoglobulin sequences and humanized camelid immunoglobulin sequences or camelized immunoglobulin single variable domains, e.g. camelized dAb as described by Ward et al. (see e.g. WO 94/04678 and Davies and Riechmann 1994, Febs Lett. 339:285 and 1996, Protein Engineering 9:531). As already said before, the at least one binding molecule is able to specifically bind to an extracellular domain of a receptor expressed on an HSC and/or a myofibroblast. Preferably, the second single variable antibody domain, if present, is also able to specifically bind to a transmembrane receptor expressed on an HSC and/or a myofibroblast. Particularly preferred is a binding molecule according to the invention comprising at least two single variable antibody domains capable of specifically binding to PDGFRB or comprising at least two single variable antibody domains capable of specifically binding to IGF2R.

Less preferred is a binding molecule according to the invention, comprising at least one single variable antibody domain capable of specifically binding to PDGFRB and at least one single variable antibody domain capable of specifically binding to IGF2R.

In one preferred embodiment, a binding molecule according to invention is provided, wherein binding of one of the single variable antibody domains to its antigen modulates the binding of the other single variable antibody domain to its antigen, preferably resulting in cluster induced endocytosis and fast receptor internalization.

The invention provides in a working example several VHHs that show excellent binding to and internalisation of the PDGFRB. In a preferred embodiment, a binding molecule according to the invention is provided, comprising at least one single variable antibody domain that is able to compete with a single domain antibody having a sequence that is selected from any one of the sequences of SP02P or SPO5P or SP14P or SP12P, depicted in Table 1 as SEQ ID Nos: 9, 25, 81, and 65, respectively, in specific binding to the PDGFRB. In a more preferred embodiment, the binding molecule comprises at least a second single variable antibody domain that is able to compete with a single domain antibody having one of the sequences of SPO2P or SPO5P or SP14P or SP12P, wherein preferably the first and second single variable antibody domain do not both compete with the same single domain antibody having one of the sequence of SP02P or SP05P or SP14P or SP12P. Alternatively and also preferred, the binding molecule comprises at least two single variable antibody domains wherein preferably the first and second single variable antibody domain both compete with the same single domain antibody having one of the sequences of SP02P or SP05P or SP14P or SP12P.

With the term "compete" is meant that in a competition assay, such as for instance described in Example 5 and Example 8 of the present invention, the addition of a binding molecule induces a significant decrease in binding of a given VHH, i.e., the VHH to which the competing is determined. "Significant" in this respect is preferably a decrease of >5%, preferably >10% when 250 nM of a binding molecule is added to 10 nM of a fluorescence labelled VHH in an ELISA. Example 8, e.g., shows a less than 5% less fluorescence intensity when 10 nM of labelled 13F11 and 250 nM of unlabelled 13E8 are allowed to bind to human IGF2R ectodomain in an ELISA, whereas substantially more decrease in fluorescence intensity is seen when 10 nM of labelled 13F11 and 250 nM of unlabelled 13A8, 13C11, 13G10, or 13A12 compete for the same or overlapping epitopes. From these data it is concluded that 13F11 and 13E8 do not compete with each other, whereas 13A8, 13C11, 13G10 and 13A12 compete with 13F11 in respect to binding to IGF2R. The same test conditions and threshold apply to a binding molecule directed to PDGFRB when determining whether a binding molecule competes with a given VHH.

TABLE 1

Amino acid sequence of single domain antibodies targeting PDGFRB. The estimated CDR regions are underlined.

| Name | Amino acid sequence | SEQ ID NO: |
|---|---|---|
| SP01P | | 1 (whole VHH) |
| | EVQLVESGGGLAQAGGSLRLSCVAS | 2 (FR1) |
| | GNIDSANG | 3 (CDR1) |
| | MAWYRQAPGKQRELVAH | 4 (FR2) |
| | ITSGTS | 5 (CDR2) |
| | YVVASVEGRFTISRANAKDTWYLQMNSLKPEDTGVYYC | 6 (FR3) |
| | FPIGLSAHWSQ | 7 (CDR3) |
| | GTQVTVSS | 8 (FR4) |
| SP02P | | 9 (whole VHH) |
| | EVQLVESGGGLVQAGGSLRLSCAAS | 10 (FR1) |
| | ESISSIEQ | 11 (CDR1) |
| | MGWFRQAPGKQRALVAI | 12 (FR2) |
| | NTYGGRT | 13 (CDR2) |
| | VYTNSVEGRFTMSRDSAKNMVYLQMTSLEPEDTAVYYC | 14 (FR3) |

TABLE 1-continued

Amino acid sequence of single domain antibodies targeting PDGFRB. The estimated CDR regions are underlined.

| Name | Amino acid sequence | SEQ ID NO: |
|---|---|---|
| | YAQTTAWRGGV | 15 (CDR3) |
| | WGQGTQVTVSS | 16 (FR4) |
| SP04P | | 17 (whole VHH) |
| | EVQLVESGGGLVQAGGSARLSCAAS | 18 (FR1) |
| | GSILSPNL | 19 (CDR1) |
| | MAWSRQAPGKQREVVAL | 20 (FR2) |
| | ATSDGIT | 21 (CDR2) |
| | TYATSVKGRFTISRDDAKNTVYLQMNSLKPEDTNLYTC | 22 (FR3) |
| | KYRALRAGAVDY | 23 (CDR3) |
| | WGQGTQVTVSS | 24 (FR4) |
| SP05P | | 25 (whole VHH) |
| | EVQLVESGGGLVQAGGSLRLSCAAS | 26 (FR1) |
| | GRTSFSGYA | 27 (CDR1) |
| | MAWFRQAPGKERDFVAS | 28 (FR2) |
| | ITWSYGYT | 29 (CDR2) |
| | YYTDSAQGRFTISRDSAKNTVYLEMNSLKPEDTAVYYC | 30 (FR3) |
| | AADPKASRFRILREYAY | 31 (CDR3) |
| | WGQGTQVTVSS | 32 (FR4) |
| SP07P | | 33 (whole VHH) |
| | EVQLVESGGGSVQTGGSLRLSCAAS | 34 (FR1) |
| | GRSFSTYA | 35 (CDR1) |
| | MAWFRQAPGKEREFVAA | 36 (FR2) |
| | INRRATDT | 37 (CDR2) |
| | VYADSAKGRFIISRDNDKNTVYLQMDSLKTEDTAVYYC | 38 (FR3) |
| | AAAKNAYDWRWDRLRDRDY | 39 (CDR3) |
| | WGQRGQGTQVTVSS | 40 (FR4) |
| SP08P | | 41 (whole VHH) |
| | EVQLVESGGGLVQAGGSLRLSCAAS | 42 (FR1) |
| | GRTFNGYA | 43 (CDR1) |
| | MAWFRQAPGKERDFVAS | 44 (FR2) |
| | ITWSYGYT | 45 (CDR2) |
| | YYADSAQGRFTISRDSAKNTVYLEMNSLKPEDTAVYYC | 46 (FR3) |
| | AADPKASRFRILRQYAH | 47 (CDR3) |
| | WGQGTQVTVSS | 48 (FR4) |
| SP10P | | 49 (whole VHH) |
| | EVQLVESGGGLVQAGGSLRLSCAAS | 50 (FR1) |
| | GRTFNGYA | 51 (CDR1) |
| | MGWFRQAPGKERDFVAA | 52 (FR2) |
| | ITWSYGYT | 53 (CDR2) |
| | HYAESVKGRFSISRDSANNMVYLEMNSLKPEDTAVYYC | 54 (FR3) |
| | AADPKASRFRTLRRYDY | 55 (CDR3) |
| | WGQGTQVTVSS | 56 (FR4) |
| SP11P | | 57 (whole VHH) |
| | EVQLVESGGGLVQAGDSLRLSCAAS | 58 (FR1) |
| | GRTFSSYP | 59 (CDR1) |
| | IAWFRQAPGKEREFVAA | 60 (FR2) |
| | ITSSG | 61 (CDR2) |
| | LTTYYANVVKGRFAISRDNAKDTVYLQMNSLKPEDTAVHYC | 62 (FR3) |
| | ATSNGFLSGRDIYQHNKYIY | 63 (CDR3) |
| | WGQGTQVTVSS | 64 (FR4) |
| SP12P | | 65 (whole VHH) |
| | EVQLVESGGGLVQAGGSLRLSCVIS | 66 (FR1) |
| | GRTSPTYP | 67 (CDR1) |
| | MGWFRQSPGNEREFVAS | 68 (FR2) |
| | INWSGGWR | 69 (CDR2) |
| | NYADSVKGRFTISRDDAKNTVYLQMNSLKPEDTAVYYC | 70 (FR3) |
| | ARGQYSSGTPVYAHEYAY | 71 (CDR3) |
| | WGQGTQVTVSS | 72 (FR4) |
| SP13P | | 73 (whole VHH) |
| | EVQLVESGGGLVQPGGSLRLSCAAS | 74 (FR1) |
| | ESIFSINY | 75 (CDR1) |
| | MAWYRQAPGKQRELVAF | 76 (FR2) |
| | SIDGSST | 77 (CDR2) |
| | NYVDSVRGRFTASRDNAENTLYLQMNSLKPEDTAVYYC | 78 (FR3) |
| | YAQGNTWAAGV | 79 (CDR3) |
| | WGQGTQVTVSS | 80 (FR4) |

TABLE 1-continued

Amino acid sequence of single domain antibodies targeting PDGFRB. The estimated CDR regions are underlined.

| Name Amino acid sequence | SEQ ID NO: |
|---|---|
| SP14P | 81 (whole VHH) |
| EVQLVESGGGLVQAGDSLRLSCVVS | 82 (FR1) |
| GLTFSRYG | 83 (CDR1) |
| MGWFRQATGKEREFVG | 84 (FR2) |
| GISVGSSGT | 85 (CDR2) |
| MYPNSVKGRFTISRDNAKSTVYLQMNSLKPEDTAVYFC | 86 (FR3) |
| AAIDQGSFVQQRDYRY | 87 (CDR3) |
| WGQGTQVTVSS | 88 (FR4) |
| | |
| SP15P | 89 (whole VHH) |
| EVQLVESGGGLVQAGGSLRLSCAAS | 90 (FR1) |
| GRAFGGPY | 91 (CDR1) |
| MAWFRQTPGKGREFVAA | 92 (FR2) |
| ISPSSVYT | 93 (CDR2) |
| FYQDSVKGRFTISRDNTKNTAYLQMNSLKPEDTAVYYC | 94 (FR3) |
| AAEAAGEVRLETSYKY | 95 (CDR3) |
| WGQGTQVTVSS | 96 (FR4) |
| | |
| SP17P | 97 (whole VHH) |
| EVQLVESGGGLVQPGGSLRLSCAAS | 98 (FR1) |
| GLTFVNYA | 99 (CDR1) |
| MGWFRQAPGKERELVAG | 100 (FR2) |
| IASSGRI | 101 (CDR2) |
| YYADSVAGRFTISRDNARNTVNLQMNSMKPEDTAVYYC | 102 (FR3) |
| AGRRSFSSTSAADYNY | 103 (CDR3) |
| WGQGTQVTVSS | 104 (FR4) |
| | |
| SP19P | 105 (whole VHH) |
| EVQLVESGGGLLQAGGSLTLSCAAS | 106 (FR1) |
| GRTFNT | 107 (CDR1) |
| MGWFRQASWKEREFVAS | 108 (FR2) |
| IAWVGGSV | 109 (CDR2) |
| FKSDSTKGRFTVSGDNAKNTVRLQMNSLKPEDTAVYYC | 110 (FR3) |
| AARSGGTFDV | 111 (CDR3) |
| WGQGTQVTVSS | 112 (FR4) |
| | |
| SP20P | 113 (whole VHH) |
| EVQLVESGGGLVQAGGSLRLSCVIS | 114 (FR1) |
| GRTSPTYP | 115 (CDR1) |
| MGWFRQSPGNEREFVAS | 116 (FR2) |
| INWSGGWR | 117 (CDR2) |
| NYADSVKDRFTISRDDAKNTVYLQMNSLKPEDTAVYYC | 118 (FR3) |
| ARGQYSSGTPVYAHEYAY | 119 (CDR3) |
| WGQGTQVTVSS | 120 (FR4) |
| | |
| SP21P | 121 (whole VHH) |
| EVQLVESGGGLVQPGGSLRLSCVVS | 122 (FR1) |
| GSSFSSYT | 123 (CDR1) |
| MGWFRRAPGKQRELVAG | 124 (FR2) |
| VSTVGDT | 125 (CDR2) |
| AAADSVKGRFTISRDNAKNTVYLQMNSLKPEDTAVYYC | 126 (FR3) |
| NTYPHAYLE | 127 (CDR3) |
| WGQGTQVTVSS | 128 (FR4) |
| | |
| SP22P | 129 (whole VHH) |
| EVQLVESGGGLVQAGGSLTLSCAAS | 130 (FR1) |
| GRTFNT | 131 (CDR1) |
| MGWFRQAPGKEREFVAS | 132 (FR2) |
| IAWVGGSV | 133 (CDR2) |
| FKSDSTKGRFTVSGDNAKNTVRLQMNSLKPEDTAVYYC | 134 (FR3) |
| AARSGGTFDV | 135 (CDR3) |
| WGQGTQVTVSS | 136 (FR4) |
| | |
| SP23P | 137 (whole VHH) |
| EVQLVESGGELVQAGGSLRLSCAVS | 138 (FR1) |
| GRTLTSYP | 139 (CDR1) |
| MGWFRQAPGKEREFVAA | 140 (FR2) |
| ISWSGGDT | 141 (CDR2) |
| MYADSVKGRFTISRDNSKNTVYLQMNSLKPEDTADYYC | 142 (FR3) |
| ARRRYSSGISRHLVDYEY | 143 (CDR3) |
| WGQGTQVTVSS | 144 (FR4) |
| | |
| SP25P | 145 (whole VHH) |
| EVQLVESGGGLVQPGGSLRLSCAAS | 146 (FR1) |
| ESIFSINA | 147 (CDR1) |

TABLE 1-continued

Amino acid sequence of single domain antibodies targeting PDGFRB. The estimated CDR regions are underlined.

| Name | Amino acid sequence | SEQ ID NO: |
|---|---|---|
| | MGWYRQTPGKQREMVAS | 148 (FR2) |
| | ITPGGFT | 149 (CDR2) |
| | IYADSVKGRFTISRDNAKNTLYLQMNNLRFEDTAVYYC | 150 (FR3) |
| | NAFAGSATSYHDFGS | 151 (CDR3) |
| | WGQGTQVTVSS | 152 (FR4) |
| SP26P | | 153 (whole VHH) |
| | EVQLVESGGGLVQAGGSLRLSCAAS | 154 (FR1) |
| | GRSFSSSV | 155 (CDR1) |
| | MGWFRQTPGKEREFVAA | 156 (FR2) |
| | TRWTAAST | 157 (CDR2) |
| | HYADSVKGRFTISRDHAENAVFLQMNSLKPEDTAVYYC | 158 (FR3) |
| | AAGNYLDTAQYRYNY | 159 (CDR3) |
| | WGQGTQVTVSS | 160 (FR4) |
| SP27P | | 161 (whole VHH) |
| | EVQLVESGGGLVQIGDSLRLSCAAS | 162 (FR1) |
| | GGTFNRYG | 163 (CDR1) |
| | MGWFRQAPGKEREFVAA | 164 (FR2) |
| | IRWDGVDT | 165 (CDR2) |
| | NYADFVKGRFTISRYNAKNTAYLQMNSLKPEDTAVYYC | 166 (FR3) |
| | AADRRGLYTKHAHRYDY | 167 (CDR3) |
| | WGQGTQVTVSS | 168 (FR4) |
| SP28P | | 169 (whole VHH) |
| | EVQLVESGGGLVQAGGSLRLSCAAS | 170 (FR1) |
| | GSIVSFNG | 171 (CDR1) |
| | INWYRQAPGKQREWVGG | 172 (FR2) |
| | ITQGGNT | 173 (CDR2) |
| | MYADSVRGRFTISRDNTKNTMYLQMNSLKPEDTAVYYC | 174 (FR3) |
| | RRPPVAS | 175 (CDR3) |
| | WGQGTQVTVSS | 176 (FR4) |
| SP29P | | 177 (whole VHH) |
| | EVQLVESGGGLVQAGDSLRLSCTVS | 178 (FR1) |
| | GRTFNTYV | 179 (CDR1) |
| | TGWFRQAPGKEREFVAA | 180 (FR2) |
| | IHQIGST | 181 (CDR2) |
| | YYRNSVKGRFTISRDGAKDTVYLQMNNLKPEDSAVYYC | 182 (FR3) |
| | AAGNGGYVMSDIAYGT | 183 (CDR3) |
| | WGQGTQVTVSS | 184 (FR4) |
| SP30P | | 185 (whole VHH) |
| | EVQLVESGGGLVQAGGSLRLSCAA | 186 (FR1) |
| | SRGTFGTDI | 187 (CDR1) |
| | MGWFRQAPGKEREFVAA | 188 (FR2) |
| | ISWRGANT | 189 (CDR2) |
| | YYGYSVKGRFTISRDNAKNTMYLQMADLKPEDTADYYC | 190 (FR3) |
| | GVHLNGTPYYYASGYRY | 191 (CDR3) |
| | WGQGTQVTVSS | 192 (FR4) |
| SP31P | | 193 (whole VHH) |
| | EVQLVESGGGLVQAGGSLRLSCAAS | 194 (FR1) |
| | RGTFGTYI | 195 (CDR1) |
| | MGWFRQAPGKEREFVAA | 196 (FR2) |
| | ISWRGANT | 197 (CDR2) |
| | YYGYSVKGRFTISRDNAKNTMYLQMADLKPEDTADYYC | 198 (FR3) |
| | GVHLNGTPYYYASGYRY | 199 (CDR3) |
| | WGQGTQVTVSS | 200 (FR4) |
| SP32P | | 201 (whole VHH) |
| | EVQLVESGGGTVQAGDSLRLSCTAS | 202 (FR1) |
| | GRTFSTYT | 203 (CDR1) |
| | MGWFRQAPGKERVVVAV | 204 (FR2) |
| | NTWNNFT | 205 (CDR2) |
| | VHQPSVKGRFTMSRDNTKNSIYLQMDSLKPEDTAVYYC | 206 (FR3) |
| | AASAKGTARYDY | 207 (CDR3) |
| | WGQGTQVTVSS | 208 (FR4) |
| SP33P | | 209 (whole VHH) |
| | EVQLVESGGGLVQAGGSLRLSCAAS | 210 (FR1) |
| | GSLRSINT | 211 (CDR1) |
| | MAWHRRAPGKEREWVAT | 212 (FR2) |
| | ITGSDET | 213 (CDR2) |
| | IVADSVKGRFAISRDAANNTLSLEMNGLKPEDTAVYYC | 214 (FR3) |

TABLE 1-continued

Amino acid sequence of single domain antibodies targeting PDGFRB. The estimated CDR regions are underlined.

| Name | Amino acid sequence | SEQ ID NO: | |
|---|---|---|---|
| | AAFTATLVPY | 215 | (CDR3) |
| | WGQGTQVTVSS | 216 | (FR4) |
| SP35P | | 217 | (whole VHH) |
| | EVQLVESGGGLVQPGGSLRLSCAAS | 218 | (FR1) |
| | GSLGSNNP | 219 | (CDR1) |
| | MAWYRQAPGKERELVAS | 220 | (FR2) |
| | ISSAYRT | 221 | (CDR2) |
| | HYADFVKGRFTISRDSPKNTVSLQMNNLKPEDTAVYYC | 222 | (FR3) |
| | GIFVSARNY | 223 | (CDR3) |
| | WGKGTQVTVSS | 224 | (FR4) |
| SP36P | | 225 | (whole VHH) |
| | EVQLVESGGGLVQAGGSLRLSCTPS | 226 | (FR1) |
| | ITTAGTTI | 227 | (CDR1) |
| | MAWFRQAPGNEREFVAA | 228 | (FR2) |
| | IWGSKTAYGD | 229 | (CDR2) |
| | SMKGRLTISRDNVRDNGQKTVFLQMNNLQLQDTATYYC | 230 | (FR3) |
| | AASSGGYVHSSTSYEI | 231 | (CDR3) |
| | WGRGTQVTVSS | 232 | (FR4) |

The invention further provides in a working example several VHHs that show excellent binding to and internalisation of the IGF2R. In a preferred embodiment, a binding molecule according to the invention is provided, comprising at least one single variable antibody domain that is able to compete with a single domain antibody having the sequence of 13E8 or 13F11, depicted in Table 2 as SEQ ID Nos: 249 and 273, respectively, in specific binding to the IGF2R. In a more preferred embodiment, the binding molecule comprising at least a second single variable antibody domain that is able to compete with a single domain antibody having the sequence of 13E8 or 13F11, wherein preferably the first and second antibody do not both compete with the same single domain antibody having the sequence of 13E8 or 13F11. Alternatively and also preferred, the binding molecule comprises at least two single variable antibody domains wherein preferably the first and second single variable antibody domain both compete with the same single domain antibody having one of the sequences of 13E8 or 13F11.

TABLE 2

Amino acid sequences of the single domain antibodies targeting IGF2R are listed in the table below. The estimated CDR regions are underlined.

| Name | Amino acid sequence | SEQ ID NO: | |
|---|---|---|---|
| 13A2 | | 233 | (whole VHH) |
| | EVQLVESGGGLVQAGGSLRLSCAASG | 234 | (FR1) |
| | IIFSANTV | 235 | (CDR1) |
| | GWYRQVPGKERDVVA | 236 | (FR2) |
| | SITSGDSTYYG | 237 | (CDR2) |
| | DSVRDRFTISRDNAKNTVYLQMNSLKPDDTAIYYC | 238 | (FR3) |
| | RARTTDGSY | 239 | (CDR3) |
| | WGQGTQVTVSS | 240 | (FR4) |
| 13E5 | | 241 | (whole VHH) |
| | EVQLVESGGGLVQAGGSLRLSCAASG | 242 | (FR1) |
| | LTFSRYT | 243 | (CDR1) |
| | MSWYRQAPGKEREVVA | 244 | (FR2) |
| | AISSGDSTYHE | 245 | (CDR2) |
| | DSVKGRFIISRDNAKNTVYLQMNSLKTEDTAVYYC | 246 | (FR3) |
| | RANGPGTY | 247 | (CDR3) |
| | WGQGTQVTVSS | 248 | (FR4) |
| 13E8 | | 249 | (whole VHH) |
| | EVQLVESGGGLVQAGGSLRLSCAAS | 250 | (FR1) |
| | RSISP | 251 | (CDR1) |
| | MGWYRQAPGKQRELVA | 252 | (FR2) |
| | IMPSSGPPIYA | 253 | (CDR2) |
| | DSVQGRFTISRDNAKNTVYLQMNSLKPEDTAVYYC | 254 | (FR3) |
| | NVGGGY | 255 | (CDR3) |
| | WGQGTQVTVSS | 256 | (FR4) |
| 13A8 | | 257 | (whole VHH) |
| | EVQLVESGGGLVPAGGSLRLSCAASG | 258 | (FR1) |
| | RTFSNYA | 259 | (CDR1) |
| | MGWFRQAPGKERKFVA | 260 | (FR2) |

TABLE 2-continued

Amino acid sequences of the single domain antibodies targeting IGF2R are listed in the table below. The estimated CDR regions are underlined.

| Name | Amino acid sequence | SEQ ID NO: |
|------|---------------------|------------|
|  | TISWSGGVTYY | 261 (CDR2) |
|  | ADSVKGRFTISRDNAKNTVYLLMNSLKPEDTAVYYC | 262 (FR3) |
|  | AAKRDSSSYDHRRYDY | 263 (CDR3) |
|  | WGQGTQVTVSS | 264 (FR4) |
| 13A10 |  | 265 (whole VHH) |
|  | EVQLVESGGGLVQAGGSLRLSCSASG | 266 (FR1) |
|  | SIFSINY | 267 (CDR1) |
|  | MAWYRQEPGKEREVVA | 268 (FR2) |
|  | SMSWRGDSTYL | 269 (CDR2) |
|  | ADSVQGRFTISRNNAKNTMYLQMNSLKPEDTALYYC | 270 (FR3) |
|  | KANNY | 271 (CDR3) |
|  | WGQGTQVTVSS | 272 (FR4) |
| 13F11 |  | 273 (whole VHH) |
|  | EVQLVESGGRLVQPGDSLRLSCAASG | 274 (FR1) |
|  | RTFSDNA | 275 (CDR1) |
|  | MGWFRQAPGKERRFVA | 276 (FR2) |
|  | GISWAGGSTYYS | 277 (CDR2) |
|  | DSVKGRFTISRDNAKNTVYLQMNSLKPEDTAVYYC | 278 (FR3) |
|  | AAGLRAWVQRMPKDYNY | 279 (CDR3) |
|  | WGQGTQVTVSS | 280 (FR4) |
| 13G12 |  | 281 (whole VHH) |
|  | EVQLVESGGGLVQAGGSLRLSCAASG | 282 (FR1) |
|  | RAFSISS | 283 (CDR1) |
|  | MSWFRQAPGKERVVVA | 284 (FR2) |
|  | SIAWSGDSTYYA | 285 (CDR2) |
|  | DSVQGRFTISKDNAKNTLSLQMNSLKPEDTAVYYC | 286 (FR3) |
|  | SAYTQVSVNNRY | 287 (CDR3) |
|  | WGQGTQVTVSS | 288 (FR4) |
| 13A12 |  | 289 (whole VHH) |
|  | EVQLVESGGGLVQAGGSLRLSCAAS | 290 (FR1) |
|  | GIIFGANT | 291 (CDR1) |
|  | VGWYRQVPGKERDVVAS | 292 (FR2) |
|  | ITSGDST | 293 (CDR2) |
|  | YYGDSVRGRFTISRDNAKNTMYLQMNSLKPEDTAIYYC | 294 (FR3) |
|  | RARTTDGSY | 295 (CDR3) |
|  | WGQGTQVTVS | 296 (FR4) |
| 13C11 |  | 297 (whole VHH) |
|  | EVQLVESGGGLVQAGGSLRLSCAAS | 298 (FR1) |
|  | GLTFSSYT | 299 (CDR1) |
|  | MAWYRQAPGKEREVVAA | 300 (FR2) |
|  | ISSGDSI | 301 (CDR2) |
|  | YHEGSVQGRFIISRDNAKNTVYLQMNSLKAEDTAVYYC | 302 (FR3) |
|  | RANGPGTY | 303 (CDR3) |
|  | WGQGTQVTVSS | 304 (FR4) |
| 13G10 |  | 305 (whole VHH) |
|  | EVQLVESGGGLVQAGGSLRLSCAAS | 306 (FR1) |
|  | GLTFSSYT | 307 (CDR1) |
|  | MAWYRQAPGKEREVVAA | 308 (FR2) |
|  | ISSGDSI | 309 (CDR2) |
|  | YHEDSVQGRFIISRDNAKNTVYLQMNSLKAEDTAVYYC | 310 (FR3) |
|  | RANGPGTY | 311 (CDR3) |
|  | WGQGTQVTVSS | 312 (FR4) |
| 13A3 |  | 313 (whole VHH) |
|  | EVQLVESGGGLVQAGGSLRLSCAAS | 314 (FR1) |
|  | GSIFRLNY | 315 (CDR1) |
|  | MAWYRQAPGKEREVVA | 316 (FR2) |
|  | SMSRRSDST | 317 (CDR2) |
|  | YLADAVQGRFTISMNNAGNTMYLQMNSLKPEDTALYYC | 318 (FR3) |
|  | KAND | 319 (CDR3) |
|  | YWGQGTQVTVSS | 320 (FR4) |
| 13A10 |  | 321 (whole VHH) |
|  | EVQLVESGGGLVQAGGSLRLSCSAS | 322 (FR1) |
|  | GSIFSINY | 323 (CDR1) |
|  | MAWYRQEPGKEREVVA | 324 (FR2) |
|  | SMSWRGDST | 325 (CDR2) |
|  | YLADSVQGRFTISRNNAKNTMYLQMNSLKPEDTALYYC | 326 (FR3) |

TABLE 2-continued

Amino acid sequences of the single domain antibodies targeting IGF2R are listed in the table below. The estimated CDR regions are underlined.

| Name | Amino acid sequence | SEQ ID NO: | |
|---|---|---|---|
| | KANNY | 327 | (CDR3) |
| | WGQGTQVTVSS | 328 | (FR4) |
| 13B7 | | 329 | (whole VHH) |
| | EVQLVESGGGLVQAGGSLRLSCAAS | 330 | (FR1) |
| | RSISP | 331 | (CDR1) |
| | MGWYRQAPGKQRELVA | 332 | (FR2) |
| | IMPSSGTPI | 333 | (CDR2) |
| | YADSVQGRFTISRDNAKNTVYLQMNSLKPEDTAVYYC | 334 | (FR3) |
| | NVGGG | 335 | (CDR3) |
| | YWGQGTQVTVSS | 336 | (FR4) |
| 13B12 | | 337 | (whole VHH) |
| | EVQLVESGGGLVQAGGSLRLSCAAS | 338 | (FR1) |
| | GIIFGANT | 339 | (CDR1) |
| | VGWYRQVPGKERDVVA | 340 | (FR2) |
| | SITSVDST | 341 | (CDR2) |
| | YYGDSVRGRFTISRDNAKNTVYLQMNSLKPEDTAIYYC | 342 | (FR3) |
| | RARTTDGS | 343 | (CDR3) |
| | YWGQGTQVTVSS | 344 | (FR4) |
| 13D11 | | 345 | (whole VHH) |
| | EVQLVESGGGLVQAGGSLRLSCAAS | 346 | (FR1) |
| | GSIFSINY | 347 | (CDR1) |
| | MAWYRQAPGKEREVVA | 348 | (FR2) |
| | SMSWRRDST | 349 | (CDR2) |
| | YLADSVQGRFTISRNNAKNTMYLQMNSLKPEDTALYY | 350 | (FR3) |
| | CKAND | 351 | (CDR3) |
| | YWGQGTQVTVSS | 352 | (FR4) |
| 13F4 | | 353 | (whole VHH) |
| | EVQLVESGGGLVQAGGSLRLSCVAS | 354 | (FR1) |
| | GSIFSINY | 355 | (CDR1) |
| | MAWYRQTPGKEREVVA | 356 | (FR2) |
| | SMSRRSDST | 357 | (CDR2) |
| | YLADAVQGRFTISRNNAGNTMYLQMNSLKPEDTALYY | 358 | (FR3) |
| | CKAND | 359 | (CDR3) |
| | YWGQGTQVTVSS | 360 | (FR4) |
| 13G12 | | 361 | (whole VHH) |
| | EVQLVESGGGLVQAGGSLRLSCAASG | 362 | (FR1) |
| | RAFSISS | 363 | (CDR1) |
| | MSWFRQAPGKERVVVA | 364 | (FR2) |
| | SIAWSGDSTYYA | 365 | (CDR2) |
| | DSVQGRFTISKDNAKNTLSLQMNSLKPEDTAVYYC | 366 | (FR3) |
| | SAYTQVSVNNRY | 367 | (CDR3) |
| | WGQGTQVTVSS | 368 | (FR4) |

In a preferred embodiment, a binding molecule according to the invention is provided, wherein the binding molecule comprises at least one single variable antibody domain capable of specifically binding to PDGFRB, the at least one single variable antibody domain comprising a CDR 1 sequence according SEQ ID NO: 83, a CDR 2 sequence according to SEQ ID NO: 85 and a CDR 3 sequence according to SEQ ID NO: 87; or a CDR 1 sequence according SEQ ID NO: 3, a CDR 2 sequence according to SEQ ID NO: 5 and a CDR 3 sequence according to SEQ ID NO: 7; or a CDR 1 sequence according SEQ ID NO: 11, a CDR 2 sequence according to SEQ ID NO: 13 and a CDR 3 sequence according to SEQ ID NO: 15; or a CDR 1 sequence according SEQ ID NO: 35, a CDR 2 sequence according to SEQ ID NO: 37 and a CDR 3 sequence according to SEQ ID NO: 39; or a CDR 1 sequence according SEQ ID NO: 75, a CDR 2 sequence according to SEQ ID NO: 77 and a CDR 3 sequence according to SEQ ID NO: 79; or a CDR 1 sequence according SEQ ID NO: 27, a CDR 2 sequence according to SEQ ID NO: 29 and a CDR 3 sequence according to SEQ ID NO: 31; or a CDR 1 sequence according SEQ ID NO: 43, a CDR 2 sequence according to SEQ ID NO: 45 and a CDR 3 sequence according to SEQ ID NO: 47; or a CDR 1 sequence according SEQ ID NO: 51, a CDR 2 sequence according to SEQ ID NO: 53 and a CDR 3 sequence according to SEQ ID NO: 55; or a CDR 1 sequence according SEQ ID NO: 115, a CDR 2 sequence according to SEQ ID NO: 117 and a CDR 3 sequence according to SEQ ID NO: 119; or a CDR 1 sequence according SEQ ID NO: 67, a CDR 2 sequence according to SEQ ID NO: 69 and a CDR 3 sequence according to SEQ ID NO: 71, or any of the combinations of CDR1, CDR2 and CDR3 sequences wherein, independently, at most 4 amino acids, more preferably at most 3, more preferably at most 2, most preferably at most 1, has been conservatively substituted, preferably independently selected from the following amino acid substitutions: Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into Ile or into Val; Lys into Arg, into Gln, or into Glu; Met into Leu, into Tyr, or into 11e; Phe into Met, into Leu, or into Tyr; Ser into Thr; Thr into Ser; Trp into Tyr; Tyr into Trp or into Phe; and Val into Ile or into Leu.

Preferably, a binding molecule according to the invention comprises at least one single variable antibody domain capable of specifically binding to IGF2R, the at least one single variable antibody domain comprising a CDR 1 sequence according SEQ ID NO: 251, a CDR 2 sequence according to SEQ ID NO: 253 and a CDR 3 sequence according to SEQ ID NO: 255; or a CDR 1 sequence according SEQ ID NO: 275, a CDR 2 sequence according to SEQ ID NO: 277 and a CDR 3 sequence according to SEQ ID NO: 279; or a CDR 1 sequence according SEQ ID NO: 259, a CDR 2 sequence according to SEQ ID NO: 261 and a CDR 3 sequence according to SEQ ID NO: 263; or a CDR 1 sequence according SEQ ID NO: 291, a CDR 2 sequence according to SEQ ID NO: 293 and a CDR 3 sequence according to SEQ ID NO: 295; or a CDR 1 sequence according SEQ ID NO: 299, a CDR 2 sequence according to SEQ ID NO: 301 and a CDR 3 sequence according to SEQ ID NO: 302; or a CDR 1 sequence according SEQ ID NO: 307, a CDR 2 sequence according to SEQ ID NO: 309 and a CDR 3 sequence according to SEQ ID NO: 311, or any of the combinations of CDR1, CDR2 and CDR3 sequences wherein, independently, at most 4 amino acids, more preferably at most 3, more preferably at most 2, most preferably at most 1, has been conservatively substituted, preferably independently selected from the following amino acid substitutions: Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into 11e or into Val; Lys into Arg, into Gln, or into Glu; Met into Leu, into Tyr, or into 11e; Phe into Met, into Leu, or into Tyr; Ser into Thr; Thr into Ser; Trp into Tyr; Tyr into Trp or into Phe; and Val into 11e or into Leu.

Preferably, a binding molecule according to the invention comprises at least one single variable antibody domain capable of specifically binding to PDGFRB, wherein the at least one single variable antibody domain comprises or consists of any one of SEQ ID Nos: 81, 1, 9, 33, 73, 25, 41, 49, 65, or 113.

Preferably, a binding molecule according to the invention comprises at least one single variable antibody domain capable of specifically binding to IGF2R, wherein the at least one single variable antibody domain comprises or consists of any one of SEQ ID Nos: 249, 273, 257, 289, 297, or 305.

In one preferred embodiment, a binding molecule according to the invention is provided, the binding molecule comprising at least 2 single variable antibody domains, wherein at least one single variable antibody domain comprises or consists of SEQ ID NOs: 81 and at least one single variable antibody domain comprises or consists of any one of SEQ ID NOs: 1, 9, 33, 73, 25, 41, 49, 65, or 113; or wherein at least one single variable antibody domain comprises or consists of any one of SEQ ID NOs: 1, 9, 33, or 73 and at least one single variable antibody domain comprises or consists of any one of SEQ ID NOs: 25, 41, 49, 65, or 113; or wherein at least one single variable antibody domain comprises or consists of any one of SEQ ID NOs: 25, 41, 49 and at least one single variable antibody domain comprises or consists of any one of SEQ ID NOs: 65 or 113. Such molecule includes a biparatopic anti-PDGFRB binding molecule.

Preferably, a binding molecule according to the invention comprises at least 2 single variable antibody domains, wherein at least one single variable antibody domain comprises or consists of SEQ ID NOs: 249 and at least one single variable antibody domain comprises or consists of any one of SEQ ID NOs: 273, 257, 289, 297, or 305. Such molecule includes a biparatopic anti-IGF2R binding molecule.

Preferably, a binding molecule according to the invention comprises at least 2 single variable antibody domains, wherein at least one single variable antibody domain comprises or consists of any one of SEQ ID NOs: 81, 1, 9, 33, 73, 25, 41, 49, 65, or 113 and at least one single variable antibody domain comprises or consists of any one of SEQ ID NOs: 249, 273, 257, 289, 297, or 305. Such binding molecule includes a bispecific binding molecule capable of binding to one epitope on the PDGFRB and one epitope on the IGF2R.

For the purposes of comparing two or more amino acid sequences, the percentage of "sequence identity" or "sequence similarity" between a first amino acid sequence and a second amino acid sequence (also referred to herein as "amino acid identity") may be calculated by dividing [the number of amino acid residues in the first amino acid sequence that are identical to the amino acid residues at the corresponding positions in the second amino acid sequence] by [the total number of amino acid residues in the first amino acid sequence] and multiplying by [100%], in which each deletion, insertion, substitution or addition of an amino acid residue in the second amino acid sequence-compared to the first amino acid sequence—is considered as a difference at a single amino acid residue (position), i.e. as an "amino acid difference" as defined herein. Alternatively, the degree of sequence identity between two amino acid sequences may be calculated using a known computer algorithm, such as those mentioned above for determining the degree of sequence identity for nucleotide sequences, again using standard settings. Usually, for the purpose of determining the percentage of "sequence identity" between two amino acid sequences in accordance with the calculation method outlined hereinabove, the amino acid sequence with the greatest number of amino acid residues will be taken as the "first" amino acid sequence, and the other amino acid sequence will be taken as the "second" amino acid sequence.

Also, in determining the degree of sequence identity between two amino acid sequences, the skilled person may take into account so-called "conservative" amino acid substitutions, which can generally be described as amino acid substitutions in which an amino acid residue is replaced with another amino acid residue of similar chemical structure and which has little or essentially no influence on the function, activity or other biological properties of the binding molecule. Such conservative amino acid substitutions are well known in the art, for example from WO 04/037999, GB-A-3 357 768, WO 98/49185, WO 00/46383 and WO 01/09300; and (preferred) types and/or combinations of such substitutions may be selected on the basis of the pertinent teachings from WO 04/037999 as well as from WO 38/49185 and from the further references cited therein. Such conservative substitutions preferably are substitutions in which one amino acid within the following groups (a)-(e) is substituted by another amino acid residue within the same group: (a) small aliphatic, nonpolar or slightly polar residues: Ala, Val, Leu, Pro, Ile and Gly; (b) polar, negatively charged residues and their (uncharged) amides: Asp, Asn, Glu and Gln; (c) polar, positively charged residues: His, Arg and Lys; (d) large aliphatic, nonpolar residues: Met, Ser, Thr, Sec and Cys; and (e) aromatic residues: Phe, Tyr and Trp. Particularly preferred conservative substitutions are as follows: Ala into Gly or into Ser; Arg into Lys; Asn into Gln or into His; Asp into Glu; Cys into Ser; Gln into Asn; Glu into Asp; Gly into Ala or into Pro; His into Asn or into Gln; 11e into Leu or into Val; Leu into 11e or into Val; Lys into Arg, into Gln, or into Glu; Met into Leu, into Tyr, or into 11e; Phe into Met, into Leu, or into Tyr; Ser into Thr; Thr into Ser; Trp into Tyr;

Tyr into Trp or into Phe; Val into 11e or into Leu.

Any amino acid substitutions applied to the binding molecules described herein may also be based on the analysis of the frequencies of amino acid variations between homologous proteins of different species developed by Schulz et al., Principles of Protein Structure, Springer-Verlag, 1978, on the analyses of structure forming potentials developed by Chou and Fasman, Biochemistry 13:211, 1974 and Adv. Enzymol., 47:45-149, 1978, and on the analysis of hydrophobicity patterns in proteins developed by Eisenberg et al., Proc. Natl. Acad. Sci. USA 81:140-144, 1984; Kyte & Doolittle; J Molec. Biol. 157:105-132, 1981, and Goldman et al., Ann. Rev. Biophys. Chem. 15:321-353, 1986, all incorporated herein in their entirety by reference.

The invention also encompasses optimized variants of these amino acid sequences.

Generally, an "optimized variant" of an amino acid sequence according to the invention is a variant that comprises one or more beneficial substitutions such as substitutions increasing i) the degree of "humanization", ii) the chemical stability, and/or iii) the level of expression. In one preferred embodiment, a binding molecule according to the invention comprising at least 2 single variable antibody domains is provided, wherein the at least two single variable antibody domains are separated by a linker amino acid sequence. In many instances, simple Gly-Ser linkers of 4-15 amino acids may suffice, but if greater flexibility of the amino acid chain is desired longer or more complex linkers may be used. Preferred linkers are (Gly4Ser) n, (GSTSGS) n or any other linker that provides flexibility for protein folding. The binding domains may be separated only by a linker, but other useful amino acid sequences may be introduced between the binding domains or as the N-terminus or at the C-terminus of the first or last binding domain sequence, respectively. Thus, in one embodiment, a binding molecule according to the invention is provided, further comprising an amino acid sequence encoding a linker. Such linker sequence preferably provides flexibility within the molecule and increases the distance that can be bridged by the binding molecule in order to (cross) link two epitopes. Further, such linker may decrease steric hindrance that may occur when one of the single variable antibody domains has bound to its first target and the second single variable antibody domain must find and bind the second target.

It has been observed that a binding molecule according to the invention is internalized when a single variable antibody domain within the molecule binds its target with sufficient affinity. In a preferred embodiment, therefore, a binding molecule according to the invention is provided, wherein the at least one single variable antibody domain and, if present, additional single variable antibody domains are, independently from one another, capable of specifically binding to their respective receptor with a dissociation constant (KD) of 10E-5 to 10E-12 moles/liter or less, and preferably of 10E-7 to 10E-12 moles/liter or less and more preferably of 10E-9 to 10E-12 moles/liter.

In the context of the present invention, "binding to and/or having affinity for" a certain antigen has the usual meaning in the art as understood e.g. in the context of antibodies and their respective antigens. In particular embodiments of the invention, the term "binds to and/or having affinity for" means that the at least one single variable antibody domain specifically interacts with an antigen. The term "specificity" refers to the number of different types of antigens or antigenic determinants to which a particular immunoglobulin sequence, antigen-binding moiety or antigen-binding molecule (such as a binding molecule of the invention) can bind. The specificity of an antigen-binding molecule can be determined based on affinity and/or avidity towards the target molecule(s) relative to affinity and/or avidity towards non-target molecules. The affinity, represented by the equilibrium constant for the dissociation of an antigen with an antigen-binding protein ($K_D$), is a measure for the binding strength between an antigenic determinant and an antigen-binding site on the antigen-binding protein: the lower the value of the $K_D$, the stronger the binding strength between an antigenic determinant and the antigen-binding molecule (alternatively, the affinity can also be expressed as the affinity constant ($K_A$), which is $1/K_D$). Methods for determining the $K_D$ will be clear to the skilled person, and for example include the techniques mentioned herein. The affinity denotes the strength or stability of a molecular interaction. The affinity is commonly given as by the Ko, or equilibrium dissociation constant, which has units of mol/liter (or M). The affinity can also be expressed as an association constant, $K_A$, which equals $1/K_D$ and has units of liter/mol. In the present specification, the stability of the interaction between two molecules (such as an amino acid sequence, immunoglobulin sequence, or binding molecule of the invention and its intended target) will mainly be expressed in terms of the $K_D$ value of their interaction; it being clear to the skilled person that in view of the relation $K_A=1/K_D$, specifying the strength of molecular interaction by its $K_D$ value can also be used to calculate the corresponding $K_A$ value.

The $K_D$ value characterizes the strength of a molecular interaction also in a thermodynamic sense as it is related to the free energy of binding. As will be clear to the skilled person (for example on the basis of the further disclosure herein), affinity can be determined in a manner known per se, depending on the specific antigen of interest. Avidity gives a measure of the overall strength of an antibody-antigen complex. It is dependent on three major parameters: affinity of the antibody for the epitope (see above), valency of both the antibody and antigen, and structural arrangement of the parts that interact. Avidity is related to both the affinity between an antigenic determinant and its antigen binding site on the antigen-binding molecule and the number of pertinent binding sites present on the antigen-binding molecule. Typically, immunoglobulin sequences of the present invention (such as the amino acid sequences, ISVDs and/or binding molecules of the invention) will bind to their antigen with a $K_D$ of 10E-5 to 10E-12 moles/liter or less, and preferably 10E-7 to 10E-12 moles/liter or less and more preferably 10E-9 to 10E-12 moles/liter. Any Ko value greater than 10E-5 M is generally considered to indicate non-specific binding. Preferably, a monovalent immunoglobulin sequence of the invention will bind to the desired antigen with an affinity less than 500 nM, preferably less than 200 nM, more preferably less than 10 nM, most preferably less than 500 pM. Binding specificity and binding affinity of an antigen binding protein or of an antigen-binding protein to an antigen or antigenic determinant can be determined in any suitable manner known per se, including, e.g., Scatchard analysis and/or competitive binding assays, such as radioimmunoassays (RIA), enzyme-linked immunoassays (ELISA) and sandwich competition assays, and the different variants thereof known per se in the art; as well as the other techniques mentioned herein. The $K_D$ for biological interactions, such as the binding of a binding molecule of the invention to the cell associated antigen as defined herein, which are considered meaningful (e.g. specific), are typically in the range of 10E-10 M (0.1 nM) to 10E-6 M (1 M).

The Ko can also be expressed as the ratio of the dissociation rate constant of a complex, denoted as koff, to the rate of its association, denoted kon (so that $K_D$=Koff/kon and $K_A$=Kon/koff). The affinity of a molecular interaction between two molecules can be measured via different techniques known per se, such as the well-known surface plasmon resonance (SPR) biosensor technique (see for example Ober et al., Intern. Immunology, 13, 1551-1559, 2001) where one molecule is immobilized on the biosensor chip and the other molecule is passed over the immobilized molecule under flow conditions yielding kon, koff measurements and hence Ko (or $K_A$) values. This can for example be performed using the well-known Biacore instruments. Affinity measurements on transmembrane receptors that are expressed by cells are preferably performed by ELISA.

It will also be clear to the skilled person that the measured $K_D$ may correspond to the apparent $K_D$ if the measuring process somehow influences the intrinsic binding affinity of the implied molecules for example by artefacts related to the coating on the biosensor of one molecule. Also, an apparent $K_D$ may be measured if one molecule contains more than one recognition sites for the other molecule. In such situation the measured affinity may be affected by the avidity of the interaction by the two molecules. Another approach that may be used to assess affinity is the 2-step ELISA procedure of Friguet et al. (J. Immunol. Methods, 77, 305-19, 1985). This method establishes a solution phase binding equilibrium measurement and avoids possible artefacts relating to adsorption of one of the molecules on a support such as plastic. However, the accurate measurement of $K_D$ may be quite labour-intensive and as consequence, often apparent $K_D$ values are determined to assess the binding strength of two molecules. It should be noted that as long as all measurements are made in a consistent way (e.g. keeping the assay conditions unchanged) apparent $K_D$ measurements can be used as an approximation of the true $K_D$ and hence in the present document $K_D$ and apparent $K_D$ should be treated with equal importance or relevance.

A therapeutic or diagnostic molecule, if present, is also preferably bound to the remainder of the binding molecule by a linker and/or a spacer. Linkers are attached to the targeting moiety, e.g. such as a binding molecule of the invention, using strategies for either random/heterogeneous or site-specific conjugation of drugs. The former strategy is mainly based on conventional active ester or maleimide chemistry for drug conjugation to lysine or (hinge region) cysteine residues, respectively, while the latter make use of chemical residues that have been introduced at specific sites of "modified targeting moiety" that have been engineered genetically, enzymatically or by other means. The single variable antibody domain may comprise a cysteine or a histidine residue on the C-terminal or N-terminal part. The site-specific conjugation to a targeting moiety results in a homogeneous mixture with minimal batch to batch variability. Linkers can be either cleavable or non-cleavable. Both types of linkers are assumed to be stable in the circulation but based on a detailed analysis of integrity in blood and on toxicity profiles of certain ADCs, stability is a point of concern for currently approved ADCs. In case of ADCs with a cleavable linker, after internalization by the target cell the cleavable linker as well as the antibody become degraded in the lysosomes, making the drug freely available to exert toxic activity. In case of ADCs with a non-cleavable linker, only the antibody becomes degraded in the lysosomes, and drug-linker complexes are released. Aforementioned insights open avenues to empower linkers with tunable physicochemical functions that can alter the properties of the ADC as well as the drug in a beneficial way, e.g. by making the ADC production process easier and cheaper and/or by widening the therapeutic window. Next of being a stable glue between drug and mAb, an ideal linker might (1) improve the solubility of the drug and of the ADC and make the conjugation of the drug to the mAb more efficient, (2) improve cellular trafficking and the interaction of the drug with its cellular target, (3) decrease the efflux of the drug by tumor cells via multidrug resistance proteins, and (4) prevent uptake of the drug-linker complex by healthy cells. Since most of the conventional organic linkers provide suboptimal ADCs, during the last few years an extensive research on new conjugation technologies has been initiated.

The present invention provides a particular linker, further referred to as "Lx", comprising a functional platinum (II) complex having two reactive groups such as, for instance but not limited to those described in international patent publication WO2013103301. The first reactive group of Lx is capable of being replaced by a kinase inhibitor and the second reactive group by a targeting moiety such as a binding molecule of the invention. By using Lx, the immunoreactivity of the conjugated binding molecule substantially remains the same as the unbound native binding molecule. This is particularly important because only when the immunoreactivity of the binding molecule remains sufficiently high, it will be possible to deliver the conjugated drug as a therapeutic compound at the right place in the body. Furthermore, as it does not take very long to bind the binding molecule to the Lx and the reaction conditions for making this coupling are mild and highly independent from the functional moiety used, the targeting moieties used may be customized to patient-specific needs. Due to mild reaction conditions the binding molecule remains in excellent condition and retains its original (unconjugated) immunoreactivity. The present invention provides the technology to allow fast, efficient, stable, and site-directed binding of small therapeutic or diagnostic molecules to binding molecules. A biparatopic polypeptide conjugated through Lx showed superior relaxation activity in cellular models. The Lx linker is resistant to degradation in the blood while still allowing release of the payload at the target. Moreover, Lx allows, unlike other systems, the binding of drugs of different chemical classes. As stated before, the targeting of drugs via binding molecules to HSCs is conceptually attractive to enhance specificity, to decrease systemic toxicity, and to allow for the therapeutic use of compounds that are in principle less suitable or unsuitable as systemic drugs e.g. for their toxicity profile. This requires stable and site-directed coupling of a drug to a binding molecule of the invention to target upregulated receptors exposed on the outer membrane of activated HSCs. Hence, the linker and/or spacer preferably comprises or consists of a transition metal complex. In a preferred embodiment, the transition metal complex comprises Pt(II). In an even further preferred embodiment said linker comprises a cis-platinum (II) complex, more preferably a cis-platinum (II) complex comprising an inert bidentate moiety, wherein said bidentate moiety is preferably ethane-1,2-diamine.

As already mentioned before, inhibiting the contraction of the cytoskeleton of activated HSCs or myofibroblasts attenuates fibrosis. In a preferred embodiment, therefore, a binding molecule according to the invention is provided, wherein the therapeutic molecule is able to inhibit the contraction of the cytoskeleton of activated HSCs.

Kinase inhibitors, for instance, are able to inhibit contraction of the cytoskeleton of activated HSCs. Targeted kinases are involved in a signalling pathway called the renin-angiotensin system (RAS) which plays a role in liver fibrosis and portal hypertension. RAS plays a central role in the regulation of blood pressure by regulating vascular smooth muscle tone. Two kinases involved in RAS are the tyrosine kinase Janus-kinase 2 (JAK2) and Rho associated coiled-coil containing protein kinase (ROCK). The expression of these protein kinases has been associated with portal hypertension in human cirrhosis.

Portal hypertension is present in liver fibrosis and in all stages of liver cirrhosis. In liver cirrhosis, the activated HSCs contract around the sinusoids they reside on. This leads to portal hypertension where blood flow is obstructed through the portal venous system in the liver. Within RAS, JAK2 becomes phosphorylated and activates Arhgef1, the nucleotide exchange factor responsible for activation of small GTPase RhoA, which in turn activates its downstream effector ROCK. ROCK is a regulator of the actomyosin cytoskeleton which promotes contractile force generation. ROCK phosphorylates and thereby inactivates myosin light chain phosphatase (MLCP), leading to increased myosin light chain phosphorylation and contraction. Therefore, use of a ROCK inhibitor, Y27632, would lead to a decrease in HSC contraction induced by RAS. In turn, because JAK2 plays a role in activating ROCK, its inhibition through SB1518 (also called pacritinib, which is a JAK2 inhibitor) can help to relax HSCs. These small molecules are highly toxic and nonspecific, thus they suffer from dose-limiting toxicities rendering them unsuitable for systemic administration per se. A binding molecule of the invention bearing an efficacious amount of conjugated small-molecule drug is designed to overcome the limitations of the systemic administration of the small-molecule per se. Preferably, the therapeutic molecule is a kinase inhibitor, preferably selected from the group consisting of Rho-kinase, JAK-2 and neprilysin inhibitors, more preferably selected from the group consisting of Y27632, SB1518 and LBQ657. In another preferred embodiment, the therapeutic molecule is a toxin, such as taxanes, anthracyclines, vinca alkaloids, calicheamicins, maytansinoids, auristatins, preferably auristatin F, and CC 10065 analogs . . .

Normally, binding to a transmembrane receptor induces an intracellular signalling cascade. For instance, binding of PDGF to the PDGFRB induces phosphorylation of the receptor itself and other proteins, thereby engaging intracellular signalling pathways that trigger cellular responses such as migration and proliferation. As the purpose of a binding molecule of the present invention is the transportation of its payload into the cytosol of target cells and not activation of the receptor that is used for transportation, it is preferred that the binding of the binding molecule to the extracellular domain of the transmembrane receptor does not induce the receptor's intracellular signalling cascade. It is further preferred that binding of the binding molecule to the transmembrane receptor leads to receptor mediated internalisation, endocytosis and release of the drug or toxin within the endolysosomal compartment.

In one preferred embodiment, a binding molecule according to the invention is provided, wherein the binding molecule comprises an N-terminal or a C-terminal cysteine or histidine residue, preferably an N-terminal or C-terminal cysteine that serves the purpose of conjugation to the linker molecule. In embodiment, the invention provides a biparatopic binding molecule comprising at least two binding molecules according to the invention.

As mentioned previously, a binding molecule according to the invention, comprising a therapeutic molecule, serves to deliver the therapeutic molecule to the cytosol of a target cell, e.g., a fibrotic liver cell, thereby enabling the treatment of liver fibrosis. The invention, therefore, provides an internalising binding molecule according to the invention for use as a medicament. The term "treat", "treating", or "treatment" refers to administering a therapy in an amount, manner, and/or mode effective to improve a condition, symptom, or parameter associated with a disease or to prevent progression of a disease, to either a statistically significant degree or to a degree detectable to one skilled in the art. In the case of therapeutic use, the treatment may improve, cure, maintain, or decrease duration of the disease or condition in the subject. In therapeutic uses, the subject may have a partial or full manifestation of the symptoms. In a typical case, treatment improves the disease or condition of the subject to an extent detectable by a physician or prevents worsening of the disease or condition. As used herein, the term "prevent" or "preventing" means mitigating a symptom of the referenced disorder. In particular, said term encompasses the complete range of therapeutically positive effects of administrating a binding molecule of the invention to a subject including reduction of, alleviation of, and relief from a CLD-related disorder, e.g. oesophageal variceal haemorrhage, and the symptoms thereof. The term "prevention" includes the prevention or postponement of development of the disease, prevention or postponement of development of symptoms and/or a reduction in the severity of such symptoms that will or are expected to develop. These further include ameliorating existing symptoms, preventing additional symptoms and ameliorating or preventing the underlying causes of symptoms. As used herein, the terms "subject" and "patient" are used interchangeably. As used herein, the terms "subject" and "subjects" refer to an animal, e.g., a mammal including a non-primate (e.g., a cow, pig, horse, donkey, goat, camel, cat, dog, guinea pig, rat, mouse, sheep) and a primate (e.g., a monkey, such as a cynomolgus monkey, gibbon, orangutan, gorilla, chimpanzee, and a human). A "patient" preferably refers to a human. Said patient can include elderly, adults, adolescents and children, from any age, for instance children ranging from the age of 2 years to less than 12 years, adolescents ranging from 12 years to less than 18 years, adults ranging from 18 years to less than 65 years, and elderly from 85 years and up.

Preferably, such medicament is for use in a method for the prevention and/or treatment of a disease or disorder associated with or characterized by the increased expression of PDGFRB and/or IGF2R.

Preferably, such medicament is for use in a method for the prevention and/or treatment of liver cirrhosis, liver fibrosis and/or portal hypertension. For instance, portal hypertension (PH) is present in liver fibrosis and in all stages of liver cirrhosis. In liver cirrhosis, the activated HSCs contract around the sinusoids they reside on. This leads to PH where blood flow is obstructed through the portal venous system in the liver. The portal venous system is made up of the portal vein which merges a large volume of blood coming from the stomach, intestine, spleen, and pancreas, branching them through smaller vessels travelling throughout the liver. If the vessels in the liver are blocked due to liver damage, blood cannot flow properly through the liver resulting in high blood pressure. If PH worsens and blood flow is obstructed through the portal vein, blood is redirected through smaller blood vessels such as those in the oesophagus that are not designed to carry such large volumes of blood. This leads to dilated veins (varices) at the distal oesophagus and/or the proximal stomach which have an increased risk of rupturing (variceal haemorrhages), causing severe to fatal internal bleeding. A binding molecule according to the invention is particularly useful for targeting the cells that cause or exacerbate liver cirrhosis, liver fibrosis and/or portal hypertension.

Preferably, such medicament is for use in a method for the prevention and/or treatment of a disease or disorder associated with esophageal varices and/or hemorrhoids. Preferably, such medicament is for use in a method for the prevention and/or treatment of a disease or disorder characterized by internal or external variceal bleedings.

In one embodiment, the invention provides a nucleic acid that encodes at least part of a binding molecule according to the invention. Although one of the advantages of the present invention is the ease of production and the simplicity of the molecules of the invention, the choice for a single nucleic acid encoding all necessary functions in itself enables the relatively easy addition (to the extent that there is room in the chosen expression vectors, etc.) of other functionalities in the resulting binding molecule. Such nucleic acid enables production of a binding molecule according to the invention when transfected in a suitable host cell. Therefore, the invention provides a host cell for expression of at least part of a binding molecule according to the invention, comprising a nucleic acid according to the invention. In one embodiment, the invention provides a method for producing a binding molecule according to the invention, comprising culturing a host cell according to the invention, allowing for expression of at least part of said binding molecule, harvesting the binding molecule, and coupling the therapeutic or diagnostic molecule to said part of said binding molecule, optionally through a linker as defined previously.

A binding molecule of the invention can be produced by any commonly used method.

Typical examples include the recombinant expression in suitable host systems, e.g. bacteria or yeast or mammalian cells. The binding molecules of the invention will undergo a suitable purification regimen prior to being formulated in accordance to the present invention. In general, the binding molecules of the invention are produced by living host cells that have been genetically engineered to produce the binding molecule. Methods of genetically engineering cells to produce proteins are well known in the art. See e.g. Ausubel et al., eds. (1990), Current Protocols in Molecular Biology (Wiley, New York). Such methods include introducing nucleic acids that encode and allow expression of the binding molecule into living host cells. These host cells can be bacterial cells, fungal cells, or animal cells grown in culture. Bacterial host cells include, but are not limited to, *Escherichia coli* cells. Examples of suitable *E. coli* strains include: BL21 (D3), HB101, DH5a, GM2929, JM109, KW251, NM538, IMM539, and any *E. coli* strain that fails to cleave foreign DNA. Preferred is *E. coli* strain BL21 (D3). Fungal host cells that can be used include, but are not limited to, *Saccharomyces cerevisiae, Pichia pastoris* and *Aspergillus* cells. A few examples of animal cell lines that can be used are CHO, VERO, BHK, HeLa, Cos, MDCK, HEK293, 3T3, and WI38. New animal cell lines can be established using methods well known by those skilled in the art (e.g., by transformation, viral infection, and/or selection). Optionally, the binding molecule can be secreted by the host cells into the medium. In some embodiments, the binding molecules can be produced in bacterial cells, e.g., in *E. coli* cells.

In one embodiment, the binding molecules are expressed in a yeast cell such as *Pichia* (see, e.g., Powers et al., J Immunol Methods 251:123-35 (2001)), *Hansenula*, or *Saccharomyces*. In one embodiment, binding molecules are produced in mammalian cells. Typical mammalian host cells for expressing the clone antibodies or antigen-binding fragments thereof include Chinese Hamster Ovary (CHO cells) (including dhfr-CHO cells, described in Urlaub and Chasin, Proc. Natl. Acad. Sci. USA 77:4216-4220 (1980), used with a DHF selectable marker, e.g., as described in Kaufman and Sharp, Mol. Biol. 159:601-621 (1982)), lymphocytic cell lines, e.g., NSO myeloma cells and SP2 cells, COS cells, and a cell from a transgenic animal, e.g., a transgenic mammal. For example, the cell is a mammary epithelial cell. In addition to the nucleic acid sequences encoding the binding molecule, the recombinant expression vectors may carry additional sequences, such as sequences that regulate replication of the vector in host cells (e.g., origins of replication) and selectable marker genes. The selectable marker gene facilitates selection of host cells into which the vector has been introduced (see, e.g., U.S. Pat. Nos. 4,399,216; 4,634,665; and 5, 179,017). E.g., typically the selectable marker gene confers resistance to drugs, such as G418, hygromycin, or methotrexate, on a host cell into which the vector has been introduced. Standard molecular biology techniques can be used to prepare the recombinant expression vector, transfect the host cells, select for transformants, culture the host cells and recover the antibody molecule from the culture medium. E.g., the binding molecules of the invention can be isolated by affinity chromatography. In one embodiment, the binding molecule of the invention is purified as described in WO 10/058550. In an exemplary embodiment, the binding molecule is purified from one or more contaminants by: contacting a mixture of binding molecule and contaminant(s) with a Protein A-based support and/or an ion exchange support, under conditions that allow the binding molecule to bind to or adsorb to the support; removing one or more contaminants by washing the bound support under conditions where the binding molecule remains bound to the support, and selectively eluting the binding molecule from the support by eluting the adsorbed binding molecule with an elution buffer. The binding molecules of the invention can also be produced by a transgenic animal. E.g., U.S. Pat. No. 5,849,992 describes a method of expressing an antibody in the mammary gland of a transgenic mammal. A transgene is constructed that includes a milk-specific promoter and nucleic acids encoding the antibody molecule and a signal sequence for secretion. The milk produced by females of such transgenic mammals includes, secreted therein, the single domain of interest. The antibody molecule can be purified from the milk, or for some applications, used directly. The present invention encompasses methods of producing the formulations as defined herein.

The invention further provides a pharmaceutical composition comprising at least one binding molecule according to the invention and at least one pharmaceutically acceptable excipient.

A binding molecule of the invention can be administered or used for administration in the form of a liquid solution (e.g., injectable and infusible solutions). Such compositions can be administered by a parenteral mode (e.g., subcutaneous, intraperitoneal or intramuscular injection) or by inhalation. The phrases "parenteral administration" and "administered parenterally" as used herein mean modes of administration other than enteral and topical administration, usually by injection, and include subcutaneous (s.c.) or intramuscular administration as well as intravenous (i.v.), intracapsular, intraorbital, intracardiac, intradermal, intraperitoneal, transtracheal, subcuticular, subcapsular, subarachnoid, intraspinal, epidural, and intrasternal injection and infusion. Preferably, the second or further doses of a binding molecule of the invention described herein are administered subcutaneously or orally, for slow release and, hence, a sustained effect. Preferably and in particular in acute situations, it is preferred to administer a binding molecule of the invention orally as the binding molecules will be transported via the splanchnic circulation directly towards the diseased liver after uptake in the gut.

The present invention provides also formulations of binding molecules comprising at least one immunoglobulin single variable domain against PDGF or IGF, which are stable, and preferably suitable for pharmaceutical uses, including the preparation of medicaments (also called "pharmaceutical composition of the invention"). The term "pharmaceutical composition" refers to a preparation which is in such form as to permit the biological activity of the active ingredient (the binding molecule of the invention) to be effective, and which contains no additional components which are unacceptably toxic to a subject to which the formulation would be administered. Such formulations are preferably sterile. "Pharmaceutically acceptable" excipients (vehicles, additives) are those which can reasonably be administered to a subject mammal to provide an effective dose of the active ingredient employed.

The term "excipient" as used herein refers to an inert substance which is commonly used as a diluent, vehicle, preservative, lyoprotectant, surfactant, binder, carrier or stabilizing agent for compounds which impart a beneficial physical property to a formulation. The skilled person is familiar with excipients suitable for pharmaceutical purposes, which may have particular functions in the formulation, such as lyoprotection, stabilization, preservation, etc.

Non-limiting examples of agents that can be co-formulated with a binding molecule of the invention include, e.g., adjunctive treatment (e.g. corticosteroids such as (methyl) prednisolone or (methyl) prednisone, diuretics, albumin, vitamin K, antibiotics and nutritional therapy and systemic blood pressure lowering agents such as beta-blocking agents) and supportive therapy with red cell transfusion. Such combination therapies may advantageously utilize lower dosages of the administered therapeutic agents, thus avoiding possible toxicities or complications associated with the various monotherapies. In an embodiment, the present invention relates to a combination therapy of a binding molecule of the invention together with a systemic blood pressure lowering treatment. Preferably, the combination therapy is provided until the portal pressure is normalized. Portal pressure measurement helps to confirm the diagnosis and monitor the course of the disease and a possible need for additional treatments. The efficacy of any particular proteinaceous molecule of the invention or dosing regimen may be determined by methods available to those of skill in the art. Briefly, during a clinical trial, the patients may be observed by medical personnel and the state of disease is assessed by any combination of criteria.

The improvement of a patient's disease state is determined based on these criteria at numerous time points and the combination of these determinations on a patient population is plotted to assess the efficacy of treatment. In exemplary embodiments, assessment of efficacy may be measured by any or all of the criteria set forth below:
  Time-to-response of treatment
  Number of subjects with complete remission.
  Number of (subjects with) exacerbations of EVH and time to first exacerbation of EVH.
  Improvement of organ dysfunction and improvement of CLD-related signs and symptoms
  Total mortality within study drug treatment period (including tapering)·
  Determination of biomarkers of CLD The dosage of a binding molecule according to the invention is to be established through animal studies and clinical studies in so-called rising-dose experiments. Typically, the doses will be comparable with present day antibody dosages (at the molar level, the weight of the invented molecules may differ from that of antibodies). Typically, such dosages are 3-15 mg/kg body weight or 25-1000 mg per dose.

Especially in the more chronic stages of the liver disease, the first applications of a binding molecule according to the invention will (at least initially) probably take place in combination with other treatments (standard care). Thus, the invention also provides a pharmaceutical composition comprising a binding molecule according to the invention and a conventional therapy e.g. a blood pressure lowering drug such as propranolol or surgical means to stop bleedings from e.g. varices in the oesophagus. Moreover, the current invention also provides a pharmaceutical composition comprising a binding molecule according to the invention for use in an adjuvant treatment, e.g. in liver disease. Additionally, the current invention also provides a pharmaceutical composition comprising a binding molecule according to the invention for use in a combination medicinal treatment of liver disease.

Therefore, the ideal therapeutic compound should allow the delivery of effector compounds which are much more potent than currently used molecules, such as propranolol, and which otherwise have a therapeutic window which is too narrow to allow their use as free drug. Preferably, stable conjugation of the drug to the targeting moiety avoids systemic toxicity by release of the (otherwise toxic) compound in the circulation. Once the molecule is internalized by the HSC, the drug should be released to be able to deactivate the HSC.

Preferably, the pharmaceutical composition further comprises at least one other compound useful in the treatment of chronic liver disease. A pharmaceutical composition according to the invention is preferably for use as an adjuvant treatment of variceal bleeding in the presence of portal hypertension and/or for use in the treatment of liver disease. A binding molecule according to the invention, comprising a diagnostic molecule is in particular useful for diagnosis of, e.g., liver fibrosis. In a preferred embodiment, therefore, a binding molecule according to the invention comprising a diagnostic molecule is provided, wherein the diagnostic molecule is an imaging agent. Further provided is a diagnostic composition comprising at least one binding molecule according to the invention comprising a diagnostic molecule and a diluent and/or excipient.

In particularly preferred embodiments of the present invention the binding molecule according to the present invention comprises at least two single variable domains, that are independently from one another, able to specifically bind a PDGFRB or IGF2R receptor of a hepatic stellate cell and/or myofibroblast and which domains are linked via a linker comprising a cis-platinum (II) complex to a therapeutic molecule chosen from a kinase inhibitor, such as a Rho-kinase inhibitor, Jak-2 kinase inhibitor, neprilysin inhibitor or angiotensin II Receptor antagonist. Preferably, the cis-platinum (II) complex of the linker comprises an inert bidentate moiety, most preferably ethane-1,2-diamine. Furthermore, preferred single variable domains that specifically bind to an IGF2R receptor comprise a CDR 1 sequence according to SEQ ID NO: 275, a CDR 2 sequence according to SEQ ID NO: 277 and a CDR 3 sequence according to SEQ ID NO: 279 or comprise a CDR 1 sequence according to SEQ ID NO:251, a CDR 2 sequence according to SEQ ID NO: 253 and a CDR3 sequence according to SEQ ID NO: 255 (i.e. according to 13F11 and 13E8, respectively); preferred single variable domains that specifically bind a PDGFRB receptor comprise a CDR 1 sequence according to SEQ ID NO: 11, a CDR 2 sequence according to SEQ ID NO: 13 and a CDR 3 sequence according to SEQ ID NO: 15 or a CDR 1 sequence according to SEQ ID NO: 155, a CDR 2 sequence according to SEQ ID NO: 157 and a CDR 3 sequence according to SEQ ID NO: 159 (i.e. according to SP02P and SP26P, respectively). Furthermore, said binding molecule preferably also comprises a so-called half-life extender, which is preferably chosen from an albumin binding domain, albumin binding VHH or an antibody Fc tail or fragment thereof. In the Examples below, amongst others, specific species of these preferred embodiments have been described in more detail.

Examples

Example 1: Selection of human antibody fragments specific for IGF2R or PDGFRB. Llama immunization, cell collection, phage VHH selections and the constitution of libraries. VHH selection based on target affinity and HSC internalization: IGF2R (rat and human). VHH selection based on target affinity and HSC internalization: IGF2R (rat and human).

A general procedure for generating and characterizing antigen-specific VHHs is depicted in FIG. 1.

1.1 IGF2R

Our aim was to identify VHHs that bind specifically and with high affinity to receptor IGF2R on human and rat hepatic stellate cells (HSCs). The starting material for the study was a previously generated Llama VHH cDNA library. The library consisted of a large pool of VHH sequences extracted from peripheral blood mononuclear cells of llamas immunized with human IGF2R (hIGF2R) expressing A549 cells. Library size, as assessed by means of colony titrations upon DNA transformation was approximately 108 colony forming units (cfu).

Phages were prepared from the A549 VHH library and two rounds of selections were done on recombinant human extracellular domain of IGF2R (hIGF2R-ECD). In each round, approximately 1011 colony forming units (cfu) of phages were incubated on different concentrations of the target, eluted, amplified and then used for the next round of selections. The phage output after the second selection round was clearly higher than in the first round, respectively $1.2 \times 10^9$ and $3.3 \times 10^7$, demonstrating that VHH binders were being amplified.

Figure 2:
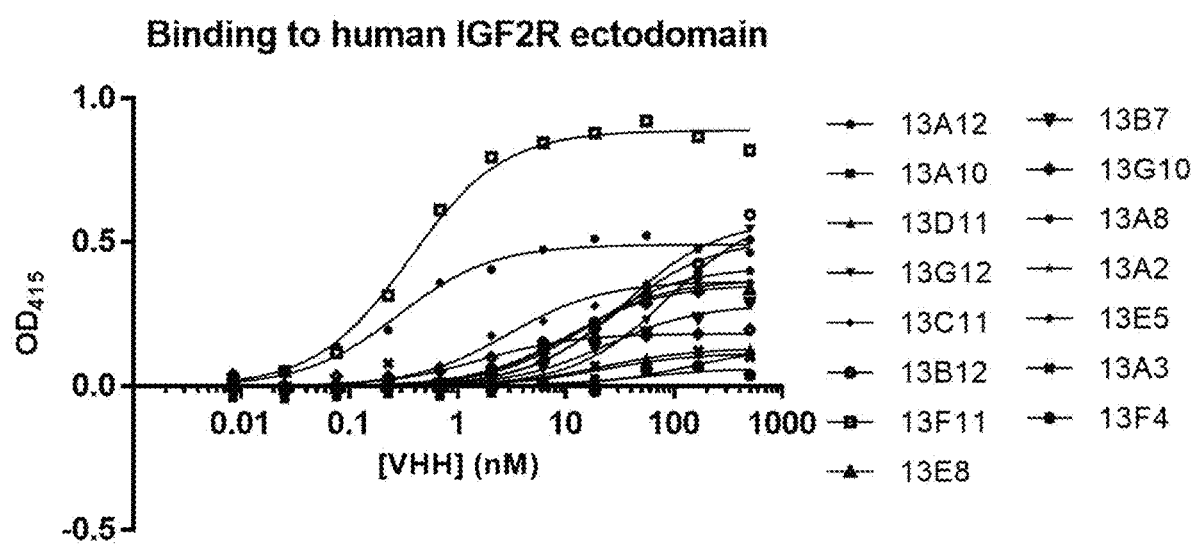
FIG. 2: Binding assay of IGF2R selected VHHs to human IGF2R ectodomain.

After the final selection round, 94 phage clones were randomly selected and tested for binding to hIGF2R-ECD in a phage ELISA. Clones with high binding affinity were then further characterized by restriction pattern analysis using Hinfl digestion and were categorized according to their restriction pattern. From each category, multiple clones were selected and the amino acid sequences of these binders were identified (Table 2). This selection led to a panel of 15 unique hIGF2R binders all derived from the A549 library (FIG. 2).

1.2 PDGFRB

Selection of VHHs that specifically and with high affinity bind to receptor PDGFRB, rat and human, was started by immunization of llamas. For each receptor, 2 llamas were injected 5 times, 4 times with extracellular domain (ECD) and 1 time with SCC VII cells transfected with PDGFRB, according to the immunization schedule in Table 3. It must be noted that the two llamas immunized with rPDGFRB were also immunized with SCC VII cells transfected with rIGF2R for the generation of VHHs that bind specifically and with high affinity to rIGF2R. Eight days after the last immunization, blood was collected, and peripheral blood lymphocytes (PBLs) were purified and their RNA was extracted.

TABLE 3

| | Immunization schedule | |
|---|---|---|
| | Target | |
| Injection | hPDGFRB | rPDGFRB/rIGF2R |
| Day 0_1$^{st}$ | ECD 25 µg | ECD 25 µg/SCC VII-rat IGF2R cells |
| Day 14_2$^{nd}$ | ECD 25 µg | ECD 25 µg/SCC VII-rat IGF2R cells |
| Day 28_3$^{rd}$ | ECD 25 µg | ECD 25 µg/SCC VII-rat IGF2R cells |
| Day 43_4$^{th}$ | ECD 25 µg | ECD 25 µg/SCC VII-rat IGF2R cells |
| Day 70_5$^{th}$ | SCC VII-hPDGFRB cells | SCC VII-rPDGFRB cells/SCC VII-rat IGF2R cells |
| llama | SNL152 and SNL153 | SNL154 and SNL155 |

The PDGFRB libraries (for both human and rat PDGFRB) were created according to the following procedure. The extracted RNA (40 µg, 4 reactions of 10 µg each) was transcribed into cDNA using the reverse transcriptase kit (Invitrogen) and the cDNA was cleaned with a QIAquick PCR purification kit (Qiagen) both according to manufacturers' protocol. IG H fragments (conventional and heavy chain) were amplified using primers annealing at the leader sequence region and at the CH2 region. The PCR product was loaded on a 1% agarose gel, after which the 700 bp fragment was cut out from the gel and purified with the QIAquick kit (Qiagen) according to manufacturers' protocol. Subsequently, 80 ng of the purified DNA was used as a template for a nested PCR to introduce restriction sites (end volume 800 µL). The amplified fragment was cleaned with a QIAquick PCR purification kit according manufacturers' protocol and eluted in 120 µL elution buffer. The eluted DNA was digested with BstEll and Sfil after which the sample was run on a 1.5% TAE-agarose gel and the 400 bp fragment was isolated from the gel. The DNA fragments were isolated by the QIAquick cleanup kit (Qiagen) according to manufacturers' protocol and eluted in 100 μL elution buffer. Subsequently, the DNA fragments (330 ng) were ligated into a phagemid vector (pHEN1 derivative, 1 μg) and transformed into TG1 bacterial cells. Before ligation, the phagemid vector was prepared by digestions with SfiI and BstEII, followed by dephosphorylation with FastAP.

The numbers of transformants were calculated from dilutions of the plated out TG1 cells (8 mL). The titer of the library (Table 4) was calculated by counting colonies in the highest dilution and using the formula below:
Library size=(amount of colonies) ×(dilution)×8 mL/0.005 mL (spotted volume). The insert frequency was determined by picking 24 different clones from each of the library transformations and running a colony PCR. The insert frequency was 100% for library 1, 2 and 4, and 96% for library 3.

TABLE 4

| Calculated library sizes | | | | |
|---|---|---|---|---|
| Library | 1 | 2 | 3 | 4 |
| Llama/Target | SNL152-hPDGFRB | SNL153-hPDGFRB | SNL154-rPDGFRB | SNL155-rPDGFRB |
| Size | $6.4 \times 10^7$ | $1.4 \times 10^7$ | $9.6 \times 10^6$ | $4.8 \times 10^6$ |
| $OD_{600}$ | 42.3 | 51.8 | 49.3 | 58.0 |

Figure 3:
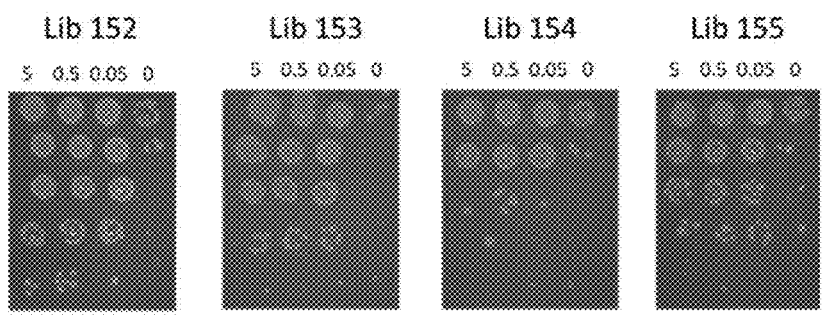
FIG. 3. Phage outputs from the first selection round of the PDGFRB libraries on human PDGFRB ectodomain (libraries 152 and 153) and rat PDGFRB ectodomain (libraries 154 and 155).
Figure 4:
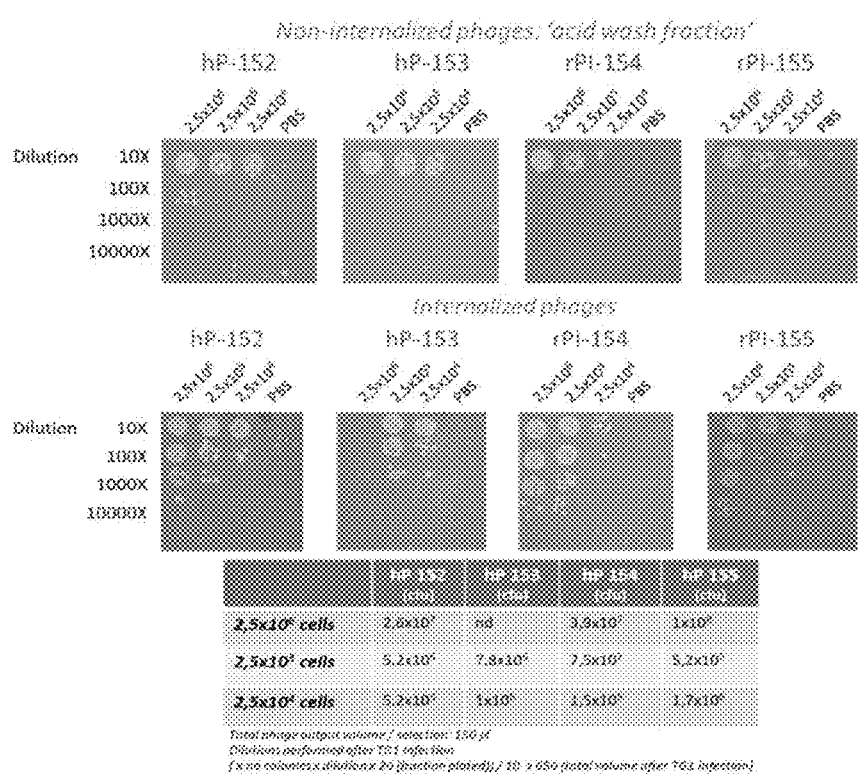
FIG. 4. Phage outputs from the second selection round of the PDGFRB libraries on SCC VII cells transfected with either human PDGFRB (libraries 152 and 153) or rat PDG-FRB (libraries 154 and 155).

Phages were prepared from the libraries and two selection rounds were done. The first selection round was carried out on extracellular domain (hPDGFRB-ECD or rPDGFRB-ECD). Phages were incubated on different concentration of the target, eluted, amplified and then used for the next round of selection. The phage outputs of the first selection round are displayed in FIG. 3. The second selection round was carried out on SCC VII cells transfected with either hPDGFRB or rPDGFRB for the selection of binding and internalizing phages. Using an acid wash, the phages only binding to PDGFRB were separated from the phages internalizing via PDGFRB after binding. This selection round was carried out with the output from the first round from the wells with the lowest ECD density. The phage outputs of the second selection round are displayed in FIG. 4.

After the second selection round, 94 internalizing phage clones were randomly selected and tested for binding to PDGFRB-ECD in a phage ELISA. Clones with high binding affinity were then further characterized by restriction pattern analysis using HinfI digestion. The clones were categorized according to their restriction pattern and only one clone from each category was selected and the amino acid sequences of these binders were identified leading to 18 unique hPDGFRB binding VHHs and 11 unique rPDGFRB binding VHHs (Table 1, FIGS. 5-6).

Example 2: Design of genes for production of binding molecules comprising VHH

Figure 7:
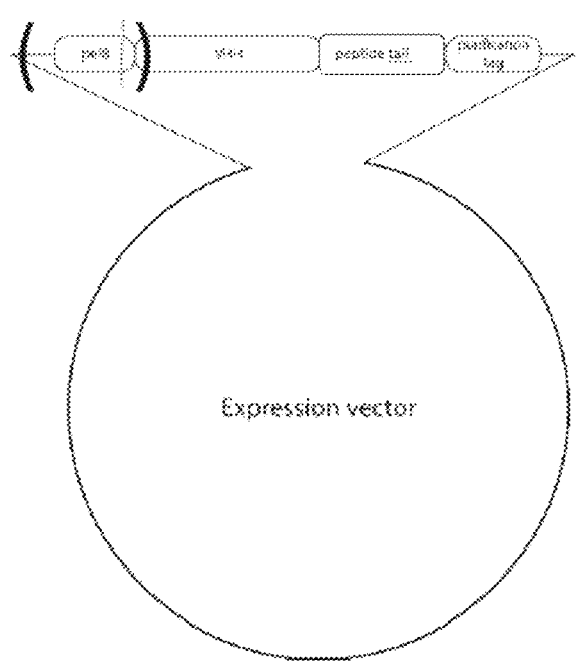
FIG. 7. Schematically displayed expression vector with the VHH insert with peptide tail and purification tag.

In order to produce the VHHs, genes of the selected VHHs were cloned into a pET-21 or pET-28 vector containing the following sequences in the insert of in the expression vector (FIG. 7). The PelB sequence directing the transport of the produced protein in the bacterial cells to the periplasm. A T7 promotor and terminator, and in between a lac operon allowing induction of the VHH protein upon addition with IPTG. Ampicillin or kanamycin resistance gene for resistance against the antibiotics ampicillin or kanamycin, respectively. One is one free C-terminal cysteine available for site-selective conjugation of semi-final moieties or maleimide modified moieties comprising payloads such as dyes or kinase inhibitors. Histidine, EPEA or other affinity purification tags and a thrombin cleavage site are used to remove the purification tag when needed.

Example 3: The Production of Monomeric, Dimeric, and Multimeric Binding Molecules Comprising VHH Domains E. coli BL21-DE3 Codonplus (Stratagene) were heat-shock transformed with VHH-encoding plasmid DNA (example 2) and grown in the presence of appropriate antibiotics. A single colony was picked and used to inoculate 10 mL 2xYT (supplemented with 2% (w/v) glucose, 35 μg/mL chloramphenicol and 100 μg/mL ampicillin or 30 μg/mL kanamycin) and the inoculated medium was incubated overnight at 37° C. and 180 rpm. Subsequently, the overnight culture was diluted 1/100 in 900 mL Terrific Broth (supplemented with 100 ml KPO buffer, 0.1% (w/v) glucose and 100 μg/mL ampicillin or 30 μg/ml kanamycin) and the culture was incubated at 37° C. and 180 rpm until OD 600 reached values between 0.5 and 0.8, after which 1 mL of 1 M IPTG was added to the culture to induce protein production and incubation was continued overnight at 25° C. and 180 rpm. The bacterial cells were harvested by spinning down the culture at 4700 rpm for 15 min at 4° C. followed by resuspension of the bacterial cells in PBS (30 mL PBS per 800 mL bacterial culture). The periplasmic content containing the VHH was released from the cells by freeze-thawing the suspension twice after which the suspension was spun down at 4° C. and 4700 rpm. The VHHs were purified with immobilized metal affinity chromatography (IMAC) purification on Talon metal affinity resin (Clontech) (0.75 mL per L bacterial culture). The resin was prewashed with PBS 3 times after which the resin was added to the periplasm and incubated for 30 min at 4° C. and 15 rpm. The resin was separated from the periplasm by spinning down the suspension for 3 minutes at 4° C. and 900 rpm and washed with 0.05% (v/v) TWEEN20 in PBS, followed by 2 washing steps with PBS. Subsequently, the resin was added to Poly-Prep Chromatography Columns (Bio-Rad) followed by pre-elution of non-specifically bound protein with 1 mL of a 15 mM imidazole solution in PBS after which the protein of interest was eluted with a 150 mM imidazole solution in PBS. The protein concentration of the collected fractions were measured on a NanoDrop 1000 spectrophotometer (ThermoFisher Scientific) at 280 nm (set at 1 Abs=1 mg/mL) and the fractions containing the VHH were pooled and dialyzed against a solution of 1 mM TCEP-HCl in PBS with 3.5 kDa MWCO SnakeSkin Dialysis tubing (ThermoFisher Scientific) overnight at 4° C. Purified protein was aliquoted and stored at −20° C. All clones were successfully purified as seen by a clear singular band around 15 kDa on SDS-PAGE.

Example 4: Characterization of Monomeric VHH Domains

4.1 IGF2R

Figure 8:
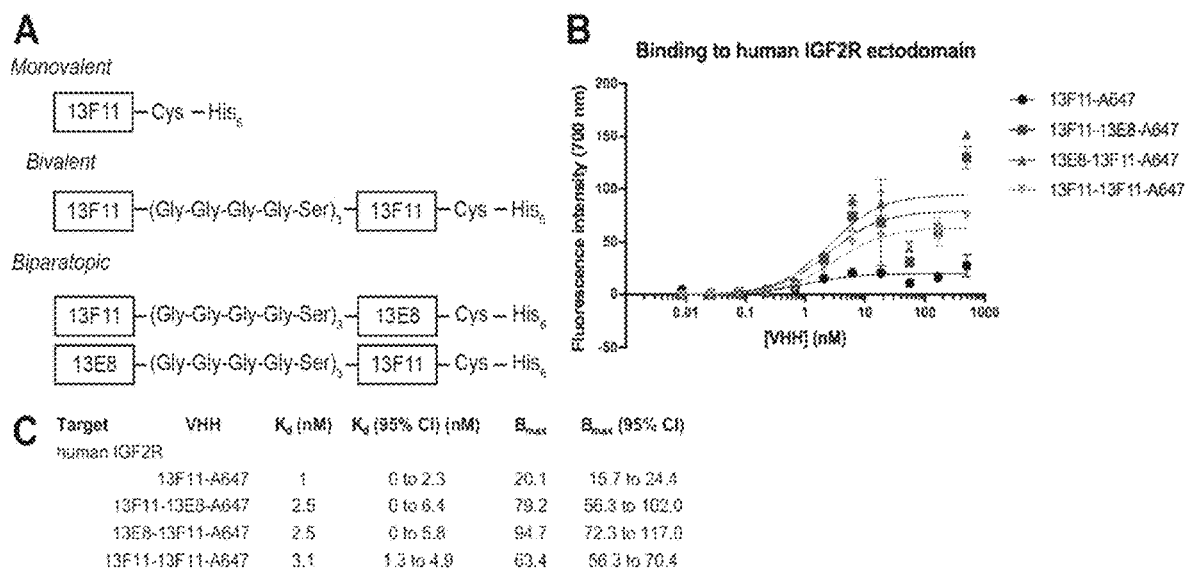
FIG. 8. Construction and characterization of bivalent and biparatopic VHH constructs directed against human IGF2R. A. Schematic representation of monovalent, bivalent and biparatopic VHH formats. In the bivalent and biparatopic formats, two VHHs are fused with a flexible (Gly-Gly-Gly-Gly-Ser) 3 linker (GGGGSGGGGSGGGGS; SEQ ID NO: 369). All formats contain a C-terminal cysteine for site-directed conjugation to thiol-reactive probes and a hexahistidine-tag (HHHHHH; SEQ ID NO: 370) or EPEA-tag (EPEA; SEQ ID NO: 371) for affinity chromatography purification. B. Binding of anti-human IGF2R VHH constructs to recombinant human IGF2R ectodomain. C. Bmax and KD+95% confidence intervals for selected VHHs.

The 15 unique hIGF2R binders (Example 1.1, FIG. 2) were produced and purified as described in examples 2 and 3. The apparent affinities were determined with binding assays on hIGF2R-ECD. Briefly, three-fold serial VHH dilutions, starting from 1 µM, were added onto hIGF2R-ECD coated plates. After 2 hours of incubation, plates were washed and bound VHH was detected using a VHH-specific IgG antibody, followed by an IRD800CW-conjugated IgG-specific antibody. The results of the binding assays are displayed in FIG. 2. VHH 13F11 was also produced with a C-terminal free cysteine and conjugated using maleimide chemistry to Alexa Fluor 647 (13F11-A647 in FIG. 8A, conjugation method as described in example 9.2). A titration ELISA (direct read out at 647 nm) with this construct was carried out on hIGF2R-ECD to determine whether the affinity was affected after site directed conjugation (FIG. 8B). The $K_D$ and Bmax were calculated in Graphpad (version 8.3), using one-site specific binding analysis (FIG. 8C). The calculated affinity of 13F11-A647 was 1.00±0.61 nM ($K_D$+SEM, n=2), which is slightly lower than the calculated affinity for unconjugated 13F11 (0.23±0.05 nM ($K_D$+SEM, n=2)). This suggests that site-directed conjugation to the C-terminal free terminal leads to a slight, but acceptable, decrease in affinity.

4.1 PDGFRB

Figure 5:
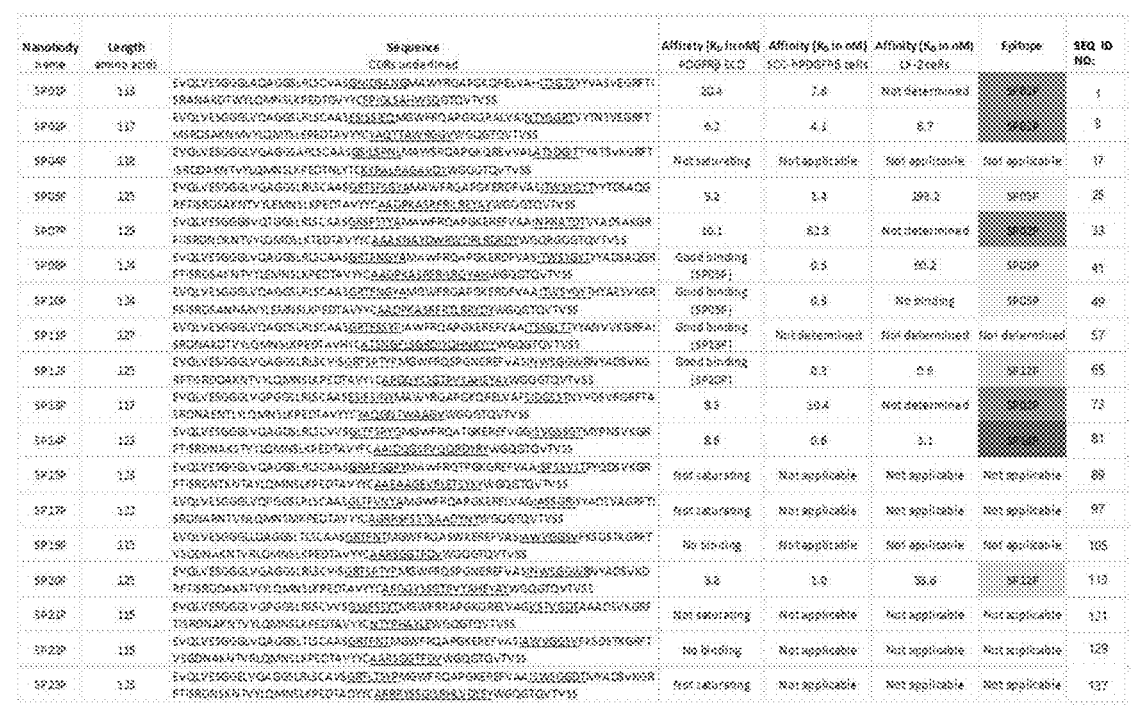
Figure 9:
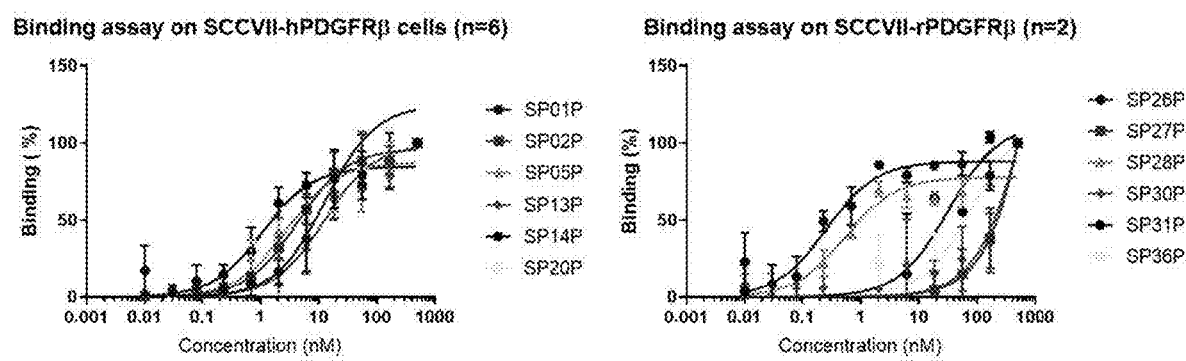
FIG. 9. Binding of selected VHHs on SCC VII cells transfected with either the human or rat PDGFRB receptor (SCC-hP or SCC-rP) fused to GFP. The VHH is detected using anti-VHH rabbit serum and donkey-anti-rabbit secondary antibody labelled with IRDye800CW.

The 18 unique hPDGFRB binders and 11 unique rPDGFRB binders (Example 1.2, FIGS. 5 and 6) were produced and purified as described in examples 2 and 3 and the apparent affinities were determined with binding assays on hPDGFRB-ECD and rPDGFRB-ECD, respectively, as described above. The results are summarized in FIGS. 5 and 6 for the hPDGFRB and rPDGFRB VHHs, respectively. The hPDGFRB and rPDGFRB binding VHHs having a high binding affinity on ECD were subsequently tested for binding on SCC VII cells transfected with hPDGFRB and rPDGFRB in FIGS. 9A and 9B, respectively. Moreover, the binding affinities of the hPDGFRB VHHs human were also determined on the human hepatic stellate cell (HSC) line LX-2 (FIG. 5).

Example 5: Determination of VHHs Binding to Non-Overlapping Receptor Epitopes to Allow Construction of Biparatopic Binding Molecules

5.1 IGF2R VHHs

Figure 10:
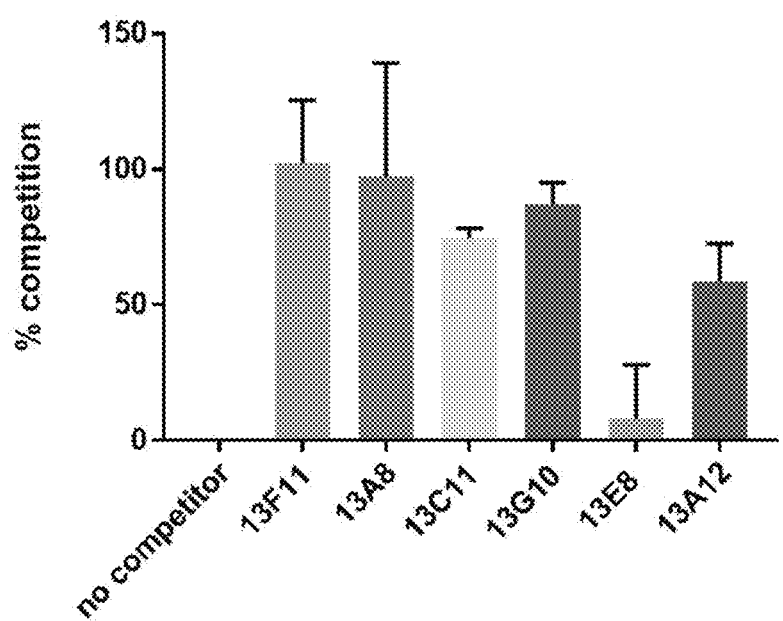
FIG. 10. Competition enzyme linked immunosorbent assay (ELISA) with VHHs directed against human IGF2R.

From the panel of 15 hIGF2R specific binders (FIG. 2), VHHs 13A8, 13A12, 13C11, 13E8, 13F11 and 13G10 were chosen for further characterization. A competition assay was performed to determine if the selected VHHs recognize distinct epitopes on hIGF2R. For this, a non-saturating amount (10 nM) of 13F11 conjugated to Alexa Fluor 647 (13F11-A647, conjugation method as described in example 9.2) was incubated with immobilized hIGF2R-ECD in the presence of unconjugated competitor (250 nM) (FIG. 10). Incubation of hIGF2R-ECD with 13F11-A647+13F11 was used as a positive control and incubation of hIGF2R-ECD with only 13F11-A647 was used to define the maximal fluorescence intensity. VHH 13A8 showed complete competition with VHH 13F11 demonstrating that these two VHHs recognized (at least partially) overlapping epitopes. Of the other VHHs, only 13E8 did not compete with 13F11, demonstrating that 13F11 and 13E8 recognized non-overlapping epitopes. Hence, these two VHHs would qualify as building blocks for a biparatopic VHH construct.

5.2 PDGFRB VHHs

Figure 11:
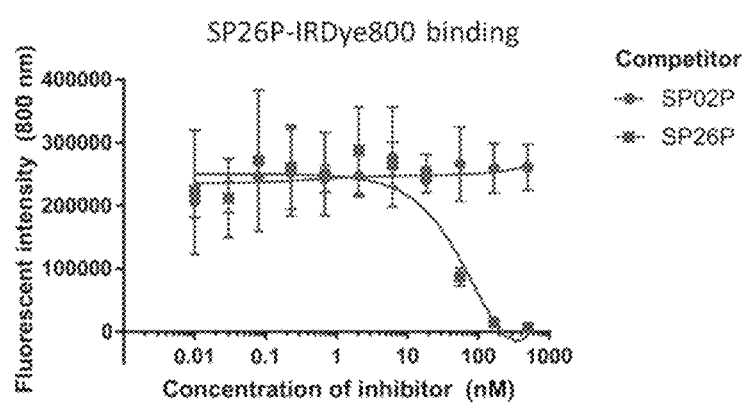
FIG. 11. Competition enzyme linked immunosorbent assay (ELISA) assay with SP02P and SP26P on PDGFRB ECD.

Competition ELISAs were carried out to determine whether the hPDGFRB specific binders (FIG. 5) and rPDGFRB specific binders (FIG. 6) recognize distinct epitopes on hPDGFRB or rPDGFRB, respectively. The hPDGFRB binding VHHs SPO2P, SP05P, SP12P and SP14P and the rPDGFRB binder SP26P were conjugated to IRDye800CW (VHH-IRDye800CW, conjugation method as described in example 9.2) and each conjugated VHH was mixed with unconjugated competitor in trifold serial dilutions and incubated on immobilized hIGF2R-ECD. Two VHHs share (part of) the same epitope when the fluorescence signal of the VHH-IRDye800CW decreases upon increasing concentration of unconjugated VHH. The epitopes determined by the competition assay for the hPDGFRB binding VHHs and the rPDGFRB VHHs are summarized in FIGS. 5 and 6, respectively. Furthermore, using a similar method as described in section 5.1, binding epitope competition between the hPDGFRB binding VHH SPO2P and rPDGFRB binding VHH SP26P was performed. No competition was observed between the two VHHs qualifying them as building blocks for biparatopic binding molecules (FIG. 11).

Example 6: Construction and Characterization of Biparatopic VHHs

6.1 IGF2R

Based on their high affinity and binding to non-overlapping receptor epitopes, VHHs 13F11 and 13E8 were selected for the design of biparatopic and bivalent VHH constructs. Two VHHs were fused with a flexible linker, consisting of three Gly-Gly-Gly-Gly-Ser repeats (FIG. 8A). The sequences were codon optimized for expression in *E. coli* and obtained as synthesized DNA fragments from GeneArt. The DNA fragments encoding VHHs were cloned into a vector pET28-based vector introducing a C-terminal free cysteine for site-directed conjugation and His6 tag for IMAC purification (FIG. 8A). The constructs were produced and purified as described in example 3. The constructs were conjugated to Alexa Fluor 647 (conjugation method as described in example 9.2) and titration ELISAs on recombinant hIGF2R-ECD (as described in example 4.1) were performed to determine the $K_D$ and Bmax (calculated in Graphpad (version 8.3), using one-site specific binding analysis) (FIG. 8C). The calculated affinities for 13F11, 13F11-13F11, 13F11-13E8 and 13E8-13F11 are 1.00±0.61 nM ($K_D$+SEM, n=2), 3.10±0.87 nM, 2.5±1.87 nM and 2.5±1.56 nM ($K_D$+SEM, n=2), respectively (FIG. 8C).

Figure 12:
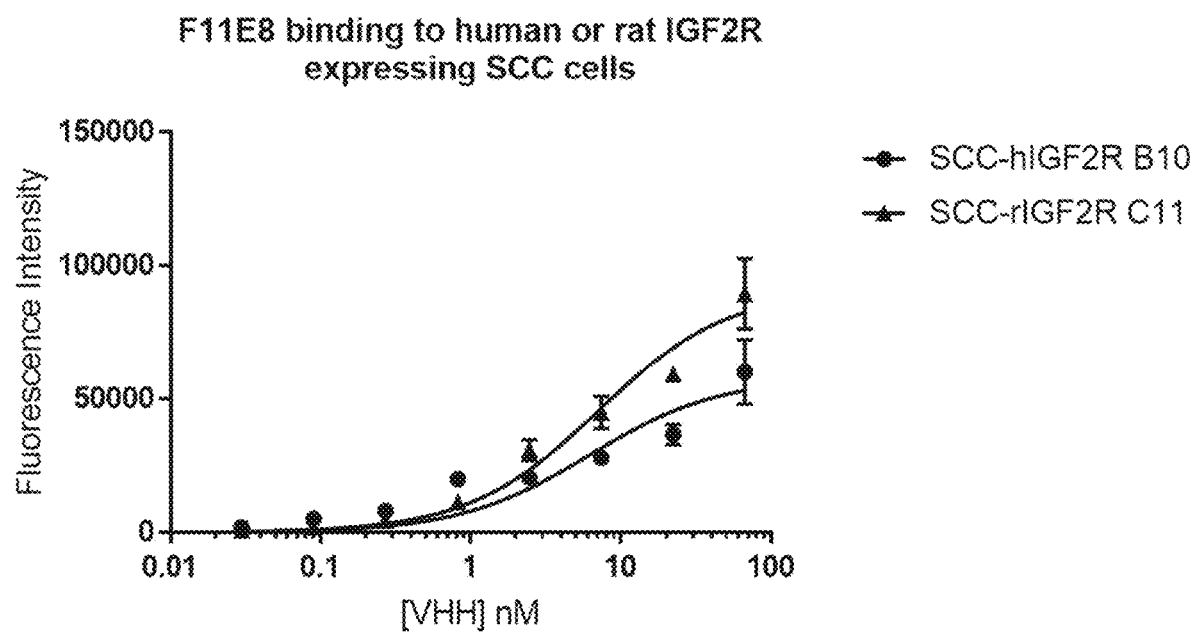
FIG. 12. 13F11-13E8 (F11E8) binding to human or rat IGF2R expressing SCC cells.

To determine whether 13F11-13E8 is cross-reactive against rIGF2R, the construct was conjugated to IRDye800CW (13F11-13E8-IRDye800CW, conjugation method as described in example 9.2) and the binding affinity was determined using a binding assay on SCC VII cells over-expressing either human, or rat IGF2R (FIG. 12). 13F11-13E8-IRDye800CW binds to both human and rat IGF2R with comparable affinity (<10 nM) as shown in FIG. 12 confirming cross-reactivity.

Figure 13:
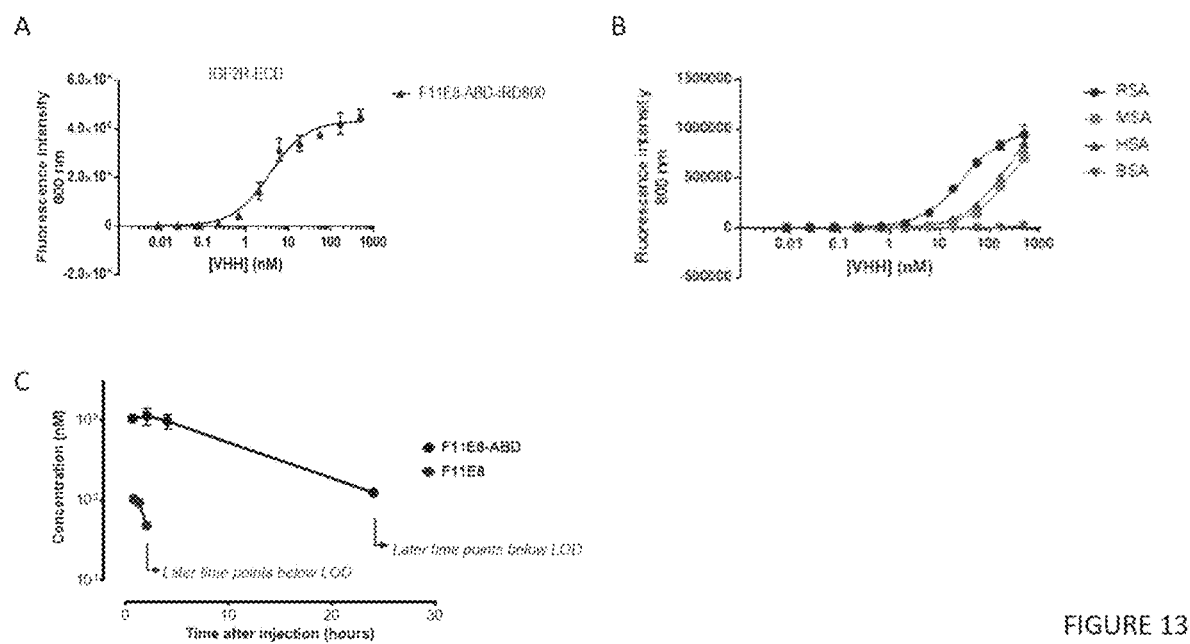
FIG. 13. Binding of 13F11-13E8-ABD (F11E8-ABD) to IGF2R and serum albumin. A) Binding assay on recombinant human IGF2R ECD. B) Binding assay on serum albumin from different species. C) Serum levels of F11E8-ABD and F11E8 in rats after intravenous injection. Shown are serum concentrations as assessed by ELISA. LOD: approximately 20 nM.

Next, 13F11-13E8 was genetically re-engineered to include an in vivo half-life extender in the form of an albumin binding domain (ABD) as described by Johansson et al (Structure, specificity, and mode of interaction for bacterial albumin-binding modules, J. Biol. Chem. 2002 (277): 8114-8120) and subsequently produced and purified as described in Example 3. Subsequently, 13F11-13E8-ABD was conjugated to IRDye800CW (F11E8-ABD-IRD800, conjugation method as described in example 9.2) and the binding affinities of the biparatopic VHH as well as the ABD unit was determined. A low nanomolar binding affinity to hIGF2R-ECD was found for F11-E8-ABD-IRD800 indicating that addition of the ABD domain has no effect on binding of the biparatopic F11-E8 to hIGF2R (FIG. 13A). The binding affinity ($K_D$) of F11-E8-ABD-IRD800 to rat serum albumin (RSA) was 30 nM and to mouse serum albumin (MSA) and human serum albumin (HSA) the binding affinity was approximately 200 nM. No binding was observed to bovine serum albumin (BSA) (FIG. 13B).

Figure 14:
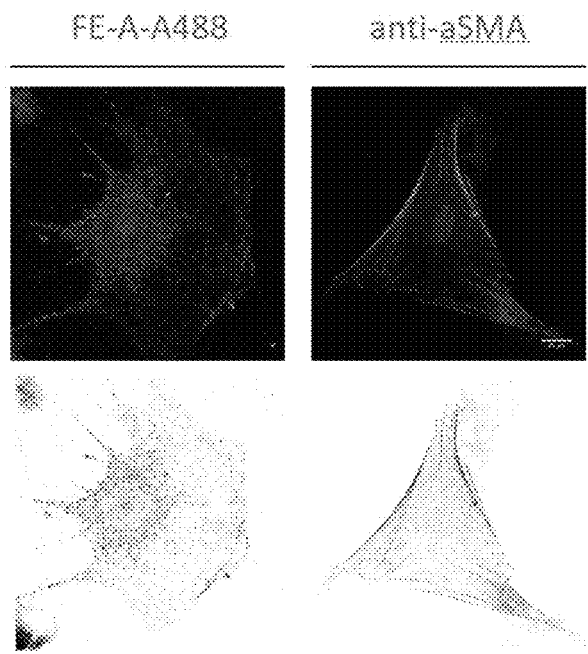
FIG. 14. Binding of 13F11-13E8-ABD conjugated to Alexa Fluor 488 (FE-A-A488) to activated primary rat hepatic stellate cells.

The cross-reactivity of F11-E8-ABD was further evaluated in binding experiments to primary activated rat hepatic stellate cells (HSCs) by conjugating the construct to Alexa Fluor 488 (FE-A-A488, conjugation method as described in example 9.2). Activated HSCs were obtained from a perfused liver of a cirrhotic bile duct ligated (BDL) rat, the HSCs were isolated using density gradient centrifugation. Cells were kept in culture for 6 days to allow complete activation and then stained with 50 nM FE-A-A488. Activation was determined by an additional staining with alpha-smooth muscle actin (a-SMA). FE-A-A488 binds to rat HSCs as can be seen in FIG. 14 and activation was confirmed by the presence of long actin polymers, or so-called stress-fibers (FIG. 14).

6.2 PDGFRB

Figure 15:
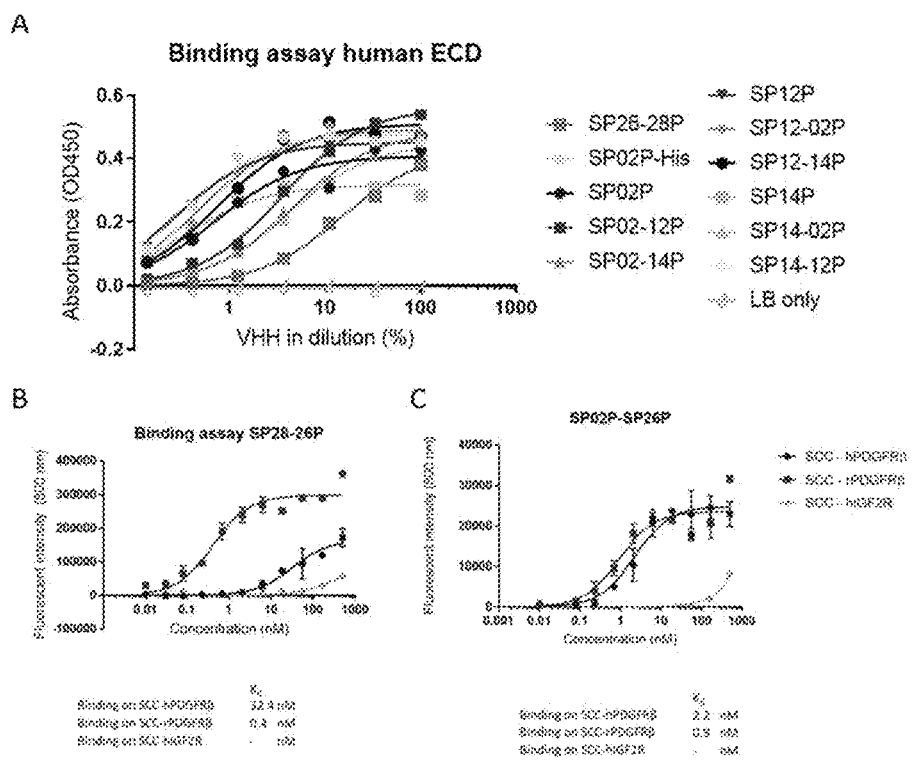
FIG. 15. Binding assays using PDGFRB VHHs. A) Binding assay using human PDGFRB specific VHHs on human PDGFRB ECD. B) Binding assay using biparatopic SP28-SP26P (SP28-26P) on human, rat PDGFRB and human IGF2R expressing target cells. C) Binding assay using biparatopic SP02P-SP26P on human, rat PDGFRB and human IGF2R expressing target cells.

Based on their high affinity and binding to non-overlapping hPDGRB epitopes, VHHs SPO2P, SP12P SP14P and SP26P were selected for the design of biparatopic VHH constructs and produced in a similar way as described in example 6.1. (FIG. 15A). The binding affinities of the biparatopic constructs were determined with an ELISA assay with the periplasm (FIG. 15A). Moreover, based on their high affinity and binding to non-overlapping rPDGRB epitopes, VHHs SP26P and SP28P were selected for the design of a biparatopic VHH construct and produced in a similar way as described in example 6.1. The formed biparatopic SP28P-SP26P was conjugated to IRDye800CW (SP28P-SP26P-IRDye800CW conjugation method as described in example 9.2) and subjected to a binding assay SCC VII cells transfected with hPDGFRB, rPDGFRB or hIGF2R were performed (FIG. 15B). The construct showed very high affinity binding to rPDGFRB ($K_D$<1 nM), whereas the binding affinity to hPDGFRB is a few orders of magnitude lower. In order to create a biparatopic VHH construct which is cross-reactive for hPDGFRB and rPDGFRB, VHH SPO2P binding to hPDGFRB and VHH SPO26P binding to rPDGFRB were selected and the biparatopic construct SPO2P-SP26P was produced in a similar way as described in example 6.1. (FIG. 15C). Construct SPO2P-SP26P was conjugated to IRDye800CW (SP02P-SP26P-IRDye800CW, conjugation method as described in example 9.2) and subjected to bindings assays on SCC VII cells transfected with hPDGFRB, rPDGFRB or hIGF2R were performed (FIG. 15C). The binding affinities to both hPDGFRB and rPDGFRB are below 5 nM, making biparatopic SPO2P-SP26P particularly promising for use in binding molecules according to the present invention.

Example 7: Improving In Vivo Pharmacokinetics in Rats of 13F11-13E8 Through Addition of an Albumin Binding Domain The in vivo pharmacokinetic properties of 13F11-13E8-ABD was compared to 13F11-13E8 without the ABD moiety in healthy Sprague-Dawley rats. In brief, rats were dosed intravenously with approximately 3 mg/kg body weight and blood samples were taken at different time points and the concentration of the VHH constructs were determined using an ELISA on immobilized hIGF2R-ECD. The peak serum level (Cmax) of 13F11-13E8-ABD exceeded 1000 nM as shown in FIG. 13C. With approximately 20 nmoles infused into the animal, and an estimated serum volume of 10 mL, this Cmax would correspond to approximately 50% of the infused dose still being in circulation one hour after dosing demonstrating good bioavailability. On the other hand, 13F11-13E8 was rapidly cleared from circulation and could not be detected anymore within two hours after injection (FIG. 13C).

Example 8: Synthesis and Analytical Characterization of Lx Semi-Final Complexes and Maleimide Functionalized Moieties with Small Molecule Kinase Inhibitors: Y27632, Pacritinib, Sacubitril (at), losartan 8.1. Structures of Y27632-Lx (semi-final moieties) SFMs and Y27632 maleimide functionalized moieties that can be utilized in the context of the present invention.

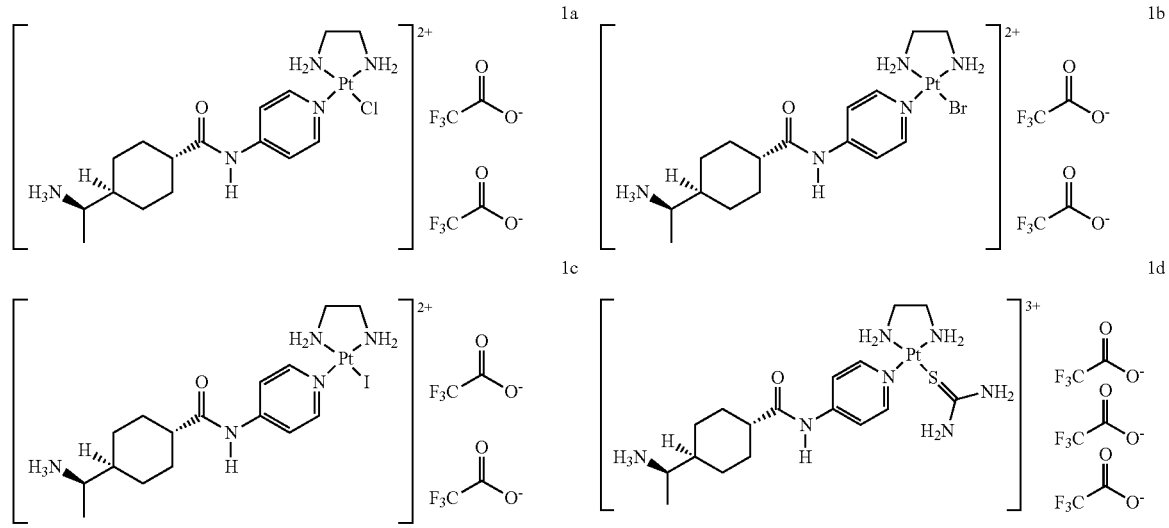

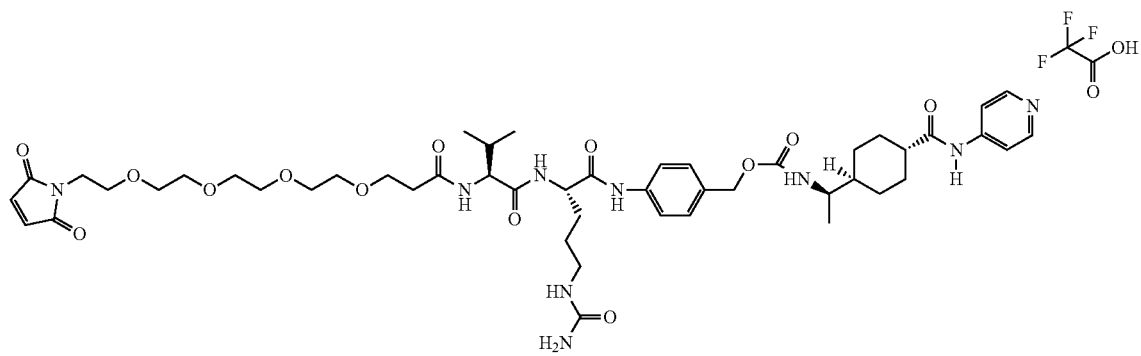
1e
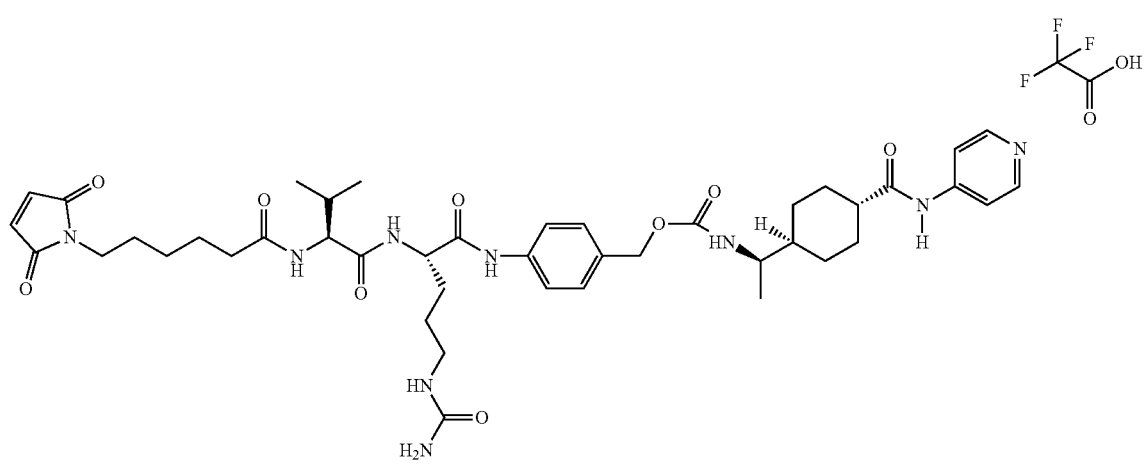
1f
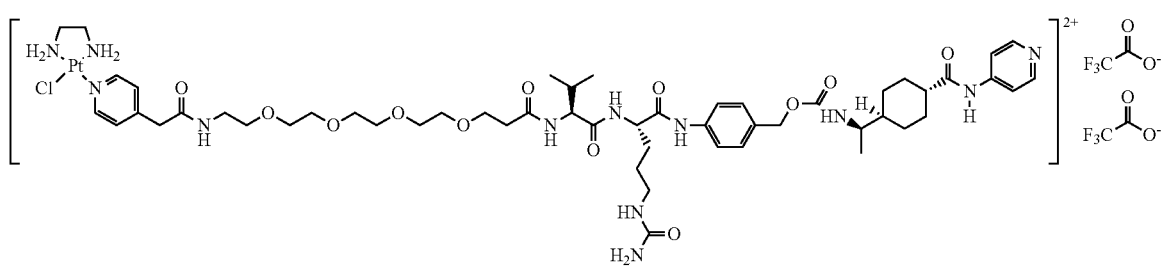
1g
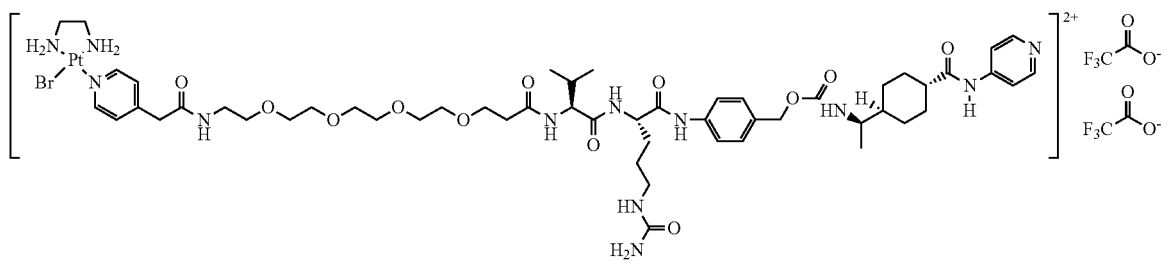
1h

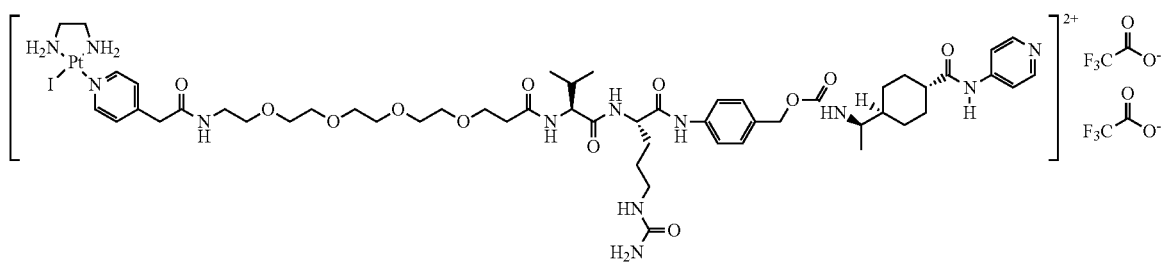

1i

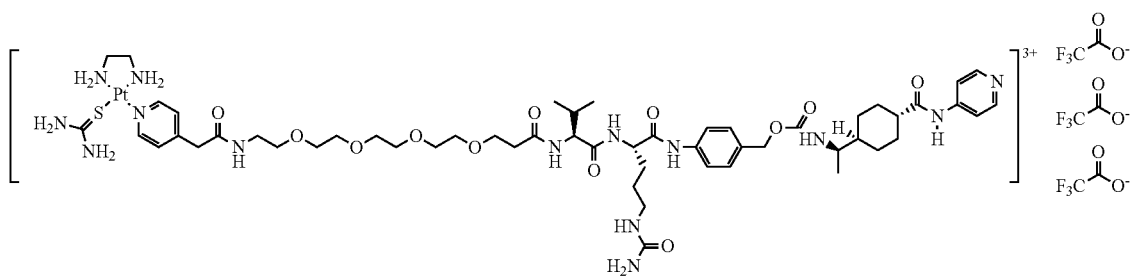

1j

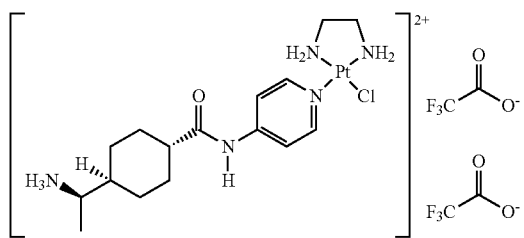

1a

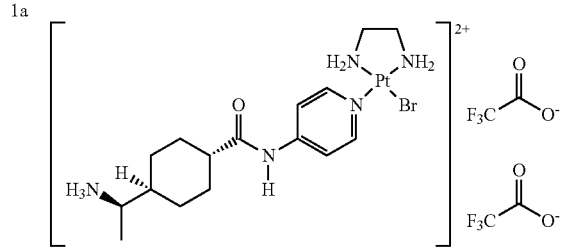

1b

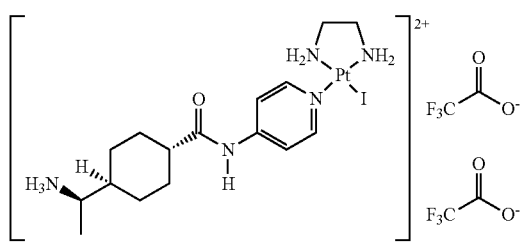

1c

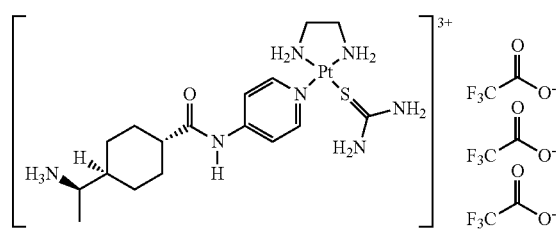

1d 8.1.1. Synthesis and analytical characterization of Y27632-Lx-Cl (1a)

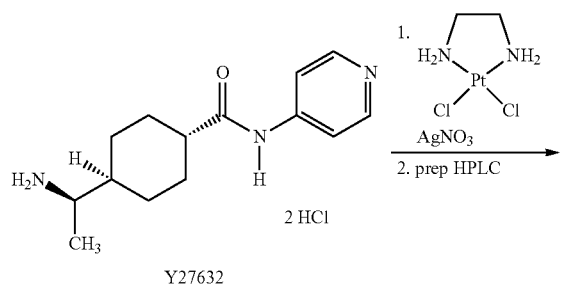

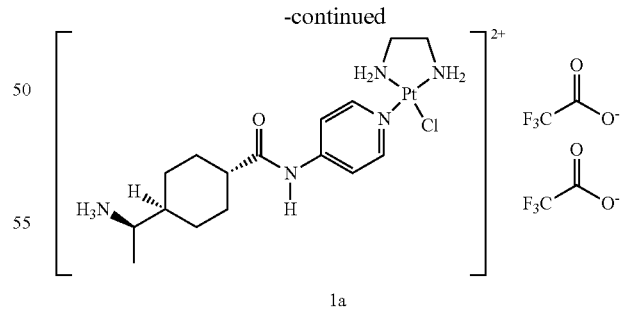

1a

AgNO$_3$ (85 mg, 500 µmol, 1.0 eq.) was added to a suspension of PtCl2 (ethane-1,2-diamine) (LxCl$_2$; 163 mg, 500 µmol, 1.0 eq.) in dry DMF (24.8 mL). The mixture was stirred overnight at room temperature in the dark under argon atmosphere. After that, the suspension was filtered through a 0.2 µm syringe filter to give a 20.2 mM stock solution of activated Pt-complex. Then, to a solution of Y27632×2 HCl (40 mg, 125 μmol, 1.0 eq.) in MilliQ water (14 mL) (pH adjusted to 6.95 using 1 M NaOH), the above prepared 20.2 mM stock solution of the activated Pt-complex (12.4 mL, 250 μmol, 2.0 eq.) was added. The reaction mixture was stirred for 4.5 h at 60° C. in the dark under argon atmosphere. Subsequently, the reaction mixture was filtered through a 0.2 μm filter and 0.9% NaCl was added to the solution (1 mL), after which the solvents were removed under reduced pressure. The residue was dissolved in MilliQ water/MeOH (85:15, 6 mL) and filtered through a 0.2 μm syringe filter. Purification was perfomed by preparative reverse-phase HPLC (Grace Alltima C18 5 μm column, 22×250 mm; gradient: 15% to 35% MeOH/0.1% TFA in water/0.1% TFA in 36 min.). Product fractions were lyophilized and the product 1a was obtained as a colorless solid (41.8 mg, 43.8% yield).

$^1$H NMR (400 MHz, CD3OD): δ 8.57-8.47 (m, 2H), 7.74-7.68 (m, 2H), 6.09-5.78 (m, 2H), 5.72-5.40 (m, 2H), 3.21-3.11 (m, 1H), 2.80-2.51 (m, 4H), 2.48-2.37 (m, 1H), 2.10-2.01 (m, 2H), 1.98-1.84 (m, 2H), 1.67-1.51 (m, 3H), 1.32-1.15 (m, 5H).

$^{195}$Pt NMR (86.0 MHz, CD3OD): δ-2512.

HPLC (Grace Alltima C18 5 μm column, 25×4.6 mm) indicated that the product was 95.6% pure (retention time 15.8 min.; gradient: 5% to 25% MeCN/0.1% TFA in water/0.1% TFA in 18 min. measured at a wavelength of 273 nm).

8.1.2. Synthesis and analytical characterization of Y27632-Lx-I (1c)

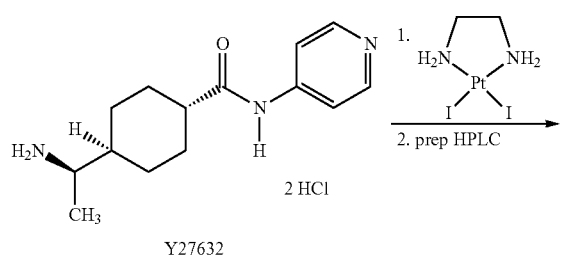

Y27632

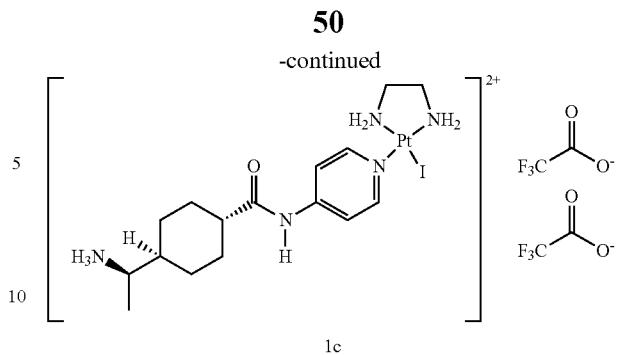

1c

Y27632×2 HCl (10 mg, 31 μmol, 1.0 eq.) in MilliQ water (125 μL) and Pt (ethane-1,2-diamine) 12 (LxI$_2$; 14.90 mg, 29 μmol, 0.95 eq.) were dissolved in dry DMF (250 μL) and the reaction mixture was shaken for 48 h at 60° C. The reaction mixture was then diluted with 10 mM NaI in MilliQ/MeOH (1:1, 3 mL) and incubated for 1 h at 25° C. after which the suspension was filtered through a 0.2 μm syringe filter. Purification was performed by preparative reverse-phase HPLC (Grace Alltima C18 5 μm column, 22×250 mm; gradient: 15% to 50% B, whereas eluent A: 95/5 water/MeOH (+0.1% TFA) and eluent B: 5/95 water/MeOH (+0.1% TFA) in 40 min.). Product containing fractions were collected and lyophilized and the product 1c was obtained as a yellow solid (11.0 mg, 41.1% yield).

HRMS (ESI$^+$) C$_{16}$H$_{29}$N$_5$OPt [M+H]$^+$ 629.1065, found 629.1092.

HPLC (Grace Alltima C18 5 μm column, 25×4.6 mm) indicated that the product was 99.1% pure (retention time 13.3 min.; gradient: 5% to 50% MeCN/0.1% TFA in water/0.1% TFA in 20 min. measured at a wavelength of 273 nm).

8.1.3. Synthesis and analytical characterization of Mal-PEG4-Val-Cit-PAB-Y27632 (1e)

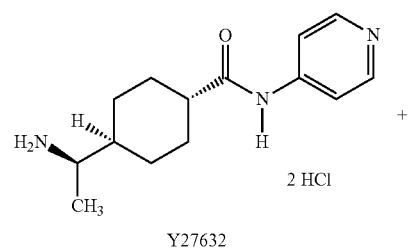

Y27632

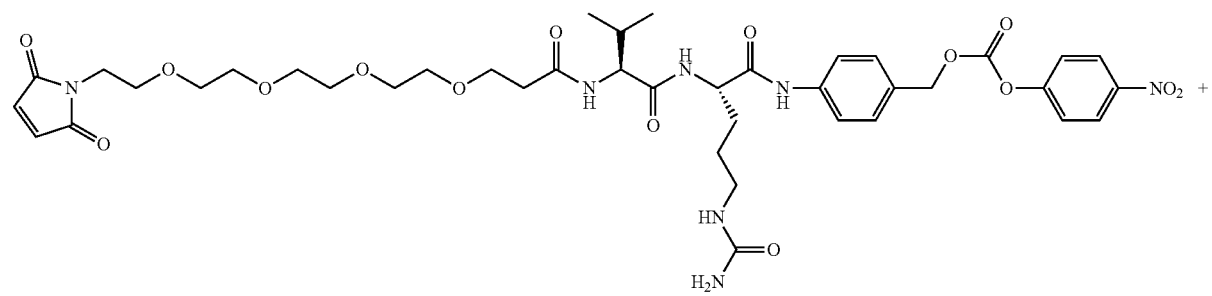

Mal-PEG$_4$-Val-Cit-PAB-PNP

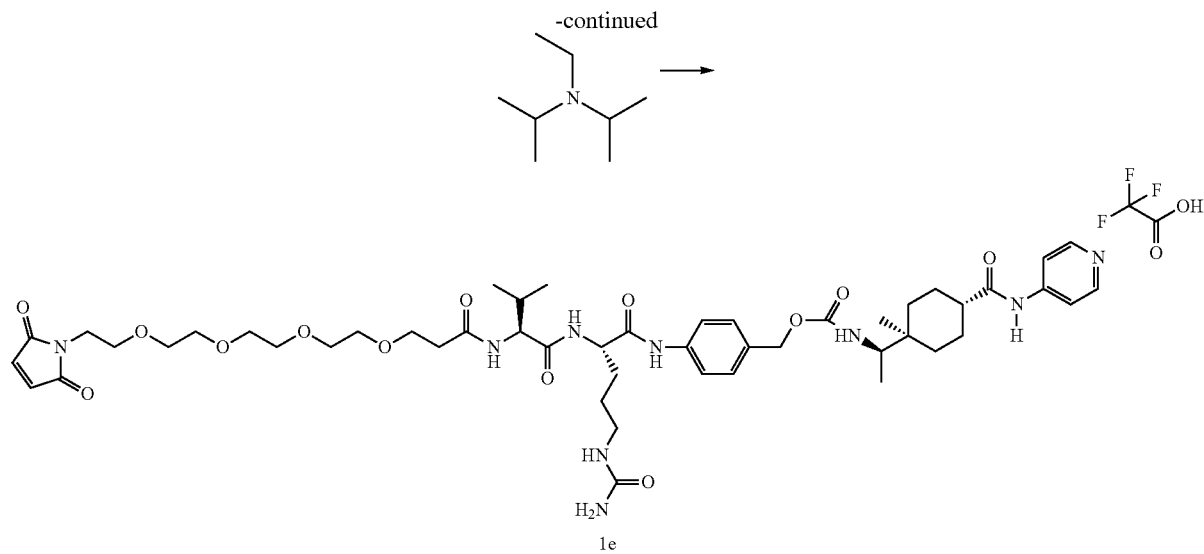

Y27632×2 HCl (18 mg, 56 μmol, 1.0 eq.), Mal-PEG4-Val-Cit-PAB-PNP (49 mg, 56 μmol, 1 eq.) and triethylamine (19.6 μL, 112 μmol, 2.0 eq.) were dissolved in dry DMSO (1 mL) and the reaction mixture was stirred for 45 min at 25° C. The reaction mixture was then diluted with MilliQ/MeOH (1:1, 3 mL) after which the suspension was filtered through a 0.2 μm syringe filter. Purification was performed by preparative reverse-phase HPLC (Grace Alltima C18 5 μm column, 22× 250 mm; gradient: 20% to 40% B, whereas eluent A: 95/5 water/MeCN (+0.1% TFA) and eluent B: 5/95 water/MeCN (+0.1% TFA) in 80 min.). Product containing fractions were collected and lyophilized and the product 1e was obtained as a yellow solid (22.3 mg, 36.3% yield).

HRMS (ESI$^+$) $C_{48}H_{70}N_9O_{13}$ [M+H]$^+$ 980.5088, found 980.5093.

HPLC (Grace Alltima C18 5 μm column, 25×4.6 mm) indicated that the product was 97.1% pure (retention time 10.1 min.; gradient: 20% to 100% MeCN/0.1% TFA in water/0.1% TFA in 20 min. measured at a wavelength of 273 nm).

8.1.4. Synthesis and analytical characterization of Mal-Val-Cit-PAB-Y27632 (1f)

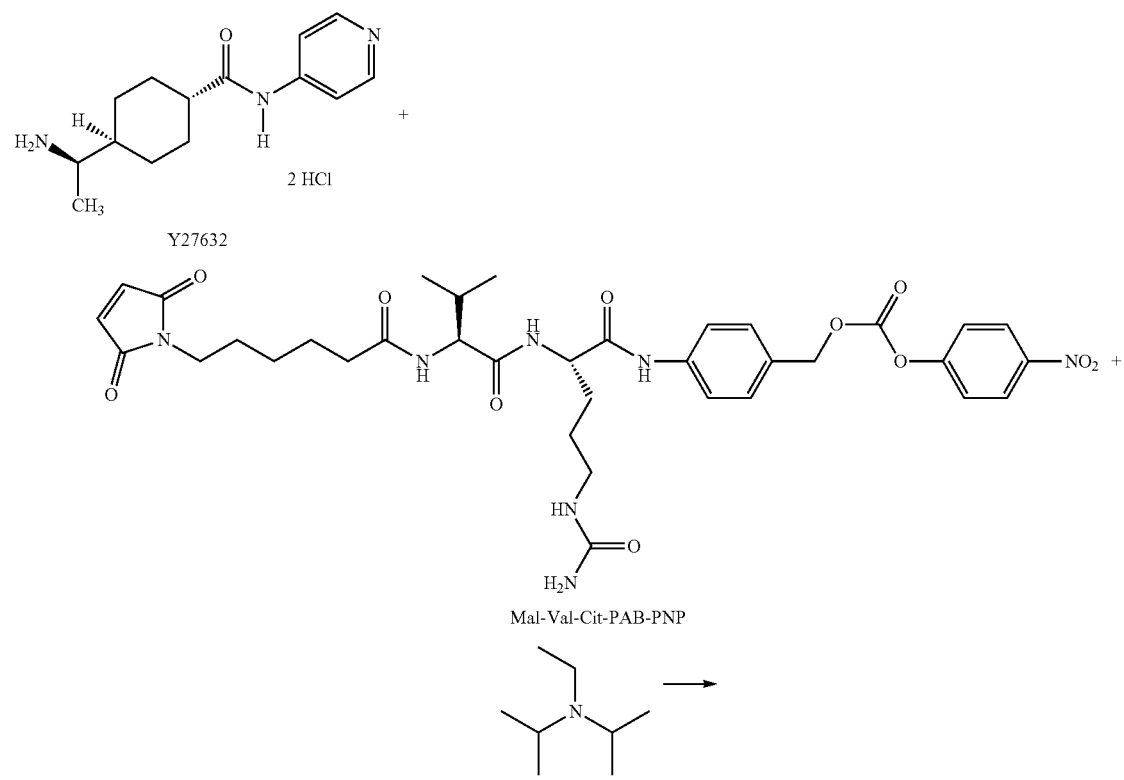

-continued

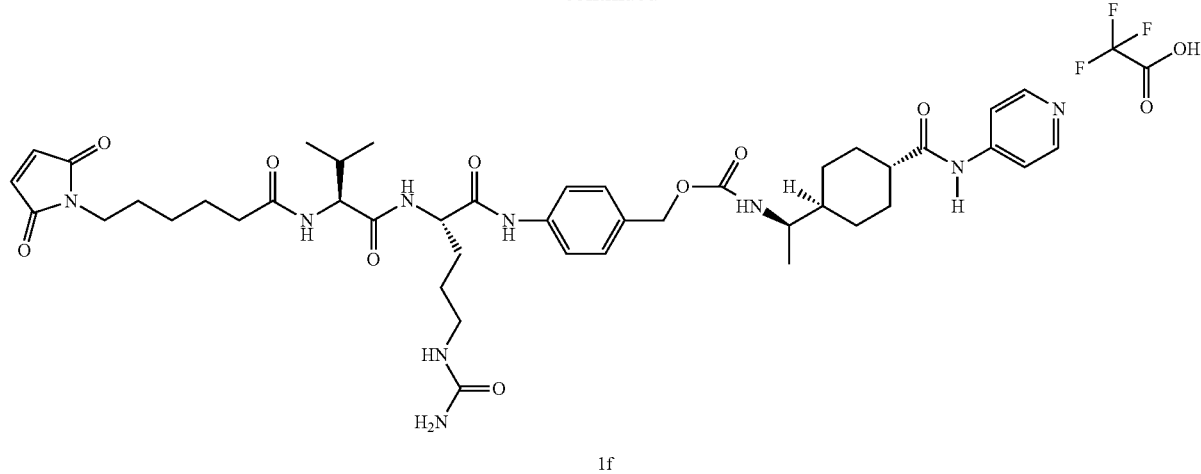

1f

Y27632×2 HCl (20 mg, 62 µmol, 1.0 eq.), Mal-Val-Cit-PAB-PNP (48 mg, 66 µmol, 1.05 eq.) and triethylamine (22.2 µL, 125 µmol, 2.0 eq.) were dissolved in dry DMSO (1 mL) and the reaction mixture was stirred for 45 min at 25° C. The reaction mixture was then diluted with MilliQ/MeOH (1:1, 3 mL) after which the suspension was filtered through a 0.2 µm syringe filter. Purification was performed by preparative reverse-phase HPLC (Grace Alltima C18 5 µm column, 22× 250 mm; gradient: 20% to 40% B, whereas eluent A: 95/5 water/MeCN (+0.1% TFA) and eluent B: 5/95 water/MeCN (+0.1% TFA) in 80 min.). Product containing fractions were collected and lyophilized and the product 1f was obtained as a yellow solid (23.5 mg, 39.2% yield).

HRMS (ESI$^+$): $C_{43}H_{60}N_9O_9$ [M+H]$^+$ 846.4509, found 846.4472.

HPLC (Grace Alltima C18 5 µm column, 25×4.6 mm) indicated that the product was 95.6% pure (retention time 10.5 min.; gradient: 20% to 100% MeCN/0.1% TFA in water/0.1% TFA in 20 min. measured at a wavelength of 273 nm).

8.2. Structures of sacubitril-Lx SFMs that can be utilized in the context of the present invention

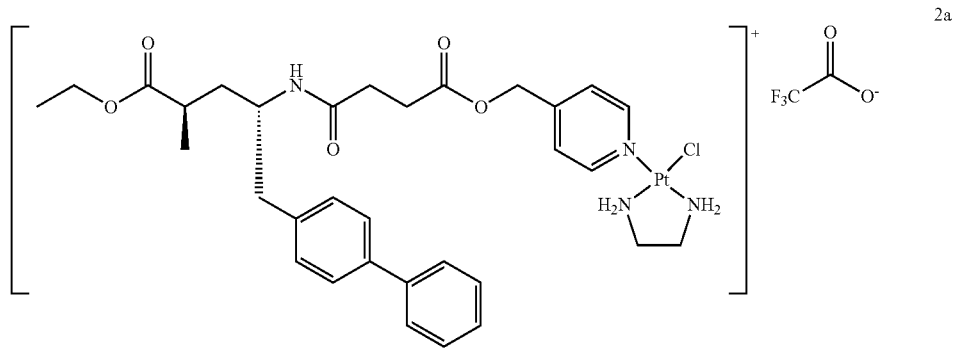

2a

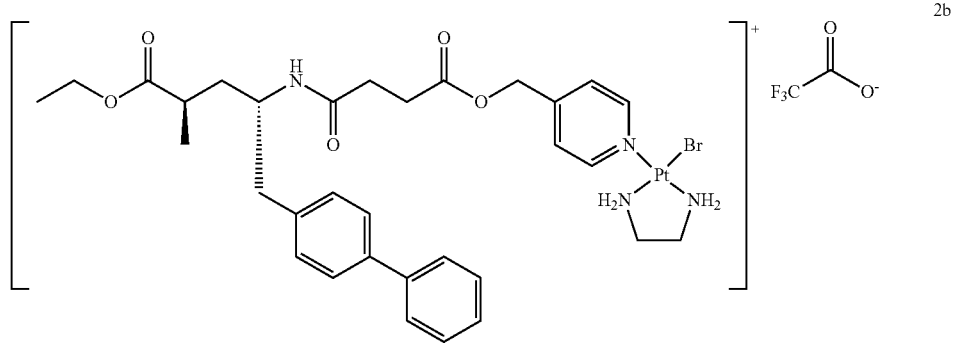

2b

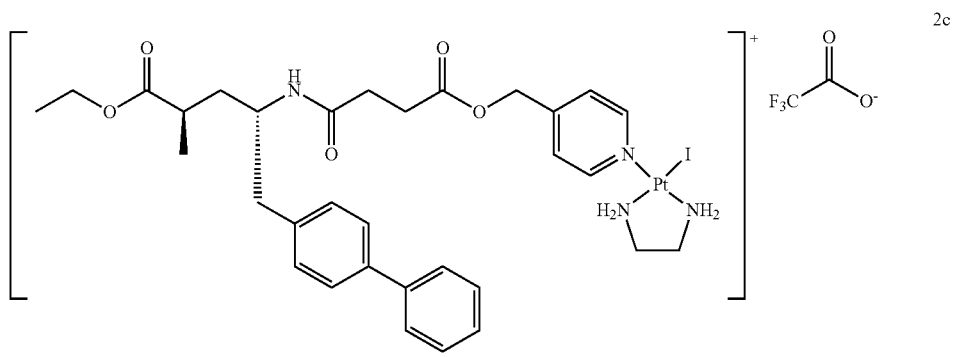
2c
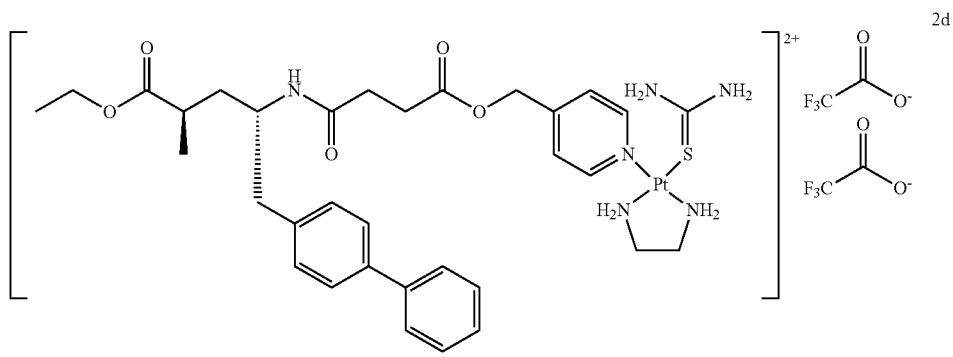
2d
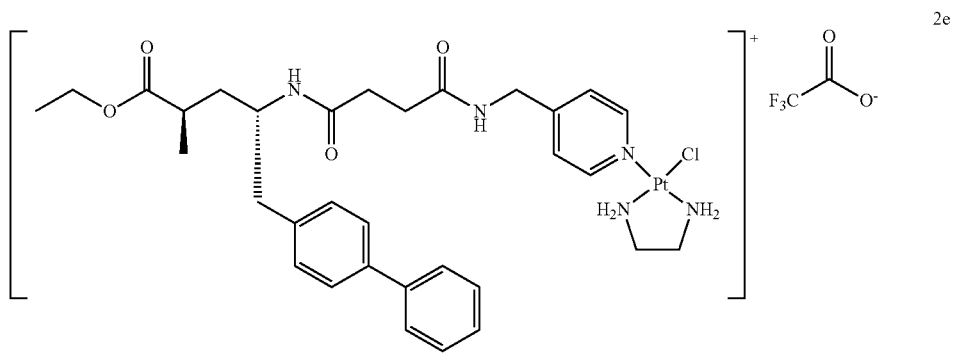
2e
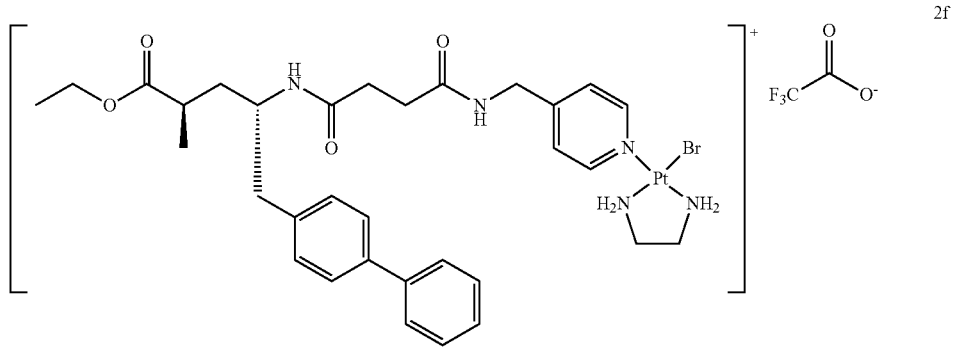
2f

-continued
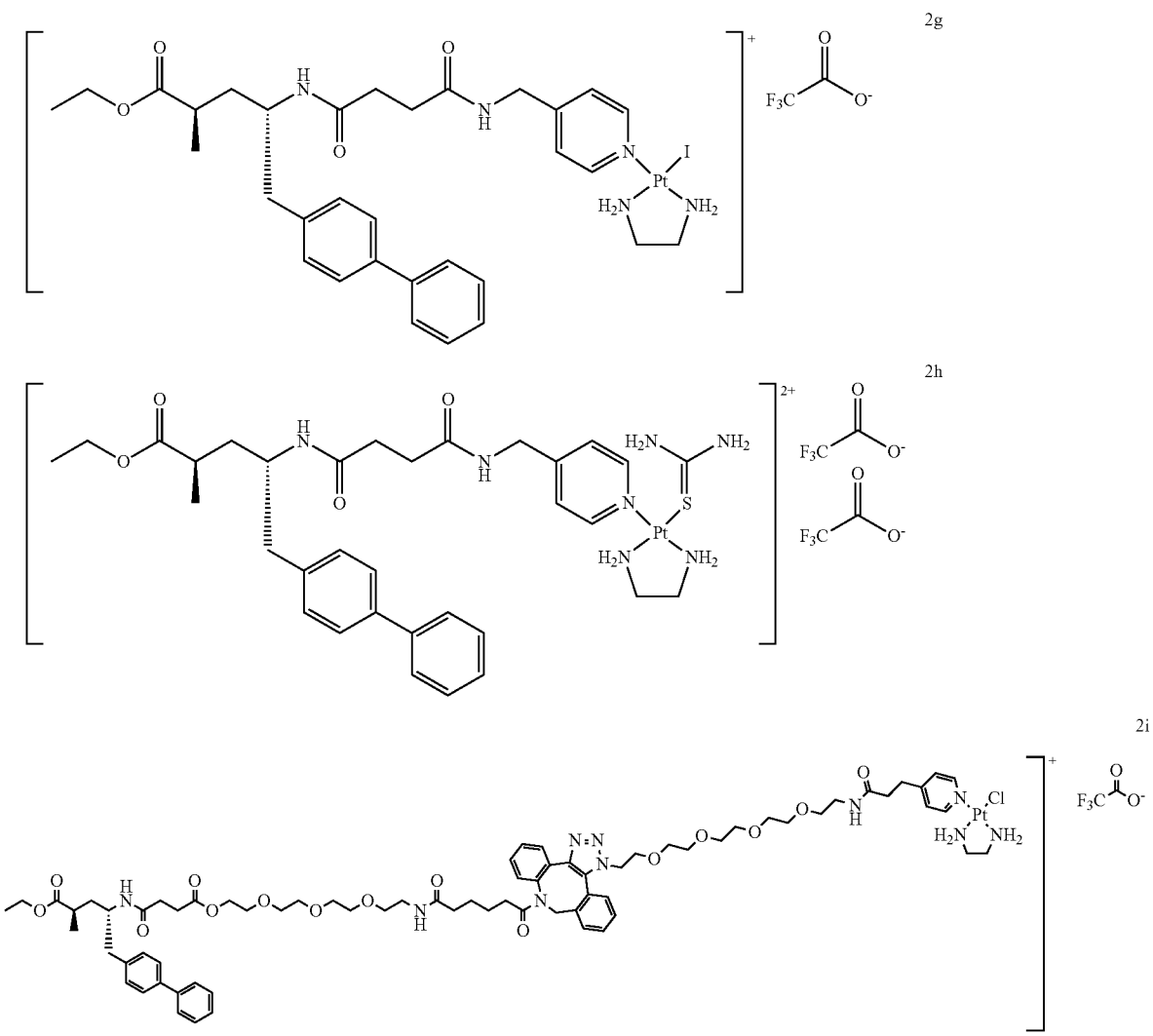
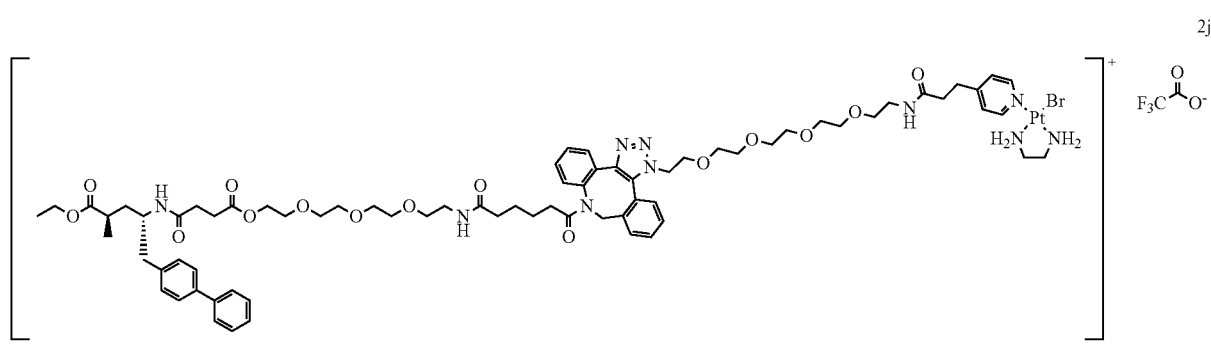
(one of the two possible diastereoisomers is depicted)

-continued
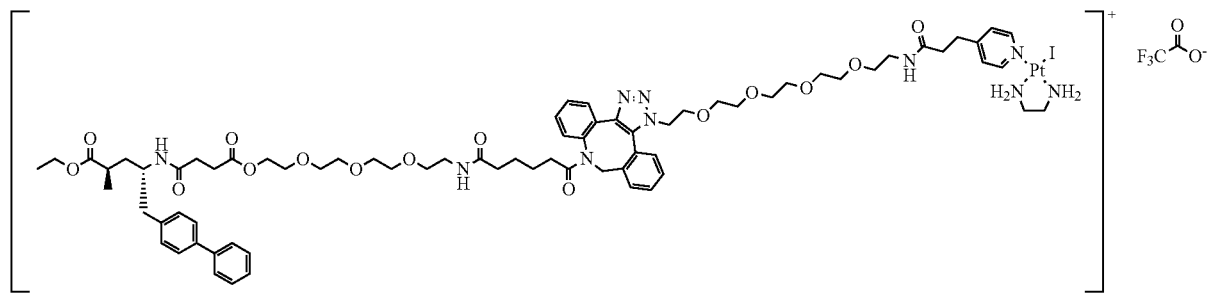
2k
(one of the two possible diastereoisomers is depicted)
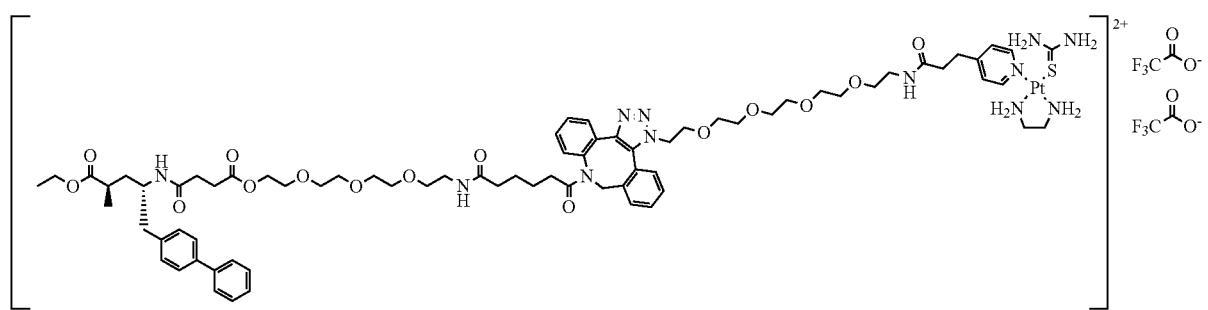
2l
(one of the two possible diastereoisomers is depicted)
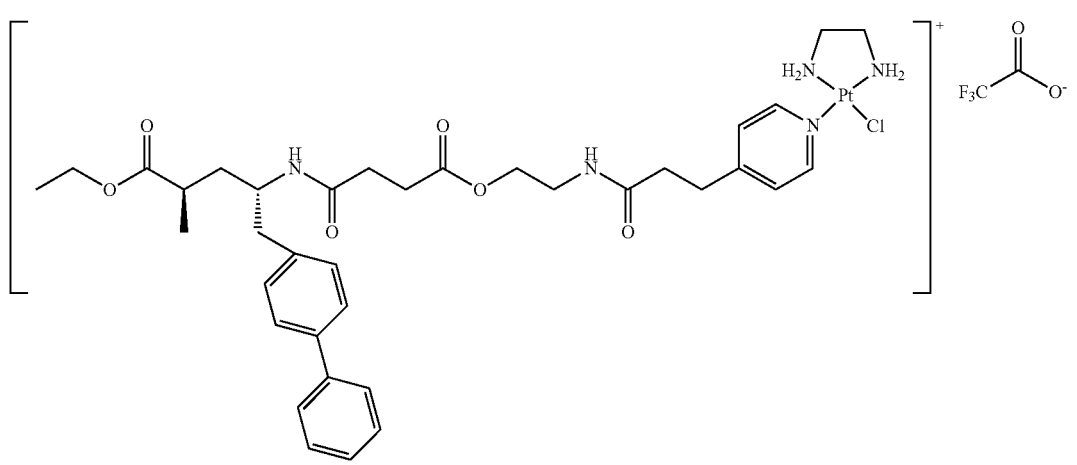
2m
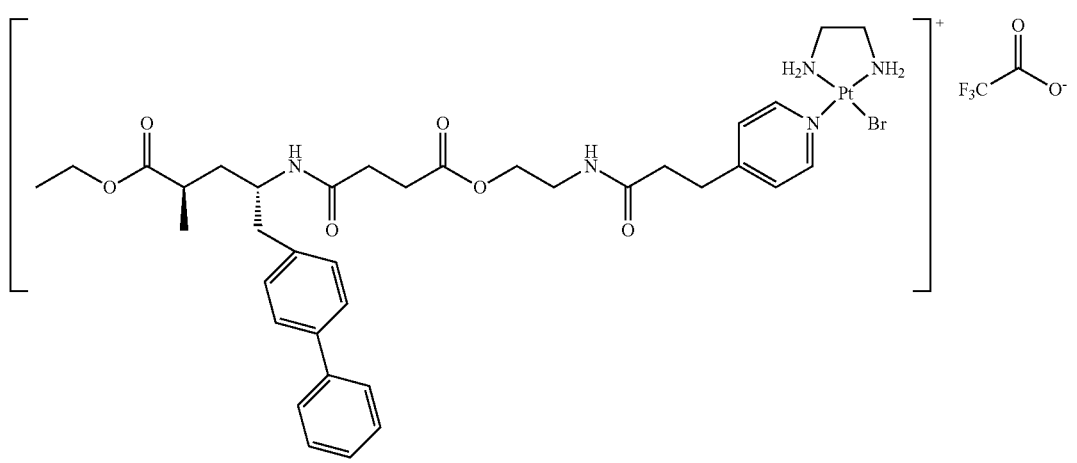
2n

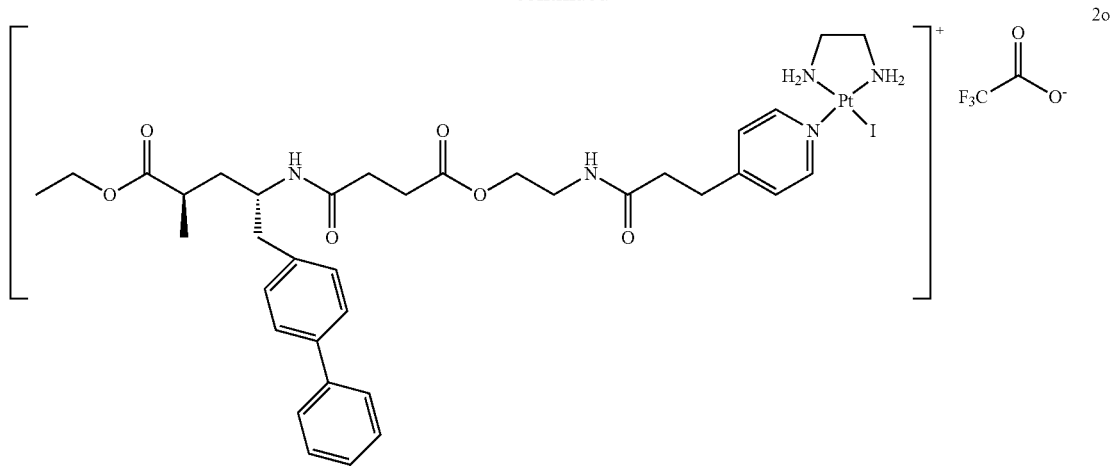
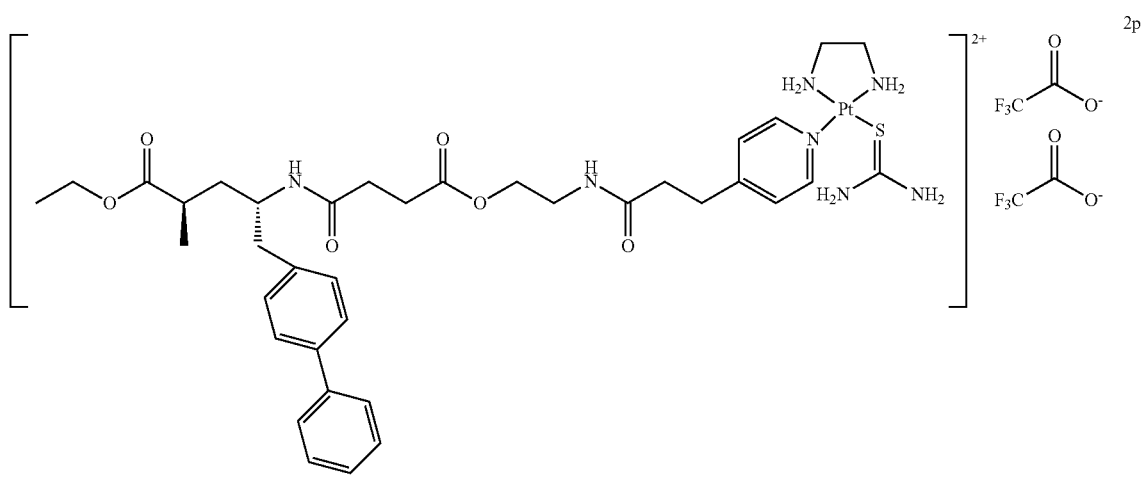
8.2.1. Synthesis and analytical characterization of sacubitril-py-Lx-I (2c)
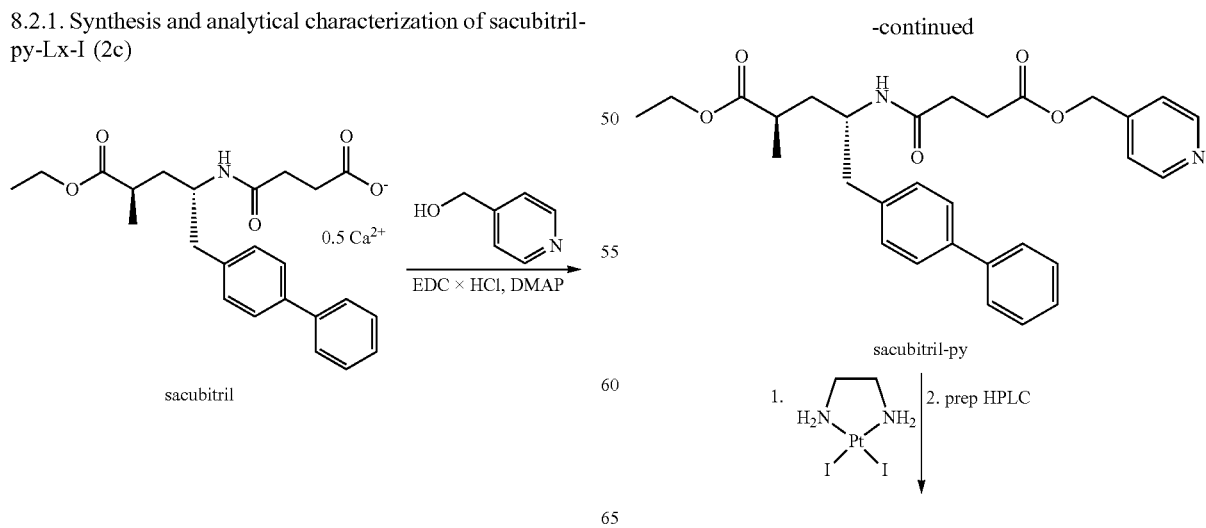

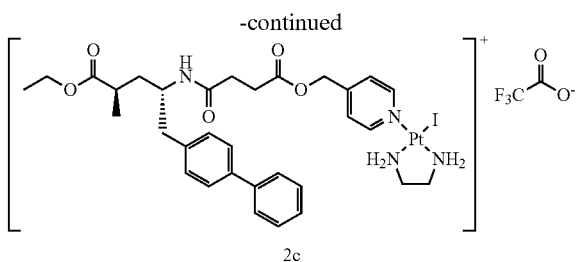

2c 8.2.1.1. Synthesis and analytical characterization of sacubitril-py

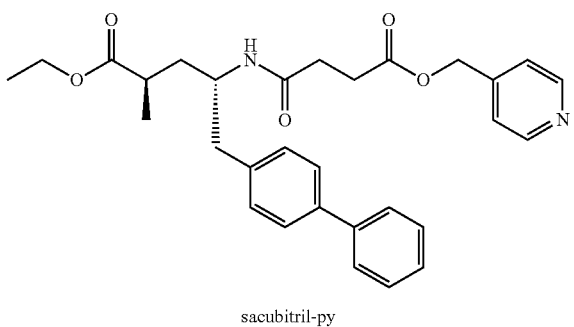 [SMILES: CCOC(=O)[C@H](C)C[C@@H](Cc1ccc(-c2ccccc2)cc1)NC(=O)CCC(=O)OCc1ccncc1]

sacubitril-py

Sacubitril hemicalcium (100 mg, 0.232 mmol, 1.0 eq.), pyridin-4-ylmethanol (30 mg, 0.279 mmol, 1.2 eq.), and DMAP (3 mg, 0.023 mmol, 0.1 eq.) were dissolved in dry DMF (1.5 mL). Subsequently, EDC× HCl (67 mg, 0.348 mmol, 1.5 eq.) and additional DMF (0.5 mL) were added. The resulting mixture was stirred at room temperature for four days under an argon atmosphere. The reaction mixture was diluted with water (20 mL) and extracted with EtOAc (2×20 mL). The organic phase was dried with $Na_2SO_4$, filtered, and the solvents were removed under reduced pressure. The residue was purified by column chromatography on silica (eluent: 0-3% MeOH/DCM) affording a colourless solid (73 mg, 62.4% yield).

$^1$H NMR (400 MHz, $CDCl_3$): δ 8.58 (d, 2H), 7.60-7.54 (m, 2H), 7.54-7.49 (m, 2H), 7.46-7.40 (m, 2H), 7.37-7.30 (m, 1H), 7.27-7.22 (m, 4H), 5.62 (d, $^1$H), 5.13 (s, 2H), 4.31-4.19 (m, 1H), 4.13 (q, 2H), 2.89-2.80 (m, 2H), 2.76-2.69 (m, 2H), 2.66-2.50 (m, 2H), 2.49-2.42 (m, 2H), 1.99-1.90 (m, 1H), 1.59-1.49 (m, 1H), 1.24 (t, 3H), 1.16 (d, 3H).

HRMS (ESI$^+$) $C_{30}H_{35}N_2O_5$ [M+H]$^+$ calc 503.2540, found 503.2599.

8.2.1.2. Synthesis and analytical characterization of sacubitril-py-Lx-I (2c)

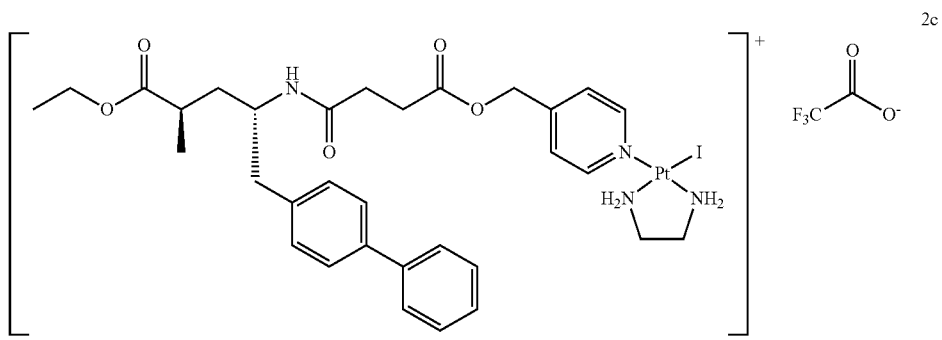

2c

Pt (ethane-1,2-diamine)I$_2$ (LxI$_2$; 76.0 mg, 149.2 μmol, 5.0 eq.) was dissolved in a solution of sacubitril-py (15.0 mg, 29.8 μmol, 1.0 eq.) in dry DMF (200 μL) and the reaction mixture was shaken for 22 h at 25° C. The reaction mixture was then diluted with water/MeOH (1:1, 3 mL) and filtered through a 0.2 μm syringe filter. Purification was performed by preparative reverse-phase HPLC (Grace Alltima C18 5 μm column, 22×250 mm; gradient: 45% to 100% B, whereas eluent A: 95/5 water/MeOH (+0.1% TFA) and eluent B: 5/95 water/MeOH (+0.1% TFA) in 40 min.). Product containing fractions were collected and lyophilized resulting in a yellow solid (14 mg, 47.0% yield).

HRMS (ESI$^+$) $C_{32}H_{42}IN_4O_5{}^{195}Pt$ [M]$^+$calc 884.1845, found 884.1856.

HPLC (Grace Alltima C18 5 μm column, 25×4.6 mm) indicated that the product was 95.8% pure (retention time 15.9 min.; gradient: 20% to 100% MeCN/0.1% TFA in water/0.1% TFA in 20 min. measured at a wavelength of 273 nm).

8.2.2. Synthesis and analytical characterization of sacubitril-CH₂CH₂NHCO-py-Lx-I (2o)
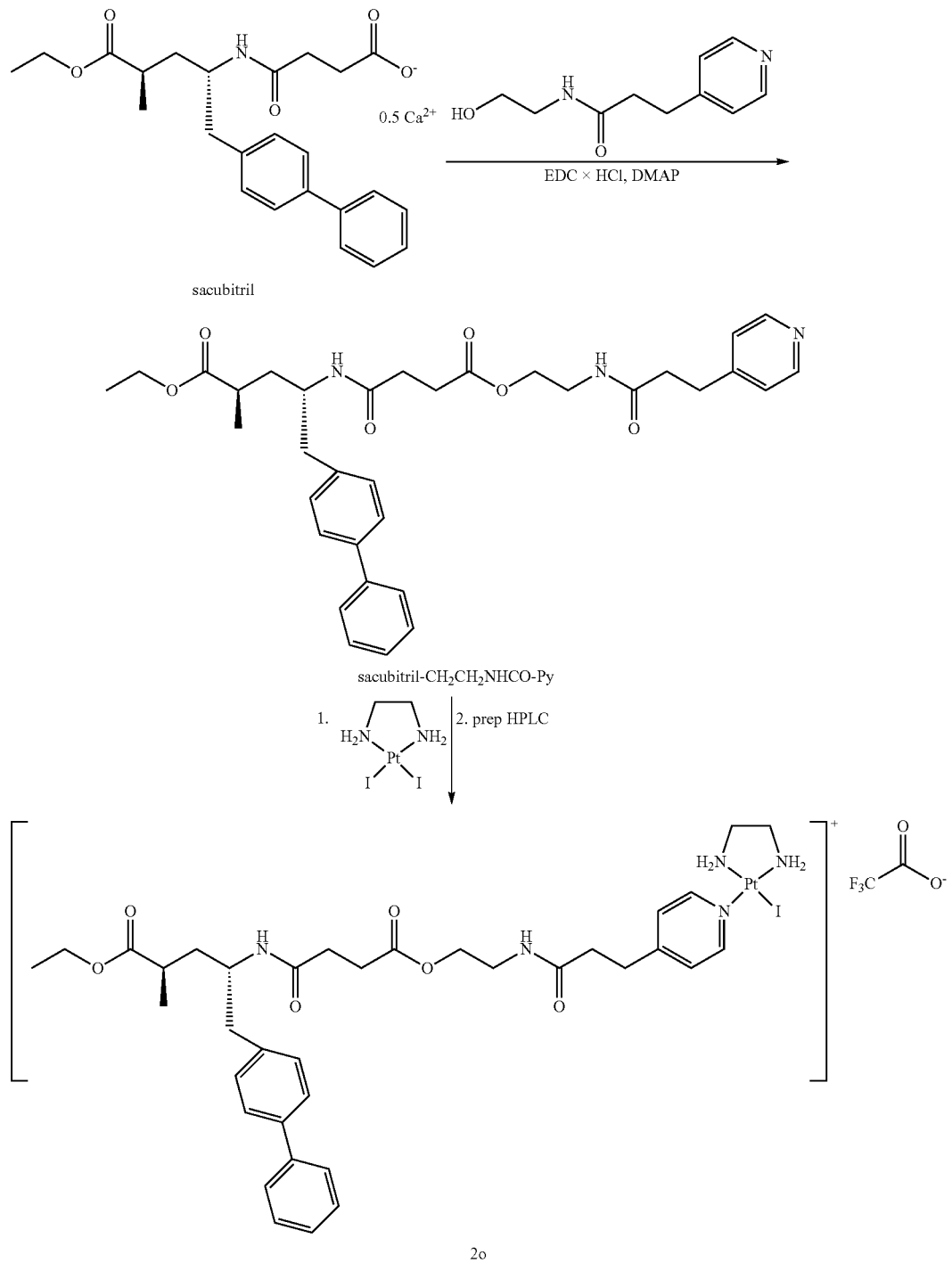

8.2.2.1. Synthesis and analytical characterization of 2,3,5,6-tetrafluorophenyl 3-(pyridin-4-yl) propanoate

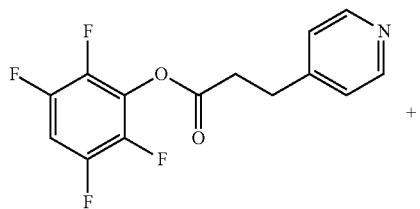

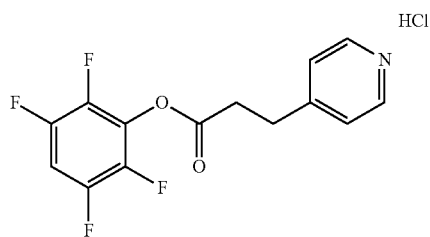

3-(Pyridin-4-yl) propionic acid (500 mg, 3.3 mmol, 1.0 eq.), 2,3,5,6-tetrafluorophenol (604 mg, 3.6 mmol, 1.1 eq.) and EDC×HCl (761 mg, 4.0 mmol, 1.2 eq.) were dissolved in dry DCM (10 mL). The resulting mixture was stirred at room temperature for 16 h. Subsequently, the mixture was extracted with 0.1 M HCl (2×), brine (1×) and dried with $Na_2SO_4$ after which the solvent was removed under reduced pressure. The reaction afforded a white solid (530 mg, 47.7% yield).

$^1$H NMR (400 MHz, $CDCl_3$): δ 8.49 (m, 2H), 7.91 (m, 1H), 7.35 (d, 2H), 3.21 (t, 2H), 3.02 (t, 2H).

8.2.2.2. Synthesis and analytical characterization of N-(2-hydroxyethyl)-3-(pyridin-4-yl) propanamide

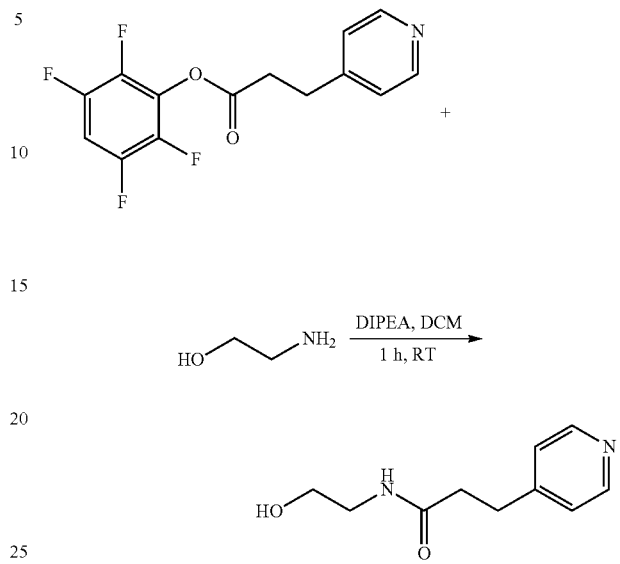

3-(Pyridin-4-yl) propionic-TFP (478 mg, 1.6 mmol, 1.0 eq.), 2-amino-ethanol (98 mg, 1.6 mmol, 1.0 eq.) and DIPEA (222 μL, 1.6 mmol, 1.0 eq.) were dissolved in dry DCM (10 mL). The resulting mixture was stirred at room temperature for 1 h. Subsequently, the solvent was removed under reduced pressure and the residue was purified by column chromatography on silica (eluent: 0-3% MeOH/DCM) affording a colourless solid (260 mg, 83.3% yield).

$^1$H NMR (400 MHz, CD3OD): δ 8.36-8.44 (m, 2H), 7.31 (d, 2H), 3.54 (t, 2H), 3.26 (t, 2H), 2.97 (t, 2H), 2.55 (t, 2H).

8.2.2.3. Synthesis and analytical characterization of sacubitril-$CH_2CH_2NHCO$-py

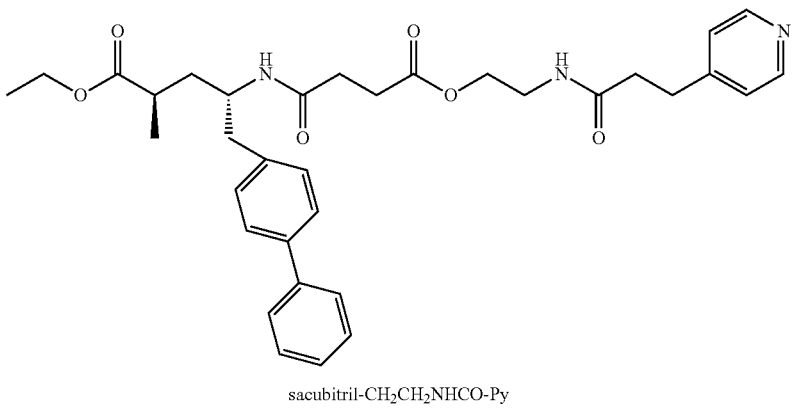 [SMILES: CCOC(=O)[C@H](C)C[C@@H](Cc1ccc(-c2ccccc2)cc1)NC(=O)CCC(=O)OCCNC(=O)CCc1ccncc1]

sacubitril-$CH_2CH_2NHCO$-Py

Sacubitril hemicalcium (200 mg, 0.487 mmol, 1.0 eq.), N-(2-hydroxyethyl)-3-(pyridin-4-yl) propanamide (114 mg, 0.584 mmol, 1.2 eq.), and DMAP (6 mg, 0.049 mmol, 0.1 eq.) were dissolved in dry DMF (1.5 mL). Subsequently, EDC× HCl (140 mg, 0.751 mmol, 1.5 eq.) and additional DMF (0.5 mL) were added. The resulting mixture was stirred at room temperature for 20 h under an argon atmosphere. The reaction mixture was diluted with water (20 mL)

and extracted with EtOAc (2×20 mL). The organic phase was dried with Na$_2$SO$_4$, filtered, and the solvents were removed under reduced pressure. The residue was purified by column chromatography on silica (eluent: 0-5% MeOH/DCM) affording a colourless solid (99 mg, 33.5% yield).

HRMS (ESI$^+$) C$_{35}$H$_{41}$IN$_3$O$_6$ [M+H]$^+$ calc 588.3068, found 588.3083.

HPLC (Grace Alltima C18 5 μm column, 25×4.6 mm) indicated that the product was 100% pure (retention time 14.0 min.; gradient: 20% to 100% MeCN/0.1% TFA in water/0.1% TFA in 20 min. measured at a wavelength of 273 nm).

8.2.2.4. Synthesis and analytical characterization of sacubitril-CH$_2$CH$_2$NHCO-py-Lx-I (2o)

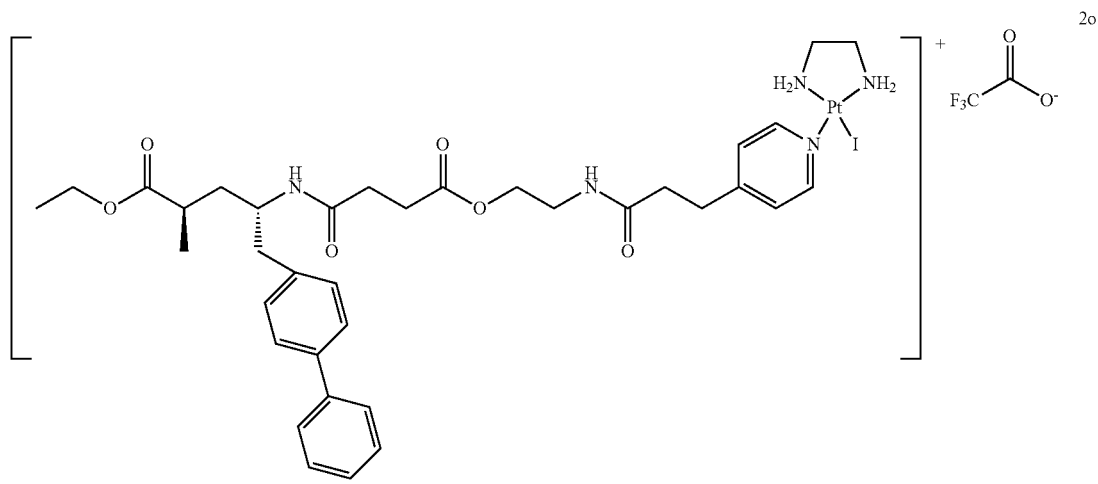

Pt (ethane-1,2-diamine)I$_2$ (LxI$_2$; 34.6 mg, 272.8 μmol, 4.0 eq.) was dissolved in a solution of sacubitril CH$_2$CH$_2$NHCO-py (40.0 mg, 68.2 μmol, 1.0 eq.) in dry DMF (416 μL) and the reaction mixture was shaken for 27 h at 50° C. The reaction mixture was then diluted with water/MeOH (1:1, 3 mL) and filtered through a 0.2 μm syringe filter. Purification was performed by preparative reverse-phase HPLC (Grace Alltima C18 5 μm column, 22×250 mm; gradient: 65% to 90% B, whereas eluent A: 95/5 water/MeOH (+0.1% TFA) and eluent B: 5/95 water/MeOH (+0.1% TFA) in 40 min.). Product containing fractions were collected and lyophilized resulting in a yellow solid (26.7 mg, 36.2% yield).

HRMS (ESI$^+$) C$_{36}$H$_{49}$IN$_5$O$_6$$^{195}$Pt [M]$^+$calc 969.2370, found 969.2388.

HPLC (Grace Alltima C18 5 μm column, 25×4.6 mm) indicated that the product was 96.4% pure (retention time 15.2 min.; gradient: 20% to 100% MeCN/0.1% TFA in water/0.1% TFA in 20 min. measured at a wavelength of 273 nm).

8.3. Structures of pacritinib-Lx SFMs and maleimide functionalized pacritinib moieties that can be utilized in the context of the present invention

71 72
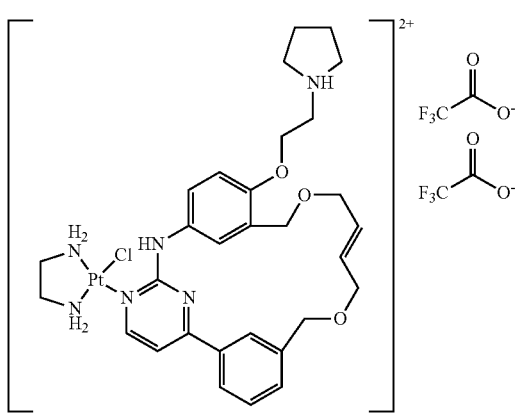
3a
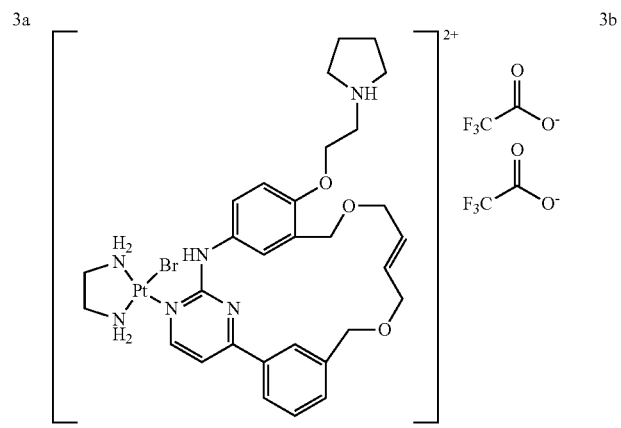
3b
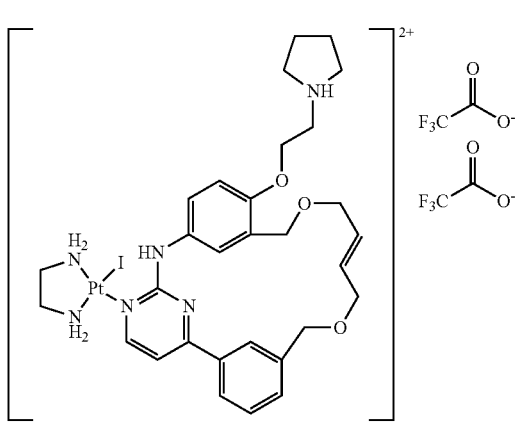
3c
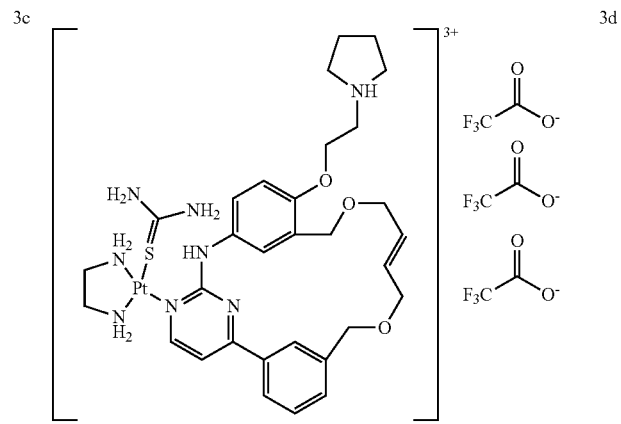
3d
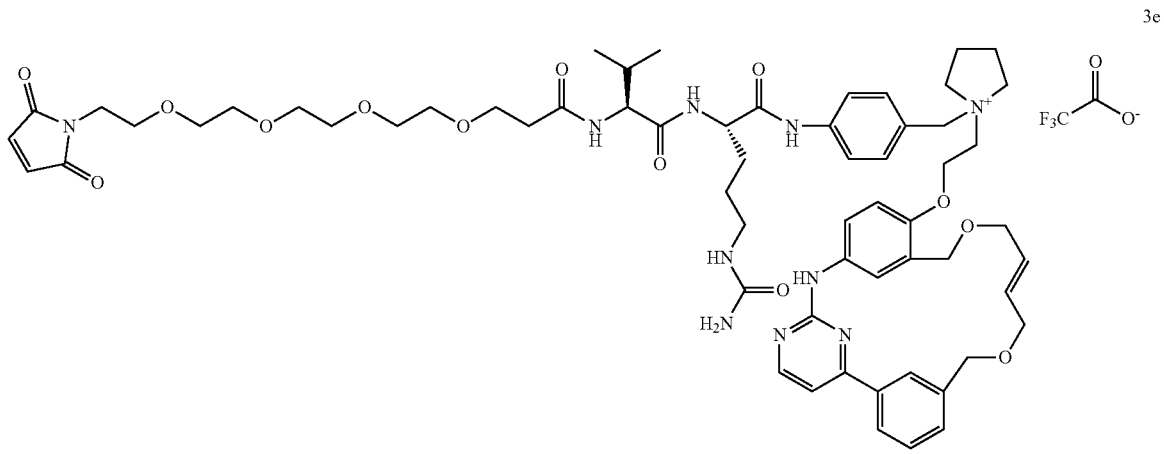
3e

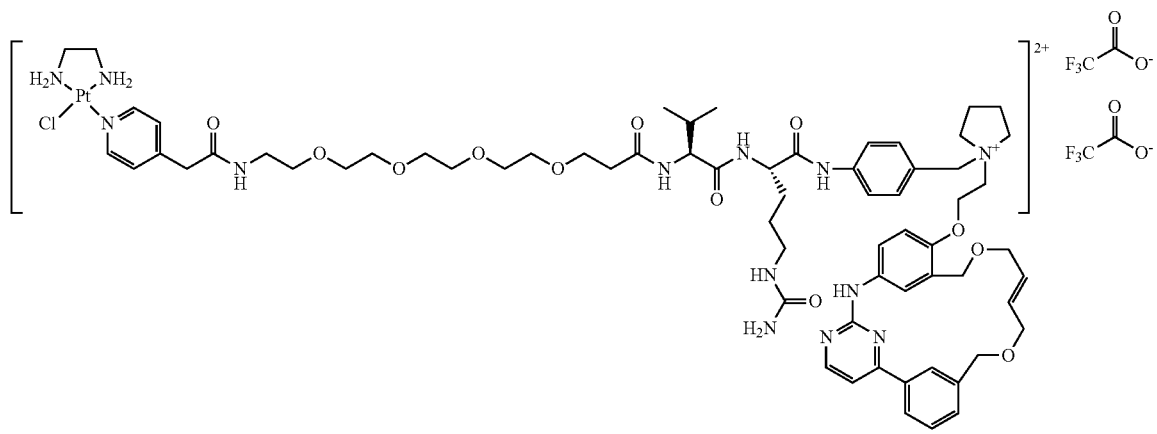
3f
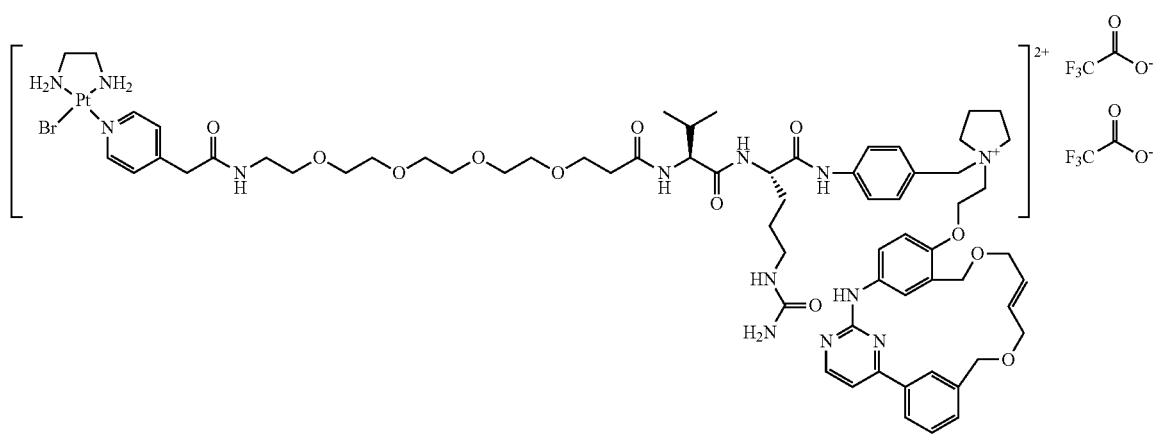
3g
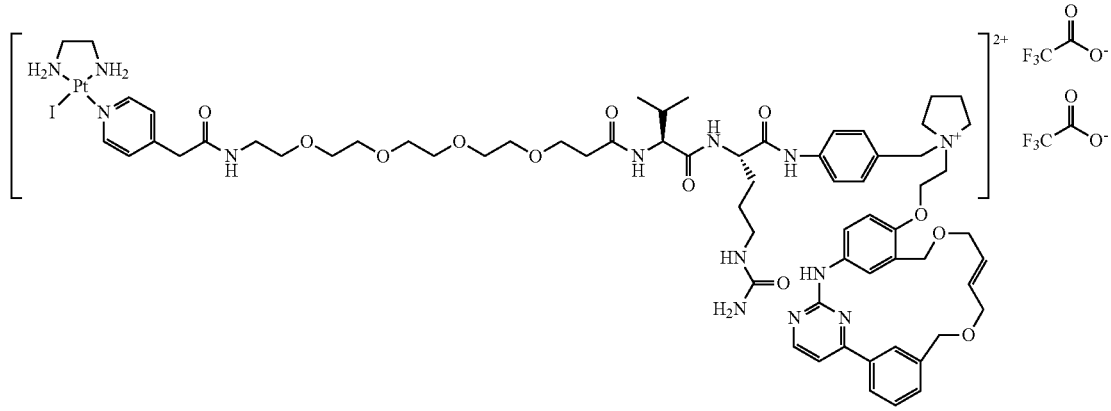
3h

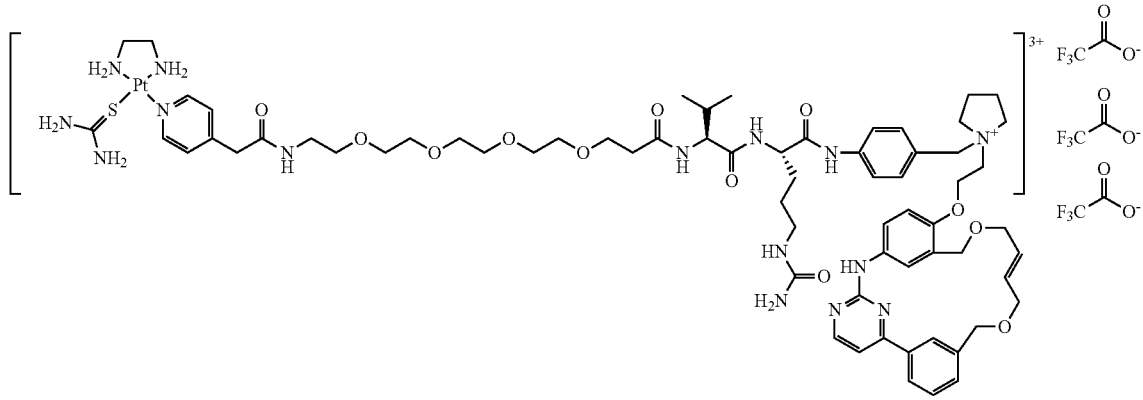

3i

8.3.1. Synthesis and analytical characterization of pacritinib-Lx-I (3c)

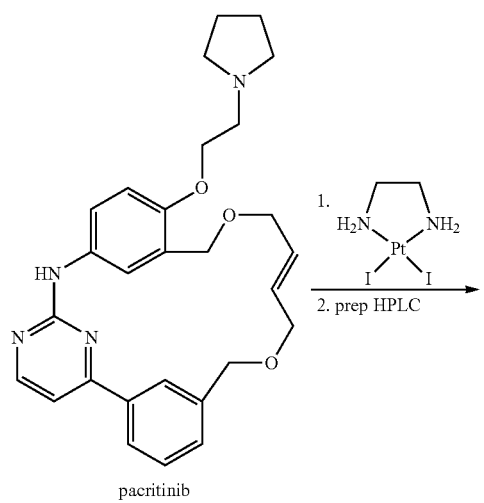

pacritinib

3c

Pacritinib (20 mg, 42.3 μmol, 1 eq.) and Pt (ethane-1,2-diamine)I$_2$ (LxI$_2$; 96.9 mg, 190.4 μmol, 4.5 eq.) were dissolved in dry DMF (250 μL) and the reaction mixture was shaken for 48 h at 60° C. The reaction mixture was then diluted with water/MeOH (1:1, 3 mL) and filtered through a 0.2 μm syringe filter. Purification was performed by preparative reverse-phase HPLC (Grace Alltima C18 5 μm column, 22×250 mm; gradient: 45% to 80% B, whereas eluent A: 95/5 water/MeOH (+0.1% TFA) and eluent B: 5/95 water/MeOH (+0.1% TFA) in 40 min.). Product containing fractions were collected and lyophilized and the product 3c was obtained as a yellow solid (13.1 mg, 28.6% yield).

HRMS (ESI$^+$) C$_{30}$H$_{41}$IN$_6$O$_3$$^{195}$Pt [M] 2+calc 427.5962, found 427.5999.

HPLC (Grace Alltima C18 5 μm column, 25×4.6 mm) indicated that the product was 92.7% pure (retention time 10.7 min.; gradient: 20% to 100% MeCN/0.1% TFA in water/0.1% TFA in 20 min. measured at a wavelength of 273 nm).

8.3.2. Synthesis and analytical characterization of Mal-PEGA-Val-Cit-PAB-pacritinib (3e)
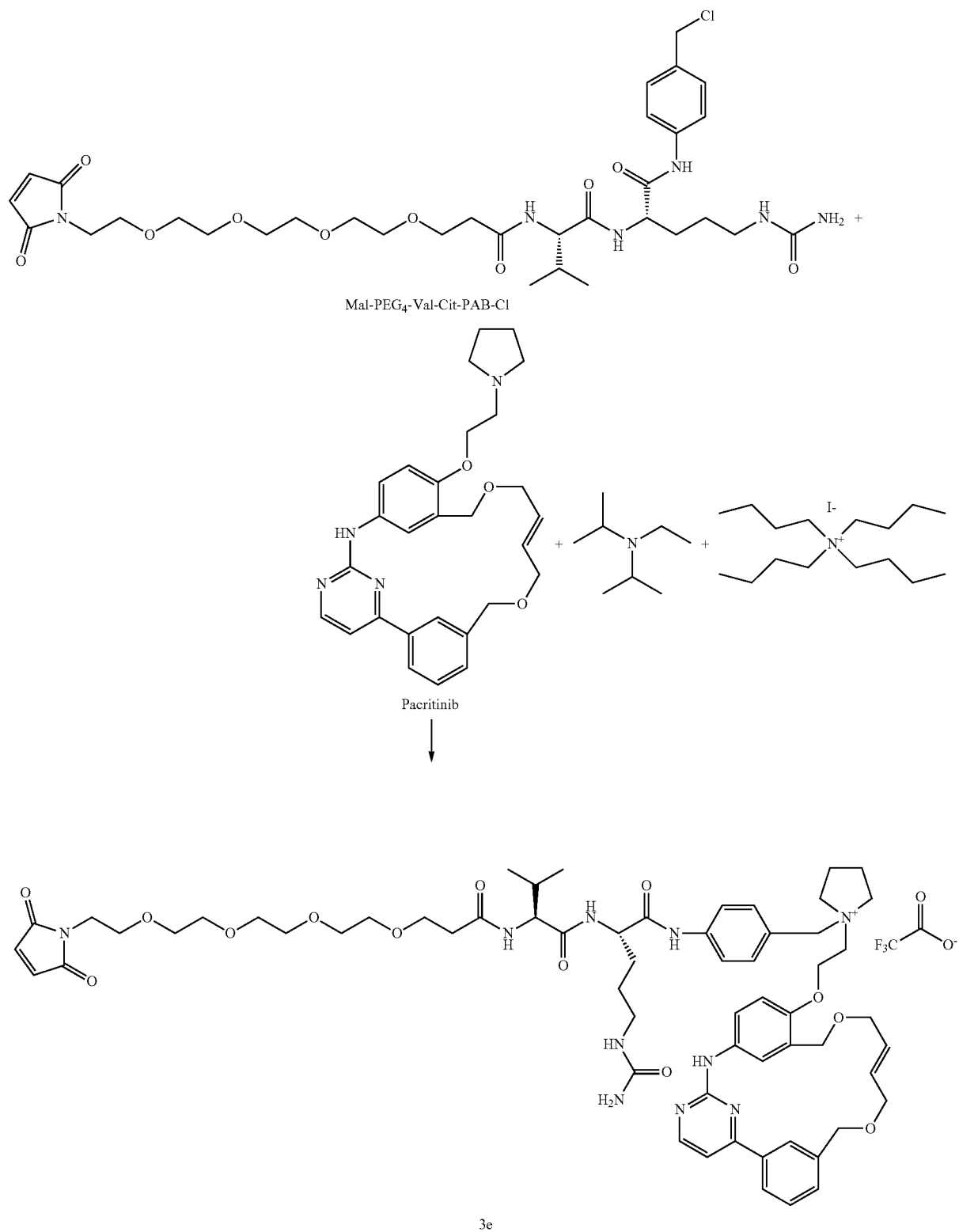
3e

8.3.2.1. Synthesis and analytical characterization of Mal-PEG4-Val-Cit-PAB-Cl

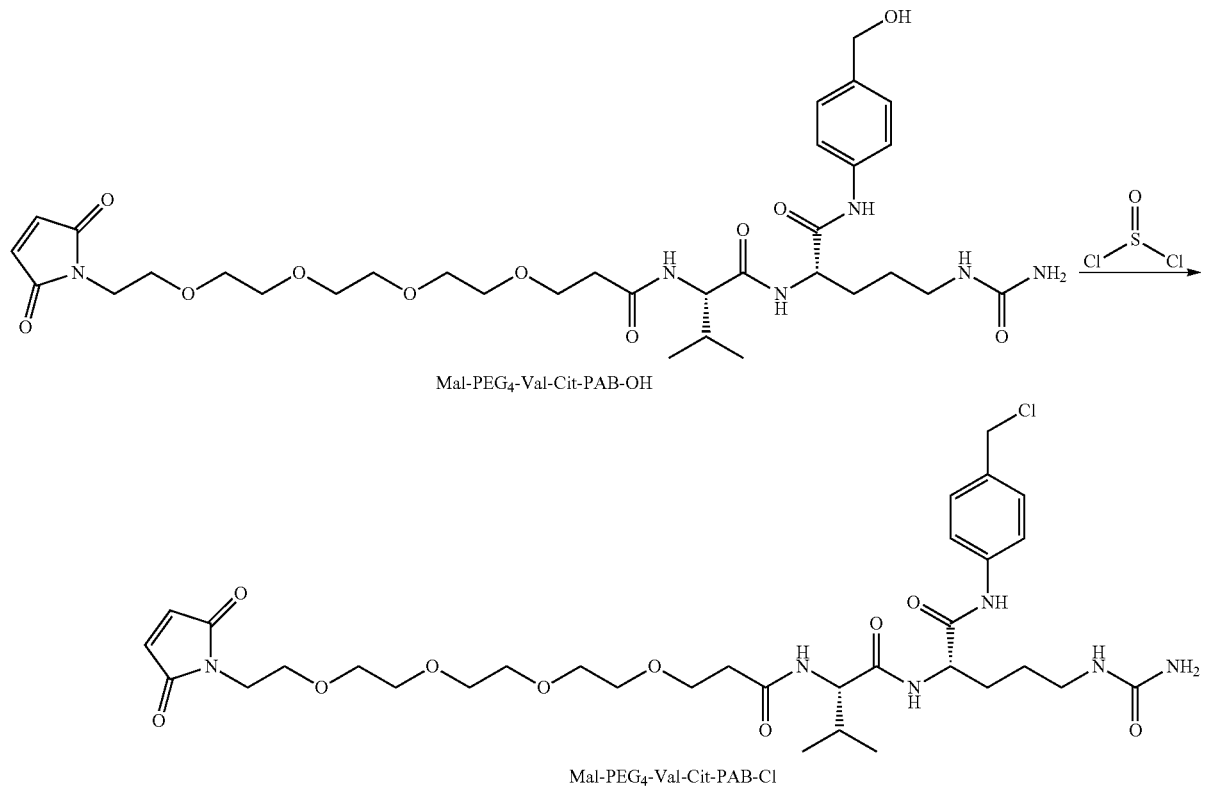

Mal-PEG4-Val-Cit-OH (10 mg, 14.2 μmol, 1.0 eq.) was dissolved in DMF (200 ML) and cooled to 0° C. in an ice/water bath. Subsequently, thionyl chloride (1.9 mg, 15.6 μmol, 1.1 eq.) was added and the mixture was stirred for 15 min. at 0° C. after which the solvent was removed under reduced pressure.

HRMS (ESI$^+$) $C_{33}H_{49}^{35}ClN6O10$ [M+H]$^+$ calc 725.3271, found 725.3298.

HPLC (Grace Alltima C18 5 μm column, 25×4.6 mm) indicated that the product was >90% pure (retention time 9.6 min.; gradient: 20% to 50% B, whereas eluent A: 95/5 water/MeCN (+0.1% TFA) and eluent B: 5/95 water/MeCN (+0.1% TFA) in 20 min. measured at a wavelength of 273 nm).

8.3.2.2. Synthesis and analytical characterization of Mal-PEG4-Val-Cit-PAB-pacritinib (3e)

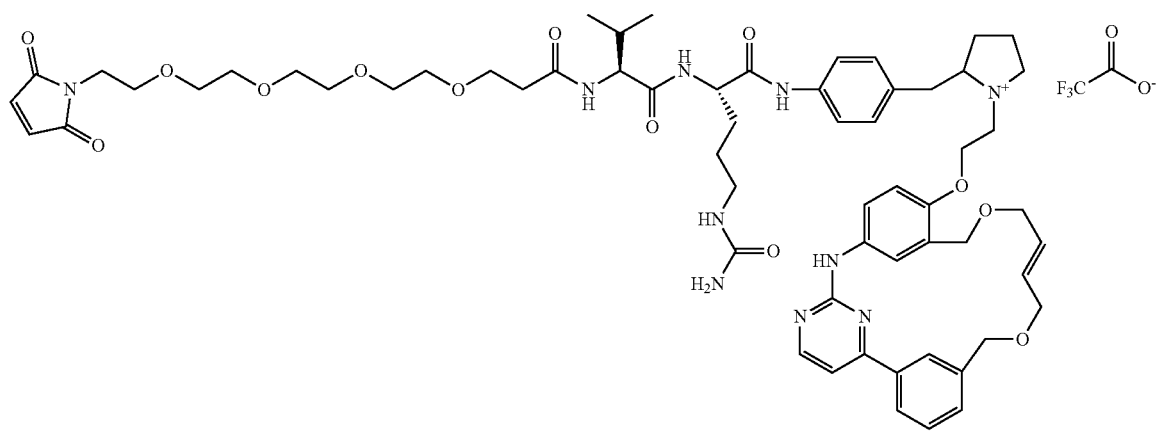

3e

Pacritinib (6.7 mg, 14.2 µmol, 1.0 eq.) was dissolved in DMF (300 µL) and added to Mal-PEG4-Val-Cit-Cl (10.3 mg, 14.2 µmol, 1.0 eq.). Subsequently, DIPEA (4.6 mg, 35.5 µmol, 2.5 eq.) and tetrabutylammonium iodide were added (1.0 mg, 2.8 µmol, 0.2 eq.) and the mixture was stirred for 24 h at 60° C. The product formation was confirmed by HRMS.

HRMS (ESI$^+$) $C_{61}H_{81}N_{10}O_{13}$ [M+H]$^+$ calc 1161.5979, found 1161.5886.

8.4. Structures of losartan-Lx SFMs that can be utilized in the context of the present invention

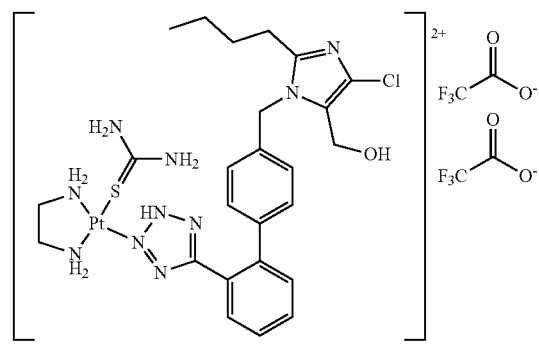

4d

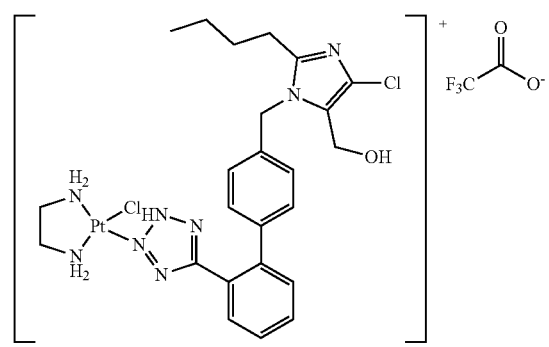

4b

8.4.1. Synthesis and analytical characterization of losartan-Lx-Cl (4a)

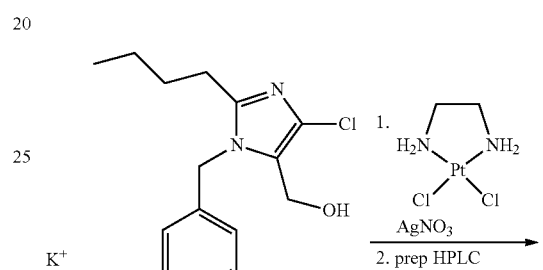

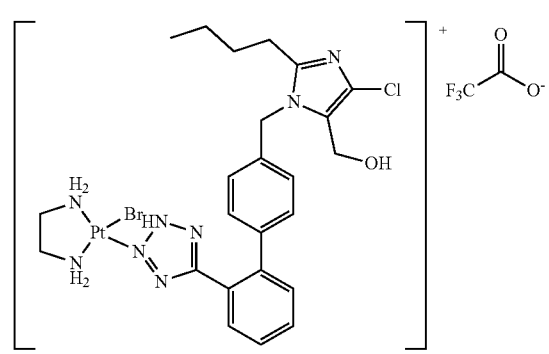

4c

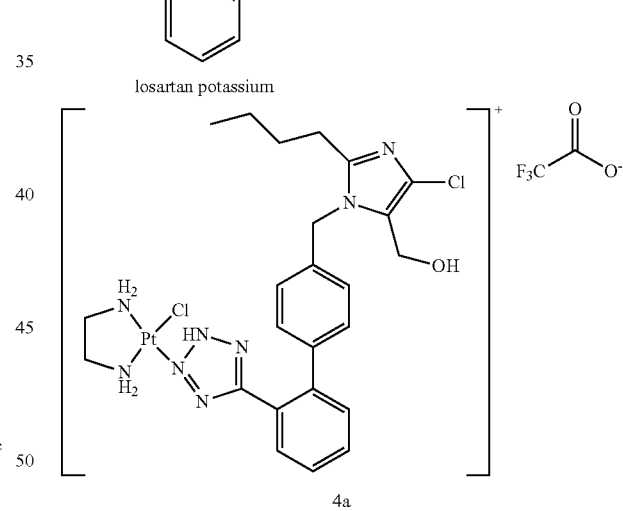

4a

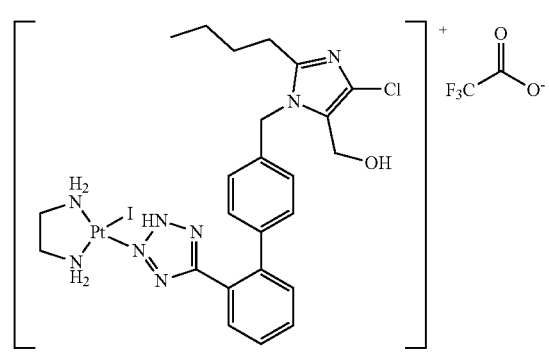

AgNO$_3$ (26.1 mg, 153.3 µmol, 1.0 eq.) was added to a suspension of PtCl$_2$ (ethane-1,2-diamine) (LxCl$_2$; 50 mg, 153.3 µmol, 1.0 eq.) in dry DMF (8.3 mL) and stirred overnight at room temperature in the dark under argon atmosphere. The suspension was then filtered through a 0.2 µm syringe filter to give a 18.5 mM stock solution of the activated Pt-complex. Then, to a solution of losartan potassium (20 mg, 43.4 µmol, 1.0 eq.) in dry DMF (500 µL), the above prepared 18.5 mM stock solution of the activated Pt-complex (1.76 mL, 32.5 µmol, 0.75 eq.) was added. The reaction mixture was stirred for 1.5 h at 22° C. Subsequently, 1 M HCl (70.4 µL, 2 eq.) and 0.9% NaCl (1 mL) were added to the mixture, after which the solvents were removed under reduced pressure. The residue was dissolved in MilliQ water/MeOH (1:1, 3 mL) and filtered through a 0.2 μm syringe filter. Purification was perfomed by preparative reverse-phase HPLC (Grace Alltima C18 5 μm column, 22×250 mm; gradient: 20% to 50% B, whereas eluent A: 95/5 water/MeCN (+0.1% TFA) and eluent B: 5/95 water/MeCN (+0.1% TFA) in 40 min.). Product containing fractions were lyophilized and the product 4a was obtained as a colourless solid (11 mg, 47.4% yield).

HRMS (ESI$^+$) $C_{24}H_{3135}Cl2N_8O_{195}Pt$ [M]$^+$calc 712.1641, found 712.1628.

HPLC (Grace Alltima C18 5 μm column, 25×4.6 mm) indicated that the product was 94.3% pure (retention time 9.6 min.; gradient: 5% to 25% MeCN/0.1% TFA in water/0.1% TFA in 18 min. measured at a wavelength of 273 nm).

Example 9: The Conjugation of a Semi-Final Complex and of a Maleimide Functionalized Moiety to a Binding Molecule of the Invention 9.1. Conjugation of Lx SFMs to a binding molecule Biparatopic 13F11-13E8 (MW~27.9 kD, 105 μL, 5 nmol, 1.33 mg/mL, 1.0 eq.) was diluted with borate buffer (20 μL, 250 mM sodium borate, 250 mM NaCl, and 10 mM diethylenetriaminepentaacetic acid, pH 8.0) and H$_2$O (200 μL), after which a solution of tris(2-carboxyethyl) phosphine hydrochloride (TCEP×HCl; 2 μL, 10 mM in H$_2$O, 10 nmol, 2.0 eq.) was added. The mixture was incubated in a thermoshaker at 37° C. for 2 h. Simultaneously, a solution of the SFM 1c (10 μL, 5 mM in 20 mM NaI, 50 nmol, 10.0 eq.) was mixed with an aqueous solution of thiourea (10 μL, 20 mM) and incubated in a thermoshaker at 37° C. for 2 h. Subsequently, the above prepared solutions of a binding molecule of the invention and the thiourea treated SMF were mixed and incubated in a thermoshaker at 37° C. for 1 h. The conjugates were purified by spin filtration using 10 kDa MWCO filters (washed 4 × with PBS), after which they were reconstituted and stored in PBS. The Y27632-to-13F11-13E8 ratio as determined by SEC-MS was 1.0.

9.2. Conjugation of a maleimide functionalized moieties to a binding molecule

Biparatopic 13F11-13E8 (MW~27.9 kD, 105 μL, 5 nmol, 1.33 mg/mL, 1.0 eq.) was diluted with borate buffer (20 μL, 250 mM sodium borate, 250 mM NaCl, and 10 mM diethylenetriaminepentaacetic acid, pH 8.0) and H$_2$O (200 μL), after which a solution of tris(2-carboxyethyl) phosphine hydrochloride (TCEP× HCl; 2 μL, 10 mM in H$_2$O, 120 nmol, 2.0 eq.) was added. The mixture was incubated in a thermoshaker at 37° C. for 2 h. Subsequently, the above prepared solution of a binding molecule of the invention was mixed with the maleimide functionalized moiety 1e (2.5 μL, 10 mM in DMSO, 50 nmol, 10.0 eq.) and incubated at 0° C. for 1 h. The conjugates were purified by spin filtration using 10 kDa MWCO filters (washed 4 × with PBS), after which they were reconstituted and stored in PBS. The Y27632-to-13F11-13E8 ratio as determined by SEC-MS was 1.0.

Example 10: Internalization of VHHs 10.1. IGF2R VHH

Figure 16:
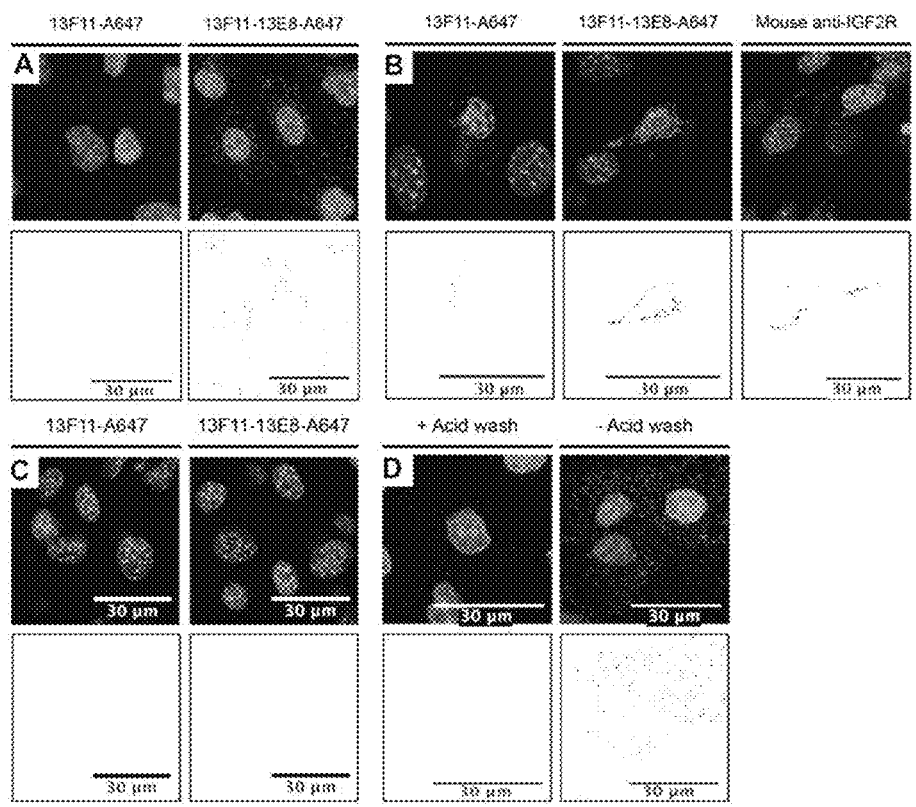
FIG. 16. Internalization of 13F11 and 13F11-13E8 in IGF2R expressing target cells, 63× magnification. Scale bars are 30 μm. A. A549 (IGF2R positive). B. NIH 3T3 2.2 transiently transfected with human IGF2R. C. NIH 3T3 2.2 mock transfected. D. Acid wash control on A549 cells.
Figure 17:
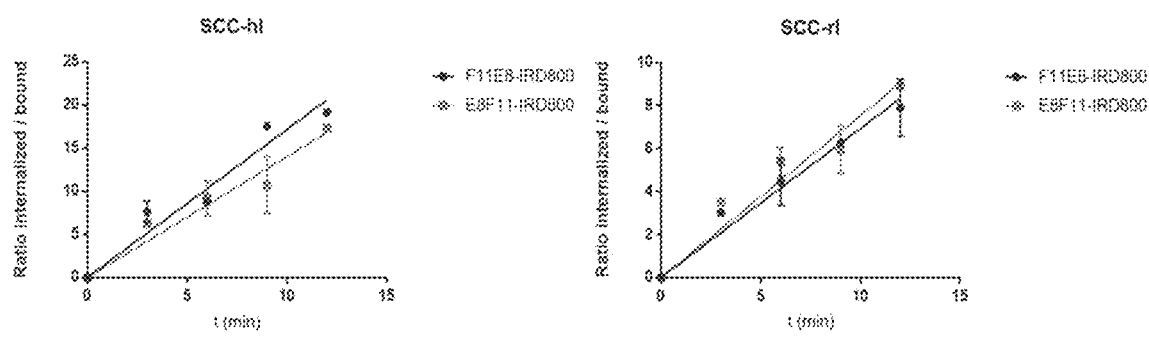
FIG. 17. Internalization rates of 13F11-13E8 (F11E8) and 13E8-13F11 (E8F11) on human or rat IGF2R expressing SCC cells.

To assess if monovalent 13F11 and biparatopic 13F11-13E8 are internalized in the hIGF2R expressing cells, A549 cells (FIG. 16A) and NIH 3T3 2.2 cells transiently transfected with hIGF2R (FIG. 16B) were incubated with 25 nM VHH conjugated to Alexa Fluor 647 (conjugation method as described in example 9.2). A Mouse anti-IGF2R mAb was included to detect IGF2R expression on the hIGF2R transfected cells NIH 3T3 2.2 (FIG. 16B, right column), the mAb was detected with a goat anti-mouse mAb conjugated to Alexa Fluor 555. Additionally, mock transfected NIH 3T3 2.2 cells were incubated with 13F11 and 13F11-13E8 (FIG. 16C). To ensure that only signal of internalized VHH or mouse anti-IGF2R was present, an acid wash (0.2M glycine-HCl, 150 mM NaCl, pH 2.3) was used to remove VHH or mouse anti-IGF2R bound to the target receptors on the cell surface. The efficiency of the acid wash procedure was verified by incubating the hIGF2R transfected NIH 3T3 2.2 cells with 13F11-13E8-A647 on ice and subsequently treating these cells with an acid wash while remaining on ice to prevent internalization (FIG. 10D). Biparatopic 13F11-13E8 clearly internalized in A549 cells whereas for monovalent 13F11 no internalization was observed (FIG. 16A). On the other hand both VHHs did internalise in NIH 3T3 2.2 cells transiently transfected with hGF2R, although a higher intensity staining was observed for 13F11-13E8 (FIG. 16B). The differences in internalization are possibly related to the differences in IGF2R expression levels on the target cells. As expected, both VHH constructs did not internalize in the mock transfected NIH 3T3 2.2 cells (FIG. 16C). The acid wash control experiment indicated that the acid wash treatment was sufficient to remove all membrane bound VHH (FIG. 16D). Summarizing, biparatopic 13F11-13E8 clearly internalizes in cells expressing hIGF2R on the cell surface. The rate of internalization (endocytic rate constant, ke) of biparatopic constructs 13F11-13E8 and 13E8-13F11 was determined with a kinetic internalization assay on SCC-VII cells transfected with hIGF2R and rIGF2R. Briefly, 10 nM of IRD800CW conjugated 13F11-13E8 or 13E8-13F11 (conjugation method as described in example 9.2) was added to hIGF2R expressing SCC cells or rIGF2R expressing SCC cells and incubated at 37° C. for different time points up to 12 minutes. Internalization was then purposely halted by putting the cells on ice. Subsequently, cells were washed with cold PBS and the non-internalized VHH construct (bound fraction) was separated from the internalized construct (internalized fraction) using an acid-wash, as described above, after which the fluorescence of both fractions were measured. Both constructs internalize with similar endocytic rate constants (ke around 1.5 min-1) in the hIGF2R expressing SCC cells (FIG. 17). Internalization was also observed in rIGF2R expressing SCC cells as a clear increase in fluorescence over time can be shown in FIG. 17 (ke around 0.7 min-1).

Figure 18:
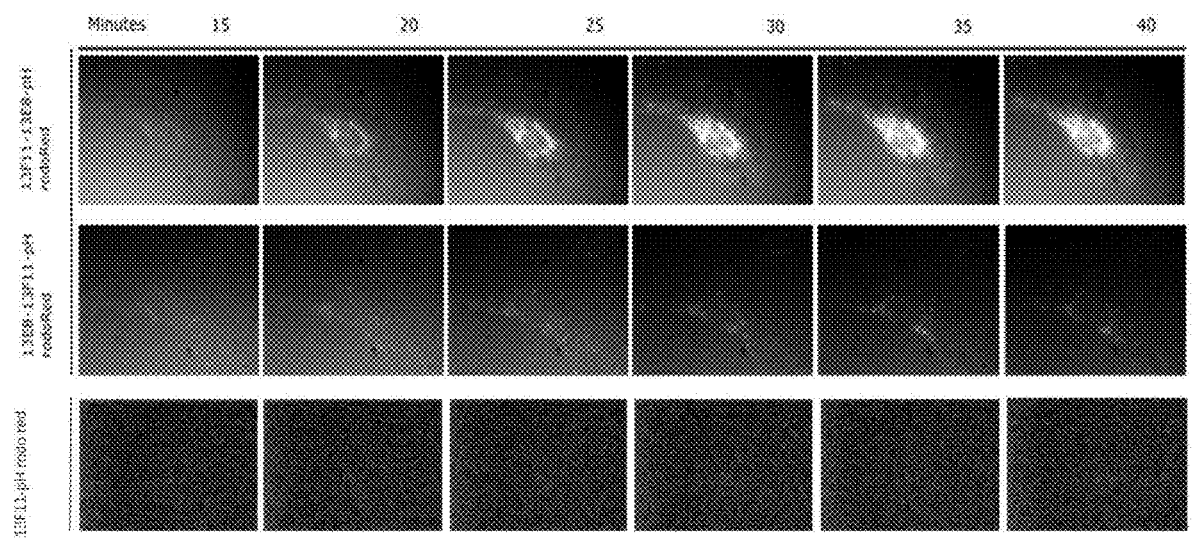
FIG. 18. Internalization in LX-2 cells of monovalent (13F11) and biparatopic (13F11-13E8 and 13E8-13F11) VHHs conjugated to the pH sensitive pHrodo red dye.

Internalization of monovalent 13F11 and biparatopics 13F11-13E8 and 13E8-13F11 in living activated HSCs LX-2 was visualized using the pHrodo pH dependent probe (ThermoFisher Scientific). The pH probe becomes more fluorescent as the pH of the surroundings decreases accordingly. Endosomes and lysosomes have a pH maintained at 6.5 and 4.5, respectively, compared to cytoplasmic pH of 7.0, and thus internalization of a VHH-pHrodo construct can be visualized when it internalizes via the endosomal pathway. LX-2 cells were incubated at 37° C. for 2 hours with 50 nM of pHrodo-red conjugated 13F11, 13F11-13E8 and 13E8-13F11 (conjugation method as described in example 9.2). Images were taken at 5 min. intervals using a wide-field PEXScope microscope (Nikon) with a mCherry filter and 40× oil objective. Compared to the monovalent construct, a more pronounced increase in intracellular fluorescence was observed from 15 min. onwards for both biparatopic constructs 13F11-13E8 and 13E8-13F11 (FIG. 18). Biparatopic 13F11-13E8 clearly shows higher increase of fluorescence over the 40-min. time period compared to 13E8-13F11 indicating a higher rate of internalization. Additionally, both internalized 13F11-13E8 and 13E8-13F11 accumulate into perinuclear compartments (endosomes/lysosomes).

10.2. PDGFRB VHH

Figure 19:
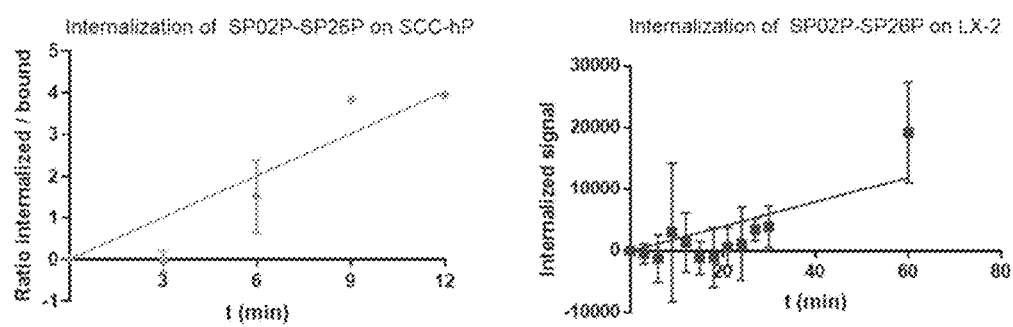
FIG. 19. Internalization rates of SPO2P-SP26P on human PDGFRB expressing SCC cells and LX-2 cells.

To determine the rate of internalization of the VHH construct SPO2P-SP26P, kinetic internalization assays on hPDGFRB expressing SCC cells and LX-2 cells were performed using a similar method as described for the IGF2R constructs in example 10.1. Internalization of SPO2P-SP26P was observed in both hPDGFRB expressing SCC cells and in LX-2 cells (FIG. 19).

Figure 20:
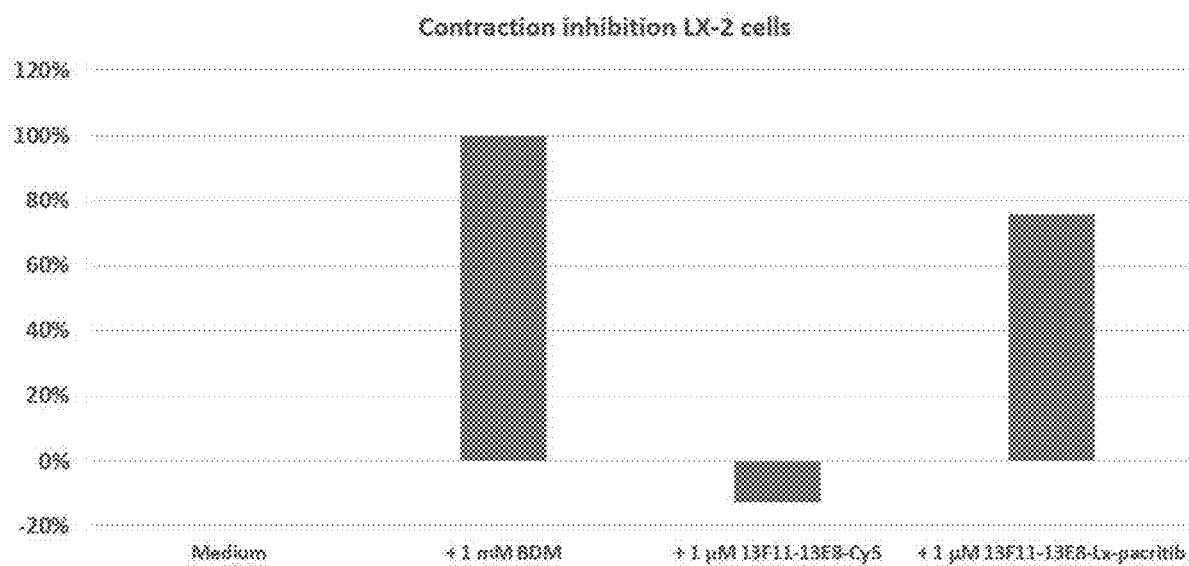
FIG. 20. Contraction assay on activated hepatic stellate cells (HSCs). Depicted is the measured area of the gel after 6 days of incubation with the NDCs. The contraction of the LX-2 cells without any inhibitor was set at 0% relaxation, while 1 μM BDM was set at 100% relaxation. Note: for the medium no contraction inhibition was observed.

Example 11: NDC-Lx-Pacritinib Induces Relaxation of Activated Hepatic Stellate Cells (HSCs) in a Contraction Assay The relaxing potency of biparatopic VHH 13F11-13E8 conjugated to the JAK2 inhibitor pacritinib (3c) (conjugation method as described in example 9.1.) was assessed in vitro using a contraction assay with the human HSC line LX-2. Wells of a 24-wells plate were filled with 0.5 mL BSA and left for at 37° C. for 1 h after which the wells were washed with PBS and dried. Subsequently, a mixture of 1M NaOH, 10× PBS, sterile water, 2× DMEM, 0.2M HEPES and 1 mg/mL type I collagen was added to the wells and incubated at 37° C. for 1 h allowing gelation of the collagen. The LX-2 cells, which medium was replaced with DMEM supplemented with 2% FBS 24 h prior to the assay, were harvested and resuspended at $2 \times 10^5$ cells per mL medium (2% FCS in DMEM) and 500 µl was added to the gel and incubated at 37° C. for 3 h. After attachment of the cells to the collagen gel, the medium was removed and replaced with 500 µl of fresh medium with 1 µM 13F11-13E8-Lx-pacritinib, 1 µM 13F11-13E8-Cy5 (conjugation method as described in 9.2., negative control) or 1 µM contraction inhibitor 2,3-butanedione monoxime (BDM, positive control). The collagen gels were detached from the sides of the wells by moving a pipette tip or spatula around the edges and the cells were incubated at 37° C. up to 7 days. Every 24 h, pictures of the collagen gels were taken with a camera (JAI CV-A55-IR) at a fixed distance or height. The areas of the collagen gels were quantified in pixels using Adobe Photoshop (CC 2017). The percentage of contraction inhibition was determined setting the gel incubated without any inhibitor at 0% contraction inhibition and the gel incubated at 1 µM BDM (positive control) at 100% contraction inhibition. Construct 13F11-13E8-Lx-pacritinib was able to induce contraction inhibition up to 76%, whereas a nanobody construct not equipped with a kinase inhibitor (13F11-13E8-mal-Cy5) did not inhibit contraction (FIG. 20).

Example 12: Expression of Targeted IGF2R in Cirrhotic Liver Sections

Figure 21:
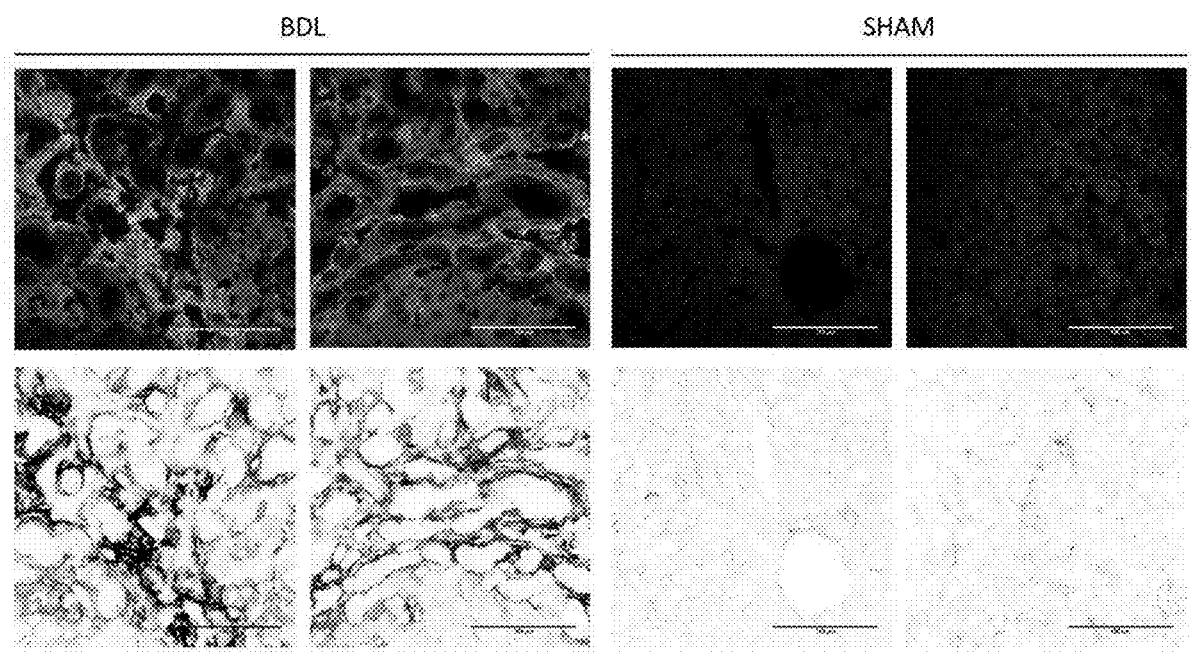
FIG. 21. Immunofluorescence binding of 13F11-13E8-ABD (F11E8-ABD) to cirrhotic (BDL) and healthy (SHAM) rat liver sections.
Figure 22:
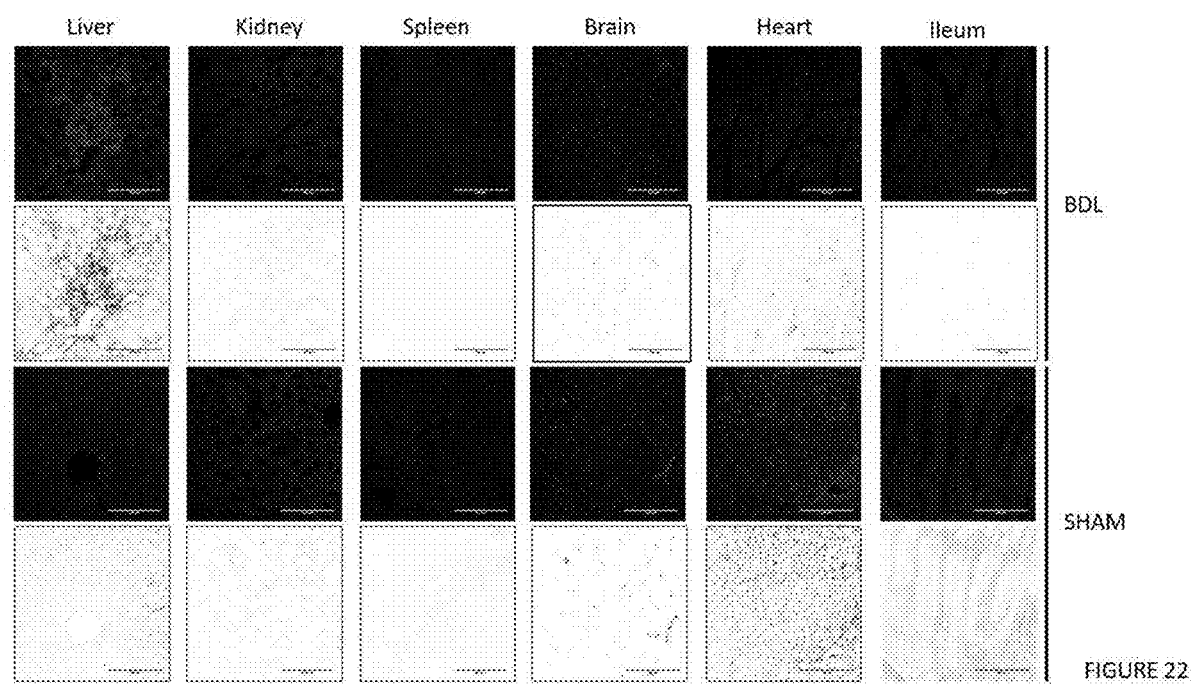
FIG. 22. Expression of IGF2R in various tissues derived from cirrhotic (BDL) and healthy (SHAM) rats.

To evaluate whether IGF2R receptor expression is upregulated in a cirrhotic liver, various cryo-sections of tissues (liver, kidney, spleen, heart, ileum, brain) obtained from both healthy (SHAM) and cirrhotic (BDL) rats (preparation procedure as outlined in example 13) were stained with biparatopic construct 13F11-13E8-ABD conjugated to Alexa Fluor 647 (13F11-13E8-ABD-A647, conjugation method as described in example 9.2.). After cryo-sectioning, the tissue sections were stained with 50 nM fluorescent 13F11-13E8-ABD-AF647 and incubated overnight at 4° C. Subsequently, the sections were washed and stained with DAPI and mounted with mowiol mounting medium (Merck) and were imaged on a Zeiss LSM700 laser scanning confocal microscope with a 20× objective. 13F11-13E8-ABD-AF647 clearly binds to cells in a liver from BDL rats and not to cells in a liver from SHAM rats (FIG. 21) indicating a strong upregulation of IGF2R in cirrhotic livers. Additionally, no, or minor staining could be observed to other tissues from both BDL and SHAM rats, which shows that IGF2R expression is highly restricted to the cirrhotic liver (FIG. 22).

Example 13: Selective Lowering of Portal Hypertension by Targeting Activated Hepatic Stellate Cells In Vivo with an IGF2R-Binding Molecule of the Invention Conjugated to a Small Molecule Kinase Inhibitor To evaluate in vivo functionality, 13F11-13E8-ABD was conjugated to a Y27632-maleimide modified functional moiety (1e) (the test conjugate) as outlined in example 9.2. To provide a comparator, a similar amount of 13F11-13E8-ABD was conjugated to N-ethylmaleimide in a parallel and similar preparation (the mock conjugate).

To establish animals displaying portal hypertension (Klein et al, Fibrosis: Methods and Protocols. Methods in Molecular Biology. 2017 (1627): 91-122.), Sprague-Dawley rats were subjected to bile duct ligation (BDL) through median laparotomy under ketamine/xylazine-induced anaesthesia i.p. (BDL rats). To provide healthy controls, a second cohort of rats was subjected to the same surgical procedure except for actual ligation of the bile duct (SHAM rats). Surgery was followed-up with pain control medication (carprofen s.c.). Approximately five weeks after surgery, ketamine/xylazine anesthetized rats were subjected to median laparotomy, after which one catheter was inserted through an ileocecal vein to the portal vein, and one catheter was inserted into the femoral artery. The catheters were connected to pressure recording equipment, for assessment of portal pressure and mean arterial pressure, respectively.

After catheterization and hemodynamic stabilization, rats were dosed with 5 mg/kg test conjugate or mock conjugate i.v. through the lateral tail vein and pressures were monitored continuously (example 13.1.). One hour after dosing, animals were sacrificed after which tissues were isolated for ex vivo analysis (example 13.2.).

Figure 23:
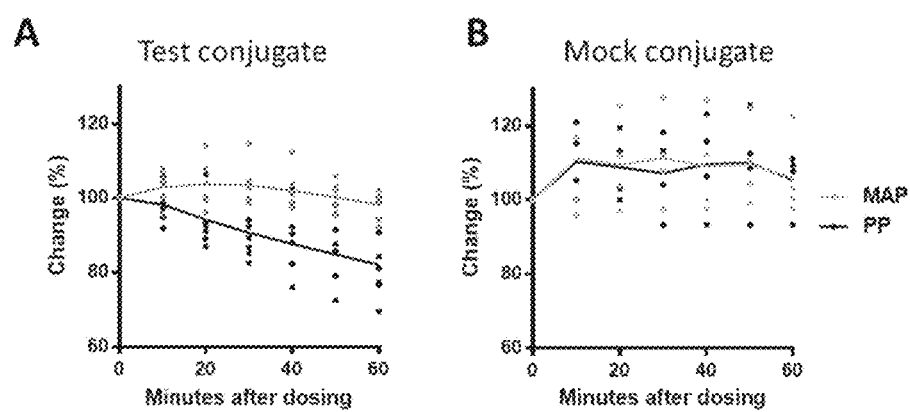
FIG. 23. Change in portal pressure (PP) and mean arterial pressure (MAP) in BDL rats as a function of minutes after dosing for A) 13F11-13E8-ABD-Y27632 (test conjugate) and B) 13F11-13E8-ABD-ethyl (mock conjugate).

13.1. Selective Lowering of Portal Pressure by an IGF2R-Binding Molecule of the Invention Conjugated to a Small Molecule Kinase Inhibitor In BDL rats, infusion of the test conjugate, but not of the mock conjugate, resulted in a gradual decrease of portal pressure (PP) while arterial pressure remained constant (MAP), indicating selective relief of portal hypertension (FIG. 23A). In animals infused with the mock conjugate, both pressures remained constant, indicating that the lowering of portal pressure by the test conjugate was mediated by the small molecule kinase inhibitor (FIG. 23B). In SHAM rats, neither the test conjugate nor the mock conjugate affected portal or arterial pressure, indicating that the effect observed in BDL rats was specific to the diseased condition.

Figure 24:
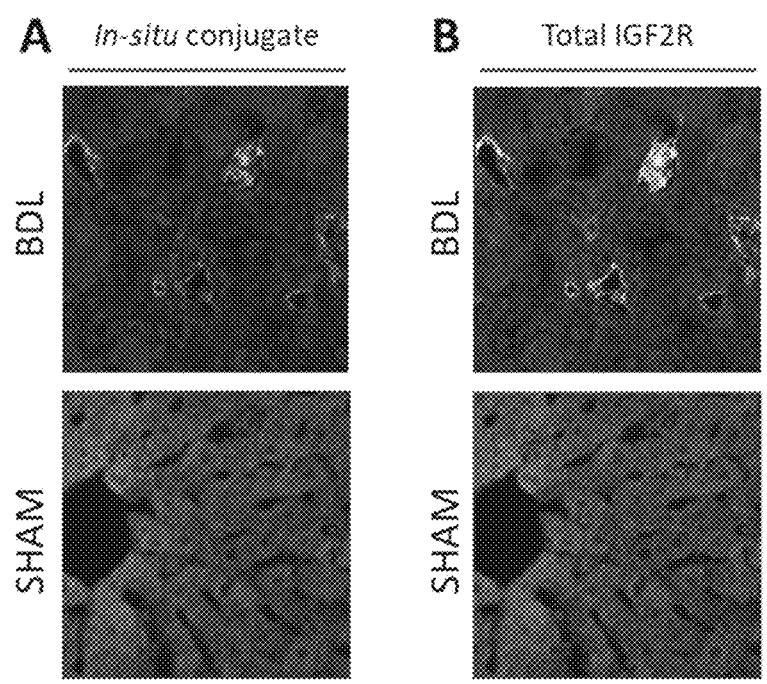
FIG. 24. In vivo targeting of the IGF2R by 13F11-13E8-ABD-Y27632 (test conjugate) in BDL and SHAM rats. A) In situ detection of the infused test conjugate. Liver cryosections of BDL rats (upper) and SHAM rats (lower) probed for the presence of test conjugate with a VHH-specific detection antibody (green). The test conjugate is clearly detected in the cellular layers lining the obstructed sinusoids in the cirrhotic liver of BDL rats, and not in the healthy liver of SHAM rats. B) Distribution of the test conjugate versus the (tissue) distribution of IGF2R. The same cryo-sections were also stained for IGF2R using fluorophore-conjugated F11E8 (red). The test conjugate displays co-localization with IGF2R (green with red: yellow). Of note, some deeper-lying areas display IGF2R expression (red) in the absence of test conjugate, suggesting that tissue penetration was still ongoing, and not completed, at the end of the single hour of the in-life study. Consistent with earlier observations, no IGF2R was detected in the liver of SHAM rats.

13.2. In vivo targeting of the IGF2R by an IGF2R-binding molecule of the invention conjugated to a small molecule kinase inhibitor After isolation, livers obtained from test conjugate-infused BDL and SHAM rats were fixated with paraformaldehyde, soaked in 30% (w/v) sucrose in PBS, and sectioned using cryo-microtome. To detect the test conjugate in situ, tissue sections were stained with a rabbit polyclonal anti- VHH antiserum recognizing the 13F11-13E8 moiety of the conjugate, followed by an anti-rabbit antibody conjugated to the fluorophore Alexa-488 for visualization by confocal fluorescence microscopy (cf. example 12). As shown in FIG. 24A, the test conjugate was detected in the liver of BDL rats and not in the liver of SHAM rats. Furthermore, a second staining of the same sections with excess 13F11-13E8 conjugated to the fluorophore Alexa-647 (13F11-13E8-A647, conjugation method as described in example 9.2.) demonstrated that the distribution of the test conjugate in the liver of BDL rats overlapped with the (tissue) distribution of IGF2R (FIG. 24B). These results indicate that the presence of test conjugate in the liver was driven by the (cirrhosis-specific) expression of IGF2R, and in vivo targeting of the molecular target had in fact been achieved. Of note, the second staining using Alexa-647-conjugated 13F11-13E8 to detect IGF2R distribution clearly showed that not all IGF2R molecules had been reached by the test conjugate within the single hour of the in vivo study. Further accumulation of the test conjugate in the BDL liver beyond this one-hour time point was likely to have occurred.

---

The invention claimed is:

1. A multiparatopic antibody comprising at least two single variable antibody domains, independently from one another, able to specifically bind to platelet-derived growth factor receptor beta (PDGFRB), wherein:
the first single variable antibody domain comprises a CDR 1 sequence according SEQ ID NO: 11, a CDR 2 sequence according to SEQ ID NO: 13 and a CDR 3 sequence according to SEQ ID NO: 15;
and wherein
the second single variable antibody domain comprises:
a CDR 1 sequence according SEQ ID NO: 67, a CDR 2 sequence according to SEQ ID NO: 69 and a CDR 3 sequence according to SEQ ID NO: 71, or
a CDR 1 sequence according SEQ ID NO: 83, a CDR 2 sequence according to SEQ ID NO: 85 and a CDR 3 sequence according to SEQ ID NO: 87, or
a CDR 1 sequence according SEQ ID NO: 155, a CDR 2 sequence according to SEQ ID NO: 157 and a CDR 3 sequence according to SEQ ID NO: 159.

2. The antibody according to claim 1, wherein the second single variable antibody domain comprises a CDR 1 sequence according SEQ ID NO: 155, a CDR 2 sequence according to SEQ ID NO: 157 and the CDR 3 sequence according to SEQ ID NO: 159.

3. The antibody according to claim 1, wherein the at least two single variable antibody domains are of VHH-type.

4. The antibody according to claim 1, wherein the at least two single variable antibody domains are humanized or camelized.

5. The antibody, according to claim 1, wherein the first single variable antibody domain comprises or consists of SEQ ID NO: 9 (SP02P), and wherein the second single variable antibody domain comprises or consists of any one of SEQ ID NOs: SEQ ID NO: 65 (SP12P), SEQ ID NO: 81 (SP14P) and SEQ ID NO: 153 (SP26P).

6. The antibody according to claim 1, wherein the first single variable antibody domain comprises or consists of SEQ ID NO: 9 (SP02P) and wherein the second single variable antibody domain comprises or consists of SEQ ID NO: 153 (SP26P).

7. The antibody according to claim 1, wherein the antibody is a biparatopic antibody.

8. The antibody according to claim 1, further comprising a half-life extender.

9. The antibody according to claim 1, wherein the at least two single variable antibody domains are separated by a linker amino acid sequence.

10. The antibody according to claim 1, further comprising an N-terminal or a C-terminal cysteine or histidine residue.

11. A multiparatopic binding molecule comprising the antibody according to claim 1 and further comprising at least one diagnostic or therapeutic molecule.

12. The binding molecule according to claim 9, wherein the therapeutic or diagnostic molecule are bound to at least one single variable antibody domain of the antibody by a linker and/or spacer.

13. The binding molecule according to claim 9, wherein the therapeutic molecule is a kinase inhibitor.

14. The binding molecule according to claim 9, wherein the therapeutic molecule is a toxin.

15. A nucleic acid that encodes the antibody according to claim 1 and/or the binding molecule according to claim 9.

16. A pharmaceutical composition comprising the antibody according to claim 1 and/or the binding molecule according to claim 9 and further comprising at least one pharmaceutically acceptable excipient.

17. The binding molecule according to claim 9, comprising a diagnostic molecule, wherein the diagnostic molecule is an imaging agent.

* * * * *

SEQUENCE LISTING

```
<160> NUMBER OF SEQ ID NOS: 371

<210> SEQ ID NO 1
<211> LENGTH: 113
<212> TYPE: PRT
<213> ORGANISM: Lama glama

<400> SEQUENCE: 1

Glu Val Gln Leu Val Glu Ser Gly Gly Gly Leu Ala Gln Ala Gly Gly
1               5                   10                  15

Ser Leu Arg Leu Ser Cys Val Ala Ser Gly Asn Ile Asp Ser Ala Asn
            20                  25                  30

Gly Met Ala Trp Tyr Arg Gln Ala Pro Gly Lys Gln Arg Glu Leu Val
        35                  40                  45

Ala His Ile Thr Ser Gly Thr Ser Tyr Tyr Val Ala Ser Val Glu Gly
    50                  55                  60

Arg Phe Thr Ile Ser Arg Ala Asn Ala Lys Asp Thr Trp Tyr Leu Gln
65                  70                  75                  80

Met Asn Ser Leu Lys Pro Glu Asp Thr Gly Val Tyr Tyr Cys Phe Pro
                85                  90                  95

Ile Gly Leu Ser Ala His Trp Ser Gln Gly Thr Gln Val Thr Val Ser
            100                 105                 110

Ser

<210> SEQ ID NO 2
<211> LENGTH: 25
<212> TYPE: PRT
<213> ORGANISM: Lama glama

<400> SEQUENCE: 2

Glu Val Gln Leu Val Glu Ser Gly Gly Gly Leu Ala Gln Ala Gly Gly
1               5                   10                  15

Ser Leu Arg Leu Ser Cys Val Ala Ser
            20                  25

<210> SEQ ID NO 3
<211> LENGTH: 8
<212> TYPE: PRT
<213> ORGANISM: Lama glama

<400> SEQUENCE: 3

Gly Asn Ile Asp Ser Ala Asn Gly
1               5

<210> SEQ ID NO 4
<211> LENGTH: 17
<212> TYPE: PRT
<213> ORGANISM: Lama glama

<400> SEQUENCE: 4
```

```
Met Ala Trp Tyr Arg Gln Ala Pro Gly Lys Gln Arg Glu Leu Val Ala
1               5                   10                  15

His

<210> SEQ ID NO 5
<211> LENGTH: 6
<212> TYPE: PRT
<213> ORGANISM: Lama glama

<400> SEQUENCE: 5

Ile Thr Ser Gly Thr Ser
1               5

<210> SEQ ID NO 6
<211> LENGTH: 38
<212> TYPE: PRT
<213> ORGANISM: Lama glama

<400> SEQUENCE: 6

Tyr Tyr Val Ala Ser Val Glu Gly Arg Phe Thr Ile Ser Arg Ala Asn
1               5                   10                  15

Ala Lys Asp Thr Trp Tyr Leu Gln Met Asn Ser Leu Lys Pro Glu Asp
            20                  25                  30

Thr Gly Val Tyr Tyr Cys
            35

<210> SEQ ID NO 7
<211> LENGTH: 11
<212> TYPE: PRT
<213> ORGANISM: Lama glama

<400> SEQUENCE: 7

Phe Pro Ile Gly Leu Ser Ala His Trp Ser Gln
1               5                   10

<210> SEQ ID NO 8
<211> LENGTH: 8
<212> TYPE: PRT
<213> ORGANISM: Lama glama

<400> SEQUENCE: 8

Gly Thr Gln Val Thr Val Ser Ser
1               5

<210> SEQ ID NO 9
<211> LENGTH: 117
<212> TYPE: PRT
<213> ORGANISM: Lama glama

<400> SEQUENCE: 9

Glu Val Gln Leu Val Glu Ser Gly Gly Gly Leu Val Gln Ala Gly Gly
1               5                   10                  15

Ser Leu Arg Leu Ser Cys Ala Ala Ser Glu Ser Ile Ser Ser Ile Glu
            20                  25                  30

Gln Met Gly Trp Phe Arg Gln Ala Pro Gly Lys Gln Arg Ala Leu Val
        35                  40                  45

Ala Ile Asn Thr Tyr Gly Gly Arg Thr Val Tyr Thr Asn Ser Val Glu
    50                  55                  60

Gly Arg Phe Thr Met Ser Arg Asp Ser Ala Lys Asn Met Val Tyr Leu
65                  70                  75                  80
```

Gln Met Thr Ser Leu Glu Pro Glu Asp Thr Ala Val Tyr Tyr Cys Tyr
                85                  90                  95

Ala Gln Thr Thr Ala Trp Arg Gly Gly Val Trp Gly Gly Thr Gln
            100                 105                 110

Val Thr Val Ser Ser
        115

<210> SEQ ID NO 10
<211> LENGTH: 25
<212> TYPE: PRT
<213> ORGANISM: Lama glama

<400> SEQUENCE: 10

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 11
<211> LENGTH: 8
<212> TYPE: PRT
<213> ORGANISM: Lama glama

<400> SEQUENCE: 11

Glu Ser Ile Ser Ser Ile Glu Gln
1               5

<210> SEQ ID NO 12
<211> LENGTH: 17
<212> TYPE: PRT
<213> ORGANISM: Lama glama

<400> SEQUENCE: 12

Met Gly Trp Phe Arg Gln Ala Pro Gly Lys Gln Arg Ala Leu Val Ala
1               5                   10                  15

Ile

<210> SEQ ID NO 13
<211> LENGTH: 7
<212> TYPE: PRT
<213> ORGANISM: Lama glama

<400> SEQUENCE: 13

Asn Thr Tyr Gly Gly Arg Thr
1               5

<210> SEQ ID NO 14
<211> LENGTH: 38
<212> TYPE: PRT
<213> ORGANISM: Lama glama

<400> SEQUENCE: 14

Val Tyr Thr Asn Ser Val Glu Gly Arg Phe Thr Met Ser Arg Asp Ser
1               5                   10                  15

Ala Lys Asn Met Val Tyr Leu Gln Met Thr Ser Leu Glu Pro Glu Asp
            20                  25                  30

Thr Ala Val Tyr Tyr Cys
                35

<210> SEQ ID NO 15
<211> LENGTH: 11
<212> TYPE: PRT

```
<213> ORGANISM: Lama glama

<400> SEQUENCE: 15

Tyr Ala Gln Thr Thr Ala Trp Arg Gly Gly Val
1               5                   10

<210> SEQ ID NO 16
<211> LENGTH: 11
<212> TYPE: PRT
<213> ORGANISM: Lama glama

<400> SEQUENCE: 16

Trp Gly Gln Gly Thr Gln Val Thr Val Ser Ser
1               5                   10

<210> SEQ ID NO 17
<211> LENGTH: 118
<212> TYPE: PRT
<213> ORGANISM: Lama glama

<400> SEQUENCE: 17

Glu Val Gln Leu Val Glu Ser Gly Gly Gly Leu Val Gln Ala Gly Gly
1               5                   10                  15

Ser Ala Arg Leu Ser Cys Ala Ala Ser Gly Ser Ile Leu Ser Pro Asn
            20                  25                  30

Leu Met Ala Trp Ser Arg Gln Ala Pro Gly Lys Gln Arg Glu Val Val
        35                  40                  45

Ala Leu Ala Thr Ser Asp Gly Ile Thr Thr Tyr Ala Thr Ser Val Lys
    50                  55                  60

Gly Arg Phe Thr Ile Ser Arg Asp Asp Ala Lys Asn Thr Val Tyr Leu
65                  70                  75                  80

Gln Met Asn Ser Leu Lys Pro Glu Asp Thr Asn Leu Tyr Thr Cys Lys
                85                  90                  95

Tyr Arg Ala Leu Arg Ala Gly Ala Val Asp Tyr Trp Gly Gln Gly Thr
            100                 105                 110

Gln Val Thr Val Ser Ser
        115

<210> SEQ ID NO 18
<211> LENGTH: 25
<212> TYPE: PRT
<213> ORGANISM: Lama glama

<400> SEQUENCE: 18

Glu Val Gln Leu Val Glu Ser Gly Gly Gly Leu Val Gln Ala Gly Gly
1               5                   10                  15

Ser Ala Arg Leu Ser Cys Ala Ala Ser
            20                  25

<210> SEQ ID NO 19
<211> LENGTH: 8
<212> TYPE: PRT
<213> ORGANISM: Lama glama

<400> SEQUENCE: 19

Gly Ser Ile Leu Ser Pro Asn Leu
1               5

<210> SEQ ID NO 20
<211> LENGTH: 17
<212> TYPE: PRT
```

<213> ORGANISM: Lama glama

<400> SEQUENCE: 20

Met Ala Trp Ser Arg Gln Ala Pro Gly Lys Gln Arg Glu Val Val Ala
1               5                   10                  15

Leu

<210> SEQ ID NO 21
<211> LENGTH: 7
<212> TYPE: PRT
<213> ORGANISM: Lama glama

<400> SEQUENCE: 21

Ala Thr Ser Asp Gly Ile Thr
1               5

<210> SEQ ID NO 22
<211> LENGTH: 38
<212> TYPE: PRT
<213> ORGANISM: Lama glama

<400> SEQUENCE: 22

Thr Tyr Ala Thr Ser Val Lys Gly Arg Phe Thr Ile Ser Arg Asp Asp
1               5                   10                  15

Ala Lys Asn Thr Val Tyr Leu Gln Met Asn Ser Leu Lys Pro Glu Asp
            20                  25                  30

Thr Asn Leu Tyr Thr Cys
        35

<210> SEQ ID NO 23
<211> LENGTH: 12
<212> TYPE: PRT
<213> ORGANISM: Lama glama

<400> SEQUENCE: 23

Lys Tyr Arg Ala Leu Arg Ala Gly Ala Val Asp Tyr
1               5                   10

<210> SEQ ID NO 24
<211> LENGTH: 11
<212> TYPE: PRT
<213> ORGANISM: Lama glama

<400> SEQUENCE: 24

Trp Gly Gln Gly Thr Gln Val Thr Val Ser Ser
1               5                   10

<210> SEQ ID NO 25
<211> LENGTH: 125
<212> TYPE: PRT
<213> ORGANISM: Lama glama

<400> SEQUENCE: 25

Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Thr Ser Phe Ser Gly
            20                  25                  30

Tyr Ala Met Ala Trp Phe Arg Gln Ala Pro Gly Lys Glu Arg Asp Phe
        35                  40                  45

Val Ala Ser Ile Thr Trp Ser Tyr Gly Tyr Thr Tyr Tyr Thr Asp Ser
    50                  55                  60

```
Ala Gln Gly Arg Phe Thr Ile Ser Arg Asp Ser Ala Lys Asn Thr Val
 65                  70                  75                  80

Tyr Leu Glu Met Asn Ser Leu Lys Pro Glu Asp Thr Ala Val Tyr Tyr
                 85                  90                  95

Cys Ala Ala Asp Pro Lys Ala Ser Arg Phe Arg Ile Leu Arg Glu Tyr
            100                 105                 110

Ala Tyr Trp Gly Gln Gly Thr Gln Val Thr Val Ser Ser
        115                 120                 125

<210> SEQ ID NO 26
<211> LENGTH: 25
<212> TYPE: PRT
<213> ORGANISM: Lama glama

<400> SEQUENCE: 26

Glu Val Gln Leu Val Glu Ser Gly Gly Gly Leu Val Gln Ala Gly Gly
  1               5                  10                  15

Ser Leu Arg Leu Ser Cys Ala Ala Ser
             20                  25

<210> SEQ ID NO 27
<211> LENGTH: 9
<212> TYPE: PRT
<213> ORGANISM: Lama glama

<400> SEQUENCE: 27

Gly Arg Thr Ser Phe Ser Gly Tyr Ala
  1               5

<210> SEQ ID NO 28
<211> LENGTH: 17
<212> TYPE: PRT
<213> ORGANISM: Lama glama

<400> SEQUENCE: 28

Met Ala Trp Phe Arg Gln Ala Pro Gly Lys Glu Arg Asp Phe Val Ala
  1               5                  10                  15

Ser

<210> SEQ ID NO 29
<211> LENGTH: 8
<212> TYPE: PRT
<213> ORGANISM: Lama glama

<400> SEQUENCE: 29

Ile Thr Trp Ser Tyr Gly Tyr Thr
  1               5

<210> SEQ ID NO 30
<211> LENGTH: 38
<212> TYPE: PRT
<213> ORGANISM: Lama glama

<400> SEQUENCE: 30

Tyr Tyr Thr Asp Ser Ala Gln Gly Arg Phe Thr Ile Ser Arg Asp Ser
  1               5                  10                  15

Ala Lys Asn Thr Val Tyr Leu Glu Met Asn Ser Leu Lys Pro Glu Asp
             20                  25                  30

Thr Ala Val Tyr Tyr Cys
             35
```

-continued

<210> SEQ ID NO 31
<211> LENGTH: 17
<212> TYPE: PRT
<213> ORGANISM: Lama glama

<400> SEQUENCE: 31

Ala Ala Asp Pro Lys Ala Ser Arg Phe Arg Ile Leu Arg Glu Tyr Ala
1               5                   10                  15

Tyr

<210> SEQ ID NO 32
<211> LENGTH: 11
<212> TYPE: PRT
<213> ORGANISM: Lama glama

<400> SEQUENCE: 32

Trp Gly Gln Gly Thr Gln Val Thr Val Ser Ser
1               5                   10

<210> SEQ ID NO 33
<211> LENGTH: 129
<212> TYPE: PRT
<213> ORGANISM: Lama glama

<400> SEQUENCE: 33

Glu Val Gln Leu Val Glu Ser Gly Gly Gly Ser Val Gln Thr Gly Gly
1               5                   10                  15

Ser Leu Arg Leu Ser Cys Ala Ala Ser Gly Arg Ser Phe Ser Thr Tyr
            20                  25                  30

Ala Met Ala Trp Phe Arg Gln Ala Pro Gly Lys Glu Arg Glu Phe Val
        35                  40                  45

Ala Ala Ile Asn Arg Arg Ala Thr Asp Thr Val Tyr Ala Asp Ser Ala
    50                  55                  60

Lys Gly Arg Phe Ile Ile Ser Arg Asp Asn Asp Lys Asn Thr Val Tyr
65                  70                  75                  80

Leu Gln Met Asp Ser Leu Lys Thr Glu Asp Thr Ala Val Tyr Tyr Cys
                85                  90                  95

Ala Ala Ala Lys Asn Ala Tyr Asp Trp Arg Trp Asp Arg Leu Arg Asp
            100                 105                 110

Arg Asp Tyr Trp Gly Gln Arg Gly Gln Gly Thr Gln Val Thr Val Ser
        115                 120                 125

Ser

<210> SEQ ID NO 34
<211> LENGTH: 25
<212> TYPE: PRT
<213> ORGANISM: Lama glama

<400> SEQUENCE: 34

Glu Val Gln Leu Val Glu Ser Gly Gly Gly Ser Val Gln Thr Gly Gly
1               5                   10                  15

Ser Leu Arg Leu Ser Cys Ala Ala Ser
            20                  25

<210> SEQ ID NO 35
<211> LENGTH: 8
<212> TYPE: PRT
<213> ORGANISM: Lama glama

<400> SEQUENCE: 35

```
Gly Arg Ser Phe Ser Thr Tyr Ala
1               5

<210> SEQ ID NO 36
<211> LENGTH: 17
<212> TYPE: PRT
<213> ORGANISM: Lama glama

<400> SEQUENCE: 36

Met Ala Trp Phe Arg Gln Ala Pro Gly Lys Glu Arg Glu Phe Val Ala
1               5                   10                  15

Ala

<210> SEQ ID NO 37
<211> LENGTH: 8
<212> TYPE: PRT
<213> ORGANISM: Lama glama

<400> SEQUENCE: 37

Ile Asn Arg Arg Ala Thr Asp Thr
1               5

<210> SEQ ID NO 38
<211> LENGTH: 38
<212> TYPE: PRT
<213> ORGANISM: Lama glama

<400> SEQUENCE: 38

Val Tyr Ala Asp Ser Ala Lys Gly Arg Phe Ile Ile Ser Arg Asp Asn
1               5                   10                  15

Asp Lys Asn Thr Val Tyr Leu Gln Met Asp Ser Leu Lys Thr Glu Asp
                20                  25                  30

Thr Ala Val Tyr Tyr Cys
            35

<210> SEQ ID NO 39
<211> LENGTH: 19
<212> TYPE: PRT
<213> ORGANISM: Lama glama

<400> SEQUENCE: 39

Ala Ala Ala Lys Asn Ala Tyr Asp Trp Arg Trp Asp Arg Leu Arg Asp
1               5                   10                  15

Arg Asp Tyr

<210> SEQ ID NO 40
<211> LENGTH: 14
<212> TYPE: PRT
<213> ORGANISM: Lama glama

<400> SEQUENCE: 40

Trp Gly Gln Arg Gly Gln Gly Thr Gln Val Thr Val Ser Ser
1               5                   10

<210> SEQ ID NO 41
<211> LENGTH: 124
<212> TYPE: PRT
<213> ORGANISM: Lama glama

<400> SEQUENCE: 41

Glu Val Gln Leu Val Glu Ser Gly Gly Gly Leu Val Gln Ala Gly Gly
1               5                   10                  15
```

-continued

Ser Leu Arg Leu Ser Cys Ala Ala Ser Gly Arg Thr Phe Asn Gly Tyr
            20                  25                  30

Ala Met Ala Trp Phe Arg Gln Ala Pro Gly Lys Glu Arg Asp Phe Val
        35                  40                  45

Ala Ser Ile Thr Trp Ser Tyr Gly Tyr Thr Tyr Tyr Ala Asp Ser Ala
    50                  55                  60

Gln Gly Arg Phe Thr Ile Ser Arg Asp Ser Ala Lys Asn Thr Val Tyr
65                  70                  75                  80

Leu Glu Met Asn Ser Leu Lys Pro Glu Asp Thr Ala Val Tyr Tyr Cys
                85                  90                  95

Ala Ala Asp Pro Lys Ala Ser Arg Phe Arg Ile Leu Arg Gln Tyr Ala
            100                 105                 110

His Trp Gly Gln Gly Thr Gln Val Thr Val Ser Ser
        115                 120

<210> SEQ ID NO 42
<211> LENGTH: 25
<212> TYPE: PRT
<213> ORGANISM: Lama glama

<400> SEQUENCE: 42

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 43
<211> LENGTH: 8
<212> TYPE: PRT
<213> ORGANISM: Lama glama

<400> SEQUENCE: 43

Gly Arg Thr Phe Asn Gly Tyr Ala
1               5

<210> SEQ ID NO 44
<211> LENGTH: 17
<212> TYPE: PRT
<213> ORGANISM: Lama glama

<400> SEQUENCE: 44

Met Ala Trp Phe Arg Gln Ala Pro Gly Lys Glu Arg Asp Phe Val Ala
1               5                   10                  15

Ser

<210> SEQ ID NO 45
<211> LENGTH: 8
<212> TYPE: PRT
<213> ORGANISM: Lama glama

<400> SEQUENCE: 45

Ile Thr Trp Ser Tyr Gly Tyr Thr
1               5

<210> SEQ ID NO 46
<211> LENGTH: 38
<212> TYPE: PRT
<213> ORGANISM: Lama glama

<400> SEQUENCE: 46

Tyr Tyr Ala Asp Ser Ala Gln Gly Arg Phe Thr Ile Ser Arg Asp Ser

```
                1               5                  10                  15
Ala Lys Asn Thr Val Tyr Leu Glu Met Asn Ser Leu Lys Pro Glu Asp
                20                  25                  30

Thr Ala Val Tyr Tyr Cys
        35

<210> SEQ ID NO 47
<211> LENGTH: 17
<212> TYPE: PRT
<213> ORGANISM: Lama glama

<400> SEQUENCE: 47

Ala Ala Asp Pro Lys Ala Ser Arg Phe Arg Ile Leu Arg Gln Tyr Ala
1               5                   10                  15

His

<210> SEQ ID NO 48
<211> LENGTH: 11
<212> TYPE: PRT
<213> ORGANISM: Lama glama

<400> SEQUENCE: 48

Trp Gly Gln Gly Thr Gln Val Thr Val Ser Ser
1               5                   10

<210> SEQ ID NO 49
<211> LENGTH: 124
<212> TYPE: PRT
<213> ORGANISM: Lama glama

<400> SEQUENCE: 49

Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Thr Phe Asn Gly Tyr
                20                  25                  30

Ala Met Gly Trp Phe Arg Gln Ala Pro Gly Lys Glu Arg Asp Phe Val
            35                  40                  45

Ala Ala Ile Thr Trp Ser Tyr Gly Tyr Thr His Tyr Ala Glu Ser Val
        50                  55                  60

Lys Gly Arg Phe Ser Ile Ser Arg Asp Ser Ala Asn Asn Met Val Tyr
65                  70                  75                  80

Leu Glu Met Asn Ser Leu Lys Pro Glu Asp Thr Ala Val Tyr Tyr Cys
                85                  90                  95

Ala Ala Asp Pro Lys Ala Ser Arg Phe Arg Thr Leu Arg Arg Tyr Asp
                100                 105                 110

Tyr Trp Gly Gln Gly Thr Gln Val Thr Val Ser Ser
            115                 120

<210> SEQ ID NO 50
<211> LENGTH: 25
<212> TYPE: PRT
<213> ORGANISM: Lama glama

<400> SEQUENCE: 50

Glu Val Gln Leu Val Glu Ser Gly Gly Gly Leu Val Gln Ala Gly Gly
1               5                   10                  15

Ser Leu Arg Leu Ser Cys Ala Ala Ser
                20                  25
```

<210> SEQ ID NO 51
<211> LENGTH: 8
<212> TYPE: PRT
<213> ORGANISM: Lama glama

<400> SEQUENCE: 51

Gly Arg Thr Phe Asn Gly Tyr Ala
1               5

<210> SEQ ID NO 52
<211> LENGTH: 17
<212> TYPE: PRT
<213> ORGANISM: Lama glama

<400> SEQUENCE: 52

Met Gly Trp Phe Arg Gln Ala Pro Gly Lys Glu Arg Asp Phe Val Ala
1               5                   10                  15

Ala

<210> SEQ ID NO 53
<211> LENGTH: 8
<212> TYPE: PRT
<213> ORGANISM: Lama glama

<400> SEQUENCE: 53

Ile Thr Trp Ser Tyr Gly Tyr Thr
1               5

<210> SEQ ID NO 54
<211> LENGTH: 38
<212> TYPE: PRT
<213> ORGANISM: Lama glama

<400> SEQUENCE: 54

His Tyr Ala Glu Ser Val Lys Gly Arg Phe Ser Ile Ser Arg Asp Ser
1               5                   10                  15

Ala Asn Asn Met Val Tyr Leu Glu Met Asn Ser Leu Lys Pro Glu Asp
            20                  25                  30

Thr Ala Val Tyr Tyr Cys
        35

<210> SEQ ID NO 55
<211> LENGTH: 17
<212> TYPE: PRT
<213> ORGANISM: Lama glama

<400> SEQUENCE: 55

Ala Ala Asp Pro Lys Ala Ser Arg Phe Arg Thr Leu Arg Arg Tyr Asp
1               5                   10                  15

Tyr

<210> SEQ ID NO 56
<211> LENGTH: 11
<212> TYPE: PRT
<213> ORGANISM: Lama glama

<400> SEQUENCE: 56

Trp Gly Gln Gly Thr Gln Val Thr Val Ser Ser
1               5                   10

<210> SEQ ID NO 57
<211> LENGTH: 127
<212> TYPE: PRT

<213> ORGANISM: Lama glama

<400> SEQUENCE: 57

Glu Val Gln Leu Val Glu Ser Gly Gly Gly Leu Val Gln Ala Gly Asp
1               5                   10                  15

Ser Leu Arg Leu Ser Cys Ala Ala Ser Gly Arg Thr Phe Ser Ser Tyr
            20                  25                  30

Pro Ile Ala Trp Phe Arg Gln Ala Pro Gly Lys Glu Arg Glu Phe Val
        35                  40                  45

Ala Ala Ile Thr Ser Ser Gly Leu Thr Thr Tyr Tyr Ala Asn Val Val
    50                  55                  60

Lys Gly Arg Phe Ala Ile Ser Arg Asp Asn Ala Lys Asp Thr Val Tyr
65                  70                  75                  80

Leu Gln Met Asn Ser Leu Lys Pro Glu Asp Thr Ala Val His Tyr Cys
                85                  90                  95

Ala Thr Ser Asn Gly Phe Leu Ser Gly Arg Asp Ile Tyr Gln His Asn
            100                 105                 110

Lys Tyr Ile Tyr Trp Gly Gln Gly Thr Gln Val Thr Val Ser Ser
        115                 120                 125

<210> SEQ ID NO 58
<211> LENGTH: 25
<212> TYPE: PRT
<213> ORGANISM: Lama glama

<400> SEQUENCE: 58

Glu Val Gln Leu Val Glu Ser Gly Gly Gly Leu Val Gln Ala Gly Asp
1               5                   10                  15

Ser Leu Arg Leu Ser Cys Ala Ala Ser
            20                  25

<210> SEQ ID NO 59
<211> LENGTH: 8
<212> TYPE: PRT
<213> ORGANISM: Lama glama

<400> SEQUENCE: 59

Gly Arg Thr Phe Ser Ser Tyr Pro
1               5

<210> SEQ ID NO 60
<211> LENGTH: 17
<212> TYPE: PRT
<213> ORGANISM: Lama glama

<400> SEQUENCE: 60

Ile Ala Trp Phe Arg Gln Ala Pro Gly Lys Glu Arg Glu Phe Val Ala
1               5                   10                  15

Ala

<210> SEQ ID NO 61
<211> LENGTH: 5
<212> TYPE: PRT
<213> ORGANISM: Lama glama

<400> SEQUENCE: 61

Ile Thr Ser Ser Gly
1               5

<210> SEQ ID NO 62

```
<211> LENGTH: 41
<212> TYPE: PRT
<213> ORGANISM: Lama glama

<400> SEQUENCE: 62

Leu Thr Thr Tyr Tyr Ala Asn Val Val Lys Gly Arg Phe Ala Ile Ser
1               5                   10                  15

Arg Asp Asn Ala Lys Asp Thr Val Tyr Leu Gln Met Asn Ser Leu Lys
                20                  25                  30

Pro Glu Asp Thr Ala Val His Tyr Cys
                35                  40

<210> SEQ ID NO 63
<211> LENGTH: 20
<212> TYPE: PRT
<213> ORGANISM: Lama glama

<400> SEQUENCE: 63

Ala Thr Ser Asn Gly Phe Leu Ser Gly Arg Asp Ile Tyr Gln His Asn
1               5                   10                  15

Lys Tyr Ile Tyr
            20

<210> SEQ ID NO 64
<211> LENGTH: 11
<212> TYPE: PRT
<213> ORGANISM: Lama glama

<400> SEQUENCE: 64

Trp Gly Gln Gly Thr Gln Val Thr Val Ser Ser
1               5                   10

<210> SEQ ID NO 65
<211> LENGTH: 125
<212> TYPE: PRT
<213> ORGANISM: Lama glama

<400> SEQUENCE: 65

Glu Val Gln Leu Val Glu Ser Gly Gly Gly Leu Val Gln Ala Gly Gly
1               5                   10                  15

Ser Leu Arg Leu Ser Cys Val Ile Ser Gly Arg Thr Ser Pro Thr Tyr
                20                  25                  30

Pro Met Gly Trp Phe Arg Gln Ser Pro Gly Asn Glu Arg Glu Phe Val
                35                  40                  45

Ala Ser Ile Asn Trp Ser Gly Trp Arg Asn Tyr Ala Asp Ser Val
            50                  55                  60

Lys Gly Arg Phe Thr Ile Ser Arg Asp Asp Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Arg Gly Gln Tyr Ser Ser Gly Thr Pro Val Tyr Ala His Glu Tyr
                100                 105                 110

Ala Tyr Trp Gly Gln Gly Thr Gln Val Thr Val Ser Ser
                115                 120                 125

<210> SEQ ID NO 66
<211> LENGTH: 25
<212> TYPE: PRT
<213> ORGANISM: Lama glama

<400> SEQUENCE: 66
```

Glu Val Gln Leu Val Glu Ser Gly Gly Gly Leu Val Gln Ala Gly Gly
1               5                   10                  15

Ser Leu Arg Leu Ser Cys Val Ile Ser
            20                  25

<210> SEQ ID NO 67
<211> LENGTH: 8
<212> TYPE: PRT
<213> ORGANISM: Lama glama

<400> SEQUENCE: 67

Gly Arg Thr Ser Pro Thr Tyr Pro
1               5

<210> SEQ ID NO 68
<211> LENGTH: 17
<212> TYPE: PRT
<213> ORGANISM: Lama glama

<400> SEQUENCE: 68

Met Gly Trp Phe Arg Gln Ser Pro Gly Asn Glu Arg Glu Phe Val Ala
1               5                   10                  15

Ser

<210> SEQ ID NO 69
<211> LENGTH: 8
<212> TYPE: PRT
<213> ORGANISM: Lama glama

<400> SEQUENCE: 69

Ile Asn Trp Ser Gly Gly Trp Arg
1               5

<210> SEQ ID NO 70
<211> LENGTH: 38
<212> TYPE: PRT
<213> ORGANISM: Lama glama

<400> SEQUENCE: 70

Asn Tyr Ala Asp Ser Val Lys Gly Arg Phe Thr Ile Ser Arg Asp Asp
1               5                   10                  15

Ala Lys Asn Thr Val Tyr Leu Gln Met Asn Ser Leu Lys Pro Glu Asp
            20                  25                  30

Thr Ala Val Tyr Tyr Cys
        35

<210> SEQ ID NO 71
<211> LENGTH: 18
<212> TYPE: PRT
<213> ORGANISM: Lama glama

<400> SEQUENCE: 71

Ala Arg Gly Gln Tyr Ser Ser Gly Thr Pro Val Tyr Ala His Glu Tyr
1               5                   10                  15

Ala Tyr

<210> SEQ ID NO 72
<211> LENGTH: 11
<212> TYPE: PRT
<213> ORGANISM: Lama glama

<400> SEQUENCE: 72

Trp Gly Gln Gly Thr Gln Val Thr Val Ser Ser
1               5                   10

<210> SEQ ID NO 73
<211> LENGTH: 117
<212> TYPE: PRT
<213> ORGANISM: Lama glama

<400> SEQUENCE: 73

Glu Val Gln Leu Val Glu Ser Gly Gly Gly Leu Val Gln Pro Gly Gly
1               5                   10                  15

Ser Leu Arg Leu Ser Cys Ala Ala Ser Glu Ser Ile Phe Ser Ile Asn
            20                  25                  30

Tyr Met Ala Trp Tyr Arg Gln Ala Pro Gly Lys Gln Arg Glu Leu Val
        35                  40                  45

Ala Phe Ser Ile Asp Gly Ser Ser Thr Asn Tyr Val Asp Ser Val Arg
    50                  55                  60

Gly Arg Phe Thr Ala Ser Arg Asp Asn Ala Glu Asn Thr Leu Tyr Leu
65                  70                  75                  80

Gln Met Asn Ser Leu Lys Pro Glu Asp Thr Ala Val Tyr Tyr Cys Tyr
                85                  90                  95

Ala Gln Gly Asn Thr Trp Ala Ala Gly Val Trp Gly Gln Gly Thr Gln
            100                 105                 110

Val Thr Val Ser Ser
        115

<210> SEQ ID NO 74
<211> LENGTH: 25
<212> TYPE: PRT
<213> ORGANISM: Lama glama

<400> SEQUENCE: 74

Glu Val Gln Leu Val Glu Ser Gly Gly Gly Leu Val Gln Pro Gly Gly
1               5                   10                  15

Ser Leu Arg Leu Ser Cys Ala Ala Ser
            20                  25

<210> SEQ ID NO 75
<211> LENGTH: 8
<212> TYPE: PRT
<213> ORGANISM: Lama glama

<400> SEQUENCE: 75

Glu Ser Ile Phe Ser Ile Asn Tyr
1               5

<210> SEQ ID NO 76
<211> LENGTH: 17
<212> TYPE: PRT
<213> ORGANISM: Lama glama

<400> SEQUENCE: 76

Met Ala Trp Tyr Arg Gln Ala Pro Gly Lys Gln Arg Glu Leu Val Ala
1               5                   10                  15

Phe

<210> SEQ ID NO 77
<211> LENGTH: 7
<212> TYPE: PRT
<213> ORGANISM: Lama glama

<400> SEQUENCE: 77

Ser Ile Asp Gly Ser Ser Thr
1               5

<210> SEQ ID NO 78
<211> LENGTH: 38
<212> TYPE: PRT
<213> ORGANISM: Lama glama

<400> SEQUENCE: 78

Asn Tyr Val Asp Ser Val Arg Gly Arg Phe Thr Ala Ser Arg Asp Asn
1               5                   10                  15

Ala Glu Asn Thr Leu Tyr Leu Gln Met Asn Ser Leu Lys Pro Glu Asp
            20                  25                  30

Thr Ala Val Tyr Tyr Cys
            35

<210> SEQ ID NO 79
<211> LENGTH: 11
<212> TYPE: PRT
<213> ORGANISM: Lama glama

<400> SEQUENCE: 79

Tyr Ala Gln Gly Asn Thr Trp Ala Ala Gly Val
1               5                   10

<210> SEQ ID NO 80
<211> LENGTH: 11
<212> TYPE: PRT
<213> ORGANISM: Lama glama

<400> SEQUENCE: 80

Trp Gly Gln Gly Thr Gln Val Thr Val Ser Ser
1               5                   10

<210> SEQ ID NO 81
<211> LENGTH: 123
<212> TYPE: PRT
<213> ORGANISM: Lama glama

<400> SEQUENCE: 81

Glu Val Gln Leu Val Glu Ser Gly Gly Gly Leu Val Gln Ala Gly Asp
1               5                   10                  15

Ser Leu Arg Leu Ser Cys Val Val Ser Gly Leu Thr Phe Ser Arg Tyr
            20                  25                  30

Gly Met Gly Trp Phe Arg Gln Ala Thr Gly Lys Glu Arg Glu Phe Val
        35                  40                  45

Gly Gly Ile Ser Val Gly Ser Ser Gly Thr Met Tyr Pro Asn Ser Val
    50                  55                  60

Lys Gly Arg Phe Thr Ile Ser Arg Asp Asn Ala Lys Ser Thr Val Tyr
65                  70                  75                  80

Leu Gln Met Asn Ser Leu Lys Pro Glu Asp Thr Ala Val Tyr Phe Cys
                85                  90                  95

Ala Ala Ile Asp Gln Gly Ser Phe Val Gln Arg Asp Tyr Arg Tyr
            100                 105                 110

Trp Gly Gln Gly Thr Gln Val Thr Val Ser Ser
        115                 120

<210> SEQ ID NO 82

```
<211> LENGTH: 25
<212> TYPE: PRT
<213> ORGANISM: Lama glama

<400> SEQUENCE: 82

Glu Val Gln Leu Val Glu Ser Gly Gly Gly Leu Val Gln Ala Gly Asp
1               5                   10                  15

Ser Leu Arg Leu Ser Cys Val Val Ser
            20                  25

<210> SEQ ID NO 83
<211> LENGTH: 8
<212> TYPE: PRT
<213> ORGANISM: Lama glama

<400> SEQUENCE: 83

Gly Leu Thr Phe Ser Arg Tyr Gly
1               5

<210> SEQ ID NO 84
<211> LENGTH: 16
<212> TYPE: PRT
<213> ORGANISM: Lama glama

<400> SEQUENCE: 84

Met Gly Trp Phe Arg Gln Ala Thr Gly Lys Glu Arg Glu Phe Val Gly
1               5                   10                  15

<210> SEQ ID NO 85
<211> LENGTH: 9
<212> TYPE: PRT
<213> ORGANISM: Lama glama

<400> SEQUENCE: 85

Gly Ile Ser Val Gly Ser Ser Gly Thr
1               5

<210> SEQ ID NO 86
<211> LENGTH: 38
<212> TYPE: PRT
<213> ORGANISM: Lama glama

<400> SEQUENCE: 86

Met Tyr Pro Asn Ser Val Lys Gly Arg Phe Thr Ile Ser Arg Asp Asn
1               5                   10                  15

Ala Lys Ser Thr Val Tyr Leu Gln Met Asn Ser Leu Lys Pro Glu Asp
            20                  25                  30

Thr Ala Val Tyr Phe Cys
        35

<210> SEQ ID NO 87
<211> LENGTH: 16
<212> TYPE: PRT
<213> ORGANISM: Lama glama

<400> SEQUENCE: 87

Ala Ala Ile Asp Gln Gly Ser Phe Val Gln Gln Arg Asp Tyr Arg Tyr
1               5                   10                  15

<210> SEQ ID NO 88
<211> LENGTH: 11
<212> TYPE: PRT
<213> ORGANISM: Lama glama
```

```
-continued

<400> SEQUENCE: 88

Trp Gly Gln Gly Thr Gln Val Thr Val Ser Ser
1               5                  10

<210> SEQ ID NO 89
<211> LENGTH: 123
<212> TYPE: PRT
<213> ORGANISM: Lama glama

<400> SEQUENCE: 89

Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Ala Phe Gly Gly Pro
            20                  25                  30

Tyr Met Ala Trp Phe Arg Gln Thr Pro Gly Lys Gly Arg Glu Phe Val
        35                  40                  45

Ala Ala Ile Ser Pro Ser Ser Val Tyr Thr Phe Tyr Gln Asp Ser Val
    50                  55                  60

Lys Gly Arg Phe Thr Ile Ser Arg Asp Asn Thr Lys Asn Thr Ala Tyr
65                  70                  75                  80

Leu Gln Met Asn Ser Leu Lys Pro Glu Asp Thr Ala Val Tyr Tyr Cys
                85                  90                  95

Ala Ala Glu Ala Ala Gly Glu Val Arg Leu Glu Thr Ser Tyr Lys Tyr
            100                 105                 110

Trp Gly Gln Gly Thr Gln Val Thr Val Ser Ser
        115                 120

<210> SEQ ID NO 90
<211> LENGTH: 25
<212> TYPE: PRT
<213> ORGANISM: Lama glama

<400> SEQUENCE: 90

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 91
<211> LENGTH: 8
<212> TYPE: PRT
<213> ORGANISM: Lama glama

<400> SEQUENCE: 91

Gly Arg Ala Phe Gly Gly Pro Tyr
1               5

<210> SEQ ID NO 92
<211> LENGTH: 17
<212> TYPE: PRT
<213> ORGANISM: Lama glama

<400> SEQUENCE: 92

Met Ala Trp Phe Arg Gln Thr Pro Gly Lys Gly Arg Glu Phe Val Ala
1               5                   10                  15

Ala

<210> SEQ ID NO 93
<211> LENGTH: 8
<212> TYPE: PRT
```

```
<213> ORGANISM: Lama glama

<400> SEQUENCE: 93

Ile Ser Pro Ser Ser Val Tyr Thr
1               5

<210> SEQ ID NO 94
<211> LENGTH: 38
<212> TYPE: PRT
<213> ORGANISM: Lama glama

<400> SEQUENCE: 94

Phe Tyr Gln Asp Ser Val Lys Gly Arg Phe Thr Ile Ser Arg Asp Asn
1               5                   10                  15

Thr Lys Asn Thr Ala Tyr Leu Gln Met Asn Ser Leu Lys Pro Glu Asp
            20                  25                  30

Thr Ala Val Tyr Tyr Cys
        35

<210> SEQ ID NO 95
<211> LENGTH: 16
<212> TYPE: PRT
<213> ORGANISM: Lama glama

<400> SEQUENCE: 95

Ala Ala Glu Ala Ala Gly Glu Val Arg Leu Glu Thr Ser Tyr Lys Tyr
1               5                   10                  15

<210> SEQ ID NO 96
<211> LENGTH: 11
<212> TYPE: PRT
<213> ORGANISM: Lama glama

<400> SEQUENCE: 96

Trp Gly Gln Gly Thr Gln Val Thr Val Ser Ser
1               5                   10

<210> SEQ ID NO 97
<211> LENGTH: 122
<212> TYPE: PRT
<213> ORGANISM: Lama glama

<400> SEQUENCE: 97

Glu Val Gln Leu Val Glu Ser Gly Gly Gly Leu Val Gln Pro Gly Gly
1               5                   10                  15

Ser Leu Arg Leu Ser Cys Ala Ala Ser Gly Leu Thr Phe Val Asn Tyr
            20                  25                  30

Ala Met Gly Trp Phe Arg Gln Ala Pro Gly Lys Glu Arg Glu Leu Val
        35                  40                  45

Ala Gly Ile Ala Ser Ser Gly Arg Ile Tyr Tyr Ala Asp Ser Val Ala
    50                  55                  60

Gly Arg Phe Thr Ile Ser Arg Asp Asn Ala Arg Asn Thr Val Asn Leu
65                  70                  75                  80

Gln Met Asn Ser Met Lys Pro Glu Asp Thr Ala Val Tyr Tyr Cys Ala
                85                  90                  95

Gly Arg Arg Ser Phe Ser Ser Thr Ser Ala Ala Asp Tyr Asn Tyr Trp
            100                 105                 110

Gly Gln Gly Thr Gln Val Thr Val Ser Ser
        115                 120
```

-continued

```
<210> SEQ ID NO 98
<211> LENGTH: 25
<212> TYPE: PRT
<213> ORGANISM: Lama glama

<400> SEQUENCE: 98

Glu Val Gln Leu Val Glu Ser Gly Gly Gly Leu Val Gln Pro Gly Gly
1               5                   10                  15

Ser Leu Arg Leu Ser Cys Ala Ala Ser
            20                  25

<210> SEQ ID NO 99
<211> LENGTH: 8
<212> TYPE: PRT
<213> ORGANISM: Lama glama

<400> SEQUENCE: 99

Gly Leu Thr Phe Val Asn Tyr Ala
1               5

<210> SEQ ID NO 100
<211> LENGTH: 17
<212> TYPE: PRT
<213> ORGANISM: Lama glama

<400> SEQUENCE: 100

Met Gly Trp Phe Arg Gln Ala Pro Gly Lys Glu Arg Glu Leu Val Ala
1               5                   10                  15

Gly

<210> SEQ ID NO 101
<211> LENGTH: 7
<212> TYPE: PRT
<213> ORGANISM: Lama glama

<400> SEQUENCE: 101

Ile Ala Ser Ser Gly Arg Ile
1               5

<210> SEQ ID NO 102
<211> LENGTH: 38
<212> TYPE: PRT
<213> ORGANISM: Lama glama

<400> SEQUENCE: 102

Tyr Tyr Ala Asp Ser Val Ala Gly Arg Phe Thr Ile Ser Arg Asp Asn
1               5                   10                  15

Ala Arg Asn Thr Val Asn Leu Gln Met Asn Ser Met Lys Pro Glu Asp
            20                  25                  30

Thr Ala Val Tyr Tyr Cys
        35

<210> SEQ ID NO 103
<211> LENGTH: 16
<212> TYPE: PRT
<213> ORGANISM: Lama glama

<400> SEQUENCE: 103

Ala Gly Arg Arg Ser Phe Ser Ser Thr Ser Ala Ala Asp Tyr Asn Tyr
1               5                   10                  15

<210> SEQ ID NO 104
<211> LENGTH: 11
```

<212> TYPE: PRT
<213> ORGANISM: Lama glama

<400> SEQUENCE: 104

Trp Gly Gln Gly Thr Gln Val Thr Val Ser Ser
1               5                   10

<210> SEQ ID NO 105
<211> LENGTH: 115
<212> TYPE: PRT
<213> ORGANISM: Lama glama

<400> SEQUENCE: 105

Glu Val Gln Leu Val Glu Ser Gly Gly Gly Leu Leu Gln Ala Gly Gly
1               5                   10                  15

Ser Leu Thr Leu Ser Cys Ala Ala Ser Gly Arg Thr Phe Asn Thr Met
            20                  25                  30

Gly Trp Phe Arg Gln Ala Ser Trp Lys Glu Arg Glu Phe Val Ala Ser
        35                  40                  45

Ile Ala Trp Val Gly Gly Ser Val Phe Lys Ser Asp Ser Thr Lys Gly
    50                  55                  60

Arg Phe Thr Val Ser Gly Asp Asn Ala Lys Asn Thr Val Arg Leu Gln
65                  70                  75                  80

Met Asn Ser Leu Lys Pro Glu Asp Thr Ala Val Tyr Tyr Cys Ala Ala
                85                  90                  95

Arg Ser Gly Gly Thr Phe Asp Val Trp Gly Gln Gly Thr Gln Val Thr
            100                 105                 110

Val Ser Ser
        115

<210> SEQ ID NO 106
<211> LENGTH: 25
<212> TYPE: PRT
<213> ORGANISM: Lama glama

<400> SEQUENCE: 106

Glu Val Gln Leu Val Glu Ser Gly Gly Gly Leu Leu Gln Ala Gly Gly
1               5                   10                  15

Ser Leu Thr Leu Ser Cys Ala Ala Ser
            20                  25

<210> SEQ ID NO 107
<211> LENGTH: 6
<212> TYPE: PRT
<213> ORGANISM: Lama glama

<400> SEQUENCE: 107

Gly Arg Thr Phe Asn Thr
1               5

<210> SEQ ID NO 108
<211> LENGTH: 17
<212> TYPE: PRT
<213> ORGANISM: Lama glama

<400> SEQUENCE: 108

Met Gly Trp Phe Arg Gln Ala Ser Trp Lys Glu Arg Glu Phe Val Ala
1               5                   10                  15

Ser

```
<210> SEQ ID NO 109
<211> LENGTH: 8
<212> TYPE: PRT
<213> ORGANISM: Lama glama

<400> SEQUENCE: 109

Ile Ala Trp Val Gly Gly Ser Val
1               5

<210> SEQ ID NO 110
<211> LENGTH: 38
<212> TYPE: PRT
<213> ORGANISM: Lama glama

<400> SEQUENCE: 110

Phe Lys Ser Asp Ser Thr Lys Gly Arg Phe Thr Val Ser Gly Asp Asn
1               5                   10                  15

Ala Lys Asn Thr Val Arg Leu Gln Met Asn Ser Leu Lys Pro Glu Asp
                20                  25                  30

Thr Ala Val Tyr Tyr Cys
            35

<210> SEQ ID NO 111
<211> LENGTH: 10
<212> TYPE: PRT
<213> ORGANISM: Lama glama

<400> SEQUENCE: 111

Ala Ala Arg Ser Gly Gly Thr Phe Asp Val
1               5                   10

<210> SEQ ID NO 112
<211> LENGTH: 11
<212> TYPE: PRT
<213> ORGANISM: Lama glama

<400> SEQUENCE: 112

Trp Gly Gln Gly Thr Gln Val Thr Val Ser Ser
1               5                   10

<210> SEQ ID NO 113
<211> LENGTH: 125
<212> TYPE: PRT
<213> ORGANISM: Lama glama

<400> SEQUENCE: 113

Glu Val Gln Leu Val Glu Ser Gly Gly Gly Leu Val Gln Ala Gly Gly
1               5                   10                  15

Ser Leu Arg Leu Ser Cys Val Ile Ser Gly Arg Thr Ser Pro Thr Tyr
                20                  25                  30

Pro Met Gly Trp Phe Arg Gln Ser Pro Gly Asn Glu Arg Glu Phe Val
            35                  40                  45

Ala Ser Ile Asn Trp Ser Gly Trp Arg Asn Tyr Ala Asp Ser Val
        50                  55                  60

Lys Asp Arg Phe Thr Ile Ser Arg Asp Asp Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Arg Gly Gln Tyr Ser Ser Gly Thr Pro Val Tyr Ala His Glu Tyr
            100                 105                 110

Ala Tyr Trp Gly Gln Gly Thr Gln Val Thr Val Ser Ser
```

```
<210> SEQ ID NO 114
<211> LENGTH: 25
<212> TYPE: PRT
<213> ORGANISM: Lama glama

<400> SEQUENCE: 114

Glu Val Gln Leu Val Glu Ser Gly Gly Gly Leu Val Gln Ala Gly Gly
1               5                   10                  15

Ser Leu Arg Leu Ser Cys Val Ile Ser
            20                  25

<210> SEQ ID NO 115
<211> LENGTH: 8
<212> TYPE: PRT
<213> ORGANISM: Lama glama

<400> SEQUENCE: 115

Gly Arg Thr Ser Pro Thr Tyr Pro
1               5

<210> SEQ ID NO 116
<211> LENGTH: 17
<212> TYPE: PRT
<213> ORGANISM: Lama glama

<400> SEQUENCE: 116

Met Gly Trp Phe Arg Gln Ser Pro Gly Asn Glu Arg Glu Phe Val Ala
1               5                   10                  15

Ser

<210> SEQ ID NO 117
<211> LENGTH: 8
<212> TYPE: PRT
<213> ORGANISM: Lama glama

<400> SEQUENCE: 117

Ile Asn Trp Ser Gly Gly Trp Arg
1               5

<210> SEQ ID NO 118
<211> LENGTH: 38
<212> TYPE: PRT
<213> ORGANISM: Lama glama

<400> SEQUENCE: 118

Asn Tyr Ala Asp Ser Val Lys Asp Arg Phe Thr Ile Ser Arg Asp Asp
1               5                   10                  15

Ala Lys Asn Thr Val Tyr Leu Gln Met Asn Ser Leu Lys Pro Glu Asp
            20                  25                  30

Thr Ala Val Tyr Tyr Cys
            35

<210> SEQ ID NO 119
<211> LENGTH: 18
<212> TYPE: PRT
<213> ORGANISM: Lama glama

<400> SEQUENCE: 119

Ala Arg Gly Gln Tyr Ser Ser Gly Thr Pro Val Tyr Ala His Glu Tyr
1               5                   10                  15
```

Ala Tyr

<210> SEQ ID NO 120
<211> LENGTH: 11
<212> TYPE: PRT
<213> ORGANISM: Lama glama

<400> SEQUENCE: 120

Trp Gly Gln Gly Thr Gln Val Thr Val Ser Ser
1               5                   10

<210> SEQ ID NO 121
<211> LENGTH: 115
<212> TYPE: PRT
<213> ORGANISM: Lama glama

<400> SEQUENCE: 121

Glu Val Gln Leu Val Glu Ser Gly Gly Gly Leu Val Gln Pro Gly Gly
1               5                   10                  15

Ser Leu Arg Leu Ser Cys Val Val Ser Gly Ser Ser Phe Ser Ser Tyr
            20                  25                  30

Thr Met Gly Trp Phe Arg Arg Ala Pro Gly Lys Gln Arg Glu Leu Val
        35                  40                  45

Ala Gly Val Ser Thr Val Gly Asp Thr Ala Ala Asp Ser Val Lys
    50                  55                  60

Gly Arg Phe Thr Ile Ser Arg Asp Asn Ala Lys Asn Thr Val Tyr Leu
65                  70                  75                  80

Gln Met Asn Ser Leu Lys Pro Glu Asp Thr Ala Val Tyr Tyr Cys Asn
                85                  90                  95

Thr Tyr Pro His Ala Tyr Leu Glu Trp Gly Gln Gly Thr Gln Val Thr
            100                 105                 110

Val Ser Ser
        115

<210> SEQ ID NO 122
<211> LENGTH: 25
<212> TYPE: PRT
<213> ORGANISM: Lama glama

<400> SEQUENCE: 122

Glu Val Gln Leu Val Glu Ser Gly Gly Gly Leu Val Gln Pro Gly Gly
1               5                   10                  15

Ser Leu Arg Leu Ser Cys Val Val Ser
            20                  25

<210> SEQ ID NO 123
<211> LENGTH: 8
<212> TYPE: PRT
<213> ORGANISM: Lama glama

<400> SEQUENCE: 123

Gly Ser Ser Phe Ser Ser Tyr Thr
1               5

<210> SEQ ID NO 124
<211> LENGTH: 17
<212> TYPE: PRT
<213> ORGANISM: Lama glama

<400> SEQUENCE: 124

Met Gly Trp Phe Arg Arg Ala Pro Gly Lys Gln Arg Glu Leu Val Ala

-continued

```
1               5                   10                  15

Gly

<210> SEQ ID NO 125
<211> LENGTH: 7
<212> TYPE: PRT
<213> ORGANISM: Lama glama

<400> SEQUENCE: 125

Val Ser Thr Val Gly Asp Thr
1               5

<210> SEQ ID NO 126
<211> LENGTH: 38
<212> TYPE: PRT
<213> ORGANISM: Lama glama

<400> SEQUENCE: 126

Ala Ala Ala Asp Ser Val Lys Gly Arg Phe Thr Ile Ser Arg Asp Asn
1               5                   10                  15

Ala Lys Asn Thr Val Tyr Leu Gln Met Asn Ser Leu Lys Pro Glu Asp
            20                  25                  30

Thr Ala Val Tyr Tyr Cys
        35

<210> SEQ ID NO 127
<211> LENGTH: 9
<212> TYPE: PRT
<213> ORGANISM: Lama glama

<400> SEQUENCE: 127

Asn Thr Tyr Pro His Ala Tyr Leu Glu
1               5

<210> SEQ ID NO 128
<211> LENGTH: 11
<212> TYPE: PRT
<213> ORGANISM: Lama glama

<400> SEQUENCE: 128

Trp Gly Gln Gly Thr Gln Val Thr Val Ser Ser
1               5                   10

<210> SEQ ID NO 129
<211> LENGTH: 115
<212> TYPE: PRT
<213> ORGANISM: Lama glama

<400> SEQUENCE: 129

Glu Val Gln Leu Val Glu Ser Gly Gly Gly Leu Val Gln Ala Gly Gly
1               5                   10                  15

Ser Leu Thr Leu Ser Cys Ala Ala Ser Gly Arg Thr Phe Asn Thr Met
            20                  25                  30

Gly Trp Phe Arg Gln Ala Pro Gly Lys Glu Arg Glu Phe Val Ala Ser
        35                  40                  45

Ile Ala Trp Val Gly Gly Ser Val Phe Lys Ser Asp Thr Lys Gly
    50                  55                  60

Arg Phe Thr Val Ser Gly Asp Asn Ala Lys Asn Thr Val Arg Leu Gln
65                  70                  75                  80

Met Asn Ser Leu Lys Pro Glu Asp Thr Ala Val Tyr Tyr Cys Ala Ala
                85                  90                  95
```

```
Arg Ser Gly Gly Thr Phe Asp Val Trp Gly Gln Gly Thr Gln Val Thr
            100                 105                 110
Val Ser Ser
        115

<210> SEQ ID NO 130
<211> LENGTH: 25
<212> TYPE: PRT
<213> ORGANISM: Lama glama

<400> SEQUENCE: 130

Glu Val Gln Leu Val Glu Ser Gly Gly Gly Leu Val Gln Ala Gly Gly
1               5                   10                  15
Ser Leu Thr Leu Ser Cys Ala Ala Ser
            20                  25

<210> SEQ ID NO 131
<211> LENGTH: 6
<212> TYPE: PRT
<213> ORGANISM: Lama glama

<400> SEQUENCE: 131

Gly Arg Thr Phe Asn Thr
1               5

<210> SEQ ID NO 132
<211> LENGTH: 17
<212> TYPE: PRT
<213> ORGANISM: Lama glama

<400> SEQUENCE: 132

Met Gly Trp Phe Arg Gln Ala Pro Gly Lys Glu Arg Glu Phe Val Ala
1               5                   10                  15
Ser

<210> SEQ ID NO 133
<211> LENGTH: 8
<212> TYPE: PRT
<213> ORGANISM: Lama glama

<400> SEQUENCE: 133

Ile Ala Trp Val Gly Gly Ser Val
1               5

<210> SEQ ID NO 134
<211> LENGTH: 38
<212> TYPE: PRT
<213> ORGANISM: Lama glama

<400> SEQUENCE: 134

Phe Lys Ser Asp Ser Thr Lys Gly Arg Phe Thr Val Ser Gly Asp Asn
1               5                   10                  15
Ala Lys Asn Thr Val Arg Leu Gln Met Asn Ser Leu Lys Pro Glu Asp
            20                  25                  30
Thr Ala Val Tyr Tyr Cys
        35

<210> SEQ ID NO 135
<211> LENGTH: 10
<212> TYPE: PRT
<213> ORGANISM: Lama glama
```

<400> SEQUENCE: 135

Ala Ala Arg Ser Gly Gly Thr Phe Asp Val
1               5                   10

<210> SEQ ID NO 136
<211> LENGTH: 11
<212> TYPE: PRT
<213> ORGANISM: Lama glama

<400> SEQUENCE: 136

Trp Gly Gln Gly Thr Gln Val Thr Val Ser Ser
1               5                   10

<210> SEQ ID NO 137
<211> LENGTH: 125
<212> TYPE: PRT
<213> ORGANISM: Lama glama

<400> SEQUENCE: 137

Glu Val Gln Leu Val Glu Ser Gly Gly Glu Leu Val Gln Ala Gly Gly
1               5                   10                  15

Ser Leu Arg Leu Ser Cys Ala Val Ser Gly Arg Thr Leu Thr Ser Tyr
            20                  25                  30

Pro Met Gly Trp Phe Arg Gln Ala Pro Gly Lys Glu Arg Glu Phe Val
        35                  40                  45

Ala Ala Ile Ser Trp Ser Gly Gly Asp Thr Met Tyr Ala Asp Ser Val
    50                  55                  60

Lys Gly Arg Phe Thr Ile Ser Arg Asp Asn Ser Lys Asn Thr Val Tyr
65                  70                  75                  80

Leu Gln Met Asn Ser Leu Lys Pro Glu Asp Thr Ala Asp Tyr Tyr Cys
                85                  90                  95

Ala Arg Arg Arg Tyr Ser Ser Gly Ile Ser Arg His Leu Val Asp Tyr
            100                 105                 110

Glu Tyr Trp Gly Gln Gly Thr Gln Val Thr Val Ser Ser
        115                 120                 125

<210> SEQ ID NO 138
<211> LENGTH: 25
<212> TYPE: PRT
<213> ORGANISM: Lama glama

<400> SEQUENCE: 138

Glu Val Gln Leu Val Glu Ser Gly Gly Glu Leu Val Gln Ala Gly Gly
1               5                   10                  15

Ser Leu Arg Leu Ser Cys Ala Val Ser
            20                  25

<210> SEQ ID NO 139
<211> LENGTH: 8
<212> TYPE: PRT
<213> ORGANISM: Lama glama

<400> SEQUENCE: 139

Gly Arg Thr Leu Thr Ser Tyr Pro
1               5

<210> SEQ ID NO 140
<211> LENGTH: 17
<212> TYPE: PRT
<213> ORGANISM: Lama glama

-continued

```
<400> SEQUENCE: 140

Met Gly Trp Phe Arg Gln Ala Pro Gly Lys Glu Arg Glu Phe Val Ala
1               5                   10                  15

Ala

<210> SEQ ID NO 141
<211> LENGTH: 8
<212> TYPE: PRT
<213> ORGANISM: Lama glama

<400> SEQUENCE: 141

Ile Ser Trp Ser Gly Gly Asp Thr
1               5

<210> SEQ ID NO 142
<211> LENGTH: 38
<212> TYPE: PRT
<213> ORGANISM: Lama glama

<400> SEQUENCE: 142

Met Tyr Ala Asp Ser Val Lys Gly Arg Phe Thr Ile Ser Arg Asp Asn
1               5                   10                  15

Ser Lys Asn Thr Val Tyr Leu Gln Met Asn Ser Leu Lys Pro Glu Asp
            20                  25                  30

Thr Ala Asp Tyr Tyr Cys
            35

<210> SEQ ID NO 143
<211> LENGTH: 18
<212> TYPE: PRT
<213> ORGANISM: Lama glama

<400> SEQUENCE: 143

Ala Arg Arg Arg Tyr Ser Ser Gly Ile Ser Arg His Leu Val Asp Tyr
1               5                   10                  15

Glu Tyr

<210> SEQ ID NO 144
<211> LENGTH: 11
<212> TYPE: PRT
<213> ORGANISM: Lama glama

<400> SEQUENCE: 144

Trp Gly Gln Gly Thr Gln Val Thr Val Ser Ser
1               5                   10

<210> SEQ ID NO 145
<211> LENGTH: 121
<212> TYPE: PRT
<213> ORGANISM: Lama glama

<400> SEQUENCE: 145

Glu Val Gln Leu Val Glu Ser Gly Gly Gly Leu Val Gln Pro Gly Gly
1               5                   10                  15

Ser Leu Arg Leu Ser Cys Ala Ala Ser Glu Ser Ile Phe Ser Ile Asn
            20                  25                  30

Ala Met Gly Trp Tyr Arg Gln Thr Pro Gly Lys Gln Arg Glu Met Val
        35                  40                  45

Ala Ser Ile Thr Pro Gly Gly Phe Thr Ile Tyr Ala Asp Ser Val Lys
    50                  55                  60
```

Gly Arg Phe Thr Ile Ser Arg Asp Asn Ala Lys Asn Thr Leu Tyr Leu
65                  70                  75                  80

Gln Met Asn Asn Leu Arg Phe Glu Asp Thr Ala Val Tyr Tyr Cys Asn
                85                  90                  95

Ala Phe Ala Gly Ser Ala Thr Ser Tyr His Asp Phe Gly Ser Trp Gly
            100                 105                 110

Gln Gly Thr Gln Val Thr Val Ser Ser
            115                 120

<210> SEQ ID NO 146
<211> LENGTH: 25
<212> TYPE: PRT
<213> ORGANISM: Lama glama

<400> SEQUENCE: 146

Glu Val Gln Leu Val Glu Ser Gly Gly Gly Leu Val Gln Pro Gly Gly
1               5                   10                  15

Ser Leu Arg Leu Ser Cys Ala Ala Ser
            20                  25

<210> SEQ ID NO 147
<211> LENGTH: 8
<212> TYPE: PRT
<213> ORGANISM: Lama glama

<400> SEQUENCE: 147

Glu Ser Ile Phe Ser Ile Asn Ala
1               5

<210> SEQ ID NO 148
<211> LENGTH: 17
<212> TYPE: PRT
<213> ORGANISM: Lama glama

<400> SEQUENCE: 148

Met Gly Trp Tyr Arg Gln Thr Pro Gly Lys Gln Arg Glu Met Val Ala
1               5                   10                  15

Ser

<210> SEQ ID NO 149
<211> LENGTH: 7
<212> TYPE: PRT
<213> ORGANISM: Lama glama

<400> SEQUENCE: 149

Ile Thr Pro Gly Gly Phe Thr
1               5

<210> SEQ ID NO 150
<211> LENGTH: 38
<212> TYPE: PRT
<213> ORGANISM: Lama glama

<400> SEQUENCE: 150

Ile Tyr Ala Asp Ser Val Lys Gly Arg Phe Thr Ile Ser Arg Asp Asn
1               5                   10                  15

Ala Lys Asn Thr Leu Tyr Leu Gln Met Asn Asn Leu Arg Phe Glu Asp
            20                  25                  30

Thr Ala Val Tyr Tyr Cys
            35

-continued

```
<210> SEQ ID NO 151
<211> LENGTH: 15
<212> TYPE: PRT
<213> ORGANISM: Lama glama

<400> SEQUENCE: 151

Asn Ala Phe Ala Gly Ser Ala Thr Ser Tyr His Asp Phe Gly Ser
1               5                   10                  15

<210> SEQ ID NO 152
<211> LENGTH: 11
<212> TYPE: PRT
<213> ORGANISM: Lama glama

<400> SEQUENCE: 152

Trp Gly Gln Gly Thr Gln Val Thr Val Ser Ser
1               5                   10

<210> SEQ ID NO 153
<211> LENGTH: 122
<212> TYPE: PRT
<213> ORGANISM: Lama glama

<400> SEQUENCE: 153

Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Ser Phe Ser Ser Ser
            20                  25                  30

Val Met Gly Trp Phe Arg Gln Thr Pro Gly Lys Glu Arg Glu Phe Val
        35                  40                  45

Ala Ala Thr Arg Trp Thr Ala Ala Ser Thr His Tyr Ala Asp Ser Val
    50                  55                  60

Lys Gly Arg Phe Thr Ile Ser Arg Asp His Ala Glu Asn Ala Val Phe
65                  70                  75                  80

Leu Gln Met Asn Ser Leu Lys Pro Glu Asp Thr Ala Val Tyr Tyr Cys
                85                  90                  95

Ala Ala Gly Asn Tyr Leu Asp Thr Ala Gln Tyr Arg Tyr Asn Tyr Trp
            100                 105                 110

Gly Gln Gly Thr Gln Val Thr Val Ser Ser
        115                 120

<210> SEQ ID NO 154
<211> LENGTH: 25
<212> TYPE: PRT
<213> ORGANISM: Lama glama

<400> SEQUENCE: 154

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 155
<211> LENGTH: 8
<212> TYPE: PRT
<213> ORGANISM: Lama glama

<400> SEQUENCE: 155

Gly Arg Ser Phe Ser Ser Ser Val
1               5
```

```
<210> SEQ ID NO 156
<211> LENGTH: 17
<212> TYPE: PRT
<213> ORGANISM: Lama glama

<400> SEQUENCE: 156

Met Gly Trp Phe Arg Gln Thr Pro Gly Lys Glu Arg Glu Phe Val Ala
1               5                   10                  15

Ala

<210> SEQ ID NO 157
<211> LENGTH: 8
<212> TYPE: PRT
<213> ORGANISM: Lama glama

<400> SEQUENCE: 157

Thr Arg Trp Thr Ala Ala Ser Thr
1               5

<210> SEQ ID NO 158
<211> LENGTH: 38
<212> TYPE: PRT
<213> ORGANISM: Lama glama

<400> SEQUENCE: 158

His Tyr Ala Asp Ser Val Lys Gly Arg Phe Thr Ile Ser Arg Asp His
1               5                   10                  15

Ala Glu Asn Ala Val Phe Leu Gln Met Asn Ser Leu Lys Pro Glu Asp
                20                  25                  30

Thr Ala Val Tyr Tyr Cys
            35

<210> SEQ ID NO 159
<211> LENGTH: 15
<212> TYPE: PRT
<213> ORGANISM: Lama glama

<400> SEQUENCE: 159

Ala Ala Gly Asn Tyr Leu Asp Thr Ala Gln Tyr Arg Tyr Asn Tyr
1               5                   10                  15

<210> SEQ ID NO 160
<211> LENGTH: 11
<212> TYPE: PRT
<213> ORGANISM: Lama glama

<400> SEQUENCE: 160

Trp Gly Gln Gly Thr Gln Val Thr Val Ser Ser
1               5                   10

<210> SEQ ID NO 161
<211> LENGTH: 124
<212> TYPE: PRT
<213> ORGANISM: Lama glama

<400> SEQUENCE: 161

Glu Val Gln Leu Val Glu Ser Gly Gly Gly Leu Val Gln Ile Gly Asp
1               5                   10                  15

Ser Leu Arg Leu Ser Cys Ala Ala Ser Gly Gly Thr Phe Asn Arg Tyr
                20                  25                  30

Gly Met Gly Trp Phe Arg Gln Ala Pro Gly Lys Glu Arg Glu Phe Val
            35                  40                  45
```

Ala Ala Ile Arg Trp Asp Gly Val Asp Thr Asn Tyr Ala Asp Phe Val
            50                  55                  60

Lys Gly Arg Phe Thr Ile Ser Arg Tyr Asn Ala Lys Asn Thr Ala Tyr
 65                  70                  75                  80

Leu Gln Met Asn Ser Leu Lys Pro Glu Asp Thr Ala Val Tyr Tyr Cys
                 85                  90                  95

Ala Ala Asp Arg Arg Gly Leu Tyr Thr Lys His Ala His Arg Tyr Asp
            100                 105                 110

Tyr Trp Gly Gln Gly Thr Gln Val Thr Val Ser Ser
            115                 120

<210> SEQ ID NO 162
<211> LENGTH: 25
<212> TYPE: PRT
<213> ORGANISM: Lama glama

<400> SEQUENCE: 162

Glu Val Gln Leu Val Glu Ser Gly Gly Gly Leu Val Gln Ile Gly Asp
 1               5                  10                  15

Ser Leu Arg Leu Ser Cys Ala Ala Ser
             20                  25

<210> SEQ ID NO 163
<211> LENGTH: 8
<212> TYPE: PRT
<213> ORGANISM: Lama glama

<400> SEQUENCE: 163

Gly Gly Thr Phe Asn Arg Tyr Gly
 1               5

<210> SEQ ID NO 164
<211> LENGTH: 17
<212> TYPE: PRT
<213> ORGANISM: Lama glama

<400> SEQUENCE: 164

Met Gly Trp Phe Arg Gln Ala Pro Gly Lys Glu Arg Glu Phe Val Ala
 1               5                  10                  15

Ala

<210> SEQ ID NO 165
<211> LENGTH: 8
<212> TYPE: PRT
<213> ORGANISM: Lama glama

<400> SEQUENCE: 165

Ile Arg Trp Asp Gly Val Asp Thr
 1               5

<210> SEQ ID NO 166
<211> LENGTH: 38
<212> TYPE: PRT
<213> ORGANISM: Lama glama

<400> SEQUENCE: 166

Asn Tyr Ala Asp Phe Val Lys Gly Arg Phe Thr Ile Ser Arg Tyr Asn
 1               5                  10                  15

Ala Lys Asn Thr Ala Tyr Leu Gln Met Asn Ser Leu Lys Pro Glu Asp
             20                  25                  30

Thr Ala Val Tyr Tyr Cys

```
<210> SEQ ID NO 167
<211> LENGTH: 17
<212> TYPE: PRT
<213> ORGANISM: Lama glama

<400> SEQUENCE: 167

Ala Ala Asp Arg Arg Gly Leu Tyr Thr Lys His Ala His Arg Tyr Asp
1               5                   10                  15

Tyr

<210> SEQ ID NO 168
<211> LENGTH: 11
<212> TYPE: PRT
<213> ORGANISM: Lama glama

<400> SEQUENCE: 168

Trp Gly Gln Gly Thr Gln Val Thr Val Ser Ser
1               5                   10

<210> SEQ ID NO 169
<211> LENGTH: 113
<212> TYPE: PRT
<213> ORGANISM: Lama glama

<400> SEQUENCE: 169

Glu Val Gln Leu Val Glu Ser Gly Gly Gly Leu Val Gln Ala Gly Gly
1               5                   10                  15

Ser Leu Arg Leu Ser Cys Ala Ala Ser Gly Ser Ile Val Ser Phe Asn
            20                  25                  30

Gly Ile Asn Trp Tyr Arg Gln Ala Pro Gly Lys Gln Arg Glu Trp Val
        35                  40                  45

Gly Gly Ile Thr Gln Gly Gly Asn Thr Met Tyr Ala Asp Ser Val Arg
    50                  55                  60

Gly Arg Phe Thr Ile Ser Arg Asp Asn Thr Lys Asn Thr Met Tyr Leu
65                  70                  75                  80

Gln Met Asn Ser Leu Lys Pro Glu Asp Thr Ala Val Tyr Tyr Cys Arg
                85                  90                  95

Arg Pro Pro Val Ala Ser Trp Gly Gln Gly Thr Gln Val Thr Val Ser
            100                 105                 110

Ser

<210> SEQ ID NO 170
<211> LENGTH: 25
<212> TYPE: PRT
<213> ORGANISM: Lama glama

<400> SEQUENCE: 170

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 171
<211> LENGTH: 8
<212> TYPE: PRT
<213> ORGANISM: Lama glama

<400> SEQUENCE: 171
```

```
Gly Ser Ile Val Ser Phe Asn Gly
1               5
```

<210> SEQ ID NO 172
<211> LENGTH: 17
<212> TYPE: PRT
<213> ORGANISM: Lama glama

<400> SEQUENCE: 172

```
Ile Asn Trp Tyr Arg Gln Ala Pro Gly Lys Gln Arg Glu Trp Val Gly
1               5                   10                  15

Gly
```

<210> SEQ ID NO 173
<211> LENGTH: 7
<212> TYPE: PRT
<213> ORGANISM: Lama glama

<400> SEQUENCE: 173

```
Ile Thr Gln Gly Gly Asn Thr
1               5
```

<210> SEQ ID NO 174
<211> LENGTH: 38
<212> TYPE: PRT
<213> ORGANISM: Lama glama

<400> SEQUENCE: 174

```
Met Tyr Ala Asp Ser Val Arg Gly Arg Phe Thr Ile Ser Arg Asp Asn
1               5                   10                  15

Thr Lys Asn Thr Met Tyr Leu Gln Met Asn Ser Leu Lys Pro Glu Asp
            20                  25                  30

Thr Ala Val Tyr Tyr Cys
            35
```

<210> SEQ ID NO 175
<211> LENGTH: 7
<212> TYPE: PRT
<213> ORGANISM: Lama glama

<400> SEQUENCE: 175

```
Arg Arg Pro Pro Val Ala Ser
1               5
```

<210> SEQ ID NO 176
<211> LENGTH: 11
<212> TYPE: PRT
<213> ORGANISM: Lama glama

<400> SEQUENCE: 176

```
Trp Gly Gln Gly Thr Gln Val Thr Val Ser Ser
1               5                   10
```

<210> SEQ ID NO 177
<211> LENGTH: 122
<212> TYPE: PRT
<213> ORGANISM: Lama glama

<400> SEQUENCE: 177

```
Glu Val Gln Leu Val Glu Ser Gly Gly Gly Leu Val Gln Ala Gly Asp
1               5                   10                  15

Ser Leu Arg Leu Ser Cys Thr Val Ser Gly Arg Thr Phe Asn Thr Tyr
            20                  25                  30
```

```
Val Thr Gly Trp Phe Arg Gln Ala Pro Gly Lys Glu Arg Glu Phe Val
        35                  40                  45

Ala Ala Ile His Gln Ile Gly Ser Thr Tyr Tyr Arg Asn Ser Val Lys
    50                  55                  60

Gly Arg Phe Thr Ile Ser Arg Asp Gly Ala Lys Asp Thr Val Tyr Leu
65                  70                  75                  80

Gln Met Asn Asn Leu Lys Pro Glu Asp Ser Ala Val Tyr Tyr Cys Ala
                85                  90                  95

Ala Gly Asn Gly Gly Tyr Val Met Ser Asp Ile Ala Tyr Gly Thr Trp
            100                 105                 110

Gly Gln Gly Thr Gln Val Thr Val Ser Ser
            115                 120

<210> SEQ ID NO 178
<211> LENGTH: 25
<212> TYPE: PRT
<213> ORGANISM: Lama glama

<400> SEQUENCE: 178

Glu Val Gln Leu Val Glu Ser Gly Gly Gly Leu Val Gln Ala Gly Asp
1               5                   10                  15

Ser Leu Arg Leu Ser Cys Thr Val Ser
            20                  25

<210> SEQ ID NO 179
<211> LENGTH: 8
<212> TYPE: PRT
<213> ORGANISM: Lama glama

<400> SEQUENCE: 179

Gly Arg Thr Phe Asn Thr Tyr Val
1               5

<210> SEQ ID NO 180
<211> LENGTH: 17
<212> TYPE: PRT
<213> ORGANISM: Lama glama

<400> SEQUENCE: 180

Thr Gly Trp Phe Arg Gln Ala Pro Gly Lys Glu Arg Glu Phe Val Ala
1               5                   10                  15

Ala

<210> SEQ ID NO 181
<211> LENGTH: 7
<212> TYPE: PRT
<213> ORGANISM: Lama glama

<400> SEQUENCE: 181

Ile His Gln Ile Gly Ser Thr
1               5

<210> SEQ ID NO 182
<211> LENGTH: 38
<212> TYPE: PRT
<213> ORGANISM: Lama glama

<400> SEQUENCE: 182

Tyr Tyr Arg Asn Ser Val Lys Gly Arg Phe Thr Ile Ser Arg Asp Gly
1               5                   10                  15
```

Ala Lys Asp Thr Val Tyr Leu Gln Met Asn Asn Leu Lys Pro Glu Asp
            20                  25                  30

Ser Ala Val Tyr Tyr Cys
            35

<210> SEQ ID NO 183
<211> LENGTH: 16
<212> TYPE: PRT
<213> ORGANISM: Lama glama

<400> SEQUENCE: 183

Ala Ala Gly Asn Gly Gly Tyr Val Met Ser Asp Ile Ala Tyr Gly Thr
1               5                   10                  15

<210> SEQ ID NO 184
<211> LENGTH: 11
<212> TYPE: PRT
<213> ORGANISM: Lama glama

<400> SEQUENCE: 184

Trp Gly Gln Gly Thr Gln Val Thr Val Ser Ser
1               5                   10

<210> SEQ ID NO 185
<211> LENGTH: 124
<212> TYPE: PRT
<213> ORGANISM: Lama glama

<400> SEQUENCE: 185

Glu Val Gln Leu Val Glu Ser Gly Gly Gly Leu Val Gln Ala Gly Gly
1               5                   10                  15

Ser Leu Arg Leu Ser Cys Ala Ala Ser Arg Gly Thr Phe Gly Thr Asp
            20                  25                  30

Ile Met Gly Trp Phe Arg Gln Ala Pro Gly Lys Glu Arg Glu Phe Val
        35                  40                  45

Ala Ala Ile Ser Trp Arg Gly Ala Asn Thr Tyr Tyr Gly Tyr Ser Val
    50                  55                  60

Lys Gly Arg Phe Thr Ile Ser Arg Asp Asn Ala Lys Asn Thr Met Tyr
65                  70                  75                  80

Leu Gln Met Ala Asp Leu Lys Pro Glu Asp Thr Ala Asp Tyr Tyr Cys
                85                  90                  95

Gly Val His Leu Asn Gly Thr Pro Tyr Tyr Ala Ser Gly Tyr Arg
            100                 105                 110

Tyr Trp Gly Gln Gly Thr Gln Val Thr Val Ser Ser
            115                 120

<210> SEQ ID NO 186
<211> LENGTH: 24
<212> TYPE: PRT
<213> ORGANISM: Lama glama

<400> SEQUENCE: 186

Glu Val Gln Leu Val Glu Ser Gly Gly Gly Leu Val Gln Ala Gly Gly
1               5                   10                  15

Ser Leu Arg Leu Ser Cys Ala Ala
            20

<210> SEQ ID NO 187
<211> LENGTH: 9
<212> TYPE: PRT
<213> ORGANISM: Lama glama

```
<400> SEQUENCE: 187

Ser Arg Gly Thr Phe Gly Thr Asp Ile
1               5

<210> SEQ ID NO 188
<211> LENGTH: 17
<212> TYPE: PRT
<213> ORGANISM: Lama glama

<400> SEQUENCE: 188

Met Gly Trp Phe Arg Gln Ala Pro Gly Lys Glu Arg Glu Phe Val Ala
1               5                   10                  15

Ala

<210> SEQ ID NO 189
<211> LENGTH: 8
<212> TYPE: PRT
<213> ORGANISM: Lama glama

<400> SEQUENCE: 189

Ile Ser Trp Arg Gly Ala Asn Thr
1               5

<210> SEQ ID NO 190
<211> LENGTH: 38
<212> TYPE: PRT
<213> ORGANISM: Lama glama

<400> SEQUENCE: 190

Tyr Tyr Gly Tyr Ser Val Lys Gly Arg Phe Thr Ile Ser Arg Asp Asn
1               5                   10                  15

Ala Lys Asn Thr Met Tyr Leu Gln Met Ala Asp Leu Lys Pro Glu Asp
            20                  25                  30

Thr Ala Asp Tyr Tyr Cys
        35

<210> SEQ ID NO 191
<211> LENGTH: 17
<212> TYPE: PRT
<213> ORGANISM: Lama glama

<400> SEQUENCE: 191

Gly Val His Leu Asn Gly Thr Pro Tyr Tyr Tyr Ala Ser Gly Tyr Arg
1               5                   10                  15

Tyr

<210> SEQ ID NO 192
<211> LENGTH: 11
<212> TYPE: PRT
<213> ORGANISM: Lama glama

<400> SEQUENCE: 192

Trp Gly Gln Gly Thr Gln Val Thr Val Ser Ser
1               5                   10

<210> SEQ ID NO 193
<211> LENGTH: 124
<212> TYPE: PRT
<213> ORGANISM: Lama glama

<400> SEQUENCE: 193
```

Glu Val Gln Leu Val Glu Ser Gly Gly Gly Leu Val Gln Ala Gly Gly
1               5                   10                  15

Ser Leu Arg Leu Ser Cys Ala Ala Ser Arg Gly Thr Phe Gly Thr Tyr
            20                  25                  30

Ile Met Gly Trp Phe Arg Gln Ala Pro Gly Lys Glu Arg Glu Phe Val
        35                  40                  45

Ala Ala Ile Ser Trp Arg Gly Ala Asn Thr Tyr Tyr Gly Tyr Ser Val
    50                  55                  60

Lys Gly Arg Phe Thr Ile Ser Arg Asp Asn Ala Lys Asn Thr Met Tyr
65                  70                  75                  80

Leu Gln Met Ala Asp Leu Lys Pro Glu Asp Thr Ala Asp Tyr Tyr Cys
                85                  90                  95

Gly Val His Leu Asn Gly Thr Pro Tyr Tyr Tyr Ala Ser Gly Tyr Arg
            100                 105                 110

Tyr Trp Gly Gln Gly Thr Gln Val Thr Val Ser Ser
            115                 120

<210> SEQ ID NO 194
<211> LENGTH: 25
<212> TYPE: PRT
<213> ORGANISM: Lama glama

<400> SEQUENCE: 194

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 195
<211> LENGTH: 8
<212> TYPE: PRT
<213> ORGANISM: Lama glama

<400> SEQUENCE: 195

Arg Gly Thr Phe Gly Thr Tyr Ile
1               5

<210> SEQ ID NO 196
<211> LENGTH: 17
<212> TYPE: PRT
<213> ORGANISM: Lama glama

<400> SEQUENCE: 196

Met Gly Trp Phe Arg Gln Ala Pro Gly Lys Glu Arg Glu Phe Val Ala
1               5                   10                  15

Ala

<210> SEQ ID NO 197
<211> LENGTH: 8
<212> TYPE: PRT
<213> ORGANISM: Lama glama

<400> SEQUENCE: 197

Ile Ser Trp Arg Gly Ala Asn Thr
1               5

<210> SEQ ID NO 198
<211> LENGTH: 38
<212> TYPE: PRT
<213> ORGANISM: Lama glama

-continued

```
<400> SEQUENCE: 198

Tyr Tyr Gly Tyr Ser Val Lys Gly Arg Phe Thr Ile Ser Arg Asp Asn
1               5                   10                  15

Ala Lys Asn Thr Met Tyr Leu Gln Met Ala Asp Leu Lys Pro Glu Asp
            20                  25                  30

Thr Ala Asp Tyr Tyr Cys
            35

<210> SEQ ID NO 199
<211> LENGTH: 17
<212> TYPE: PRT
<213> ORGANISM: Lama glama

<400> SEQUENCE: 199

Gly Val His Leu Asn Gly Thr Pro Tyr Tyr Tyr Ala Ser Gly Tyr Arg
1               5                   10                  15

Tyr

<210> SEQ ID NO 200
<211> LENGTH: 11
<212> TYPE: PRT
<213> ORGANISM: Lama glama

<400> SEQUENCE: 200

Trp Gly Gln Gly Thr Gln Val Thr Val Ser Ser
1               5                   10

<210> SEQ ID NO 201
<211> LENGTH: 118
<212> TYPE: PRT
<213> ORGANISM: Lama glama

<400> SEQUENCE: 201

Glu Val Gln Leu Val Glu Ser Gly Gly Gly Thr Val Gln Ala Gly Asp
1               5                   10                  15

Ser Leu Arg Leu Ser Cys Thr Ala Ser Gly Arg Thr Phe Ser Thr Tyr
            20                  25                  30

Thr Met Gly Trp Phe Arg Gln Ala Pro Gly Lys Glu Arg Val Val Val
        35                  40                  45

Ala Val Asn Thr Trp Asn Asn Phe Thr Val His Gln Pro Ser Val Lys
    50                  55                  60

Gly Arg Phe Thr Met Ser Arg Asp Asn Thr Lys Asn Ser Ile Tyr Leu
65                  70                  75                  80

Gln Met Asp Ser Leu Lys Pro Glu Asp Thr Ala Val Tyr Tyr Cys Ala
                85                  90                  95

Ala Ser Ala Lys Gly Thr Ala Arg Tyr Asp Tyr Trp Gly Gln Gly Thr
            100                 105                 110

Gln Val Thr Val Ser Ser
        115

<210> SEQ ID NO 202
<211> LENGTH: 25
<212> TYPE: PRT
<213> ORGANISM: Lama glama

<400> SEQUENCE: 202

Glu Val Gln Leu Val Glu Ser Gly Gly Gly Thr Val Gln Ala Gly Asp
1               5                   10                  15

Ser Leu Arg Leu Ser Cys Thr Ala Ser
            20                  25
```

<210> SEQ ID NO 203
<211> LENGTH: 8
<212> TYPE: PRT
<213> ORGANISM: Lama glama

<400> SEQUENCE: 203

Gly Arg Thr Phe Ser Thr Tyr Thr
1               5

<210> SEQ ID NO 204
<211> LENGTH: 17
<212> TYPE: PRT
<213> ORGANISM: Lama glama

<400> SEQUENCE: 204

Met Gly Trp Phe Arg Gln Ala Pro Gly Lys Glu Arg Val Val Val Ala
1               5                   10                  15

Val

<210> SEQ ID NO 205
<211> LENGTH: 7
<212> TYPE: PRT
<213> ORGANISM: Lama glama

<400> SEQUENCE: 205

Asn Thr Trp Asn Asn Phe Thr
1               5

<210> SEQ ID NO 206
<211> LENGTH: 38
<212> TYPE: PRT
<213> ORGANISM: Lama glama

<400> SEQUENCE: 206

Val His Gln Pro Ser Val Lys Gly Arg Phe Thr Met Ser Arg Asp Asn
1               5                   10                  15

Thr Lys Asn Ser Ile Tyr Leu Gln Met Asp Ser Leu Lys Pro Glu Asp
            20                  25                  30

Thr Ala Val Tyr Tyr Cys
        35

<210> SEQ ID NO 207
<211> LENGTH: 12
<212> TYPE: PRT
<213> ORGANISM: Lama glama

<400> SEQUENCE: 207

Ala Ala Ser Ala Lys Gly Thr Ala Arg Tyr Asp Tyr
1               5                   10

<210> SEQ ID NO 208
<211> LENGTH: 11
<212> TYPE: PRT
<213> ORGANISM: Lama glama

<400> SEQUENCE: 208

Trp Gly Gln Gly Thr Gln Val Thr Val Ser Ser
1               5                   10

<210> SEQ ID NO 209
<211> LENGTH: 116

```
<212> TYPE: PRT
<213> ORGANISM: Lama glama

<400> SEQUENCE: 209
```

Glu Val Gln Leu Val Glu Ser Gly Gly Gly Leu Val Gln Ala Gly Gly
1               5                   10                  15

Ser Leu Arg Leu Ser Cys Ala Ala Ser Gly Ser Leu Arg Ser Ile Asn
            20                  25                  30

Thr Met Ala Trp His Arg Arg Ala Pro Gly Lys Glu Arg Glu Trp Val
        35                  40                  45

Ala Thr Ile Thr Gly Ser Asp Glu Thr Ile Val Ala Asp Ser Val Lys
    50                  55                  60

Gly Arg Phe Ala Ile Ser Arg Asp Ala Ala Asn Asn Thr Leu Ser Leu
65                  70                  75                  80

Glu Met Asn Gly Leu Lys Pro Glu Asp Thr Ala Val Tyr Tyr Cys Ala
                85                  90                  95

Ala Phe Thr Ala Thr Leu Val Pro Tyr Trp Gly Gln Gly Thr Gln Val
            100                 105                 110

Thr Val Ser Ser
            115

```
<210> SEQ ID NO 210
<211> LENGTH: 25
<212> TYPE: PRT
<213> ORGANISM: Lama glama

<400> SEQUENCE: 210
```

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

```
<210> SEQ ID NO 211
<211> LENGTH: 8
<212> TYPE: PRT
<213> ORGANISM: Lama glama

<400> SEQUENCE: 211
```

Gly Ser Leu Arg Ser Ile Asn Thr
1               5

```
<210> SEQ ID NO 212
<211> LENGTH: 17
<212> TYPE: PRT
<213> ORGANISM: Lama glama

<400> SEQUENCE: 212
```

Met Ala Trp His Arg Arg Ala Pro Gly Lys Glu Arg Glu Trp Val Ala
1               5                   10                  15

Thr

```
<210> SEQ ID NO 213
<211> LENGTH: 7
<212> TYPE: PRT
<213> ORGANISM: Lama glama

<400> SEQUENCE: 213
```

Ile Thr Gly Ser Asp Glu Thr
1               5

<210> SEQ ID NO 214
<211> LENGTH: 38
<212> TYPE: PRT
<213> ORGANISM: Lama glama

<400> SEQUENCE: 214

Ile Val Ala Asp Ser Val Lys Gly Arg Phe Ala Ile Ser Arg Asp Ala
1               5                   10                  15

Ala Asn Asn Thr Leu Ser Leu Glu Met Asn Gly Leu Lys Pro Glu Asp
            20                  25                  30

Thr Ala Val Tyr Tyr Cys
        35

<210> SEQ ID NO 215
<211> LENGTH: 10
<212> TYPE: PRT
<213> ORGANISM: Lama glama

<400> SEQUENCE: 215

Ala Ala Phe Thr Ala Thr Leu Val Pro Tyr
1               5                   10

<210> SEQ ID NO 216
<211> LENGTH: 11
<212> TYPE: PRT
<213> ORGANISM: Lama glama

<400> SEQUENCE: 216

Trp Gly Gln Gly Thr Gln Val Thr Val Ser Ser
1               5                   10

<210> SEQ ID NO 217
<211> LENGTH: 115
<212> TYPE: PRT
<213> ORGANISM: Lama glama

<400> SEQUENCE: 217

Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Leu Gly Ser Asn Asn
            20                  25                  30

Pro Met Ala Trp Tyr Arg Gln Ala Pro Gly Lys Glu Arg Glu Leu Val
        35                  40                  45

Ala Ser Ile Ser Ser Ala Tyr Arg Thr His Tyr Ala Asp Phe Val Lys
    50                  55                  60

Gly Arg Phe Thr Ile Ser Arg Asp Ser Pro Lys Asn Thr Val Ser Leu
65                  70                  75                  80

Gln Met Asn Asn Leu Lys Pro Glu Asp Thr Ala Val Tyr Tyr Cys Gly
                85                  90                  95

Ile Phe Val Ser Ala Arg Asn Tyr Trp Gly Lys Gly Thr Gln Val Thr
            100                 105                 110

Val Ser Ser
        115

<210> SEQ ID NO 218
<211> LENGTH: 25
<212> TYPE: PRT
<213> ORGANISM: Lama glama

<400> SEQUENCE: 218

Glu Val Gln Leu Val Glu Ser Gly Gly Gly Leu Val Gln Pro Gly Gly

```
1               5                  10                  15
Ser Leu Arg Leu Ser Cys Ala Ala Ser
            20                  25

<210> SEQ ID NO 219
<211> LENGTH: 8
<212> TYPE: PRT
<213> ORGANISM: Lama glama

<400> SEQUENCE: 219

Gly Ser Leu Gly Ser Asn Asn Pro
1               5

<210> SEQ ID NO 220
<211> LENGTH: 17
<212> TYPE: PRT
<213> ORGANISM: Lama glama

<400> SEQUENCE: 220

Met Ala Trp Tyr Arg Gln Ala Pro Gly Lys Glu Arg Glu Leu Val Ala
1               5                  10                  15

Ser

<210> SEQ ID NO 221
<211> LENGTH: 7
<212> TYPE: PRT
<213> ORGANISM: Lama glama

<400> SEQUENCE: 221

Ile Ser Ser Ala Tyr Arg Thr
1               5

<210> SEQ ID NO 222
<211> LENGTH: 38
<212> TYPE: PRT
<213> ORGANISM: Lama glama

<400> SEQUENCE: 222

His Tyr Ala Asp Phe Val Lys Gly Arg Phe Thr Ile Ser Arg Asp Ser
1               5                  10                  15

Pro Lys Asn Thr Val Ser Leu Gln Met Asn Asn Leu Lys Pro Glu Asp
            20                  25                  30

Thr Ala Val Tyr Tyr Cys
            35

<210> SEQ ID NO 223
<211> LENGTH: 9
<212> TYPE: PRT
<213> ORGANISM: Lama glama

<400> SEQUENCE: 223

Gly Ile Phe Val Ser Ala Arg Asn Tyr
1               5

<210> SEQ ID NO 224
<211> LENGTH: 11
<212> TYPE: PRT
<213> ORGANISM: Lama glama

<400> SEQUENCE: 224

Trp Gly Lys Gly Thr Gln Val Thr Val Ser Ser
1               5                  10
```

<210> SEQ ID NO 225
<211> LENGTH: 125
<212> TYPE: PRT
<213> ORGANISM: Lama glama

<400> SEQUENCE: 225

Glu Val Gln Leu Val Glu Ser Gly Gly Gly Leu Val Gln Ala Gly Gly
1               5                   10                  15

Ser Leu Arg Leu Ser Cys Thr Pro Ser Ile Thr Thr Ala Gly Thr Thr
            20                  25                  30

Ile Met Ala Trp Phe Arg Gln Ala Pro Gly Asn Glu Arg Glu Phe Val
        35                  40                  45

Ala Ala Ile Trp Gly Ser Lys Thr Ala Tyr Gly Asp Ser Met Lys Gly
    50                  55                  60

Arg Leu Thr Ile Ser Arg Asp Asn Val Arg Asn Gly Gln Lys Thr
65                  70                  75                  80

Val Phe Leu Gln Met Asn Asn Leu Gln Leu Gln Asp Thr Ala Thr Tyr
                85                  90                  95

Tyr Cys Ala Ala Ser Ser Gly Gly Tyr Val His Ser Ser Thr Ser Tyr
            100                 105                 110

Glu Ile Trp Gly Arg Gly Thr Gln Val Thr Val Ser Ser
        115                 120                 125

<210> SEQ ID NO 226
<211> LENGTH: 25
<212> TYPE: PRT
<213> ORGANISM: Lama glama

<400> SEQUENCE: 226

Glu Val Gln Leu Val Glu Ser Gly Gly Gly Leu Val Gln Ala Gly Gly
1               5                   10                  15

Ser Leu Arg Leu Ser Cys Thr Pro Ser
            20                  25

<210> SEQ ID NO 227
<211> LENGTH: 8
<212> TYPE: PRT
<213> ORGANISM: Lama glama

<400> SEQUENCE: 227

Ile Thr Thr Ala Gly Thr Thr Ile
1               5

<210> SEQ ID NO 228
<211> LENGTH: 17
<212> TYPE: PRT
<213> ORGANISM: Lama glama

<400> SEQUENCE: 228

Met Ala Trp Phe Arg Gln Ala Pro Gly Asn Glu Arg Glu Phe Val Ala
1               5                   10                  15

Ala

<210> SEQ ID NO 229
<211> LENGTH: 10
<212> TYPE: PRT
<213> ORGANISM: Lama glama

<400> SEQUENCE: 229

Ile Trp Gly Ser Lys Thr Ala Tyr Gly Asp

-continued

```
1               5                   10
```

\<210\> SEQ ID NO 230
\<211\> LENGTH: 38
\<212\> TYPE: PRT
\<213\> ORGANISM: Lama glama

\<400\> SEQUENCE: 230

```
Ser Met Lys Gly Arg Leu Thr Ile Ser Arg Asp Asn Val Arg Asp Asn
1               5                   10                  15

Gly Gln Lys Thr Val Phe Leu Gln Met Asn Asn Leu Gln Leu Gln Asp
            20                  25                  30

Thr Ala Thr Tyr Tyr Cys
            35
```

\<210\> SEQ ID NO 231
\<211\> LENGTH: 16
\<212\> TYPE: PRT
\<213\> ORGANISM: Lama glama

\<400\> SEQUENCE: 231

```
Ala Ala Ser Ser Gly Gly Tyr Val His Ser Thr Ser Tyr Glu Ile
1               5                   10                  15
```

\<210\> SEQ ID NO 232
\<211\> LENGTH: 11
\<212\> TYPE: PRT
\<213\> ORGANISM: Lama glama

\<400\> SEQUENCE: 232

```
Trp Gly Arg Gly Thr Gln Val Thr Val Ser Ser
1               5                   10
```

\<210\> SEQ ID NO 233
\<211\> LENGTH: 115
\<212\> TYPE: PRT
\<213\> ORGANISM: Lama glama

\<400\> SEQUENCE: 233

```
Glu Val Gln Leu Val Glu Ser Gly Gly Gly Leu Val Gln Ala Gly Gly
1               5                   10                  15

Ser Leu Arg Leu Ser Cys Ala Ala Ser Gly Ile Ile Phe Ser Ala Asn
            20                  25                  30

Thr Val Gly Trp Tyr Arg Gln Val Pro Gly Lys Glu Arg Asp Val Val
            35                  40                  45

Ala Ser Ile Thr Ser Gly Asp Ser Thr Tyr Tyr Gly Asp Ser Val Arg
        50                  55                  60

Asp Arg Phe Thr Ile Ser Arg Asp Asn Ala Lys Asn Thr Val Tyr Leu
65                  70                  75                  80

Gln Met Asn Ser Leu Lys Pro Asp Asp Thr Ala Ile Tyr Tyr Cys Arg
                85                  90                  95

Ala Arg Thr Thr Asp Gly Ser Tyr Trp Gly Gln Gly Thr Gln Val Thr
            100                 105                 110

Val Ser Ser
        115
```

\<210\> SEQ ID NO 234
\<211\> LENGTH: 26
\<212\> TYPE: PRT
\<213\> ORGANISM: Lama glama -continued

```
<400> SEQUENCE: 234

Glu Val Gln Leu Val Glu Ser Gly Gly Gly Leu Val Gln Ala Gly Gly
1               5                   10                  15

Ser Leu Arg Leu Ser Cys Ala Ala Ser Gly
            20                  25

<210> SEQ ID NO 235
<211> LENGTH: 8
<212> TYPE: PRT
<213> ORGANISM: Lama glama

<400> SEQUENCE: 235

Ile Ile Phe Ser Ala Asn Thr Val
1               5

<210> SEQ ID NO 236
<211> LENGTH: 15
<212> TYPE: PRT
<213> ORGANISM: Lama glama

<400> SEQUENCE: 236

Gly Trp Tyr Arg Gln Val Pro Gly Lys Glu Arg Asp Val Val Ala
1               5                   10                  15

<210> SEQ ID NO 237
<211> LENGTH: 11
<212> TYPE: PRT
<213> ORGANISM: Lama glama

<400> SEQUENCE: 237

Ser Ile Thr Ser Gly Asp Ser Thr Tyr Tyr Gly
1               5                   10

<210> SEQ ID NO 238
<211> LENGTH: 35
<212> TYPE: PRT
<213> ORGANISM: Lama glama

<400> SEQUENCE: 238

Asp Ser Val Arg Asp Arg Phe Thr Ile Ser Arg Asp Asn Ala Lys Asn
1               5                   10                  15

Thr Val Tyr Leu Gln Met Asn Ser Leu Lys Pro Asp Asp Thr Ala Ile
            20                  25                  30

Tyr Tyr Cys
        35

<210> SEQ ID NO 239
<211> LENGTH: 9
<212> TYPE: PRT
<213> ORGANISM: Lama glama

<400> SEQUENCE: 239

Arg Ala Arg Thr Thr Asp Gly Ser Tyr
1               5

<210> SEQ ID NO 240
<211> LENGTH: 11
<212> TYPE: PRT
<213> ORGANISM: Lama glama

<400> SEQUENCE: 240

Trp Gly Gln Gly Thr Gln Val Thr Val Ser Ser
1               5                   10
```

<210> SEQ ID NO 241
<211> LENGTH: 114
<212> TYPE: PRT
<213> ORGANISM: Lama glama

<400> SEQUENCE: 241

Glu Val Gln Leu Val Glu Ser Gly Gly Gly Leu Val Gln Ala Gly Gly
1               5                   10                  15

Ser Leu Arg Leu Ser Cys Ala Ala Ser Gly Leu Thr Phe Ser Arg Tyr
            20                  25                  30

Thr Met Ser Trp Tyr Arg Gln Ala Pro Gly Lys Glu Arg Glu Val Val
        35                  40                  45

Ala Ala Ile Ser Ser Gly Asp Ser Thr Tyr His Glu Asp Ser Val Lys
    50                  55                  60

Gly Arg Phe Ile Ile Ser Arg Asp Asn Ala Lys Asn Thr Val Tyr Leu
65                  70                  75                  80

Gln Met Asn Ser Leu Lys Thr Glu Asp Thr Ala Val Tyr Tyr Cys Arg
                85                  90                  95

Ala Asn Gly Pro Gly Thr Tyr Trp Gly Gln Gly Thr Gln Val Thr Val
            100                 105                 110

Ser Ser

<210> SEQ ID NO 242
<211> LENGTH: 26
<212> TYPE: PRT
<213> ORGANISM: Lama glama

<400> SEQUENCE: 242

Glu Val Gln Leu Val Glu Ser Gly Gly Gly Leu Val Gln Ala Gly Gly
1               5                   10                  15

Ser Leu Arg Leu Ser Cys Ala Ala Ser Gly
            20                  25

<210> SEQ ID NO 243
<211> LENGTH: 7
<212> TYPE: PRT
<213> ORGANISM: Lama glama

<400> SEQUENCE: 243

Leu Thr Phe Ser Arg Tyr Thr
1               5

<210> SEQ ID NO 244
<211> LENGTH: 16
<212> TYPE: PRT
<213> ORGANISM: Lama glama

<400> SEQUENCE: 244

Met Ser Trp Tyr Arg Gln Ala Pro Gly Lys Glu Arg Glu Val Val Ala
1               5                   10                  15

<210> SEQ ID NO 245
<211> LENGTH: 11
<212> TYPE: PRT
<213> ORGANISM: Lama glama

<400> SEQUENCE: 245

Ala Ile Ser Ser Gly Asp Ser Thr Tyr His Glu
1               5                   10

<210> SEQ ID NO 246
<211> LENGTH: 35
<212> TYPE: PRT
<213> ORGANISM: Lama glama

<400> SEQUENCE: 246

Asp Ser Val Lys Gly Arg Phe Ile Ile Ser Arg Asp Asn Ala Lys Asn
1               5                   10                  15

Thr Val Tyr Leu Gln Met Asn Ser Leu Lys Thr Glu Asp Thr Ala Val
            20                  25                  30

Tyr Tyr Cys
        35

<210> SEQ ID NO 247
<211> LENGTH: 8
<212> TYPE: PRT
<213> ORGANISM: Lama glama

<400> SEQUENCE: 247

Arg Ala Asn Gly Pro Gly Thr Tyr
1               5

<210> SEQ ID NO 248
<211> LENGTH: 11
<212> TYPE: PRT
<213> ORGANISM: Lama glama

<400> SEQUENCE: 248

Trp Gly Gln Gly Thr Gln Val Thr Val Ser Ser
1               5                   10

<210> SEQ ID NO 249
<211> LENGTH: 109
<212> TYPE: PRT
<213> ORGANISM: Lama glama

<400> SEQUENCE: 249

Glu Val Gln Leu Val Glu Ser Gly Gly Gly Leu Val Gln Ala Gly Gly
1               5                   10                  15

Ser Leu Arg Leu Ser Cys Ala Ala Ser Arg Ser Ile Ser Pro Met Gly
            20                  25                  30

Trp Tyr Arg Gln Ala Pro Gly Lys Gln Arg Glu Leu Val Ala Ile Met
        35                  40                  45

Pro Ser Ser Gly Pro Pro Ile Tyr Ala Asp Ser Val Gln Gly Arg Phe
    50                  55                  60

Thr Ile Ser Arg Asp Asn Ala Lys Asn Thr Val Tyr Leu Gln Met Asn
65                  70                  75                  80

Ser Leu Lys Pro Glu Asp Thr Ala Val Tyr Tyr Cys Asn Val Gly Gly
                85                  90                  95

Gly Tyr Trp Gly Gln Gly Thr Gln Val Thr Val Ser Ser
            100                 105

<210> SEQ ID NO 250
<211> LENGTH: 25
<212> TYPE: PRT
<213> ORGANISM: Lama glama

<400> SEQUENCE: 250

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 251
<211> LENGTH: 5
<212> TYPE: PRT
<213> ORGANISM: Lama glama

<400> SEQUENCE: 251

Arg Ser Ile Ser Pro
1               5

<210> SEQ ID NO 252
<211> LENGTH: 16
<212> TYPE: PRT
<213> ORGANISM: Lama glama

<400> SEQUENCE: 252

Met Gly Trp Tyr Arg Gln Ala Pro Gly Lys Gln Arg Glu Leu Val Ala
1               5                   10                  15

<210> SEQ ID NO 253
<211> LENGTH: 11
<212> TYPE: PRT
<213> ORGANISM: Lama glama

<400> SEQUENCE: 253

Ile Met Pro Ser Ser Gly Pro Pro Ile Tyr Ala
1               5                   10

<210> SEQ ID NO 254
<211> LENGTH: 35
<212> TYPE: PRT
<213> ORGANISM: Lama glama

<400> SEQUENCE: 254

Asp Ser Val Gln Gly Arg Phe Thr Ile Ser Arg Asp Asn Ala Lys Asn
1               5                   10                  15

Thr Val Tyr Leu Gln Met Asn Ser Leu Lys Pro Glu Asp Thr Ala Val
            20                  25                  30

Tyr Tyr Cys
        35

<210> SEQ ID NO 255
<211> LENGTH: 6
<212> TYPE: PRT
<213> ORGANISM: Lama glama

<400> SEQUENCE: 255

Asn Val Gly Gly Gly Tyr
1               5

<210> SEQ ID NO 256
<211> LENGTH: 11
<212> TYPE: PRT
<213> ORGANISM: Lama glama

<400> SEQUENCE: 256

Trp Gly Gln Gly Thr Gln Val Thr Val Ser Ser
1               5                   10

<210> SEQ ID NO 257
<211> LENGTH: 123
<212> TYPE: PRT

<213> ORGANISM: Lama glama

<400> SEQUENCE: 257

Glu Val Gln Leu Val Glu Ser Gly Gly Gly Leu Val Pro Ala Gly Gly
1               5                   10                  15

Ser Leu Arg Leu Ser Cys Ala Ala Ser Gly Arg Thr Phe Ser Asn Tyr
            20                  25                  30

Ala Met Gly Trp Phe Arg Gln Ala Pro Gly Lys Glu Arg Lys Phe Val
        35                  40                  45

Ala Thr Ile Ser Trp Ser Gly Val Thr Tyr Tyr Ala Asp Ser Val
    50                  55                  60

Lys Gly Arg Phe Thr Ile Ser Arg Asp Asn Ala Lys Asn Thr Val Tyr
65                  70                  75                  80

Leu Leu Met Asn Ser Leu Lys Pro Glu Asp Thr Ala Val Tyr Tyr Cys
                85                  90                  95

Ala Ala Lys Arg Asp Ser Ser Ser Tyr Asp His Arg Arg Tyr Asp Tyr
            100                 105                 110

Trp Gly Gln Gly Thr Gln Val Thr Val Ser Ser
        115                 120

<210> SEQ ID NO 258
<211> LENGTH: 26
<212> TYPE: PRT
<213> ORGANISM: Lama glama

<400> SEQUENCE: 258

Glu Val Gln Leu Val Glu Ser Gly Gly Gly Leu Val Pro Ala Gly Gly
1               5                   10                  15

Ser Leu Arg Leu Ser Cys Ala Ala Ser Gly
            20                  25

<210> SEQ ID NO 259
<211> LENGTH: 7
<212> TYPE: PRT
<213> ORGANISM: Lama glama

<400> SEQUENCE: 259

Arg Thr Phe Ser Asn Tyr Ala
1               5

<210> SEQ ID NO 260
<211> LENGTH: 16
<212> TYPE: PRT
<213> ORGANISM: Lama glama

<400> SEQUENCE: 260

Met Gly Trp Phe Arg Gln Ala Pro Gly Lys Glu Arg Lys Phe Val Ala
1               5                   10                  15

<210> SEQ ID NO 261
<211> LENGTH: 11
<212> TYPE: PRT
<213> ORGANISM: Lama glama

<400> SEQUENCE: 261

Thr Ile Ser Trp Ser Gly Val Thr Tyr Tyr
1               5                   10

<210> SEQ ID NO 262
<211> LENGTH: 36
<212> TYPE: PRT

<213> ORGANISM: Lama glama

<400> SEQUENCE: 262

```
Ala Asp Ser Val Lys Gly Arg Phe Thr Ile Ser Arg Asp Asn Ala Lys
1               5                   10                  15
Asn Thr Val Tyr Leu Leu Met Asn Ser Leu Lys Pro Glu Asp Thr Ala
            20                  25                  30
Val Tyr Tyr Cys
        35
```

<210> SEQ ID NO 263
<211> LENGTH: 16
<212> TYPE: PRT
<213> ORGANISM: Lama glama

<400> SEQUENCE: 263

```
Ala Ala Lys Arg Asp Ser Ser Tyr Asp His Arg Arg Tyr Asp Tyr
1               5                   10                  15
```

<210> SEQ ID NO 264
<211> LENGTH: 11
<212> TYPE: PRT
<213> ORGANISM: Lama glama

<400> SEQUENCE: 264

```
Trp Gly Gln Gly Thr Gln Val Thr Val Ser Ser
1               5                   10
```

<210> SEQ ID NO 265
<211> LENGTH: 112
<212> TYPE: PRT
<213> ORGANISM: Lama glama

<400> SEQUENCE: 265

```
Glu Val Gln Leu Val Glu Ser Gly Gly Gly Leu Val Gln Ala Gly Gly
1               5                   10                  15
Ser Leu Arg Leu Ser Cys Ser Ala Ser Gly Ser Ile Phe Ser Ile Asn
            20                  25                  30
Tyr Met Ala Trp Tyr Arg Gln Glu Pro Gly Lys Glu Arg Glu Val Val
        35                  40                  45
Ala Ser Met Ser Trp Arg Gly Asp Ser Thr Tyr Leu Ala Asp Ser Val
    50                  55                  60
Gln Gly Arg Phe Thr Ile Ser Arg Asn Asn Ala Lys Asn Thr Met Tyr
65                  70                  75                  80
Leu Gln Met Asn Ser Leu Lys Pro Glu Asp Thr Ala Leu Tyr Tyr Cys
                85                  90                  95
Lys Ala Asn Asn Tyr Trp Gly Gln Gly Thr Gln Val Thr Val Ser Ser
            100                 105                 110
```

<210> SEQ ID NO 266
<211> LENGTH: 26
<212> TYPE: PRT
<213> ORGANISM: Lama glama

<400> SEQUENCE: 266

```
Glu Val Gln Leu Val Glu Ser Gly Gly Gly Leu Val Gln Ala Gly Gly
1               5                   10                  15
Ser Leu Arg Leu Ser Cys Ser Ala Ser Gly
            20                  25
```

```
<210> SEQ ID NO 267
<211> LENGTH: 7
<212> TYPE: PRT
<213> ORGANISM: Lama glama

<400> SEQUENCE: 267

Ser Ile Phe Ser Ile Asn Tyr
1               5

<210> SEQ ID NO 268
<211> LENGTH: 16
<212> TYPE: PRT
<213> ORGANISM: Lama glama

<400> SEQUENCE: 268

Met Ala Trp Tyr Arg Gln Glu Pro Gly Lys Glu Arg Glu Val Val Ala
1               5                   10                  15

<210> SEQ ID NO 269
<211> LENGTH: 11
<212> TYPE: PRT
<213> ORGANISM: Lama glama

<400> SEQUENCE: 269

Ser Met Ser Trp Arg Gly Asp Ser Thr Tyr Leu
1               5                   10

<210> SEQ ID NO 270
<211> LENGTH: 36
<212> TYPE: PRT
<213> ORGANISM: Lama glama

<400> SEQUENCE: 270

Ala Asp Ser Val Gln Gly Arg Phe Thr Ile Ser Arg Asn Asn Ala Lys
1               5                   10                  15

Asn Thr Met Tyr Leu Gln Met Asn Ser Leu Lys Pro Glu Asp Thr Ala
                20                  25                  30

Leu Tyr Tyr Cys
        35

<210> SEQ ID NO 271
<211> LENGTH: 5
<212> TYPE: PRT
<213> ORGANISM: Lama glama

<400> SEQUENCE: 271

Lys Ala Asn Asn Tyr
1               5

<210> SEQ ID NO 272
<211> LENGTH: 11
<212> TYPE: PRT
<213> ORGANISM: Lama glama

<400> SEQUENCE: 272

Trp Gly Gln Gly Thr Gln Val Thr Val Ser Ser
1               5                   10

<210> SEQ ID NO 273
<211> LENGTH: 124
<212> TYPE: PRT
<213> ORGANISM: Lama glama

<400> SEQUENCE: 273
```

```
Glu Val Gln Leu Val Glu Ser Gly Gly Arg Leu Val Gln Pro Gly Asp
1               5                   10                  15

Ser Leu Arg Leu Ser Cys Ala Ala Ser Gly Arg Thr Phe Ser Asp Asn
            20                  25                  30

Ala Met Gly Trp Phe Arg Gln Ala Pro Gly Lys Glu Arg Arg Phe Val
        35                  40                  45

Ala Gly Ile Ser Trp Ala Gly Gly Ser Thr Tyr Tyr Ser Asp Ser Val
    50                  55                  60

Lys Gly Arg Phe Thr Ile Ser Arg Asp Asn Ala Lys Asn Thr Val Tyr
65                  70                  75                  80

Leu Gln Met Asn Ser Leu Lys Pro Glu Asp Thr Ala Val Tyr Tyr Cys
                85                  90                  95

Ala Ala Gly Leu Arg Ala Trp Val Gln Arg Met Pro Lys Asp Tyr Asn
            100                 105                 110

Tyr Trp Gly Gln Gly Thr Gln Val Thr Val Ser Ser
        115                 120
```

<210> SEQ ID NO 274
<211> LENGTH: 26
<212> TYPE: PRT
<213> ORGANISM: Lama glama

<400> SEQUENCE: 274

```
Glu Val Gln Leu Val Glu Ser Gly Gly Arg Leu Val Gln Pro Gly Asp
1               5                   10                  15

Ser Leu Arg Leu Ser Cys Ala Ala Ser Gly
            20                  25
```

<210> SEQ ID NO 275
<211> LENGTH: 7
<212> TYPE: PRT
<213> ORGANISM: Lama glama

<400> SEQUENCE: 275

```
Arg Thr Phe Ser Asp Asn Ala
1               5
```

<210> SEQ ID NO 276
<211> LENGTH: 16
<212> TYPE: PRT
<213> ORGANISM: Lama glama

<400> SEQUENCE: 276

```
Met Gly Trp Phe Arg Gln Ala Pro Gly Lys Glu Arg Arg Phe Val Ala
1               5                   10                  15
```

<210> SEQ ID NO 277
<211> LENGTH: 12
<212> TYPE: PRT
<213> ORGANISM: Lama glama

<400> SEQUENCE: 277

```
Gly Ile Ser Trp Ala Gly Gly Ser Thr Tyr Tyr Ser
1               5                   10
```

<210> SEQ ID NO 278
<211> LENGTH: 35
<212> TYPE: PRT
<213> ORGANISM: Lama glama

<400> SEQUENCE: 278

```
Asp Ser Val Lys Gly Arg Phe Thr Ile Ser Arg Asp Asn Ala Lys Asn
1               5                   10                  15

Thr Val Tyr Leu Gln Met Asn Ser Leu Lys Pro Glu Asp Thr Ala Val
            20                  25                  30

Tyr Tyr Cys
        35

<210> SEQ ID NO 279
<211> LENGTH: 17
<212> TYPE: PRT
<213> ORGANISM: Lama glama

<400> SEQUENCE: 279

Ala Ala Gly Leu Arg Ala Trp Val Gln Arg Met Pro Lys Asp Tyr Asn
1               5                   10                  15

Tyr

<210> SEQ ID NO 280
<211> LENGTH: 11
<212> TYPE: PRT
<213> ORGANISM: Lama glama

<400> SEQUENCE: 280

Trp Gly Gln Gly Thr Gln Val Thr Val Ser Ser
1               5                   10

<210> SEQ ID NO 281
<211> LENGTH: 119
<212> TYPE: PRT
<213> ORGANISM: Lama glama

<400> SEQUENCE: 281

Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Ala Phe Ser Ile Ser
            20                  25                  30

Ser Met Ser Trp Phe Arg Gln Ala Pro Gly Lys Glu Arg Val Val Val
        35                  40                  45

Ala Ser Ile Ala Trp Ser Gly Asp Ser Thr Tyr Tyr Ala Asp Ser Val
    50                  55                  60

Gln Gly Arg Phe Thr Ile Ser Lys Asp Asn Ala Lys Asn Thr Leu Ser
65                  70                  75                  80

Leu Gln Met Asn Ser Leu Lys Pro Glu Asp Thr Ala Val Tyr Tyr Cys
                85                  90                  95

Ser Ala Tyr Thr Gln Val Ser Val Asn Asn Arg Tyr Trp Gly Gln Gly
            100                 105                 110

Thr Gln Val Thr Val Ser Ser
        115

<210> SEQ ID NO 282
<211> LENGTH: 26
<212> TYPE: PRT
<213> ORGANISM: Lama glama

<400> SEQUENCE: 282

Glu Val Gln Leu Val Glu Ser Gly Gly Gly Leu Val Gln Ala Gly Gly
1               5                   10                  15

Ser Leu Arg Leu Ser Cys Ala Ala Ser Gly
            20                  25
```

<210> SEQ ID NO 283
<211> LENGTH: 7
<212> TYPE: PRT
<213> ORGANISM: Lama glama

<400> SEQUENCE: 283

Arg Ala Phe Ser Ile Ser Ser
1               5

<210> SEQ ID NO 284
<211> LENGTH: 16
<212> TYPE: PRT
<213> ORGANISM: Lama glama

<400> SEQUENCE: 284

Met Ser Trp Phe Arg Gln Ala Pro Gly Lys Glu Arg Val Val Val Ala
1               5                   10                  15

<210> SEQ ID NO 285
<211> LENGTH: 12
<212> TYPE: PRT
<213> ORGANISM: Lama glama

<400> SEQUENCE: 285

Ser Ile Ala Trp Ser Gly Asp Ser Thr Tyr Tyr Ala
1               5                   10

<210> SEQ ID NO 286
<211> LENGTH: 35
<212> TYPE: PRT
<213> ORGANISM: Lama glama

<400> SEQUENCE: 286

Asp Ser Val Gln Gly Arg Phe Thr Ile Ser Lys Asp Asn Ala Lys Asn
1               5                   10                  15

Thr Leu Ser Leu Gln Met Asn Ser Leu Lys Pro Glu Asp Thr Ala Val
            20                  25                  30

Tyr Tyr Cys
        35

<210> SEQ ID NO 287
<211> LENGTH: 12
<212> TYPE: PRT
<213> ORGANISM: Lama glama

<400> SEQUENCE: 287

Ser Ala Tyr Thr Gln Val Ser Val Asn Asn Arg Tyr
1               5                   10

<210> SEQ ID NO 288
<211> LENGTH: 11
<212> TYPE: PRT
<213> ORGANISM: Lama glama

<400> SEQUENCE: 288

Trp Gly Gln Gly Thr Gln Val Thr Val Ser Ser
1               5                   10

<210> SEQ ID NO 289
<211> LENGTH: 114
<212> TYPE: PRT
<213> ORGANISM: Lama glama

<400> SEQUENCE: 289

-continued

Glu Val Gln Leu Val Glu Ser Gly Gly Gly Leu Val Gln Ala Gly Gly
1               5                   10                  15

Ser Leu Arg Leu Ser Cys Ala Ala Ser Gly Ile Ile Phe Gly Ala Asn
            20                  25                  30

Thr Val Gly Trp Tyr Arg Gln Val Pro Gly Lys Glu Arg Asp Val Val
        35                  40                  45

Ala Ser Ile Thr Ser Gly Asp Ser Thr Tyr Tyr Gly Asp Ser Val Arg
    50                  55                  60

Gly Arg Phe Thr Ile Ser Arg Asp Asn Ala Lys Asn Thr Met Tyr Leu
65                  70                  75                  80

Gln Met Asn Ser Leu Lys Pro Glu Asp Thr Ala Ile Tyr Tyr Cys Arg
            85                  90                  95

Ala Arg Thr Thr Asp Gly Ser Tyr Trp Gly Gln Gly Thr Gln Val Thr
            100                 105                 110

Val Ser

<210> SEQ ID NO 290
<211> LENGTH: 25
<212> TYPE: PRT
<213> ORGANISM: Lama glama

<400> SEQUENCE: 290

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 291
<211> LENGTH: 8
<212> TYPE: PRT
<213> ORGANISM: Lama glama

<400> SEQUENCE: 291

Gly Ile Ile Phe Gly Ala Asn Thr
1               5

<210> SEQ ID NO 292
<211> LENGTH: 17
<212> TYPE: PRT
<213> ORGANISM: Lama glama

<400> SEQUENCE: 292

Val Gly Trp Tyr Arg Gln Val Pro Gly Lys Glu Arg Asp Val Val Ala
1               5                   10                  15

Ser

<210> SEQ ID NO 293
<211> LENGTH: 7
<212> TYPE: PRT
<213> ORGANISM: Lama glama

<400> SEQUENCE: 293

Ile Thr Ser Gly Asp Ser Thr
1               5

<210> SEQ ID NO 294
<211> LENGTH: 38
<212> TYPE: PRT
<213> ORGANISM: Lama glama

```
<400> SEQUENCE: 294

Tyr Tyr Gly Asp Ser Val Arg Gly Arg Phe Thr Ile Ser Arg Asp Asn
1               5                   10                  15

Ala Lys Asn Thr Met Tyr Leu Gln Met Asn Ser Leu Lys Pro Glu Asp
            20                  25                  30

Thr Ala Ile Tyr Tyr Cys
            35

<210> SEQ ID NO 295
<211> LENGTH: 9
<212> TYPE: PRT
<213> ORGANISM: Lama glama

<400> SEQUENCE: 295

Arg Ala Arg Thr Thr Asp Gly Ser Tyr
1               5

<210> SEQ ID NO 296
<211> LENGTH: 10
<212> TYPE: PRT
<213> ORGANISM: Lama glama

<400> SEQUENCE: 296

Trp Gly Gln Gly Thr Gln Val Thr Val Ser
1               5                   10

<210> SEQ ID NO 297
<211> LENGTH: 114
<212> TYPE: PRT
<213> ORGANISM: Lama glama

<400> SEQUENCE: 297

Glu Val Gln Leu Val Glu Ser Gly Gly Gly Leu Val Gln Ala Gly Gly
1               5                   10                  15

Ser Leu Arg Leu Ser Cys Ala Ala Ser Gly Leu Thr Phe Ser Ser Tyr
            20                  25                  30

Thr Met Ala Trp Tyr Arg Gln Ala Pro Gly Lys Glu Arg Glu Val Val
        35                  40                  45

Ala Ala Ile Ser Ser Gly Asp Ser Ile Tyr His Glu Gly Ser Val Gln
    50                  55                  60

Gly Arg Phe Ile Ile Ser Arg Asp Asn Ala Lys Asn Thr Val Tyr Leu
65                  70                  75                  80

Gln Met Asn Ser Leu Lys Ala Glu Asp Thr Ala Val Tyr Tyr Cys Arg
                85                  90                  95

Ala Asn Gly Pro Gly Thr Tyr Trp Gly Gln Gly Thr Gln Val Thr Val
            100                 105                 110

Ser Ser

<210> SEQ ID NO 298
<211> LENGTH: 25
<212> TYPE: PRT
<213> ORGANISM: Lama glama

<400> SEQUENCE: 298

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25
```

```
<210> SEQ ID NO 299
<211> LENGTH: 8
<212> TYPE: PRT
<213> ORGANISM: Lama glama

<400> SEQUENCE: 299

Gly Leu Thr Phe Ser Ser Tyr Thr
1               5

<210> SEQ ID NO 300
<211> LENGTH: 17
<212> TYPE: PRT
<213> ORGANISM: Lama glama

<400> SEQUENCE: 300

Met Ala Trp Tyr Arg Gln Ala Pro Gly Lys Glu Arg Glu Val Val Ala
1               5                   10                  15

Ala

<210> SEQ ID NO 301
<211> LENGTH: 7
<212> TYPE: PRT
<213> ORGANISM: Lama glama

<400> SEQUENCE: 301

Ile Ser Ser Gly Asp Ser Ile
1               5

<210> SEQ ID NO 302
<211> LENGTH: 38
<212> TYPE: PRT
<213> ORGANISM: Lama glama

<400> SEQUENCE: 302

Tyr His Glu Gly Ser Val Gln Gly Arg Phe Ile Ile Ser Arg Asp Asn
1               5                   10                  15

Ala Lys Asn Thr Val Tyr Leu Gln Met Asn Ser Leu Lys Ala Glu Asp
            20                  25                  30

Thr Ala Val Tyr Tyr Cys
        35

<210> SEQ ID NO 303
<211> LENGTH: 8
<212> TYPE: PRT
<213> ORGANISM: Lama glama

<400> SEQUENCE: 303

Arg Ala Asn Gly Pro Gly Thr Tyr
1               5

<210> SEQ ID NO 304
<211> LENGTH: 11
<212> TYPE: PRT
<213> ORGANISM: Lama glama

<400> SEQUENCE: 304

Trp Gly Gln Gly Thr Gln Val Thr Val Ser Ser
1               5                   10

<210> SEQ ID NO 305
<211> LENGTH: 114
<212> TYPE: PRT
<213> ORGANISM: Lama glama
```

<400> SEQUENCE: 305

Glu Val Gln Leu Val Glu Ser Gly Gly Gly Leu Val Gln Ala Gly Gly
1               5                   10                  15

Ser Leu Arg Leu Ser Cys Ala Ala Ser Gly Leu Thr Phe Ser Ser Tyr
            20                  25                  30

Thr Met Ala Trp Tyr Arg Gln Ala Pro Gly Lys Glu Arg Glu Val Val
        35                  40                  45

Ala Ala Ile Ser Ser Gly Asp Ser Ile Tyr His Glu Asp Ser Val Gln
    50                  55                  60

Gly Arg Phe Ile Ile Ser Arg Asp Asn Ala Lys Asn Thr Val Tyr Leu
65                  70                  75                  80

Gln Met Asn Ser Leu Lys Ala Glu Asp Thr Ala Val Tyr Tyr Cys Arg
                85                  90                  95

Ala Asn Gly Pro Gly Thr Tyr Trp Gly Gln Gly Thr Gln Val Thr Val
            100                 105                 110

Ser Ser

<210> SEQ ID NO 306
<211> LENGTH: 25
<212> TYPE: PRT
<213> ORGANISM: Lama glama

<400> SEQUENCE: 306

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 307
<211> LENGTH: 8
<212> TYPE: PRT
<213> ORGANISM: Lama glama

<400> SEQUENCE: 307

Gly Leu Thr Phe Ser Ser Tyr Thr
1               5

<210> SEQ ID NO 308
<211> LENGTH: 17
<212> TYPE: PRT
<213> ORGANISM: Lama glama

<400> SEQUENCE: 308

Met Ala Trp Tyr Arg Gln Ala Pro Gly Lys Glu Arg Glu Val Val Ala
1               5                   10                  15

Ala

<210> SEQ ID NO 309
<211> LENGTH: 7
<212> TYPE: PRT
<213> ORGANISM: Lama glama

<400> SEQUENCE: 309

Ile Ser Ser Gly Asp Ser Ile
1               5

<210> SEQ ID NO 310
<211> LENGTH: 38
<212> TYPE: PRT
<213> ORGANISM: Lama glama

-continued

<400> SEQUENCE: 310

Tyr His Glu Asp Ser Val Gln Gly Arg Phe Ile Ile Ser Arg Asp Asn
1               5                   10                  15

Ala Lys Asn Thr Val Tyr Leu Gln Met Asn Ser Leu Lys Ala Glu Asp
            20                  25                  30

Thr Ala Val Tyr Tyr Cys
        35

<210> SEQ ID NO 311
<211> LENGTH: 8
<212> TYPE: PRT
<213> ORGANISM: Lama glama

<400> SEQUENCE: 311

Arg Ala Asn Gly Pro Gly Thr Tyr
1               5

<210> SEQ ID NO 312
<211> LENGTH: 11
<212> TYPE: PRT
<213> ORGANISM: Lama glama

<400> SEQUENCE: 312

Trp Gly Gln Gly Thr Gln Val Thr Val Ser Ser
1               5                   10

<210> SEQ ID NO 313
<211> LENGTH: 112
<212> TYPE: PRT
<213> ORGANISM: Lama glama

<400> SEQUENCE: 313

Glu Val Gln Leu Val Glu Ser Gly Gly Gly Leu Val Gln Ala Gly Gly
1               5                   10                  15

Ser Leu Arg Leu Ser Cys Ala Ala Ser Gly Ser Ile Phe Arg Leu Asn
            20                  25                  30

Tyr Met Ala Trp Tyr Arg Gln Ala Pro Gly Lys Glu Arg Glu Val Val
        35                  40                  45

Ala Ser Met Ser Arg Arg Ser Asp Ser Thr Tyr Leu Ala Asp Ala Val
    50                  55                  60

Gln Gly Arg Phe Thr Ile Ser Met Asn Asn Ala Gly Asn Thr Met Tyr
65                  70                  75                  80

Leu Gln Met Asn Ser Leu Lys Pro Glu Asp Thr Ala Leu Tyr Tyr Cys
                85                  90                  95

Lys Ala Asn Asp Tyr Trp Gly Gln Gly Thr Gln Val Thr Val Ser Ser
            100                 105                 110

<210> SEQ ID NO 314
<211> LENGTH: 25
<212> TYPE: PRT
<213> ORGANISM: Lama glama

<400> SEQUENCE: 314

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 315

-continued

```
<211> LENGTH: 8
<212> TYPE: PRT
<213> ORGANISM: Lama glama

<400> SEQUENCE: 315

Gly Ser Ile Phe Arg Leu Asn Tyr
1               5

<210> SEQ ID NO 316
<211> LENGTH: 16
<212> TYPE: PRT
<213> ORGANISM: Lama glama

<400> SEQUENCE: 316

Met Ala Trp Tyr Arg Gln Ala Pro Gly Lys Glu Arg Glu Val Val Ala
1               5                   10                  15

<210> SEQ ID NO 317
<211> LENGTH: 9
<212> TYPE: PRT
<213> ORGANISM: Lama glama

<400> SEQUENCE: 317

Ser Met Ser Arg Arg Ser Asp Ser Thr
1               5

<210> SEQ ID NO 318
<211> LENGTH: 38
<212> TYPE: PRT
<213> ORGANISM: Lama glama

<400> SEQUENCE: 318

Tyr Leu Ala Asp Ala Val Gln Gly Arg Phe Thr Ile Ser Met Asn Asn
1               5                   10                  15

Ala Gly Asn Thr Met Tyr Leu Gln Met Asn Ser Leu Lys Pro Glu Asp
                20                  25                  30

Thr Ala Leu Tyr Tyr Cys
        35

<210> SEQ ID NO 319
<211> LENGTH: 4
<212> TYPE: PRT
<213> ORGANISM: Lama glama

<400> SEQUENCE: 319

Lys Ala Asn Asp
1

<210> SEQ ID NO 320
<211> LENGTH: 12
<212> TYPE: PRT
<213> ORGANISM: Lama glama

<400> SEQUENCE: 320

Tyr Trp Gly Gln Gly Thr Gln Val Thr Val Ser Ser
1               5                   10

<210> SEQ ID NO 321
<211> LENGTH: 112
<212> TYPE: PRT
<213> ORGANISM: Lama glama

<400> SEQUENCE: 321

Glu Val Gln Leu Val Glu Ser Gly Gly Gly Leu Val Gln Ala Gly Gly
```

```
                1               5                  10                 15
Ser Leu Arg Leu Ser Cys Ser Ala Ser Gly Ser Ile Phe Ser Ile Asn
                20                  25                  30

Tyr Met Ala Trp Tyr Arg Gln Glu Pro Gly Lys Glu Arg Glu Val Val
        35                  40                  45

Ala Ser Met Ser Trp Arg Gly Asp Ser Thr Tyr Leu Ala Asp Ser Val
        50                  55                  60

Gln Gly Arg Phe Thr Ile Ser Arg Asn Asn Ala Lys Asn Thr Met Tyr
65                  70                  75                  80

Leu Gln Met Asn Ser Leu Lys Pro Glu Asp Thr Ala Leu Tyr Tyr Cys
                85                  90                  95

Lys Ala Asn Asn Tyr Trp Gly Gln Gly Thr Gln Val Thr Val Ser Ser
                100                 105                 110

<210> SEQ ID NO 322
<211> LENGTH: 25
<212> TYPE: PRT
<213> ORGANISM: Lama glama

<400> SEQUENCE: 322

Glu Val Gln Leu Val Glu Ser Gly Gly Gly Leu Val Gln Ala Gly Gly
1               5                   10                  15

Ser Leu Arg Leu Ser Cys Ser Ala Ser
                20                  25

<210> SEQ ID NO 323
<211> LENGTH: 8
<212> TYPE: PRT
<213> ORGANISM: Lama glama

<400> SEQUENCE: 323

Gly Ser Ile Phe Ser Ile Asn Tyr
1               5

<210> SEQ ID NO 324
<211> LENGTH: 16
<212> TYPE: PRT
<213> ORGANISM: Lama glama

<400> SEQUENCE: 324

Met Ala Trp Tyr Arg Gln Glu Pro Gly Lys Glu Arg Glu Val Val Ala
1               5                   10                  15

<210> SEQ ID NO 325
<211> LENGTH: 9
<212> TYPE: PRT
<213> ORGANISM: Lama glama

<400> SEQUENCE: 325

Ser Met Ser Trp Arg Gly Asp Ser Thr
1               5

<210> SEQ ID NO 326
<211> LENGTH: 38
<212> TYPE: PRT
<213> ORGANISM: Lama glama

<400> SEQUENCE: 326

Tyr Leu Ala Asp Ser Val Gln Gly Arg Phe Thr Ile Ser Arg Asn Asn
1               5                   10                  15

Ala Lys Asn Thr Met Tyr Leu Gln Met Asn Ser Leu Lys Pro Glu Asp
```

Thr Ala Leu Tyr Tyr Cys
        35

<210> SEQ ID NO 327
<211> LENGTH: 5
<212> TYPE: PRT
<213> ORGANISM: Lama glama

<400> SEQUENCE: 327

Lys Ala Asn Asn Tyr
1               5

<210> SEQ ID NO 328
<211> LENGTH: 11
<212> TYPE: PRT
<213> ORGANISM: Lama glama

<400> SEQUENCE: 328

Trp Gly Gln Gly Thr Gln Val Thr Val Ser Ser
1               5                   10

<210> SEQ ID NO 329
<211> LENGTH: 109
<212> TYPE: PRT
<213> ORGANISM: Lama glama

<400> SEQUENCE: 329

Glu Val Gln Leu Val Glu Ser Gly Gly Gly Leu Val Gln Ala Gly Gly
1               5                   10                  15

Ser Leu Arg Leu Ser Cys Ala Ala Ser Arg Ser Ile Ser Pro Met Gly
            20                  25                  30

Trp Tyr Arg Gln Ala Pro Gly Lys Gln Arg Glu Leu Val Ala Ile Met
        35                  40                  45

Pro Ser Ser Gly Thr Pro Ile Tyr Ala Asp Ser Val Gln Gly Arg Phe
    50                  55                  60

Thr Ile Ser Arg Asp Asn Ala Lys Asn Thr Val Tyr Leu Gln Met Asn
65                  70                  75                  80

Ser Leu Lys Pro Glu Asp Thr Ala Val Tyr Tyr Cys Asn Val Gly Gly
                85                  90                  95

Gly Tyr Trp Gly Gln Gly Thr Gln Val Thr Val Ser Ser
            100                 105

<210> SEQ ID NO 330
<211> LENGTH: 25
<212> TYPE: PRT
<213> ORGANISM: Lama glama

<400> SEQUENCE: 330

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 331
<211> LENGTH: 5
<212> TYPE: PRT
<213> ORGANISM: Lama glama

<400> SEQUENCE: 331

Arg Ser Ile Ser Pro

<210> SEQ ID NO 332
<211> LENGTH: 16
<212> TYPE: PRT
<213> ORGANISM: Lama glama

<400> SEQUENCE: 332

Met Gly Trp Tyr Arg Gln Ala Pro Gly Lys Gln Arg Glu Leu Val Ala
1               5                   10                  15

<210> SEQ ID NO 333
<211> LENGTH: 9
<212> TYPE: PRT
<213> ORGANISM: Lama glama

<400> SEQUENCE: 333

Ile Met Pro Ser Ser Gly Thr Pro Ile
1               5

<210> SEQ ID NO 334
<211> LENGTH: 37
<212> TYPE: PRT
<213> ORGANISM: Lama glama

<400> SEQUENCE: 334

Tyr Ala Asp Ser Val Gln Gly Arg Phe Thr Ile Ser Arg Asp Asn Ala
1               5                   10                  15

Lys Asn Thr Val Tyr Leu Gln Met Asn Ser Leu Lys Pro Glu Asp Thr
            20                  25                  30

Ala Val Tyr Tyr Cys
        35

<210> SEQ ID NO 335
<211> LENGTH: 5
<212> TYPE: PRT
<213> ORGANISM: Lama glama

<400> SEQUENCE: 335

Asn Val Gly Gly Gly
1               5

<210> SEQ ID NO 336
<211> LENGTH: 12
<212> TYPE: PRT
<213> ORGANISM: Lama glama

<400> SEQUENCE: 336

Tyr Trp Gly Gln Gly Thr Gln Val Thr Val Ser Ser
1               5                   10

<210> SEQ ID NO 337
<211> LENGTH: 115
<212> TYPE: PRT
<213> ORGANISM: Lama glama

<400> SEQUENCE: 337

Glu Val Gln Leu Val Glu Ser Gly Gly Gly Leu Val Gln Ala Gly Gly
1               5                   10                  15

Ser Leu Arg Leu Ser Cys Ala Ala Ser Gly Ile Ile Phe Gly Ala Asn
            20                  25                  30

Thr Val Gly Trp Tyr Arg Gln Val Pro Gly Lys Glu Arg Asp Val Val
        35                  40                  45

```
Ala Ser Ile Thr Ser Val Asp Ser Thr Tyr Tyr Gly Asp Ser Val Arg
        50                  55                  60

Gly Arg Phe Thr Ile Ser Arg Asp Asn Ala Lys Asn Thr Val Tyr Leu
 65                  70                  75                  80

Gln Met Asn Ser Leu Lys Pro Glu Asp Thr Ala Ile Tyr Tyr Cys Arg
                 85                  90                  95

Ala Arg Thr Thr Asp Gly Ser Tyr Trp Gly Gln Gly Thr Gln Val Thr
            100                 105                 110

Val Ser Ser
        115

<210> SEQ ID NO 338
<211> LENGTH: 25
<212> TYPE: PRT
<213> ORGANISM: Lama glama

<400> SEQUENCE: 338

Glu Val Gln Leu Val Glu Ser Gly Gly Gly Leu Val Gln Ala Gly Gly
 1               5                  10                  15

Ser Leu Arg Leu Ser Cys Ala Ala Ser
            20                  25

<210> SEQ ID NO 339
<211> LENGTH: 8
<212> TYPE: PRT
<213> ORGANISM: Lama glama

<400> SEQUENCE: 339

Gly Ile Ile Phe Gly Ala Asn Thr
 1               5

<210> SEQ ID NO 340
<211> LENGTH: 16
<212> TYPE: PRT
<213> ORGANISM: Lama glama

<400> SEQUENCE: 340

Val Gly Trp Tyr Arg Gln Val Pro Gly Lys Glu Arg Asp Val Val Ala
 1               5                  10                  15

<210> SEQ ID NO 341
<211> LENGTH: 8
<212> TYPE: PRT
<213> ORGANISM: Lama glama

<400> SEQUENCE: 341

Ser Ile Thr Ser Val Asp Ser Thr
 1               5

<210> SEQ ID NO 342
<211> LENGTH: 38
<212> TYPE: PRT
<213> ORGANISM: Lama glama

<400> SEQUENCE: 342

Tyr Tyr Gly Asp Ser Val Arg Gly Arg Phe Thr Ile Ser Arg Asp Asn
 1               5                  10                  15

Ala Lys Asn Thr Val Tyr Leu Gln Met Asn Ser Leu Lys Pro Glu Asp
            20                  25                  30

Thr Ala Ile Tyr Tyr Cys
            35
```

<210> SEQ ID NO 343
<211> LENGTH: 8
<212> TYPE: PRT
<213> ORGANISM: Lama glama

<400> SEQUENCE: 343

Arg Ala Arg Thr Thr Asp Gly Ser
1               5

<210> SEQ ID NO 344
<211> LENGTH: 12
<212> TYPE: PRT
<213> ORGANISM: Lama glama

<400> SEQUENCE: 344

Tyr Trp Gly Gln Gly Thr Gln Val Thr Val Ser Ser
1               5                   10

<210> SEQ ID NO 345
<211> LENGTH: 112
<212> TYPE: PRT
<213> ORGANISM: Lama glama

<400> SEQUENCE: 345

Glu Val Gln Leu Val Glu Ser Gly Gly Gly Leu Val Gln Ala Gly Gly
1               5                   10                  15

Ser Leu Arg Leu Ser Cys Ala Ala Ser Gly Ser Ile Phe Ser Ile Asn
            20                  25                  30

Tyr Met Ala Trp Tyr Arg Gln Ala Pro Gly Lys Glu Arg Glu Val Val
        35                  40                  45

Ala Ser Met Ser Trp Arg Arg Asp Ser Thr Tyr Leu Ala Asp Ser Val
    50                  55                  60

Gln Gly Arg Phe Thr Ile Ser Arg Asn Asn Ala Lys Asn Thr Met Tyr
65                  70                  75                  80

Leu Gln Met Asn Ser Leu Lys Pro Glu Asp Thr Ala Leu Tyr Tyr Cys
                85                  90                  95

Lys Ala Asn Asp Tyr Trp Gly Gln Gly Thr Gln Val Thr Val Ser Ser
            100                 105                 110

<210> SEQ ID NO 346
<211> LENGTH: 25
<212> TYPE: PRT
<213> ORGANISM: Lama glama

<400> SEQUENCE: 346

Glu Val Gln Leu Val Glu Ser Gly Gly Gly Leu Val Gln Ala Gly Gly
1               5                   10                  15

Ser Leu Arg Leu Ser Cys Ala Ala Ser
            20                  25

<210> SEQ ID NO 347
<211> LENGTH: 8
<212> TYPE: PRT
<213> ORGANISM: Lama glama

<400> SEQUENCE: 347

Gly Ser Ile Phe Ser Ile Asn Tyr
1               5

<210> SEQ ID NO 348

```
<211> LENGTH: 16
<212> TYPE: PRT
<213> ORGANISM: Lama glama

<400> SEQUENCE: 348

Met Ala Trp Tyr Arg Gln Ala Pro Gly Lys Glu Arg Glu Val Val Ala
1               5                   10                  15

<210> SEQ ID NO 349
<211> LENGTH: 9
<212> TYPE: PRT
<213> ORGANISM: Lama glama

<400> SEQUENCE: 349

Ser Met Ser Trp Arg Arg Asp Ser Thr
1               5

<210> SEQ ID NO 350
<211> LENGTH: 37
<212> TYPE: PRT
<213> ORGANISM: Lama glama

<400> SEQUENCE: 350

Tyr Leu Ala Asp Ser Val Gln Gly Arg Phe Thr Ile Ser Arg Asn Asn
1               5                   10                  15

Ala Lys Asn Thr Met Tyr Leu Gln Met Asn Ser Leu Lys Pro Glu Asp
            20                  25                  30

Thr Ala Leu Tyr Tyr
            35

<210> SEQ ID NO 351
<211> LENGTH: 5
<212> TYPE: PRT
<213> ORGANISM: Lama glama

<400> SEQUENCE: 351

Cys Lys Ala Asn Asp
1               5

<210> SEQ ID NO 352
<211> LENGTH: 12
<212> TYPE: PRT
<213> ORGANISM: Lama glama

<400> SEQUENCE: 352

Tyr Trp Gly Gln Gly Thr Gln Val Thr Val Ser Ser
1               5                   10

<210> SEQ ID NO 353
<211> LENGTH: 112
<212> TYPE: PRT
<213> ORGANISM: Lama glama

<400> SEQUENCE: 353

Glu Val Gln Leu Val Glu Ser Gly Gly Gly Leu Val Gln Ala Gly Gly
1               5                   10                  15

Ser Leu Arg Leu Ser Cys Val Ala Ser Gly Ser Ile Phe Ser Ile Asn
            20                  25                  30

Tyr Met Ala Trp Tyr Arg Gln Thr Pro Gly Lys Glu Arg Glu Val Val
        35                  40                  45

Ala Ser Met Ser Arg Arg Ser Asp Ser Thr Tyr Leu Ala Asp Ala Val
    50                  55                  60
```

Gln Gly Arg Phe Thr Ile Ser Arg Asn Asn Ala Gly Asn Thr Met Tyr
65                  70                  75                  80

Leu Gln Met Asn Ser Leu Lys Pro Glu Asp Thr Ala Leu Tyr Tyr Cys
                85                  90                  95

Lys Ala Asn Asp Tyr Trp Gly Gln Gly Thr Gln Val Thr Val Ser Ser
            100                 105                 110

<210> SEQ ID NO 354
<211> LENGTH: 25
<212> TYPE: PRT
<213> ORGANISM: Lama glama

<400> SEQUENCE: 354

Glu Val Gln Leu Val Glu Ser Gly Gly Gly Leu Val Gln Ala Gly Gly
1               5                   10                  15

Ser Leu Arg Leu Ser Cys Val Ala Ser
            20                  25

<210> SEQ ID NO 355
<211> LENGTH: 8
<212> TYPE: PRT
<213> ORGANISM: Lama glama

<400> SEQUENCE: 355

Gly Ser Ile Phe Ser Ile Asn Tyr
1               5

<210> SEQ ID NO 356
<211> LENGTH: 16
<212> TYPE: PRT
<213> ORGANISM: Lama glama

<400> SEQUENCE: 356

Met Ala Trp Tyr Arg Gln Thr Pro Gly Lys Glu Arg Glu Val Val Ala
1               5                   10                  15

<210> SEQ ID NO 357
<211> LENGTH: 9
<212> TYPE: PRT
<213> ORGANISM: Lama glama

<400> SEQUENCE: 357

Ser Met Ser Arg Arg Ser Asp Ser Thr
1               5

<210> SEQ ID NO 358
<211> LENGTH: 37
<212> TYPE: PRT
<213> ORGANISM: Lama glama

<400> SEQUENCE: 358

Tyr Leu Ala Asp Ala Val Gln Gly Arg Phe Thr Ile Ser Arg Asn Asn
1               5                   10                  15

Ala Gly Asn Thr Met Tyr Leu Gln Met Asn Ser Leu Lys Pro Glu Asp
            20                  25                  30

Thr Ala Leu Tyr Tyr
            35

<210> SEQ ID NO 359
<211> LENGTH: 5
<212> TYPE: PRT
<213> ORGANISM: Lama glama

```
<400> SEQUENCE: 359

Cys Lys Ala Asn Asp
1               5

<210> SEQ ID NO 360
<211> LENGTH: 12
<212> TYPE: PRT
<213> ORGANISM: Lama glama

<400> SEQUENCE: 360

Tyr Trp Gly Gln Gly Thr Gln Val Thr Val Ser Ser
1               5                   10

<210> SEQ ID NO 361
<211> LENGTH: 119
<212> TYPE: PRT
<213> ORGANISM: Lama glama

<400> SEQUENCE: 361

Glu Val Gln Leu Val Glu Ser Gly Gly Gly Leu Val Gln Ala Gly Gly
1               5                   10                  15

Ser Leu Arg Leu Ser Cys Ala Ala Ser Gly Arg Ala Phe Ser Ile Ser
            20                  25                  30

Ser Met Ser Trp Phe Arg Gln Ala Pro Gly Lys Glu Arg Val Val Val
        35                  40                  45

Ala Ser Ile Ala Trp Ser Gly Asp Ser Thr Tyr Tyr Ala Asp Ser Val
    50                  55                  60

Gln Gly Arg Phe Thr Ile Ser Lys Asp Asn Ala Lys Asn Thr Leu Ser
65                  70                  75                  80

Leu Gln Met Asn Ser Leu Lys Pro Glu Asp Thr Ala Val Tyr Tyr Cys
                85                  90                  95

Ser Ala Tyr Thr Gln Val Ser Val Asn Asn Arg Tyr Trp Gly Gln Gly
            100                 105                 110

Thr Gln Val Thr Val Ser Ser
        115

<210> SEQ ID NO 362
<211> LENGTH: 26
<212> TYPE: PRT
<213> ORGANISM: Lama glama

<400> SEQUENCE: 362

Glu Val Gln Leu Val Glu Ser Gly Gly Gly Leu Val Gln Ala Gly Gly
1               5                   10                  15

Ser Leu Arg Leu Ser Cys Ala Ala Ser Gly
            20                  25

<210> SEQ ID NO 363
<211> LENGTH: 7
<212> TYPE: PRT
<213> ORGANISM: Lama glama

<400> SEQUENCE: 363

Arg Ala Phe Ser Ile Ser Ser
1               5

<210> SEQ ID NO 364
<211> LENGTH: 16
<212> TYPE: PRT
<213> ORGANISM: Lama glama
```

```
<400> SEQUENCE: 364

Met Ser Trp Phe Arg Gln Ala Pro Gly Lys Glu Arg Val Val Val Ala
1               5                   10                  15

<210> SEQ ID NO 365
<211> LENGTH: 12
<212> TYPE: PRT
<213> ORGANISM: Lama glama

<400> SEQUENCE: 365

Ser Ile Ala Trp Ser Gly Asp Ser Thr Tyr Tyr Ala
1               5                   10

<210> SEQ ID NO 366
<211> LENGTH: 35
<212> TYPE: PRT
<213> ORGANISM: Lama glama

<400> SEQUENCE: 366

Asp Ser Val Gln Gly Arg Phe Thr Ile Ser Lys Asp Asn Ala Lys Asn
1               5                   10                  15

Thr Leu Ser Leu Gln Met Asn Ser Leu Lys Pro Glu Asp Thr Ala Val
            20                  25                  30

Tyr Tyr Cys
        35

<210> SEQ ID NO 367
<211> LENGTH: 12
<212> TYPE: PRT
<213> ORGANISM: Lama glama

<400> SEQUENCE: 367

Ser Ala Tyr Thr Gln Val Ser Val Asn Asn Arg Tyr
1               5                   10

<210> SEQ ID NO 368
<211> LENGTH: 11
<212> TYPE: PRT
<213> ORGANISM: Lama glama

<400> SEQUENCE: 368

Trp Gly Gln Gly Thr Gln Val Thr Val Ser Ser
1               5                   10

<210> SEQ ID NO 369
<211> LENGTH: 15
<212> TYPE: PRT
<213> ORGANISM: Artificial Sequence
<220> FEATURE:
<223> OTHER INFORMATION: Gly-Gly-Gly-Gly-Ser linker

<400> SEQUENCE: 369

Gly Gly Gly Gly Ser Gly Gly Gly Gly Ser Gly Gly Gly Gly Ser
1               5                   10                  15

<210> SEQ ID NO 370
<211> LENGTH: 6
<212> TYPE: PRT
<213> ORGANISM: Artificial Sequence
<220> FEATURE:
<223> OTHER INFORMATION: hexahistidine-tag

<400> SEQUENCE: 370

His His His His His His
```

```
<210> SEQ ID NO 371
<211> LENGTH: 4
<212> TYPE: PRT
<213> ORGANISM: Artificial Sequence
<220> FEATURE:
<223> OTHER INFORMATION: EPEA-tag

<400> SEQUENCE: 371

Glu Pro Glu Ala
 1
```